United States Patent
Stubbington et al.

(10) Patent No.: US 12,449,419 B1
(45) Date of Patent: Oct. 21, 2025

(54) METHODS FOR DETECTING BINDING OF PEPTIDE-MHC MONOMERS TO T CELLS

(71) Applicant: 10X Genomics, Inc., Pleasanton, CA (US)

(72) Inventors: Michael John Terry Stubbington, Pleasanton, CA (US); Luz Montesclaros, Pleasanton, CA (US); Katherine Pfeiffer, Oakland, CA (US); Sarah E. B. Taylor, Pleasanton, CA (US); Alvaro Martinez Barrio, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 316 days.

(21) Appl. No.: 17/172,868

(22) Filed: Feb. 10, 2021

Related U.S. Application Data

(60) Provisional application No. 62/975,295, filed on Feb. 12, 2020.

(51) Int. Cl.
*C12N 9/22* (2006.01)
*B01L 3/00* (2006.01)
*G01N 1/30* (2006.01)
*G01N 33/569* (2006.01)

(52) U.S. Cl.
CPC ......... *G01N 33/56977* (2013.01); *C12N 9/22* (2013.01); *G01N 1/30* (2013.01); *B01L 3/502784* (2013.01); *B01L 2200/0673* (2013.01); *B01L 2300/0829* (2013.01); *C12Y 301/22001* (2013.01); *G01N 2001/305* (2013.01); *G01N 2333/70539* (2013.01)

(58) Field of Classification Search
None
See application file for complete search history.

(56) References Cited

U.S. PATENT DOCUMENTS

| | | |
|---|---|---|
| 4,124,638 A | 11/1978 | Hansen |
| 5,185,099 A | 2/1993 | Delpuech et al. |
| 5,270,183 A | 12/1993 | Corbett et al. |

(Continued)

FOREIGN PATENT DOCUMENTS

| | | | |
|---|---|---|---|
| DE | 102018122546 B3 * | 12/2019 | ............ A61K 38/00 |
| EP | 1019496 B1 | 9/2004 | |

(Continued)

OTHER PUBLICATIONS

Garboczi et al. "HLA-A2-peptide complexes: refolding and crystallization of molecules expressed in *Escherichia coli* and complexed with single antigenic peptides." Proc Natl Acad Sci U S A. Apr. 15, 1992;89(8):3429-33 (Year: 1992).*

(Continued)

*Primary Examiner* — Rebecca M Giere
*Assistant Examiner* — Alexander Alexandrovic Volkov
(74) *Attorney, Agent, or Firm* — Seed Intellectual Property Law Group LLP

(57) ABSTRACT

Featured are devices, systems, and methods of use for detecting binding of polynucleotide-peptide conjugate-major histocompatibility complex (pMHC) monomers to a T cell receptors (TCR) on a T cell, and the use of a peptide library to detect binding of antigenic peptides in a pMHC monomer to a T cell receptor (TCR) on a T cell.

20 Claims, 20 Drawing Sheets

Specification includes a Sequence Listing.

(56) References Cited

U.S. PATENT DOCUMENTS

| | | |
|---|---|---|
| 5,478,893 A | 12/1995 | Ghosh et al. |
| 5,736,330 A | 4/1998 | Fulton |
| 5,756,334 A | 5/1998 | Perler et al. |
| 5,846,719 A | 12/1998 | Brenner et al. |
| 5,900,481 A | 5/1999 | Lough et al. |
| 5,942,609 A | 8/1999 | Hunkapiller et al. |
| 5,994,056 A | 11/1999 | Higuchi |
| 6,033,880 A | 3/2000 | Haff et al. |
| 6,057,149 A | 5/2000 | Burns et al. |
| 6,123,798 A | 9/2000 | Gandhi et al. |
| 6,171,850 B1 | 1/2001 | Nagle et al. |
| 6,172,218 B1 | 1/2001 | Brenner |
| 6,176,962 B1 | 1/2001 | Soane et al. |
| 6,306,590 B1 | 10/2001 | Mehta et al. |
| 6,327,410 B1 | 12/2001 | Walt et al. |
| 6,379,929 B1 | 4/2002 | Burns et al. |
| 6,406,848 B1 | 6/2002 | Bridgham et al. |
| 6,409,832 B2 | 6/2002 | Weigl et al. |
| 6,410,246 B1 | 6/2002 | Zhu et al. |
| 6,492,118 B1 | 12/2002 | Abrams et al. |
| 6,524,456 B1 | 2/2003 | Ramsey et al. |
| 6,586,176 B1 | 7/2003 | Trnovsky et al. |
| 6,632,655 B1 | 10/2003 | Mehta et al. |
| 6,915,679 B2 | 7/2005 | Chien et al. |
| 7,041,481 B2 | 5/2006 | Anderson et al. |
| 7,115,400 B1 | 10/2006 | Adessi et al. |
| 7,129,091 B2 | 10/2006 | Ismagilov et al. |
| 7,268,167 B2 | 9/2007 | Higuchi et al. |
| 7,282,370 B2 | 10/2007 | Bridgham et al. |
| 7,294,503 B2 | 11/2007 | Quake et al. |
| 7,323,305 B2 | 1/2008 | Leamon et al. |
| 7,544,473 B2 | 6/2009 | Brenner |
| 7,595,060 B2 | 9/2009 | Duke et al. |
| 7,622,076 B2 | 11/2009 | Davies et al. |
| 7,622,280 B2 | 11/2009 | Holliger et al. |
| 7,645,596 B2 | 1/2010 | Williams et al. |
| 7,767,417 B2 * | 8/2010 | Philips ................... A61K 38/17 514/19.5 |
| 7,772,287 B2 | 8/2010 | Higuchi et al. |
| 7,799,553 B2 | 9/2010 | Mathies et al. |
| 7,842,457 B2 | 11/2010 | Berka et al. |
| 7,910,354 B2 | 3/2011 | Drmanac et al. |
| 7,927,797 B2 | 4/2011 | Nobile et al. |
| 7,960,104 B2 | 6/2011 | Drmanac et al. |
| 7,968,287 B2 | 6/2011 | Griffiths et al. |
| 8,053,192 B2 | 11/2011 | Bignell et al. |
| 8,133,719 B2 | 3/2012 | Drmanac et al. |
| 8,168,385 B2 | 5/2012 | Brenner |
| 8,268,564 B2 | 9/2012 | Roth et al. |
| 8,273,573 B2 | 9/2012 | Ismagilov et al. |
| 8,304,193 B2 | 11/2012 | Ismagilov et al. |
| 8,318,433 B2 | 11/2012 | Brenner |
| 8,329,407 B2 | 12/2012 | Ismagilov et al. |
| 8,394,590 B2 | 3/2013 | Kwong et al. |
| 8,592,150 B2 | 11/2013 | Drmanac et al. |
| 8,658,430 B2 | 2/2014 | Miller et al. |
| 8,691,510 B2 | 4/2014 | Faham et al. |
| 8,822,148 B2 | 9/2014 | Ismagilov et al. |
| 8,835,358 B2 | 9/2014 | Fodor et al. |
| 8,871,444 B2 | 10/2014 | Griffiths et al. |
| 8,889,083 B2 | 11/2014 | Ismagilov et al. |
| 8,975,302 B2 | 3/2015 | Light et al. |
| 9,029,083 B2 | 5/2015 | Griffiths et al. |
| 9,029,085 B2 | 5/2015 | Agresti et al. |
| 9,034,601 B2 | 5/2015 | Hufton et al. |
| 9,085,798 B2 | 7/2015 | Chee |
| 9,089,844 B2 | 7/2015 | Hiddessen et al. |
| 9,126,160 B2 | 9/2015 | Ness et al. |
| 9,151,757 B2 | 10/2015 | Reker-Hadrup et al. |
| 9,156,010 B2 | 10/2015 | Colston, Jr. et al. |
| 9,194,861 B2 | 11/2015 | Hindson et al. |
| 9,216,392 B2 | 12/2015 | Hindson et al. |
| 9,217,176 B2 | 12/2015 | Faham et al. |
| 9,266,104 B2 | 2/2016 | Link |
| 9,290,808 B2 | 3/2016 | Fodor et al. |
| 9,328,382 B2 | 5/2016 | Drmanac et al. |
| 9,347,059 B2 | 5/2016 | Saxonov |
| 9,365,901 B2 | 6/2016 | Pepin et al. |
| 9,388,465 B2 | 7/2016 | Hindson et al. |
| 9,417,190 B2 | 8/2016 | Hindson et al. |
| 9,486,757 B2 | 11/2016 | Romanowsky et al. |
| 9,499,865 B2 | 11/2016 | Faham et al. |
| 9,500,664 B2 | 11/2016 | Ness et al. |
| 9,506,119 B2 | 11/2016 | Faham et al. |
| 9,512,487 B2 | 12/2016 | Faham et al. |
| 9,567,631 B2 | 2/2017 | Hindson et al. |
| 9,623,384 B2 | 4/2017 | Hindson et al. |
| 9,637,799 B2 | 5/2017 | Fan et al. |
| 9,644,204 B2 | 5/2017 | Hindson et al. |
| 9,689,024 B2 | 6/2017 | Hindson et al. |
| 9,701,998 B2 | 7/2017 | Hindson et al. |
| 9,708,657 B2 | 7/2017 | Asbury et al. |
| 9,764,322 B2 | 9/2017 | Hiddessen et al. |
| 9,951,386 B2 * | 4/2018 | Hindson ............... C12Q 1/6874 |
| 9,957,558 B2 | 5/2018 | Leamon et al. |
| 10,011,872 B1 | 7/2018 | Belgrader et al. |
| 10,017,759 B2 | 7/2018 | Kaper et al. |
| 10,066,265 B2 | 9/2018 | Klinger et al. |
| 10,077,478 B2 | 9/2018 | Faham et al. |
| 10,168,328 B2 | 1/2019 | Berka |
| 10,221,442 B2 | 3/2019 | Hindson et al. |
| 10,253,364 B2 | 4/2019 | Hindson et al. |
| 10,273,541 B2 | 4/2019 | Hindson et al. |
| 10,323,279 B2 | 6/2019 | Hindson et al. |
| 10,392,663 B2 | 8/2019 | Emerson et al. |
| 10,400,280 B2 | 9/2019 | Hindson et al. |
| 10,428,325 B1 | 10/2019 | Klinger |
| 10,995,362 B2 | 5/2021 | Dallett et al. |
| 11,459,607 B1 | 10/2022 | Terry et al. |
| 2002/0005354 A1 | 1/2002 | Spence et al. |
| 2002/0051971 A1 | 5/2002 | Stuelpnagel et al. |
| 2002/0092767 A1 | 7/2002 | Bjornson et al. |
| 2002/0119455 A1 | 8/2002 | Chan |
| 2002/0127736 A1 | 9/2002 | Chou et al. |
| 2003/0036206 A1 | 2/2003 | Chien et al. |
| 2003/0075446 A1 | 4/2003 | Culbertson et al. |
| 2003/0124509 A1 | 7/2003 | Kenis et al. |
| 2003/0215862 A1 | 11/2003 | Parce et al. |
| 2005/0130188 A1 | 6/2005 | Walt et al. |
| 2005/0250147 A1 | 11/2005 | Macevicz |
| 2005/0266582 A1 | 12/2005 | Modlin et al. |
| 2006/0177832 A1 | 8/2006 | Brenner |
| 2006/0275782 A1 | 12/2006 | Gunderson et al. |
| 2007/0020640 A1 | 1/2007 | McCloskey et al. |
| 2007/0042419 A1 | 2/2007 | Barany et al. |
| 2007/0172873 A1 | 7/2007 | Brenner et al. |
| 2007/0190543 A1 | 8/2007 | Livak |
| 2007/0196397 A1 | 8/2007 | Torii et al. |
| 2007/0264320 A1 | 11/2007 | Lee et al. |
| 2008/0056948 A1 | 3/2008 | Dale et al. |
| 2008/0166720 A1 | 7/2008 | Hsieh et al. |
| 2008/0242560 A1 | 10/2008 | Gunderson et al. |
| 2009/0011943 A1 | 1/2009 | Drmanac et al. |
| 2009/0047713 A1 | 2/2009 | Handique |
| 2009/0099041 A1 | 4/2009 | Church et al. |
| 2009/0131543 A1 | 5/2009 | Weitz et al. |
| 2009/0148961 A1 | 6/2009 | Luchini et al. |
| 2009/0155563 A1 | 6/2009 | Petsev et al. |
| 2009/0202984 A1 | 8/2009 | Cantor |
| 2009/0235990 A1 | 9/2009 | Beer |
| 2009/0269248 A1 | 10/2009 | Falb et al. |
| 2009/0286687 A1 | 11/2009 | Dressman et al. |
| 2010/0035254 A1 | 2/2010 | Williams |
| 2010/0069263 A1 | 3/2010 | Shendure et al. |
| 2010/0086914 A1 | 4/2010 | Bentley et al. |
| 2010/0105866 A1 | 4/2010 | Fraden et al. |
| 2010/0184928 A1 | 7/2010 | Kumacheva |
| 2010/0216153 A1 | 8/2010 | Lapidus et al. |
| 2010/0248991 A1 | 9/2010 | Roesler et al. |
| 2010/0304982 A1 | 12/2010 | Hinz et al. |
| 2011/0217736 A1 | 9/2011 | Hindson |
| 2011/0305761 A1 | 12/2011 | Shum et al. |
| 2012/0071331 A1 | 3/2012 | Casbon et al. |
| 2012/0172259 A1 | 7/2012 | Rigatti et al. |

(56) References Cited

U.S. PATENT DOCUMENTS

| | | |
|---|---|---|
| 2012/0196288 A1 | 8/2012 | Beer |
| 2012/0219947 A1 | 8/2012 | Yurkovetsky et al. |
| 2013/0028812 A1 | 1/2013 | Prieto et al. |
| 2013/0109575 A1 | 5/2013 | Kleinschmidt et al. |
| 2014/0221239 A1 | 8/2014 | Carman et al. |
| 2014/0272996 A1 | 9/2014 | Bemis |
| 2014/0274740 A1 | 9/2014 | Srinivasan et al. |
| 2014/0302503 A1 | 10/2014 | Lowe et al. |
| 2014/0315725 A1 | 10/2014 | Faham et al. |
| 2014/0338753 A1 | 11/2014 | Sperling et al. |
| 2015/0267191 A1 | 9/2015 | Steelman et al. |
| 2015/0329617 A1 | 11/2015 | Winther et al. |
| 2015/0329891 A1 | 11/2015 | Tan et al. |
| 2015/0361418 A1 | 12/2015 | Reed |
| 2015/0376609 A1 | 12/2015 | Hindson et al. |
| 2016/0024493 A1 | 1/2016 | Robins |
| 2016/0024572 A1 | 1/2016 | Shishkin et al. |
| 2016/0025726 A1* | 1/2016 | Altin .............. C07K 7/08 436/501 |
| 2016/0032282 A1 | 2/2016 | Vigneault et al. |
| 2016/0053253 A1 | 2/2016 | Salathia et al. |
| 2016/0059204 A1 | 3/2016 | Hindson et al. |
| 2016/0060621 A1 | 3/2016 | Agresti et al. |
| 2016/0122753 A1 | 5/2016 | Mikkelsen et al. |
| 2016/0257993 A1 | 9/2016 | Fu et al. |
| 2016/0289769 A1 | 10/2016 | Schwartz et al. |
| 2016/0304956 A1 | 10/2016 | Robins |
| 2017/0128937 A1 | 5/2017 | Hung et al. |
| 2017/0144161 A1 | 5/2017 | Hindson et al. |
| 2017/0268056 A1 | 9/2017 | Vigneault et al. |
| 2018/0030515 A1 | 2/2018 | Regev et al. |
| 2018/0080075 A1 | 3/2018 | Brenner et al. |
| 2018/0080078 A1 | 3/2018 | Robins et al. |
| 2018/0112212 A1 | 4/2018 | Nicol et al. |
| 2018/0180601 A1 | 6/2018 | Pedersen et al. |
| 2019/0085391 A1 | 3/2019 | Hindson et al. |
| 2019/0136316 A1 | 5/2019 | Hindson et al. |
| 2019/0177800 A1 | 6/2019 | Boutet et al. |
| 2019/0323088 A1 | 10/2019 | Boutet et al. |
| 2019/0352717 A1 | 11/2019 | Schnall-Levin |
| 2019/0367997 A1 | 12/2019 | Bent et al. |
| 2019/0376118 A1 | 12/2019 | Belhocine et al. |
| 2020/0002763 A1 | 1/2020 | Belgrader et al. |
| 2020/0032335 A1 | 1/2020 | Martinez |
| 2020/0033237 A1 | 1/2020 | Hindson et al. |
| 2020/0056223 A1 | 2/2020 | Bell |
| 2020/0088726 A1* | 3/2020 | Moritz ............ C07K 14/70539 |
| 2020/0291454 A1 | 9/2020 | Belhocine et al. |
| 2020/0407775 A1 | 12/2020 | Bharadwaj et al. |
| 2021/0317198 A1 | 10/2021 | Croote et al. |

FOREIGN PATENT DOCUMENTS

| | | |
|---|---|---|
| EP | 1841879 A2 | 10/2007 |
| EP | 1967592 B1 | 4/2010 |
| EP | 2540389 A1 | 1/2013 |
| EP | 2635679 B1 | 4/2017 |
| GB | 2097692 B | 5/1985 |
| WO | WO-84/002000 A1 | 5/1984 |
| WO | WO-93/001498 A1 | 1/1993 |
| WO | WO-95/30782 A1 | 11/1995 |
| WO | WO-99/042597 A1 | 8/1999 |
| WO | WO-99/52708 A1 | 10/1999 |
| WO | WO-00/008212 A1 | 2/2000 |
| WO | WO-01/002850 A1 | 1/2001 |
| WO | WO-01/014589 A2 | 3/2001 |
| WO | WO-01/89787 A2 | 11/2001 |
| WO | WO-01/90418 A1 | 11/2001 |
| WO | WO-02/072631 A2 | 9/2002 |
| WO | WO-02/072631 A3 | 9/2002 |
| WO | WO-2004/002627 A2 | 1/2004 |
| WO | WO-2004/065617 A2 | 8/2004 |
| WO | WO-2004/069849 A2 | 8/2004 |
| WO | WO-2004/091763 A2 | 10/2004 |
| WO | WO-2005/021151 A1 | 3/2005 |
| WO | WO-2005/049787 A2 | 6/2005 |
| WO | WO-2005/082098 A2 | 9/2005 |
| WO | WO-2006/040551 A2 | 4/2006 |
| WO | WO-2006/078841 A1 | 7/2006 |
| WO | WO-2006/081222 A2 | 8/2006 |
| WO | WO-2006/096571 A2 | 9/2006 |
| WO | WO-2007/081385 A2 | 7/2007 |
| WO | WO-2007/081387 A1 | 7/2007 |
| WO | WO-2007/089541 A2 | 8/2007 |
| WO | WO-2007/133710 A2 | 11/2007 |
| WO | WO-2007/140015 A2 | 12/2007 |
| WO | WO-2007/147079 A2 | 12/2007 |
| WO | WO-2008/021123 A1 | 2/2008 |
| WO | WO-2008/109176 A2 | 9/2008 |
| WO | WO-2008/121342 A2 | 10/2008 |
| WO | WO-2008/134153 A1 | 11/2008 |
| WO | WO-2008/150432 A1 | 12/2008 |
| WO | WO-2009/011808 A1 | 1/2009 |
| WO | WO-2009/015296 A1 | 1/2009 |
| WO | WO-2009/085215 A1 | 7/2009 |
| WO | WO-2009/152928 A2 | 12/2009 |
| WO | WO-2010/009735 A2 | 1/2010 |
| WO | WO-2010/009735 A9 | 1/2010 |
| WO | WO-2010/033200 A2 | 3/2010 |
| WO | WO-2010/104604 A1 | 9/2010 |
| WO | WO-2010/117620 A2 | 10/2010 |
| WO | WO-2010/148039 A2 | 12/2010 |
| WO | WO-2011/028539 A1 | 3/2011 |
| WO | WO-2011/047870 A1 | 4/2011 |
| WO | WO-2011/056546 A1 | 5/2011 |
| WO | WO-2011/066476 A1 | 6/2011 |
| WO | WO-2012/048340 A2 | 4/2012 |
| WO | WO-2012/048340 A3 | 4/2012 |
| WO | WO-2012/048341 A1 | 4/2012 |
| WO | WO-2012/061832 A1 | 5/2012 |
| WO | WO-2012/083225 A2 | 6/2012 |
| WO | WO-2012/106546 A2 | 8/2012 |
| WO | WO-2012/112804 A1 | 8/2012 |
| WO | WO-2012/112970 A2 | 8/2012 |
| WO | WO-2012/116331 A2 | 8/2012 |
| WO | WO-2012/142531 A2 | 10/2012 |
| WO | WO-2012/142611 A2 | 10/2012 |
| WO | WO-2012/149042 A2 | 11/2012 |
| WO | WO-2012/166425 A2 | 12/2012 |
| WO | WO-2012/167142 A2 | 12/2012 |
| WO | WO-2013/019751 A1 | 2/2013 |
| WO | WO-2013/036929 A1 | 3/2013 |
| WO | WO-2013/055955 A1 | 4/2013 |
| WO | WO-2013/096643 A1 | 6/2013 |
| WO | WO-2013/126741 A1 | 8/2013 |
| WO | WO-2013/188872 A1 | 12/2013 |
| WO | WO-2014/028378 A2 | 2/2014 |
| WO | WO-2014/108810 A2 | 7/2014 |
| WO | WO-2014/144495 A1 | 9/2014 |
| WO | WO-2014/165559 A2 | 10/2014 |
| WO | WO-2015/015199 A2 | 2/2015 |
| WO | WO-2015/044428 A1 | 4/2015 |
| WO | WO-2015/164212 A1 | 10/2015 |
| WO | WO-2015/185067 A1 | 12/2015 |
| WO | WO-2015/185067 A9 | 12/2015 |
| WO | WO-2015/188839 A2 | 12/2015 |
| WO | WO-2015/188839 A3 | 12/2015 |
| WO | WO-2016/040476 A1 | 3/2016 |
| WO | WO-2016/061517 A2 | 4/2016 |
| WO | WO-2016/126871 A2 | 8/2016 |
| WO | WO-2016/176322 A1 | 11/2016 |
| WO | WO-2017/015075 A1 | 1/2017 |
| WO | WO-2017/053902 A1 | 3/2017 |
| WO | WO-2017/053903 A1 | 3/2017 |
| WO | WO-2017/053905 A1 | 3/2017 |
| WO | WO-2018/057051 A1 | 3/2018 |
| WO | WO-2018/119301 A1 | 6/2018 |
| WO | WO-2018/119447 A2 | 6/2018 |
| WO | WO-2018/119447 A3 | 6/2018 |
| WO | WO-2018/132635 A1 | 7/2018 |
| WO | WO-2018/132635 A8 | 7/2018 |
| WO | WO-2018/132635 A9 | 7/2018 |
| WO | WO-2018/172726 A1 | 9/2018 |

(56) References Cited

FOREIGN PATENT DOCUMENTS

| WO | WO-2018/191701 A1 | 10/2018 |
|---|---|---|
| WO | WO-2019/028166 A1 | 2/2019 |
| WO | WO-2019/157529 A1 | 8/2019 |
| WO | WO-2019/191321 A1 | 10/2019 |
| WO | WO-2019/217758 A1 | 11/2019 |
| WO | WO-2020/028882 A1 | 2/2020 |
| WO | WO-2020/033164 A1 | 2/2020 |
| WO | WO-2020/142779 A1 | 7/2020 |
| WO | WO-2020/167862 A1 | 8/2020 |
| WO | WO-2020/167866 A1 | 8/2020 |

OTHER PUBLICATIONS

Altenbach et al. "Estimation of inter-residue distances in spin labeled proteins at physiological temperatures: experimental strategies and practical limitations." Biochemistry. Dec. 25, 2001;40(51):15471-82. (Year: 2001).*
Sperinde et al. "Phage display selection of a peptide DNase II inhibitor that enhances gene delivery." J Gene Med. Mar.-Apr. 2001;3(2):101-8 (Year: 2001).*
Lissina et al. "Protein kinase inhibitors substantially improve the physical detection of T-cells with peptide-MHC tetramers." J Immunol Methods. Jan. 1, 2009;340(1):11-24 (Year: 2009).*
Pinto et al. "A guide for in-house design of template-switch-based 5' rapid amplification of cDNA ends systems." Analytical biochemistry vol. 397,2 (2010): 227-32 (Year: 2010).*
Govern et al. "Fast on-rates allow short dwell time ligands to activate T cells." Proceedings of the National Academy of Sciences of the United States of America vol. 107,19 (2010): 8724-9 (Year: 2010).*
Gryaznov "Oligonucleotide n3'->p5' phosphoramidates and thiophosphoramidates as potential therapeutic agents." Chem Biodivers. Mar. 2010;7(3):477-93 (Year: 2010).*
O'Donoghue et al. "Direct single molecule measurement of TCR triggering by agonist pMHC in living primary T cells." eLife vol. 2 e00778. Jul. 3, 2013 (Year: 2013).*
Klinger et al. "Combining next-generation sequencing and immune assays: a novel method for identification of antigen-specific T cells." PloS one vol. 8,9 e74231. Sep. 19, 2013 (Year: 2013).*
Dreiling et al. "Early cleavage of ethylene glycol bis(succinimidylsuccinate) (EGS)-linker moieties during enzymatic digestion of cross-linked proteins." Rapid communications in mass spectrometry : RCM vol. 28,21 (2014): 2385-8 (Year: 2014).*
Zhang et al. "High-throughput determination of the antigen specificities of T cell receptors in single cells." Nature biotechnology, 10.1038/nbt.4282. Nov. 12, 2018 (Year: 2018).*
Wikipedia ("Einstein relation (kinetic theory)", p. 1) (Year: 2023).*
Abdelaal, H.M. et al. (Oct. 18, 2019). "Detection of Antigen-Specific T Cells Using In Situ MHC Tetramer Staining," *Int. J. Mol. Sci.* 20(20):5165, 11 pgs.
Bakker, A.H. et al. (Mar. 11, 2008, e-published Feb. 28, 2008). "Conditional MHC class I ligands and peptide exchange technology for the human MHC gene products HLA-A1, -A3, -A11, and -B7," *Proc Natl Acad Sci U S A*. 105(10):3825-3830.
Bentzen, A.K. et al. (Oct. 2016, e-published Aug. 29, 2016). Large-scale detection of antigen-specific T cells using peptide-MHC-I multimers labeled with DNA barcodes. *Nat Biotechnol.* 34(10):1037-1045.
Briggs, A.W. et al. (May 5, 2017). "Tumor-infiltrating immune repertoires captures by single-cell barcoding in emulsion" with Supplementary material. *bioRxiv* 134841.
Chokkalingam, V. et al., (Dec. 21, 2013). "Probing cellular heterogeneity in cytokine-secreting immune cells using droplet-based microfluidics," *Lab Chip* 13(24):4740-4744.
Dahotre, S.N. et al. (Feb. 19, 2019, e-published Jan. 30, 2019). "DNA-Barcoded pMHC Tetramers for Detection of Single Antigen-Specific T Cells by Digital PCR," *Anal Chem.* 91(4):2695-2700.
Effenberger, M. et al. (Apr. 1, 2019, e-published Feb. 13, 2019). "FLEXamers: A Double Tag for Universal Generation of Versatile Peptide-MHC Multimers," *J Immunol.* 202(7):2164-2171.
Gee, M.H. et al. (Jan. 25, 2018, e-published Dec. 21, 2017). "Antigen Identification for Orphan T Cell Receptors Expressed on Tumor-Infiltrating Lymphocytes," *Cell* 172(3):549-563.
Gerard, A. et al. (Jun. 2020, e-published Mar. 30, 2020). "High-throughput single-cell activity-based screening and sequencing of antibodies using droplet microfluidics," *Nature Biotechnology* 38(6):715-721.
Han, A. et al. (Jul. 2014, e-published Jun. 22, 2014). Linking T-cell receptor sequence to functional phenotype at the single-cell level. *Nat Biotechnol.* 32(7):684-92. (Author Manuscript Version; 23 pgs.).
Kondo, A. et al. (Mar. 2004, e-published Jan. 10, 2004). "Yeast cell-surface display—applications of molecular display," *Appl Microbiol Biotechnol* 64(1):28-40.
Mcdaniel, J.R. et al. (Mar. 2016, e-published Feb. 4, 2016). "Ultra-high-throughput sequencing of the immune receptor repertoire from millions of lymphocytes," *Nat Protoc.* 11(3):429-442.
Mcshan, A.C. et al. (Aug. 2018, e-published Jul. 9, 2018). "Peptide exchange on MHC-I by TAPBPR is driven by a negative allostery release cycle," *Nat Chem Biol.* 14(8):811-820. (Author Manuscript Version; 26 pgs.).
Morozov, G.I et al. (Feb. 23, 2016, e-published Feb. 11, 2016). "Interaction of TAPBPR, a tapasin homolog, with MHC-I molecules promotes peptide editing," *Proc Natl Acad Sci U S A* 113(8):E1006-15.
Neal, L.R. et al. (2017, e-published Jun. 26, 2017). "The Basics of Artificial Antigen Presenting Cells in T Cell-Based Cancer Immunotherapies," *J Immunol Res Ther.* 2(1):68-79. (Author Manuscript Version; 19 pgs.).
Newell, E.W. et al. (Jul. 2009, e-published Jun. 21, 2009). "Simultaneous detection of many T-cell specificities using combinatorial tetramer staining," *Nat Methods* 6(7)497-499.
Omidfar, K. et al. (Jun. 2015, e-published Apr. 24, 2015). "Advances in phage display technology for drug discovery," *Expert Opin Drug Discov.* 10(6):651-669.
Rajan, S. et al. Jan. 22, 2018). "Recombinant Human B Cell Repertoires Enable Screening for Rare, Specific, and Natively Paired Antibodies," *Commun Biol.* 1:5.
Segaliny, A.I. et al. (Dec. 4, 2018). "Functional TCR T cell screening using single-cell droplet microfluidics," *Lab Chip.* 18(24):3733-3749.
Setliff, I. et al. (Dec. 12, 2019, e-published Nov. 28, 2019). "High-Throughput Mapping of B Cell Receptor Sequences to Antigen Specificity," *Cell* 179(7); 1636-1646.
Shiakolas, A.R. et al. (Mar. 3, 2022). "Efficient discovery of SARS-CoV-2-neutralizing antibodies via B cell receptor sequencing and ligand blocking," *Nature Biotechnology*; 16 pgs.
Sokal, A. et al. (Mar. 4, 2021, e-published Feb. 2, 2021). "Maturation and persistence of the anti-SARS-CoV-2 memory B cell response," *Cell* 184(5):1201-1213.
Toebes, M. et al. (Feb. 2006, e-published Feb. 5, 2006). "Design and use of conditional MHC class I ligands," *Nat Med.* 12(2):246-251.
Toebes, M. et al. (Nov. 2009). "Generation of peptide MHC class I monomers and multimers through ligand exchange," *Curr Protoc Immunol.* Chapter 18:Unit 18.16.
Valkiers, S. et al. (Mar. 2022). "Recent advances in T-cell receptor repertoire analysis: Bridging the gap with multimodal single-cell RNA sequencing," *ImmunoInformatics*; vol. 5; 100009, 17 pgs.
Vandormael, P. et al. (Feb. 2017). "cDNA phage display for the discovery of theranostic autoantibodies in rheumatoid arthritis," *Immunol Res.* 65(1):307-325.
Wiseman, R.W. et al. (Nov. 2009, e-published Oct. 11, 2009). "Major histocompatibility complex genotyping with massively parallel pyrosequencing" *Nature Medicine* 15(11):1322-1326.
Zhang, S-Q. et al. (Nov. 12, 2018). "High-throughput determination of the antigen specificities of T cell receptors in single cells," *Nat Biotechnol.* (Author Manuscript Version; 12 pgs.).
10X Genomics, Inc. CG000153 Rev A. Chromium Single Cell DNA Reagent Kits User Guide. 2018.

(56) References Cited

OTHER PUBLICATIONS

10X Genomics, Inc. CG000184 Rev A. Chromium Single Cell 3' Reagent Kits v3 User Guide with Feature Barcoding Technology for CRISPR Screening. 2018.
10X Genomics, Inc. CG000185 Rev B. Chromium Single Cell 3' Reagent Kits User Guide with Feature Barcoding Technology for Cell Surface Protein. 2018.
10X Genomics, Inc. CG000208 Rev E. Chromium Next GEM Single Cell V(D)J reagent Kits v1.1 User Guide with Feature Barcode Technology for Cell Surface Protein. 2020.
10X Genomics, Inc. CG000209 Rev D. Chromium Next GEM Single Cell ATAC Reagent Kits v1.1 User Guide. 2020.
10X Genomics, Inc. CG000239 Rev D. Visium Spatial Gene Expression Reagent Kits User Guide. 2020.
10X Genomics, Inc. CG00026. Chromium Single Cell 3' Reagent Kit User Guide. 2016.
10X Genomics, Inc. LIT00003.Rev B Chromium Genome Solution Application Note 2017.
Abate, A.R. et al. "Beating Poisson encapsulation statistics using close-packed ordering" Lab on a Chip (Sep. 21, 2009) 9(18):2628-2631.
Adamson et al., "Production of arrays of chemically distinct nanolitre plugs via repeated splitting in microfluidic devices", Lab Chip 6(9): 1178-1186 (Sep. 2006).
Agasti, S.S. et al. "Photocleavable DNA barcode-antibody conjugates allow sensitive and multiplexed protein analysis in single cell" J Am Chem Soc (2012) 134(45):18499-18502.
Amini, S. et al. "Haplotype-resolved whole-genome sequencing by contiguity-preserving transposition and combinatorial indexing" Nature Genetics (2014) 46:1343-1349 doi:10.1038/ng.3119.
Anna et al., "Formation of dispersions using 'flow focusing' in microchannels", Appln. Phys. Letts. 82:3 364 (2003).
Baret, "Surfactants in droplet-based microfluidics" Lab Chip (12(3):422-433 (2012).
Beer et al., On-Chip, Real-Time, Single-Copy Polymerase Chain Reaction in Picoliter Droplets, Anal. Chem., 2007, v. 79, pp. 8471-8475.
Braeckmans et al., Scanning the Code. Modern Drug Discovery. 2003:28-32.
Brenner, et al. "In vitro cloning of complex mixtures of DNA on microbeads: physical separation of differentially expressed cDNAs." Proc Natl Acad Sci U S A. Feb. 15, 2000;97(4):1665-70.
Buchman, GW et al. "Selective RNA amplification: a novel method using dUMP-containing primers and uracil DNA glycosylase" PCR Methods Appl. Aug. 1993; 3(1):28-31.
Burns, J.R. et al. "The intensification of rapid reactions in multiphase systems using slug flow in capillaries" Lab Chip. (Sep. 2001) 1(1):10-15.
Burns, M.A. et al. "An Integrated Nanoliter DNA Analysis Device" Science (1998) 282:484-487.
Burns, M.A. et al. "Microfabricated structures for integrated DNA analysis" PNAS (1996) 93(11):5556-5561.
Chen, F. et al. "Chemical transfection of cells in picoliter aqueous droplets in fluorocarbon oil" Anal Chem (2011) 83(22):8816-8820.
Chien et al. "Multiport flow-control system for lab-on-a-chip microfluidic devices", Fresenius J. Anal Chem, 371:106-111 (Jul. 27, 2001).
Chu, L-Y. et al., "Controllable monodisperse multiple emulsions" Angew. Chem. Int. Ed. (2007) 46:8970-8974.
Clausell-Tormos et al., "Droplet-based microfluidic platforms for the encapsulation and screening of mammalian cells and multicellular organisms", Chem. Biol. 15:427-437 (2008).
Co-pending U.S. Appl. No. 16/737,762, filed Jan. 8, 2020.
Co-pending U.S. Appl. No. 16/737,770, filed Jan. 8, 2020.
Co-pending U.S. Appl. No. 16/789,273, filed Feb. 12, 2020.
Co-pending U.S. Appl. No. 16/800,450, filed Feb. 25, 2020.
Damean, N. et al. "Simultaneous measurement of reactions in microdroplets filled by concentration gradients" Lab Chip (Jun. 21, 2009) 9(12):1707-1713.
Drmanac et al., Sequencing by hybridization (SBH): advantages, achievements, and opportunities. Adv Biochem Eng Biotechnol. 2002;77 :75-101.
Duffy et al., Rapid Protyping of Microfluidic Systems and Polydimethylsiloxane, Anal Chem 70:4974-4984 (1998).
Eastburn, D.J. et al., "Ultrahigh-throughput mammalian single-cell reverse-transcriptase polymerase chain reaction in microfluidic droplets" Anal. Chem. (2013) 85:8016-8021.
Esser-Kahn, et al. Triggered release from polymer capsules. Macromolecules. 2011; 44:5539-5553.
Gericke, M. et al. "Functional Cellulose Beads: Preparation, Characterization, and Applications" Chem Rev (2013) 113(7):4812-4836.
Guo, M.T. et al., "Droplet microfluidics for high-throughput biological assays" Lab Chip (2012) 12:2146-2155.
Gyarmati et al., "Reversible Disulphide Formation in Polymer Networks: A Versitile Functional Group from Synthesis to Application," European Polymer Journal, 2013, 49, 1268-1286.
Hashimshony, T et al. "CEL-Seq: Single-Cell RNa-Seq by Multiplexed Linear Amplification" Cell Rep. Sep. 27, 2012;2(3):666-73. doi: 10.1016/j.celrep.2012.08.003. Epub Aug. 30, 2012.
Holtze, C. et al. Biocompatible surfactants for water-in-fluorocarbon emulsions. Lab Chip. Oct. 2008; 8(10):1632-9. doi: 10.1039/b806706f. Epub Sep. 2, 2008.
Hug, H. et al. "Measurement of the number of molecules of a single mRNA species in a complex mRNA preparation" J Theor Biol. Apr. 21, 2003;221(4):615-24.
Islam et al. Highly multiplexed and strand-specific single-cell RNA 5' end sequencing. Nat Protoc. Apr. 5, 2012;7(5):813-28. doi: 10.1038/nprot.2012.022.
Jaitin et al. Massively parallel single-cell RNA-seq for marker-free decomposition of tissues into cell types. Science. Feb. 14, 2014;343(6172):776-9. doi: 10.1126/science.1247651.
Jarosz, M. et al. "Using 1ng of DNA to detect haplotype phasing and gene fusions from whole exome sequencing of cancer cell lines" Cancer Res (2015) 75(supp15):4742.
Kaper, et al. Supporting Information for "Whole-genome haplotyping by dilution, amplification, and sequencing." Proc Natl Acad Sci U S A. Apr. 2, 2013;110(14):5552-7. doi:10.1073/pnas.1218696110. Epub Mar. 18, 2013.
Kaper, F. et al. "Whole-genome haplotyping by dilution, amplification, and sequencing" PNAS (Apr. 2013) 110:5552-5557.
Kenis, P.J. et al. "Microfabrication inside capillaries using multiphase laminar flow patterning" Science (Jul. 2, 1999);285(5424): 83-85.
Kivioj, A. et al., "Counting Absolute Numbers of Molecules Using Unique Molecular Identifiers", Nature Methods 9, 72-74 (2012).
Klein, et al. Droplet barcoding for single-cell transcriptomics applied to embryonic stem cells. Cell. May 21, 2015; 161:1187-1201.
Korlach, et al., Methods in Enzymology, Real-Time DNA Sequencing from Single Polymerase Molecules, (2010) 472:431-455.
Koster et al., "Drop-based microfluidic devices for encapsulation of single cells", Lab on a Chip The Royal Soc. of Chem. 8: 1110-1115 (2008).
Lagally, E.T. et al. "Single-Molecule DNA Amplification and Analysis in an Integrated Microfluidic Device" Anal. Chem. (2001) 73(3):565-570.
Lennon et al. "A scalable, fully automated process for construction of sequence-ready barcoded libraries for 454." Genome Biology 11:R15 (2010).
Macosko, et al. Highly Parallel Genome-wide Expression Profiling of Individual Cells Using Nanoliter Droplets. Cell. May 21, 2015;161(5):1202-14. doi: 10.1016/j.cell.2015.05.002.
Madl et al., "Bioorthogonal Strategies for Engineering Extracellular Matrices," Adv. Funct. Mater. 2018, 28, 1706046; DOI: 10.1002/adfm.201706046.
Mair, D.A. et al., "Injection molded microfluidic chips featuring integrated interconnects" Lab Chip (2006) 6:1346-1354.
Mccoy, R. et al. "Illumina TruSeq Synthetic Long-Reads Empower De Novo Assembly and Resolve Complex, Highly-Repetitive Transposable Elements" PLOS (2014) 9(9):e1016689.
Microfluidic ChipShop. Microfluidic product catalogue. Oct. 2009.
Navin, N.E. "The first five years of single-cell cancer genomics and beyond" Genome Res. (2015) 25:1499-1507.

(56) References Cited

OTHER PUBLICATIONS

Nisisako et al. "Droplet formation in a microchannel on PMMA plate" Micro Total Analysis Systems 2001. Ramsey, J.M., van den Berg, A. 137-138 (2001).
Nisisako, T. et al. "Droplet formation in a microchannel network" Lab on a Chip (2002) 2:24-26.
Nisisako, T. et al., Microfluidics large-scale integration on a chip for mass production of monodisperse droplets and particles, The Royal Society of Chemistry: Lab Chip, (Nov. 23, 2007) 8:287-293.
Novak, R. et al., "Single cell multiplex gene detection and sequencing using microfluidicallygenerated agarose emulsions" Angew. Chem. Int. Ed. Engl. (2011) 50(2):390-395.
Orakdogen, N. "Novel responsive poly(N,N-dimethylaminoethyl methacrylate) gel beads: preparation, mechanical properties and pH-dependent swelling behavior" J Polym Res (2012) 19:9914 (Year: 2012).
Perrott, Jimmy. Optimization and Improvement of Emulsion PCR for the Ion Torrent Next-Generation Sequencing Platform. (2011) Thesis.
Peters et al., "Accurate whole-genome sequencing and haplotyping from 10 to 20 human cells," Nature, Jul. 12, 2012, vol. 487, pp190-195.
Plunkett, et al. Chymotrypsin responsive hydrogel: application of a disulfide exchange protocol for the preparation of methacrylamide containing peptides. Biomacromolecules. Mar.-Apr. 2005;6(2):632-7.
Priest, "Generation of monodisperse gel emulsions in a microfluidic device", Apl Phys Lett. 88:024106 (2006).
Pushkarev et al. "Single-molecule sequencing of an individual human genome," Nature Biotech (2009) 17:847-850.
Ramsey, J.M. "The burgeoning power of the shrinking laboratory" Nature Biotech (1999) 17:1061-1062.
Ramskold et al. "Full-length mRNA-Seq from single-cell levels of RNA and individual circulating tumor cells" Nature Biotech (2012) 30(8):777-782.
Roche "Using Multiplex Identifier (MID) Adaptors for the GS FLX Titanium Chemistry Basic MID Set" Genome Sequencer FLX System, Technical Bulletin 004-2009, (Apr. 1, 2009) pp. 1-7. URL:http://454.com/downloads/my454/documentation/technical-bulletins/TCB-09004 Using MultiplexIdentifierAdaptorsForTheGS FLXTitaniumSeriesChemistry-BasicMIDSet.pdf.
Rotem, A. et al., "High-throughput single-cell labeling (Hi-SCL) for RNA-Seq using drop-based microfluidics" PLOS One (Mapy 22, 2015) 0116328 (14 pages).
Saikia et al. Simultaneous multiplexed amplicon sequencing and transcriptome profiling in single cells. Nat Methods. Jan. 2019;16(1):59-62. doi: 10.1038/s41592-018-0259-9. Epub Dec. 17, 2018.
Schubert, et al. "Microemulsifying fluorinated oils with mixtures of fluorinated an hydrogenated surfactants" Colloids and Surfaces A: Physicochemical and Engineering Aspects (1994) 84:97-106.
Seiffert, S. et al., "Smart microgel capsules from macromolecular precursors" J. Am. Chem. Soc. (2010) 132:6606-6609.
Seiffert, et al. (Nov. 2010). "Microfluidic fabrication of smart microgels from macromolecular precursors," Polymer 51(25):5883-5889.
Shah, "Fabrication of mono disperse thermosensitive microgels and gel capsules in micro fluidic devices", Soft Matter, 4:2303-2309 (2008).
Shendure et al. "Accurate Multiplex Polony Sequencing of an Evolved bacterial Genome" Science (2005) 309:1728-1732.
Smith, A.M. et al. "Highly-multiplexed barcode sequencing: an efficient method for parallel analysis of pooled samples" Nucl Acids Res (2010) 38(13):e142 Epub May 11, 2010.
Song, H. et al. "Reactions in Droplets in Microfluidic Channels" Angew. Chem. Int. Ed. (2006) 45:7336-7356.
Thaxton, C.S. et al. "A Bio-Bar-Code Assay Based Upon Dithiothreitol Oligonucleotide Release" Anal Chem (2005) 77:8174-8178.
Theberge, A.B, et al. Microdropelts in microfluidics: an evolving platform for discoveries in chemistry and biology. Angew Chem Int Ed Engl. Aug. 9, 2010;49(34):5846-68. doi: 10.1002/anie.200906653.
Thorsen, T. et al. "Dynamic Pattern Formation in a Vesicle-Generating Microfluidic Device" Phys Rev Letts (Apr. 30, 2001) 86(18):4163-4166.
Tonelli, C. et al., "Perfluoropolyether functional oligomers: unusual reactivity in organic chemistry" J. Fluorine Chem. (2002) 118:107-121.
Turchinovich et al. Capture and Amplification by Tailing and Switching (CATS). An ultrasensitive ligation-independent method for generation of DNA libraries for deep sequencing from picogram amounts of DNA and RNA. RNA Biol. 2014;11(7):817-28. doi: 10.4161/rna.29304. Epub Jun. 12, 2014.
Uttamapinant et al., "Fast, Cell-compatible Click Chemistry with Copper-chelating Azides for Biomolecular Labeling," Angew Chem Int Ed Engl. Jun. 11, 2012; 51(24): 5852-5856; doi:10.1002/anie.201108181.
Wagner, O et al., "Biocompatible fluorinated polyglycerols for droplet microfluidics as an alternative to PEG-based copolymer surfactants" Lab Chip DOI:10.1039/C5LC00823A. (2015).
Weigl, B.H. et al. "Microfluidic Diffusion-Based Separation and Detection" Science (Jan. 15, 1999) 283(5400):346-347.
Williams, R. et al. "Amplification of complex gene libraries by emulsion PCR" Nature Methods (Jul. 2006) 3(7):545-550.
Zhang, et al. One-step fabrication of supramolecular microcapsules from microfluidic droplets. Science. Feb. 10, 2012;335(6069):690-4. doi: 10.1126/science.1215416.
Zheng, et al. Massively parallel digital transcriptional profiling of single cells. Nat Commun. Jan. 16, 2017;8:14049. doi: 10.1038/ncomms14049.
Zheng, X.Y. et al. "Haplotyping germline and cancer genomes with high-throughput linked-read sequencing" Nature Biotech (Feb. 1, 2016) 34(3):303-311 and Supplemental Material.
Zhu, YY et al. "Reverse transcriptase template switching: a SMART approach for full-length cDNA library construction" Biotechniques (2001) 30(4):892-897.

\* cited by examiner

METHODS FOR DETECTING BINDING OF PEPTIDE-MHC MONOMERS TO T CELLS

REFERENCE TO A "SEQUENCE LISTING," A TABLE, OR A COMPUTER PROGRAM LISTING APPENDIX SUBMITTED AS AN ASCII FILE

The Sequence Listing written in file 057862-576001US_SequenceListing_ST25.txt, created Apr. 15, 2021, 2,231 bytes, machine format IBM-PC, MS Windows operating system, is hereby incorporated by reference.

BACKGROUND OF THE INVENTION

Immunology is fundamentally concerned with the interaction between a host whose immune system mounts a response, and an antigen against which that response is directed. The outcome of this interaction dictates the host's fate: infection in case of interaction with a pathogenic antigen, cancer in case of interaction with a tumor antigen, autoimmunity in case of interaction with a self-antigen, and allergy in case of interaction with an innocuous environmental antigen. Improvements in nucleic acid sequencing capacity have provided tools to explore the genetic basis of these different immune outcomes at high resolution and with broad coverage, with reference to both the host and the antigen.

One of the most important protein interfaces between the host and the antigen is the peptide-major histocompatibility complex (pMHC) molecules, which comprises MHC, a host-encoded transmembrane protein in physical association with an antigenic peptide, a peptide derived from an antigen. The pMHC molecule serves two parallel systems of antigen presentation: (1) the cytosolic pathway, in which endogenous proteins are processed into short peptides, e.g., peptides of approximately 7-10 amino acids, and presented in complex with MHC class I by all nucleated cells; and (2) the endosomal pathway, in which engulfed exogenous proteins are processed into peptides of approximately 10-25 amino acids and presented in complex with MHC class II by specialized antigen presenting cells (APCs). Once presented to the T cells in one of these ways, antigenic peptides can trigger a highly antigen-specific response, for example, a cellular immune response versus a humoral immune response, or an immunogenic response versus a tolerogenic response.

There exists a need for improved methods of detecting and characterizing pMHC-T cell interactions and attributing such characteristics to the T cells and the antigen from which the antigenic peptides were derived.

SUMMARY OF THE INVENTION

Described herein are methods for generating peptide-major histocompatibility complex (pMHC) monomers and detecting binding of pMHC monomers to T cells. Provided herein are methods, compositions, and systems for conjugating peptides (e.g., antigenic peptides) to polynucleotides to generate polynucleotide-peptide conjugates, loading the polynucleotide-peptide conjugates onto MHC monomers to generate pMHC monomers, presenting the pMHC monomers to T cells, and detecting and characterizing interaction of pMHC monomers with the T cells. Also provided herein are methods, compositions, and systems for presenting pMHC monomers on profiling antigen-presenting cells (pAPCs) to T cells, forming pAPC-T cell multiplets, stabilizing the pMHC-TCR complex, and detecting and characterizing the interaction of pMHC monomers with the T cells.

In one aspect, the disclosure provides a method for detection of binding of a peptide to a T cell including: (a) providing a peptide-MHC conjugate (pMHC) complex including a MHC monomer and a peptide, and the pMHC includes a reporter polynucleotide attached thereto, in which the reporter polynucleotide includes a reporter sequence that identifies the peptide of the pMHC; (b) presenting the pMHC monomers to T cells to generate a pMHC bound to a T cell, in which a T cell receptor (TCR) of the T cell binds a pMHC monomer to form a pMHC-TCR complex, in which the pMHC-TCR complex is stabilized by:
  (i) using a chemical fixative;
  (ii) reducing diffusion of the pMHC monomer from the TCR; and/or
  (iii) retaining and/or inducing internalization of the pMHC-TCR complex into T cells;
(c) partitioning the T cell and a plurality of nucleic acid barcode molecules including a cell barcode sequence into a partition; and
(d) generating a barcoded nucleic acid molecule including (i) the reporter sequence or a reverse complement thereof and (ii) the cell barcode sequence or a reverse complement thereof.

In one embodiment, the T cell includes a template nucleic acid molecule including a sequence corresponding to an immune receptor; and further including, subsequent to (c), generating an additional barcoded nucleic acid molecule including (i) a sequence of a V(D)J region of the immune receptor or a reverse complement thereof and (ii) the cell barcode sequence or a reverse complement thereof. In another embodiment, the method further includes, lysing the T cell in the partition to release the template nucleic acid molecule. In certain embodiments, the template nucleic acid molecule is a messenger RNA (mRNA) molecule. In another embodiment, the method further includes hybridizing a second nucleic acid barcode molecule to said template nucleic acid molecule and performing one or more nucleic acid reactions to generate the additional barcoded nucleic acid molecule. The one or more nucleic acid reactions can include an extension reaction, a reverse transcription reaction, and/or a ligation reaction. In certain embodiments, the pMHC complex includes a carrier and the pMHC monomer and the polynucleotide may be attached to said carrier. The carrier may be, e.g., streptavidin. The pMHC monomer and the polynucleotide may be conjugated to biotin.

In some embodiments, the method further includes:
  (i) generating a polynucleotide-peptide conjugate; and
  (ii) loading the polynucleotide-peptide conjugate onto an MHC monomer to generate the pMHC monomer. In another embodiment, the polynucleotide is covalently attached to the peptide though an adapter molecule. In certain embodiments, the adapter molecule is covalently attached to a coenzyme A (CoA) molecule or a puromycin molecule.

In some embodiments, the loading includes:
  (i) expressing and re-folding heavy chains of the MHC monomers in presence of the polynucleotide-peptide conjugates, thereby loading the polynucleotide-peptide conjugates to the MHC monomers;
  (ii) expressing and folding MHC monomers including placeholder peptides in presence of the polynucleotide-peptide conjugates, in which the placeholder peptides are exchanged for the polynucleotide-peptide conjugates, thereby loading the polynucleotide-peptide conjugates onto the MHC monomers; and/or (iii) expressing and folding empty MHC monomers in an admixture with the polynucleotide-peptide conjugates, thereby loading the polynucleotide-peptide conjugates onto the MHC monomers. In certain embodiments, the exchange of the placeholder peptides for the polynucleotide-peptide conjugates in step (b) includes: (i) UV-mediated exchange of peptides; (ii) chemical-mediated exchange of peptides; (iii) temperature-mediated exchange of peptides; (iv) chaperone-mediated exchange of peptides; and/or (v) thrombin-mediated exchange of peptides. In some embodiments, the method further includes, prior to step (c), enriching for the T cell. In another embodiment, the pMHC monomers include a detectable label, in which the detectable label is optionally a fluorophore, and the enriching includes sorting the T cells using the detectable label, thereby enriching the T cell. In certain embodiments, the reporter polynucleotide includes an adapter sequence (e.g., Illumina R1, R2, P5, or P7 adapter sequence; or a polyfunctional adapter molecule containing a DNA molecule having a region complementary to a conserved 3' end of transcribed mRNA that is covalently attached to a coenzyme A molecule or a puromycin molecule (e.g., by way of a polyethylene glycol linker moiety)), in which at least some of said plurality of nucleic acid barcode molecules include a capture sequence complementary to said adapter sequence, and in which (d) includes hybridizing said adapter sequence to a first nucleic acid barcode molecule and performing one or more nucleic acid reactions to generate the barcoded nucleic acid molecule. In another embodiment, the one or more nucleic acid reactions include an extension reaction, a reverse transcription reaction, and/or a ligation reaction. In some embodiments, the method further includes sequencing the barcoded nucleic acid molecule or a derivative thereof and/or the additional barcoded nucleic acid molecule or a derivative thereof to generate sequencing data corresponding to the barcoded nucleic acid molecule and the additional barcoded nucleic acid molecule. In some embodiments, the method further includes using the sequencing data to identify the peptide of the pMHC and, optionally, to associate the sequence of the V(D)J region of the immune receptor with the peptide.

In certain embodiments, the chemical fixative in step (b) is not a thiol-based fixative. In another embodiment, the chemical fixative is selected from the group consisting of ethylene glycol bis(succinimidyl succinate) (EGS), PEGylated bis(sulfosuccinimidyl)suberate (BS(PEG)9), BS(PEG) 5, sulfo-EGS, bis-dPEG5-PFP, and bis(sulfosuccinimidyl) suberate (BS3). In addition, reducing diffusion of the pMHC monomer in step (c) may include physiochemical alterations to the pMHC monomer and/or physiochemical alterations to the composition of the binding buffer. Furthermore, inducing internalization of the pMHC-TCR complex into T cells may include stimulating protein kinase activity; and/or retaining internalization of the pMHC-TCR complex may include not using a protein kinase inhibitor, in which the protein kinase inhibitor is optionally dasatinib. Additionally, retaining and/or inducing internalization of the pMHC-TCR complex into T cells in step (b) may further include inhibiting lysosomal degradation of the pMHC monomers in the T cells. In some embodiments, inhibiting lysosomal degradation of the pMHC monomers includes inhibiting DNAse II activity. In another embodiment, inhibiting DNAse II activity includes: (i) including chloroquine in the binding buffer; and/or (ii) conjugating a DNAse II inhibitor peptide to the pMHC monomer. In some embodiments, the reporter sequence encodes the peptide in the pMHC complex.

In some embodiments, the reporter polynucleotide of the foregoing aspects and embodiments (e.g., a barcode sequence) includes at least 1, 2, 3, 4, 5, 6, 7, 8, 9, or 10 or more nuclease-resistant internucleoside linkages. In some embodiments, the nuclease-resistant internucleoside linkage is a phosphorothioate internucleoside linkage. The reporter polynucleotide may include nuclease-resistant internucleoside linkages (e.g., a phosphorothioate internucleoside linkage) located in one or more regions of the reporter polynucleotide or throughout the reporter polynucleotide.

In yet another embodiment, the plurality of nucleic acid barcode molecules may be attached to a bead. In certain embodiments, the plurality of nucleic acid barcode molecules are releasable from the bead upon application of a stimulus (e.g., a thermal stimulus, a biological stimulus, a chemical stimulus, or a photo-stimulus). In another embodiment, the bead is a gel bead. In certain embodiments, the gel bead is degradable upon application of a stimulus (e.g., a thermal stimulus, a biological stimulus, a chemical stimulus, or a photo-stimulus). In some embodiments, each of the plurality of nucleic acid barcode molecules includes one or more functional sequences selected from the group consisting of an adapter sequence, primer sequence, a primer binding sequence, a unique molecular identifier (UMI) sequence, a sequence configured to attach to the flow cell of a sequencer, and any partial sequences thereof. In certain embodiments, the UMI is a random N-mer sequence. In another embodiment, at least some of the plurality of nucleic acid barcode molecules include a template switching sequence. In some embodiments, the template switching sequence includes a polynucleotide sequence. In certain embodiments, the polynucleotide sequence is a poly-G sequence. In another embodiment, the template switching sequence includes a ribonucleotide. In some embodiments, the method further includes releasing the barcoded nucleic acid molecule or the additional barcoded nucleic acid molecule or a derivative thereof from the partition. In another embodiment, the method further includes, prior to (d), subjecting the barcoded nucleic acid molecule and/or the additional barcoded nucleic acid molecule to one or more nucleic acid amplification reactions. In certain embodiments, the one or more nucleic acid amplification reactions are performed subsequent to releasing the barcoded nucleic acid molecule or derivative thereof from the droplet. In certain embodiments, the one or more nucleic acid amplification reactions are performed in the partition. In another embodiment, the one or more nucleic acid amplification reactions include a polymerase chain reaction (PCR). In some embodiments, the cell barcode sequence is a combinatorial assembly of a plurality of barcode segments. In another embodiment, the peptide of the pMHC monomer is derived from an antigen. The antigen may be derived from an infective agent (e.g., a virus, a bacterium, a fungus, or a parasite), a tumor antigen, a therapeutic agent (e.g., a vaccine or a drug) or a fragment thereof, or a self-antigen (e.g., one of the self-antigens listed in Table 1).

In another embodiment, the peptide of the pMHC monomer is one peptide from a library of peptides. In certain embodiments, the library of peptides is derived from an antigen. In a further embodiment, the antigen is derived from an infective agent (e.g., a virus, a bacterium, a fungus, or a parasite), a tumor antigen, a therapeutic agent (e.g., a vaccine or a drug) or a fragment thereof, or a self-antigen (e.g., one of the self-antigens listed in Table 1).

In some embodiments, the T cell is from a subject (e.g., a human).

In another aspect, the disclosure provides a method of detecting epitopes in a library of peptides including:
(i) detecting binding of one or more peptides from a library of peptides to a T cell according to any method described herein; and
(ii) identifying the one or more peptides from the library of peptides binding to the T cell as epitopes.

In another aspect, the disclosure provides a method of detecting epitopes of an antigen including: (i) generating a library of peptides derived from the antigen;
(ii) detecting binding of one or more peptides from the library of peptides to a T cell according to any method described herein; and
(iii) identifying the one or more peptides from the library of peptides binding to the T cell as epitopes of the antigen.

In another aspect, the disclosure provides a method of obtaining an epitope map of an antigen including:
(i) generating a library of peptides derived from the antigen;
(ii) detecting binding of one or more peptides from the library of peptides to a T cell according to any method described herein;
(iii) identifying the one or more peptides from the library of peptides binding to the T cell as epitopes of the antigen; and
(iv) correlating the epitopes of the antigen to the T cell and/or to a nucleic acid sequence of a TCR of the T cell to generate the epitope map of the antigen.

In another aspect, the disclosure provides a method of treating an infectious disease including:
(i) detecting one or more epitopes of an antigen according to the method of detecting epitopes of an antigen including:
(a) generating a library of peptides derived from the antigen;
(b) detecting binding of one or more peptides from the library of peptides to a T cell according to any method described herein; and
(c) identifying the one or more peptides from the library of peptides binding to the T cell as epitopes of the antigen; and
(ii) developing a therapeutic agent directed to the one or more epitopes of the antigen, in which the antigen is derived from an infective agent causing the infectious disease.

In another aspect, the disclosure provides a method of treating a cancer including:
(i) detecting one or more epitopes of an antigen according to the method of detecting epitopes of an antigen including:
(a) generating a library of peptides derived from the antigen;
(b) detecting binding of one or more peptides from the library of peptides to a T cell according to any method described herein; and
(c) identifying the one or more peptides from the library of peptides binding to the T cell as epitopes of the antigen; and
(ii) developing a therapeutic agent directed to the one or more epitopes of the antigen, in which the antigen is a tumor antigen associated with the cancer.

In another aspect, the disclosure provides a method of treating an autoimmune disease including:
(i) detecting one or more epitopes of an antigen according to the method of detecting epitopes of an antigen including:
(a) generating a library of peptides derived from the antigen;
(b) detecting binding of one or more peptides from the library of peptides to a T cell according to any method described herein; and
(c) identifying the one or more peptides from the library of peptides binding to the T cell as epitopes of the antigen; and
(ii) developing a therapeutic agent directed to the one or more epitopes of the antigen, in which the antigen is a self-antigen associated with the autoimmune disease.

In another aspect, the disclosure provides a method of detecting responsiveness of a subject to a therapeutic agent, the method including:
(i) generating an epitope map of an antigen according to the method of detecting epitopes of an antigen including:
(a) generating a library of peptides derived from the antigen;
(b) detecting binding of one or more peptides from the library of peptides to a T cell according to any method described herein; and
(c) identifying the one or more peptides from the library of peptides binding to the T cell as epitopes of the antigen;
(ii) correlating the epitope map of the antigen with a TCR repertoire profile of the subject; and
(iii) identifying the subject as responsive to the therapeutic agent if the TCR repertoire profile of the subject is significantly similar to the TCR sequence of the T cells that bind to the epitopes of the antigen, in which the antigen is derived from the therapeutic agent.

In each of the above aspects, the subject may be a human. In each of the above aspects, the therapeutic agent may be a therapeutic antibody, a vaccine, or a drug.

In another aspect, the disclosure provides a method of detecting an antigen as being associated with a disease, the method including:
(i) generating an epitope map of the antigen according to the method of detecting epitopes of an antigen including:
(a) generating a library of peptides derived from the antigen;
(b) detecting binding of one or more peptides from the library of peptides to a T cell according to any method described herein; and
(c) identifying the one or more peptides from the library of peptides binding to the T cell as epitopes of the antigen;
(ii) comparing the epitope map of the antigen with the epitope map of a reference antigen known to be associated with the disease; and
(iii) identifying the antigen to be associated with the disease if the epitope map of the antigen is significantly similar to the epitope map of the reference antigen known to be associated with the disease.

In certain embodiments, (i) the disease is an infectious disease, and the antigen is derived from an infective agent causing the infectious disease; (ii) the disease is cancer, and the antigen is a tumor antigen associated with the cancer; (iii) the disease is an autoimmune disease, and the antigen is a self-antigen associated with the autoimmune disease. In some embodiments, the infective agent is a virus, a bacterium, a fungus, or a parasite. In certain embodiments, the self-antigen is selected from one of the self-antigens listed in Table 1. In some embodiments, the partition is a droplet in an emulsion. In other embodiments, the partition is a well in a microwell array.

In another aspect, the disclosure provides a system for detection of binding of a peptide to a T cell including:
(a) a peptide-MHC conjugate (pMHC) complex including an MHC monomer and a peptide, and in which the pMHC includes a reporter polynucleotide attached thereto, in which the reporter polynucleotide includes a reporter sequence that identifies the peptide of the pMHC; and
(b) a pMHC-TCR stabilization agent including:
    (i) a chemical fixative;
    (ii) an agent configured to reduce diffusion of the pMHC monomer from a TCR; and/or
    (iii) an agent configured to retain and/or induce internalization of the pMHC-TCR complex into a T cell.
    In certain embodiments, the system further includes:
(c) a plurality of nucleic acid barcode molecules including a cell barcode sequence; and
(d) a device configured to partition a plurality of cells into a plurality of partitions.

In some embodiments, the device is a microwell array including a plurality of microwells. In other embodiments, the device is a microfluidic device configured to generate a plurality of droplets in an emulsion.

The features of the invention are set forth with particularity in the appended claims. The features and advantages of the compositions, systems, and methods described herein are described in the following detailed description, which also sets forth illustrative embodiments.

Definitions

While various embodiments of the invention have been described herein, it will be apparent to those skilled in the art that such embodiments are provided by way of example only. Numerous variations, changes, and substitutions may occur to those skilled in the art without departing from the invention. It should be understood that various alternatives to the embodiments of the invention described herein may be employed.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "barcode" or "barcode sequence" as used herein, generally refers to a label, or identifier, that can be part of a nucleic acid molecule to convey information about the nucleic acid molecule. A barcode can be a tag attached to a nucleic acid molecule (e.g., a nucleic acid barcode molecule) or a combination of the tag in addition to an endogenous characteristic of the nucleic acid molecule (e.g., size of the nucleic acid molecule or end sequence(s)). The barcode may be unique. Barcodes can have a variety of different formats, for example, barcodes can include: polynucleotide barcodes; random nucleic acid and/or amino acid sequences; and synthetic nucleic acid and/or amino acid sequences. A barcode can be attached to a nucleic acid molecule in a reversible or irreversible manner. The barcode can be added to, for example, a fragment of a deoxyribonucleic acid (DNA) or ribonucleic acid (RNA) sample before, during, and/or after sequencing of the sample. Barcodes can allow for identification and/or quantification of individual sequencing-reads in real time. In some examples, the barcode is generated in a combinatorial manner. Barcodes that may be used with methods, devices and systems of the present disclosure, including methods for forming such barcodes, are described in, for example, U.S. Patent Pub. No. 2014/0378350, which is entirely incorporated herein by reference, in its entirety for all purposes.

As used herein, the term "nucleic acid barcode molecule" refers to a nucleic acid molecule having a barcode sequence and optionally a nucleic acid primer sequence (e.g., a nucleic acid primer sequence complimentary to a nucleic acid sequence of the polynucleotide of, e.g., the polynucleotide of a peptide MHC conjugate, or complementary to a nucleic acid sequence of a TCR). In the methods, systems and compositions described herein, a nucleic acid barcode molecule may be contained in a particle (e.g., bead), attached to a particle, and/or associated with a particle. A nucleic acid barcode molecule may provide or deliver a barcode sequence and/or a nucleic acid primer sequence to a partition (e.g., a partition, such as a droplet) in one or more methods described herein.

As used herein, the term "barcoded nucleic acid molecule" refers to a nucleic acid molecule that results from, for example, the hybridization and processing of a nucleic acid barcode molecule with a target nucleic acid sequence (e.g., nucleic acid sequence complimentary to the nucleic acid primer sequence encompassed by the nucleic acid barcode molecule). For example, in the methods and systems described herein, hybridization and reverse transcription of the nucleic acid molecule of a T cell (e.g., a T cell containing a nucleic acid sequence encoding a TCR) with a nucleic acid barcode molecule (e.g., a nucleic acid barcode molecule containing a barcode sequence and, optionally, a nucleic acid primer sequence complimentary to a nucleic acid sequence of the TCR) results in a barcoded nucleic acid molecule that has a sequence corresponding to the nucleic acid sequence of the TCR and the barcode sequence (or a reverse complement thereof). A barcoded nucleic acid molecule may serve as a template, such as a template polynucleotide, that can be further processed (e.g., amplified) and sequenced to obtain the target nucleic acid sequence. For example, in the methods and systems described herein, a barcoded nucleic acid molecule may be further processed (e.g., amplified) and sequenced to obtain the nucleic acid sequence of the TCR.

The term "subject," as used herein, generally refers to a mammalian species (e.g., a human) or avian species (e.g., bird). The subject can be a vertebrate, such as a mammal (e.g., a mouse or a primate (e.g., a simian or a human)). Subjects may include, but are not limited to, farm animals, sport animals, and pets. A subject can be a healthy individual, an individual that has or is suspected of having a disease (e.g., cancer, inflammatory disease, autoimmune disease or infectious disease) or a pre-disposition to the disease, or an individual that is in need of therapy or suspected of needing therapy. A subject can be a patient.

The term "genome," as used herein, generally refers to an entirety of a subject's hereditary information. A genome can be encoded either in DNA or in RNA. A genome can comprise coding regions that code for proteins as well as non-coding regions. A genome can include the sequence of all chromosomes together in an organism. For example, the human genome has a total of 46 chromosomes. The sequence of all of these together may constitute a human genome.

The terms "label(s)", and "tag(s)" may be used synonymously. A label or tag can be coupled to a nucleic acid sequence (e.g., nucleic acid sequence of T cell receptor (TCR)) to be "tagged" by any approach including ligation, hybridization, or other approaches.

The term "sequencing," as used herein, generally refers to methods and technologies for determining the sequence of nucleotide bases in one or more nucleic acid molecules, such as the nucleic acid sequence encoding a TCR of a T cell. The nucleic acid molecules can be DNA or RNA, including variants or derivatives thereof (e.g., messenger RNA (mRNA)). Sequencing can be performed by various systems currently available, such as, with limitation, a sequencing system by Illumina, Pacific Biosciences, Oxford Nanopore, or Life Technologies (ION TORRENT™). Such devices may provide a plurality of raw genetic data corresponding to the genetic information of a subject (e.g., human), as generated by the device from a sample that is obtained from or provided by the subject. In some situations, systems and methods provided herein may be used with proteomic information.

The term "variant," as used herein, generally refers to a genetic variant, such as a nucleic acid molecule (e.g., a nucleic acid molecule from a T cell, such as one encoding a TCR) with a polymorphism. A variant can be a structural variant or copy number variant, which can be genomic variants that are larger than single nucleotide variants or short indels. A variant can be an alteration or polymorphism in a nucleic acid sample or genome of a subject. Single nucleotide polymorphisms (SNPs) are a form of polymorphisms. Polymorphisms can include single nucleotide variations (SNVs), insertions, deletions, repeats, small insertions, small deletions, small repeats, structural variant junctions, variable length tandem repeats, and/or flanking sequences. Copy number variants (CNVs), transversions and other rearrangements are also forms of genetic variation. A genomic alternation may be a base change, insertion, deletion, repeat, copy number variation, or transversion.

The term "bead," as used herein, generally refers to a particle. The bead may be a solid or semi-solid particle. The bead may be a gel. The bead may be formed of a polymeric material. The bead may be magnetic or non-magnetic.

The term "sample," as used herein, generally refers to a biological sample of a subject. The sample may be a tissue sample, such as a biopsy, core biopsy, needle aspirate, or fine needle aspirate. The sample may be a fluid sample, such as a blood sample, urine sample, or saliva sample. The sample may be a skin sample. The sample may be a cheek swap. The sample may be a plasma or serum sample. The sample may be a cell-containing or cell free sample. A cell-free sample may include extracellular nucleic acid molecules. Extracellular nucleic acid molecules may be isolated from a bodily sample that may be blood, plasma, serum, urine, saliva, mucosal excretions, sputum, stool, tears, and tumors.

As used herein, the term "significantly similar" refers to a similarity or overlap of 50% or more, such as 50%, 55%, 60%, 65%, 70%, 75%, 80%, 85%, 90%, 95%, 99%, or more overlap between a compared parameter. Thus, a significantly similar TCR profile or significantly similar TCR repertoire profile means that a subject TCR repertoire profile overlaps by 20% or more with a reference TCR repertoire profile. For example, a TCR repertoire profile of a subject (e.g., a test subject) is considered to be significantly similar to a TCR repertoire profile of one or more subjects diagnosed with a disease (e.g., a reference TCR repertoire profile) when there is 20% or more overlap between the TCR repertoire profile of the subject (e.g., the test subject) and the TCR repertoire profile of the one or more subjects diagnosed with the disease. Alternatively, the term "significantly dissimilar" refers to a similarity or overlap of less than 50%, such as 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less overlap between a compared parameter. Thus, a significantly dissimilar TCR profile or a significantly dissimilar TCR repertoire profile means that a subject TCR repertoire profile overlaps by less than 50% with a reference TCR repertoire profile. For example, a TCR repertoire profile of a subject (e.g., a test subject) is considered to be significantly dissimilar to a TCR repertoire profile of one or more subjects diagnosed with a disease (e.g., a reference TCR repertoire profile) when there is less than 20% overlap between the TCR repertoire profile of the subject (e.g., the test subject) and the TCR repertoire profile of the one or more subjects diagnosed with the disease.

The terms "pMHC(s)", "pMHC monomer(s)", and "pMHC molecule(s)", as used herein, refer to monomeric polynucleotide-peptide-major histocompatibility complex molecules (e.g., pMHC class I or pMHC class II monomers).

DETAILED DESCRIPTION

Figure 1:
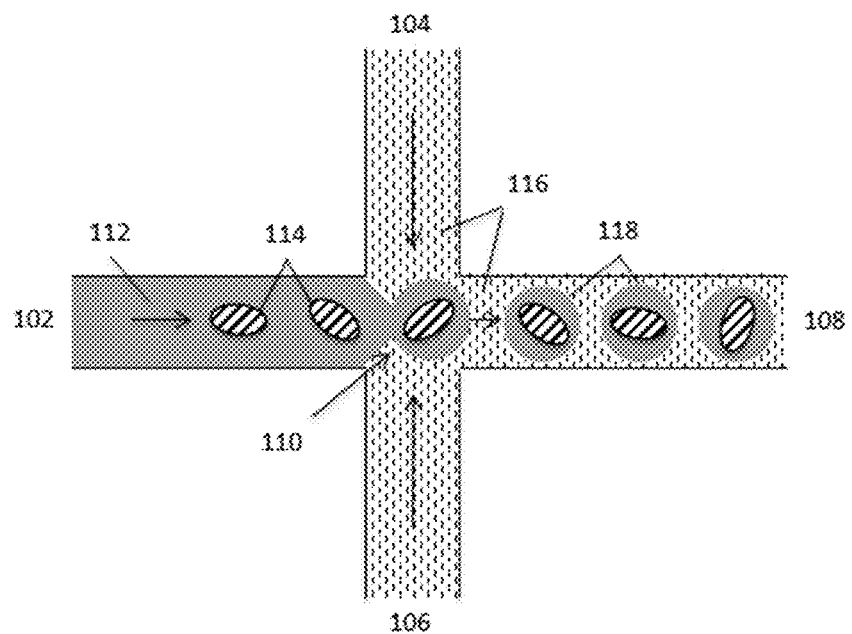
FIG. 1 is a schematic illustrating a microfluidic channel structure for partitioning individual or small groups of cells.

Disclosed herein are methods for generating peptide-major histocompatibility complex (pMHC) molecules (e.g., pMHC monomers) and detecting binding of pMHC molecules to T cells.

The methods described herein include, in some embodiments, conjugating peptides of interest (e.g., peptides derived from an antigen(s) of interest) to polynucleotide(s) (e.g., cDNA encoding the peptide) to generate polynucleotide-peptide conjugates, loading the polynucleotide-peptide conjugates to MHC (e.g., MHC class I or II) molecules to generate monomeric pMHC molecules, and presenting the pMHC molecules to T cells. In other embodiments, a monomeric pMHC complex (e.g., a scaffold comprising a pMHC monomer and a polynucleotide comprising a sequence that identifies the peptide in the pMHC monomer) is generated and presented to T cells for subsequent screening. A pMHC-TCR complex may be formed by recognition and binding of pMHC molecules to TCRs on T cells. The pMHC-T cell multiplets (e.g., pMHC molecules bound to a TCR on the surface of a T cell) may then be prepared, e.g., by partitioning into partitions, such as droplets. In some instances, the pMHC-T cell multiplets may be lysed in the partitions to release cellular nucleic acids (e.g., immune receptor molecules) for subsequent analysis. The polynucleotide attached to the pMHC of the pMHC-TCR complex is capable of hybridizing with barcode molecules (e.g., nucleic acid barcode molecules) that are co-partitioned into the partition. Barcoded nucleic acid molecules may be formed through hybridization of the polynucleotide of the pMHC complex with the nucleic acid barcode molecule that contains a sequence complimentary to a sequence of the polynucleotide. The barcoded nucleic acid molecule can be processed (e.g., amplified, such as by PCR) and sequenced for detection of binding of the peptide to T cells (e.g., by detecting the presence of the reporter polynucleotide attached to the pMHC molecule). The method can further include obtaining the nucleic acid sequence(s) encoding the TCR that binds to the peptide by co-partitioning additional barcode molecules (e.g., additional nucleic acid barcode molecules containing a sequence complimentary to the nucleic acid sequence encoding the TCR) with the pMHC molecules.

The disclosed methods can be used for detection of epitopes of an antigen and for designing therapeutic agents (e.g., a vaccine or a therapeutic antibody) directed to such epitopes. The disclosed methods can also be used for generating an epitope map for an antigen by correlating epitopes of the antigen to the nucleic acid sequence encoding TCR(s) that bind to the epitopes. An epitope map for an antigen obtained by the methods described herein can be used for diagnosis and treatment of a disease (e.g., disease associated with the antigen), and/or determining responsiveness of a subject to a therapeutic agent (e.g., a therapeutic agent from which the antigen is derived).

Antigenic Peptides

Methods described herein may be used for detecting binding of peptides to T cells (e.g., to TCRs on T cells). Binding of one or more peptides (e.g., 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, or more peptides) to T cells can be detected by the methods described herein. The peptides may be derived from an antigen (e.g., antigenic peptides). Examples of such antigenic peptides includes, without limitation, peptides from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The peptides (e.g., antigenic peptides) may be derived from an antigen that is associated with a disease, such as peptides from a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease. The disclosed method can also be used for detecting binding of one or more peptides from a library of peptides. Example of such library of peptides includes, without limitation, a library of peptides derived from a tumor antigen, a library of peptides derived from an infective agent (e.g., bacteria, virus, parasite or fungus), a library of peptides derived from a self-antigen (e.g., a self-antigen listed in Table 1), a library of peptides derived from a therapeutic agent (e.g., a vaccine or a drug), or a library of peptides derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

TABLE 1

SELF-ANTIGENS INVOLVED IN AUTOIMMUNE AND INFLAMMATORY DISEASES

| Autoimmune disease | Self-antigen |
| --- | --- |
| Type I diabetes | Carboxypeptidase H |
| | Chromogranin A |
| | Glutamate decarboxylase |
| | Imogen-38 |
| | Insulin |
| | Insulinoma antigen-2 and 2β |
| | Islet-specific glucose-6-phosphatase catalytic subunit related protein (IGRP) |
| | Proinsulin |
| Multiple sclerosis | α-enolase |
| | Aquaporin-4 |
| | β-arrestin |
| | Myelin basic protein |
| | Myelin oligodendrocytic glycoprotein |
| | Proteolipid protein |
| | S100-β |
| Rheumatoid arthritis | Citrullinated protein |
| | Collagen II |
| | Heat shock proteins |
| | Human cartilage glycoprotein 39 |

TABLE 1-continued

SELF-ANTIGENS INVOLVED IN
AUTOIMMUNE AND INFLAMMATORY DISEASES

| Autoimmune disease | Self-antigen |
|---|---|
| Systemic lupus erythematosus | Double-stranded DNA<br>La antigen<br>Nucleosomal histones and ribonucleoproteins (snRNP)<br>Phospholipid-β-2 glycoprotein I complex<br>Poly(ADP-ribose) polymerase<br>Sm antigens of U-1 small ribonucleoprotein complex |

Peptides used in the methods, compositions and systems described herein can include peptides containing at least a portion of an antigen (e.g., a tumor antigen, a self-antigen (e.g., a self-antigen listed in Table 1), an antigen from an infective agent (e.g., bacteria, virus, parasite or fungus), an antigen from a therapeutic agent (e.g., a vaccine or a drug), and/or an antigen associated with a disease (e.g., a cancer, an infectious disease, an autoimmune or inflammatory disease)). Peptides used in the methods, compositions and systems described herein may also include synthetically produced peptides. The synthetically produced peptides may be from peptide libraries, including, but not limited to, peptide libraries produced by PCR (including by introducing random mutations into various positions of a template peptide). A peptide library (used herein interchangeably with "peptide pool") can include at least 2, and up to about 5, about 10, about 20, about 30, about 40, about 50, about 60, about 70, about 80, and about 90 member peptides. A peptide library can include up to about $1\times10^2$, about $2\times10^2$, about $3\times10^2$, about $4\times10^2$, about $5\times10^2$, about $6\times10^2$, about $7\times10^2$, about $8\times10^2$, about $9\times10^2$, about $1\times10^3$, about $2\times10^3$, about $3\times10^3$, about $4\times10^3$, about $5\times10^3$, about $6\times103$, about $7\times10^3$, about $8\times10^3$, about $9\times10^3$, or about $1\times10^4$ member peptides. Without being bound by any theory, a peptide library used in the methods, compositions and systems described herein can include up to about $1\times10^4$, about $2\times10^4$, about $3\times10^4$, about $4\times10^4$, about $5\times10^4$, about $6\times10^4$, about $7\times10^4$, about $8\times10^4$, about $9\times10^4$, or about $1\times10^5$ member peptides. A peptide library can also include more than about $1\times10^5$ member peptides (e.g., about $2\times10^5$, about $3\times10^5$, about $4\times10^5$, about $5\times10^5$, about $6\times10^5$, about $7\times10^5$, about $8\times10^5$, about $9\times10^5$, about $1\times10^1$, or more member peptides). In some cases, T cell recognition is dominated by only a few amino acids in the core of the peptide, and in these cases, libraries with only a few hundred to a few thousand members may be sufficient to identify the antigenic peptide (or epitope of an antigen).

MHC-Binding Peptide

Peptides described herein are peptides derived from an antigen (e.g., one or more antigens described herein, such as a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug)) and are capable of binding to a major histocompatibility complex (MHC) molecule for recognition by a T cell (e.g., by TCR of a T cell). Specifically, a peptide for use in the methods, compositions and systems described herein can be bound to an MHC molecule, and the resulting peptide major histocompatibility (pMHC) molecule can bind to and/or be recognized by a TCR. A pMHC molecule, upon binding to a TCR, can induce a T cell response. The pMHC molecule further comprises a polynucleotide that comprises a sequence that identifies the peptide of the pMHC. In some instances, the peptide is a polynucleotide-peptide conjugate. In some instances, the sequence that identifies the peptide is a cDNA sequence encoding for the peptide. In other instances, the sequence that identifies the peptide is a known sequence (i.e., a reporter sequence, which may be the barcode sequence) associated with the peptide. In some embodiments, the polynucleotide is directly conjugated to the peptide or MHC molecule of the pMHC molecule. In other embodiments, the polynucleotide and pMHC molecule are conjugated to a scaffold to form a polynucleotide-pMHC monomer complex.

A peptide can bind to an MHC class I molecule (e.g., an MHC class I binding peptide) and/or an MHC class II molecule (e.g., an MHC class II binding peptide). An MHC class I binding peptide can be a polypeptide which is capable of selectively binding within the binding cleft formed by a specified MHC class I molecule to form a class I pMHC. An MHC class I binding peptide is typically 8-10 amino acid residues in length, and may be longer or shorter and still effective. An MHC class II binding peptide can be a polypeptide which is capable of selectively binding within the binding cleft formed by the α and β chains of a specified MHC class II molecule to form a class II pMHC. An MHC class II binding peptide is typically 10-25, and more typically 13-18, amino acid residues in length, and may be longer or shorter and still effective. An MHC-binding peptide (e.g., an MHC class I binding peptide or an MHC class II binding peptide) may be a self or non-self peptide, or a synthetic peptide. An MHC-binding peptide (including an MHC class I binding peptide and an MHC class II binding peptide) may be a peptide derived from an antigen (e.g., one or more antigens described herein, such as a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug)).

In cells, class I MHC molecules typically present antigenic peptides derived from proteins actively synthesized in the cytoplasm of the cell. In contrast, class II MHC molecules typically present antigenic peptides derived either from exogenous proteins that enter a cell's endocytic pathway or from proteins synthesized in the endoplasmic reticulum. Intracellular trafficking permits an antigenic peptide to become associated with an MHC protein. The resulting pMHC molecule then travels to the surface of the cell where it is available for interaction with a TCR. MHC-binding peptides for use in the methods, compositions and systems described herein, however, can be generated or obtained by any suitable methods known to one of skill in the art. The MHC-binding peptides can be peptides produced by hydrolysis. Alternatively, the MHC-binding peptides can be synthetically produced peptides, including randomly generated peptides, specifically designed peptides, and peptides where at least some of the amino acid positions are conserved among several peptides and the remaining positions are random.

The binding of a peptide to an MHC peptide binding groove can control the spatial arrangement of MHC and/or peptide amino acid residues that are recognized by a TCR. Upon identification of MHC-binding peptides using the featured methods, how peptides bind to the MHC molecules can be determined. For example, the major MHC anchor amino acids of a peptide which are typically held constant can be determined. Additionally, the surface exposed amino acids that are varied among different peptides can be determined. The length of an MHC-binding peptide can be from about 5 to about 40 amino acid residues, preferably from about 6 to about 30 amino acid residues, and more preferably from about 8 to about 20 amino acid residues, and even more preferably between about 9 and 11 amino acid residues, including any size peptide between 5 and 40 amino acids in length, in whole integer increments. While naturally occurring MHC class II-bound peptides vary from about 9-40 amino acids, in nearly all cases the peptide can be truncated to an amino acid core of about 9-11 amino acids without loss of MHC binding activity or T cell recognition. Without being bound by any theory, MHC-binding peptides for use in the methods, compositions and systems described herein can encompass peptides disclosed herein or any combination thereof.

Extensive knowledge regarding the binding of peptides to MHC molecules is available to the public, so that for a given MHC complex, one can design MHC-groove binding peptides that vary in less than all of the available positions. For example, the MHCBN is a comprehensive database of Major Histocompatibility Complex (MHC) binding and non-binding peptides compiled from published literature and existing databases. The database has sequence and structure data of: (a) source proteins of peptides; and (b) MHC molecules. MHCBN has a number of web tools that include: (i) mapping of peptide on query sequence; (ii) search on any field; (iii) creation of data sets; and (iv) online data submission (Bhasin et al., Bioinformatics 19(5): 665-666, 2003). The MHCBN can be used to design a complex set of polynucleotide-peptide conjugates (e.g., cDNA-peptide conjugates) featured herein. Additionally or alternatively, the Immune Epitope Database (IEDB) can be used to design a complex set of (e.g., >200) polynucleotide-peptide conjugates (e.g., cDNA-peptide conjugates) with known binding across all listed human HLA molecules. Binding studies for 207 human class II HLA molecules are listed in the IEDB. This set of "eigenpeptides" can be selected so that each member binds as narrow a set of HLA molecules as possible, thus providing both range and specificity (illustrated in FIG. 2 of US 2016/0025726). This peptide set can be tested against HLA class II molecules isolated from peripheral blood mononuclear cells (PBMCs) from healthy donors of known HLA types. This analysis would allow the identification of a panel of reference peptides with binding across many HLA genotypes, which then serves as a useful internal normalization set for studies using peptide sets of higher complexity.

MHC-binding peptides (e.g., peptides of the polynucleotide-peptide conjugates) for use in the methods, compositions and systems described herein can be from a library of antigenic peptides, wherein each of the peptides in the library includes conserved amino acids in a specific sequence sufficient to enable the peptide to bind to the peptide binding groove of an MHC molecule. Specifically, the MHC-binding peptide (e.g., peptides of the polynucleotide-peptide conjugates) can be from a library of antigenic peptides, wherein each of the peptides in the library includes between about 4 and 5 conserved amino acids in a specific sequence sufficient to enable the peptide to bind to the peptide binding groove of an MHC molecule. A library of peptides (e.g., library of antigenic peptides or MHC-binding peptides) can be produced by genetically engineering the library using PCR or other suitable technique to construct a DNA fragment encoding the peptide. With PCR techniques, by using oligonucleotides that are randomly mutated within particular triplet codons, the resultant fragment pool can encode all possible combination of codons at these positions. Preferably, certain amino acid positions can be maintained constant, which are the conserved amino acids that are required for binding to the MHC peptide binding groove and which do not contact the TCR.

One or more MHC-binding peptides (e.g., 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, or more MHC-binding peptides) derived from an antigen capable of binding a T cell (e.g., a TCR on a T cell) can be detected by the methods described herein. For example, the featured methods can be used for detecting MHC-binding peptides derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The featured methods can also be used for detecting MHC-binding peptides derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

The disclosed method can also be used for detecting synthetically produced MHC-binding peptides. The synthetically produced MHC-binding peptides may be from peptide libraries, including, but not limited to, libraries of MHC-binding peptides produced by PCR (including by introducing random mutations into various positions of a template peptide). A library of MHC-binding peptides (used herein interchangeably with "MHC-binding peptide pool" or "MHC-binding peptide library") can include at least 2, and up to about 5, about 10, about 20, about 30, about 40, about 50, about 60, about 70, about 80, and about 90 member peptides. An MHC-binding peptide library can include up to about $1\times10^2$, about $2\times10^2$, about $3\times10^2$, about $4\times10^2$, about $5\times10^2$, about $6\times10^2$, about $7\times10^2$, about $8\times10^2$, about $9\times10^2$, about $1\times10^3$, about $2\times10^3$, about $3\times10^3$, about $4\times10^3$, about $5\times10^3$, about $6\times10^3$, about $7\times10^3$, about $8\times10^3$, about $9\times10^3$, or about $1\times10^4$ member peptides. Without being bound by any theory, an MHC-binding peptide library used in the methods, compositions and systems described herein can include up to about $1\times10^4$, about $2\times10^4$, about $3\times10^4$, about $4\times10^4$, about $5\times10^4$, about $6\times10^4$, about $7\times10^4$, about $8\times10^4$, about $9\times10^4$, or about $1\times10^5$ member MHC-binding peptides. An MHC-binding peptide library can also include more than about $1\times10^5$ member MHC-binding peptides (e.g., about $2\times10^5$, about $3\times10^5$, about $4\times10^5$, about $5\times10^5$, about $6\times10^5$, about $7\times10^5$, about $8\times10^5$, about $9\times10^5$, about $1\times10^6$, or more member MHC-binding peptides). Example of such library of MHC-binding peptides includes, without limitation, a library of MHC-binding peptides derived from a tumor antigen, a library of MHC-binding peptides derived from an infective agent (e.g., bacteria, virus, parasite or fungus), a library of MHC-binding peptides derived from a self-antigen (e.g., a self-antigen listed in Table 1), a library of MHC-binding peptides derived from a therapeutic agent (e.g., a vaccine or a drug), or a library of MHC-binding peptides derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease). In some cases, T cell recognition is dominated by only a few amino acids in the core of the MHC-binding peptide, and in these cases, libraries with only a few hundred to a few thousand members may be sufficient to identify the MHC-binding peptide.

In particular embodiments, an MHC-binding peptide derived from an antigen can be an epitope of the antigen.

Epitopes

An epitope, also known as antigenic determinant, is the part of an antigen that is recognized by the immune system (e.g., by T cells, B cells, or antibodies). For example, an epitope can refer to a specific portion of an antigen that is recognized by a T cell (e.g., TCR of a T cell) and/or to which a T cell (e.g., TCR of a T cell) binds. Specifically, an epitope can refer to a peptide sequence of an antigen that is recognized by a T cell (e.g., TCR of a T cell) and/or to which a T cell (e.g., TCR of a T cell) binds. In particular, an epitope can refer to an MHC-binding peptide derived from an antigen that is recognized by a T cell (e.g., TCR of a T cell) and/or to which a T cell (e.g., TCR of a T cell) binds.

The featured methods can be used for detecting one or more epitopes (e.g., 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, $1 \times 10^4$, $2 \times 10^4$, $3 \times 10^4$, $4 \times 10^4$, $5 \times 10^4$, $6 \times 10^4$, $7 \times 10^4$, $8 \times 10^4$, $9 \times 10^4$, $1 \times 10^5$, $2 \times 10^5$, $3 \times 10^5$, $4 \times 10^5$, $5 \times 10^5$, $6 \times 10^5$, $7 \times 10^5$, $8 \times 10^5$, $9 \times 10^5$, $1 \times 10^6$, or more epitopes). The disclosed methods can be used for detecting epitopes of a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The disclosed methods can be used for detecting epitopes of an antigen that is associated with a disease, such as epitopes of a tumor antigen associated with cancer, epitopes of an antigen from an infective agent (e.g., a bacterium, a virus, a parasite, or a fungus) associated with an infectious disease (e.g., a bacterial infection, a viral infection, a parasitic infection, or a fungal infection), or epitopes of a self-antigen (e.g., a self-antigen listed in Table 1) associated with an inflammatory or autoimmune disease.

The disclosed method can also be used for detecting synthetically produced epitopes. The synthetically produced epitopes may be from epitopes libraries, including, but not limited to, libraries of epitopes produced by PCR (including by introducing random mutations into various positions of a template peptide). A library of epitopes can include at least 2, and up to about 5, about 10, about 20, about 30, about 40, about 50, about 60, about 70, about 80, and about 90 member epitopes. An epitope library can include up to about $1 \times 10^2$, about $2 \times 10^2$, about $3 \times 10^2$, about $4 \times 10^2$, about $5 \times 10^2$, about $6 \times 10^2$, about $7 \times 10^2$, about $8 \times 10^2$, about $9 \times 10^2$, about $1 \times 10^3$, about $2 \times 10^3$, about $3 \times 10^3$, about $4 \times 10^3$, about $5 \times 10^3$, about $6 \times 10^3$, about $7 \times 10^3$, about $8 \times 10^3$, about $9 \times 10^3$, or about $1 \times 10^4$ member epitopes. Without being bound by any theory, an epitope library used in the methods, compositions and systems described herein can include up to about $1 \times 10^4$, about $2 \times 10^4$, about $3 \times 10^4$, about $4 \times 10^4$, about $5 \times 10^4$, about $6 \times 10^4$, about $7 \times 10^4$, about $8 \times 10^4$, about $9 \times 10^4$, or about $1 \times 10^5$ member epitopes. An epitope library can also include more than about $1 \times 10^5$ member epitopes (e.g., about $2 \times 10^5$, about $3 \times 10^5$, about $4 \times 10^5$, about $5 \times 10^5$, about $6 \times 10^5$, about $7 \times 10^5$, about $8 \times 10^5$, about $9 \times 10^5$, about $1 \times 10^6$, or more member epitopes). Example of such library of epitopes includes, without limitation, a library of epitopes from a tumor antigen, a library of epitopes from an infective agent (e.g., bacteria, virus, parasite or fungus), a library of epitopes from a self-antigen (e.g., a self-antigen listed in Table 1), a library of epitopes from a therapeutic agent (e.g., a vaccine or a drug), or a library of epitopes from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease). In some cases, T cell recognition is dominated by only a few amino acids in the core of the epitope, and in these cases, libraries with only a few hundred to a few thousand members may be sufficient to identify the epitope.

Implications of MHC-Binding Peptides and Epitopes in Diseases

Recognition of MHC-binding peptides derived from an antigen or epitopes of an antigen by TCRs is essential for activation of T cells and triggering of immune response. Accordingly, epitopes and MHC-binding peptides derived from an antigen are related to activity and/or inactivity of the immune system, and thereby have implications in a wide range of conditions and diseases, including but not limited to cancers, infectious diseases (e.g., a bacterial infection, a viral infection, a parasitic infection, or a fungal infection), allergy, inflammation, and autoimmune diseases.

Patients with diseases associated with immunosuppression, such as cancer, may benefit from strategies directed to remove immunosuppression and/or enhance tumor-specific immune response. The cancer may include, without limitation, a cancer of the adrenal gland, bladder, blood, immune cells, bone, bone marrow, brain, breast, cervix, gall bladder, ganglia, gastrointestinal tract, heart, kidney, liver, lung, muscle, ovary, pancreas, parathyroid, penis, prostate, salivary glands, skin, spleen, testis, thymus, thyroid, or uterus.

On the contrary, patients with diseases associated with heightened immune activity, such as inflammation, autoimmunity, allergy, and/or asthma, may benefit from strategies that down-regulate immune responses. The autoimmune disease may include, without limitation, Addison's Disease, autoimmune hemolytic anemia, autoimmune inner ear disease, autoimmune lymphoproliferative syndrome, autoimmune thrombocytopenic purpura, autoimmune hepatitis, autoimmune oophoritis, Behyet's disease, autoimmune bullous pemphigoid, autoimmune cardiomyopathy, Crohn's disease, autoimmune chronic fatigue syndrome, chronic obstructive pulmonary disease (COPD), including chronic bronchitis, emphysema and chronic asthmatic bronchitis, autoimmune dermatomyositis, autoimmune diabetes mellitus type-1, autoimmune epilepsy, Kawasaki's disease, autoimmune glomerulonephritis, Grave's disease, Goodpasture's syndrome, Guillain-Barre syndrome, lupus nephritis, multiple sclerosis, myasthenia gravis, autoimmune myocarditis, autoimmune Parkinson diseases, pediatric autoimmune neuropsychiatry disorders, autoimmune pemphigus/pemphigoid, autoimmune pernicious anemia, autoimmune polyarteritis nodosa, autoimmune polymyositis, autoimmune primary biliary cirrhosis, psoriasis, autoimmune rheumatic fever, rheumatoid arthritis, autoimmune sarcoidosis, scleroderma, Sjogren's syndrome, autoimmune thyroiditis, autoimmune ulcerative colitis, autoimmune uveitis, autoimmune vitiligo, Wegener's granulomatosis, or Wilson's disease.

Peptides (e.g., MHC-binding peptides derived from an antigen or epitopes of an antigen) identified using the featured methods may have significantly lower, lower, similar, substantially similar, higher, or significantly higher binding affinities and/or specificities to an MHC molecule, when compared to a reference. The reference can be a binding affinity and/or specificity to a particular MHC molecule detected in a reference subject (e.g., a healthy subject and/or a subject without a disease), or in a reference tissue or cell of a patient (e.g., a healthy tissue or cell from a patient), or in a population of such reference subjects or reference tissues or cells. Depending on the needs of a patient, the peptides identified using the featured methods may be used to enhance, suppress, or regulate immune response in the patient.

The importance of MHC-binding peptides and/or epitopes in determining immune outcomes is also demonstrated by the large and increasing number of human genome-wide association (GWAS) studies that have strongly linked the genomic HLA locus to outcomes as diverse as autoimmunity, allergy, susceptibility to infection and drug reaction. Particular alleles of the MHC have been associated with a variety of diseases, including autoimmune diseases such as multiple sclerosis (MS), rheumatoid arthritis (RA), pemphigus vulgaris (PV), and systemic lupus erythematosus (SLE). It has been suggested that particular MHC proteins improperly recognize processed self-antigens presented to T cells in the form of complexes with MHC Class I or Class II molecules. For example, susceptibility of MS is associated with the MHC class 11 region, and particular MHC class II haplotypes confer an increased risk of MS. The strongest association is with the HLA-DR2 haplotype (DRBI*1501). HLA-DR2 (encoded by the DRA, DRB 1*1501 genes) has been shown to present at least two peptides of human myelin basic protein (residues 85-99 and 148-162) to T cells. The MBP(85-99) peptide binds with high affinity to purified DR2, and the affinity of the MBP(148-162) peptide is lower but significant.

Underlying these associations is the fact that inter-individual variation in the HLA is extreme: each HLA haplotype encodes 3 class I and 3 class II complexes, these haplotypes are co-dominantly expressed and represent the most polymorphic loci in the genome. In total, this variation results in >104 different possible HLA class I and II molecules, ~12 of which will occur in any given individual. This complexity provides broad protection at the population level, ensuring that at least some members of the population have the capacity to present antigens from a given pathogen threat. However, a corollary is that there exists substantial inter-individual heterogeneity in the spectrum of antigen peptides that can be presented to T cells, resulting in a corresponding heterogeneity in immune responses. Addressing this heterogeneity is a key objective of personalized medicine and the methods featured here.

Since the present invention provides methods for detecting binding of a peptide-MHC monomer (e.g., an antigenic peptide bound to an MHC monomer) to a T cell (e.g., binding of a peptide-MHC monomer to a TCR of a T cell), and which peptides are presented by a subject to elicit an immune response, one of skill in the art would appreciate that the methods disclosed herein are useful for a variety of purposes, including, but not limited to: (a) to identify peptide epitopes for the purpose of vaccine design; (b) to enable identification and monitoring of specific T cell responses against viruses, autoantigens, allergens; (c) to identify novel antigens in infection, autoimmunity, allergy, or cancer; (d) to test the potential immunogenicity of protein-based therapeutics.

Peptide-MHC (pMHC) Molecule

A peptide of interest (e.g., an MHC-binding peptide derived from an antigen of interest, or an epitope of an antigen of interest) or a polynucleotide-peptide conjugate (e.g., a cDNA-peptide conjugate) containing a peptide of interest can be loaded onto an MHC molecule (e.g., an MHC monomer or an MHC oligomer) to form a pMHC molecule (e.g., a pMHC monomer or a pMHC oligomer).

A pMHC molecule featured herein may include a peptide derived from an antigen of interest (e.g., an MHC-binding peptide derived from an antigen of interest, or an epitope of an antigen of interest) loaded onto an MHC molecule (e.g., an MHC monomer or an MHC oligomer). For example, a pMHC molecule can include a peptide (e.g., an MHC-binding peptide or an epitope) loaded onto an MHC molecule, in which the peptide is derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The featured pMHC molecule can also include a peptide (e.g., an MHC-binding peptide or an epitope) loaded onto an MHC molecule, in which the peptide is derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

A pMHC molecule featured herein can also include a synthetically produced peptide (e.g., a synthetically produced MHC-binding peptide, or a synthetically produced epitope) loaded onto an MHC molecule (e.g., an MHC monomer or an MHC oligomer). The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

In some instances, a pMHC molecule featured herein can include a polynucleotide-peptide conjugate (e.g., a cDNA-peptide conjugate) loaded onto an MHC molecule (e.g., an MHC monomer or an MHC oligomer), in which the peptide of the polynucleotide-peptide conjugate is derived from an antigen of interest (e.g., an MHC-binding peptide derived from an antigen of interest, an epitope of an antigen of interest). For example, a pMHC molecule can include a polynucleotide-peptide conjugate (e.g., a cDNA-peptide conjugate) loaded onto an MHC molecule, in which the peptide (e.g., MHC-binding peptide or epitope) of the polynucleotide-peptide conjugate is derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The featured pMHC molecule can also include a polynucleotide-peptide conjugate (e.g., a cDNA-peptide conjugate) loaded onto an MHC molecule, in which the peptide (e.g., MHC-binding peptide or epitope) of the polynucleotide-peptide conjugate is derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

A pMHC molecule featured herein can also include a polynucleotide-peptide conjugate (e.g., a cDNA-peptide conjugate) loaded onto an MHC molecule (e.g., an MHC monomer or an MHC oligomer), in which the peptide of the polynucleotide-peptide conjugate is a synthetically produced peptide (e.g., a synthetically produced MHC-binding peptide, a synthetically produced epitope). The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

A pMHC molecule featured herein can be generated by one or more methods known in the art or described herein.

Loading Peptide onto MHC Molecules

A peptide of interest (e.g., an MHC-binding peptide derived from an antigen of interest, or an epitope of an antigen of interest) or a polynucleotide-peptide conjugate (e.g., a cDNA-peptide conjugate) containing a peptide of interest can be loaded onto an MHC class I or II molecule (e.g., a monomer or an oligomer of an MHC class I or II) by one or more of the following methods to generate a pMHC molecule (e.g., a pMHC monomer or a pMHC oligomer).

Refolding an MHC Molecule in Presence of a Peptide of Interest

A peptide of interest can be loaded onto an MHC molecule (e.g., an MHC class I or II) by refolding the MHC molecule in the presence of the peptide (e.g., in an ad mixture containing the peptide and the MHC), as described by Garboczi et al. (*Proc Natl Acad Sci* 89:3429-3433, 1992). For example, an MHC molecule (e.g., an MHC class I molecule (e.g., HLA-A2 heavy chain and $\beta_2$m subunits of a human MHC class I molecule)) can be expressed at high levels (e.g., about 1-10 mg/L, about 10-20 mg/L, about 20-30 mg/L, about 30-40 mg/L, about 40-50 mg/L, about 50-60 mg/L, about 60-70 mg/L, about 70-80 mg/L, about 80-90 mg/L, about 90-100 mg/L, about 100-110 mg/L, about 110-120 mg/L, about 120-130 mg/L, about 130-140 mg/L, about 140-150 mg/L, about 150-160 mg/L, about 160-170 mg/L, about 170-180 mg/L, about 180-190 mg/L, about 190-200 mg/L, or more) as insoluble protein aggregate in a bacterial cell (e.g., *E. coli*). The insoluble protein aggregate, or inclusion body can then be dissolved in a strong denaturant (e.g., urea, such as 1-100 M urea (e.g., 8M urea)). The denatured chains of the MHC molecule can then be refolded and assembled under dilute conditions by removal of the denaturant (e.g., urea) in presence of a peptide of interest (e.g., a peptide of interest that is restricted to the MHC molecule (e.g., restricted to the HLA-A2 of the MHC class I molecule)) to generate a pMHC molecule that has the peptide of interest loaded onto the MHC molecule. The pMHC molecule thus formed may have polypeptide chains corresponding to sizes of the subunits of the MHC molecule (e.g., corresponding to sizes of the HLA-A2 heavy chain and $\beta_2$m subunits). The pMHC molecule thus formed may be stable for at least 2 weeks (e.g., at least 2 weeks, at least 3 weeks, at least 4 weeks, at least 5 weeks, at least 6 weeks, at least 7 weeks, at least 8 weeks, at least 9 weeks, at least 10 weeks, or more) when stored at 4° C. The pMHC molecule thus formed may continue to exhibit a single peak on gel filtration for at least 2 weeks (e.g., at least 2 weeks, at least 3 weeks, at least 4 weeks, at least 5 weeks, at least 6 weeks, at least 7 weeks, at least 8 weeks, at least 9 weeks, at least 10 weeks, or more) when stored at 4° C. The pMHC molecule thus formed may continue to crystallize for at least 2 weeks (e.g., at least 2 weeks, at least 3 weeks, at least 4 weeks, at least 5 weeks, at least 6 weeks, at least 7 weeks, at least 8 weeks, at least 9 weeks, at least 10 weeks, or more) when stored at 4° C.

For example, a peptide derived from an antigen of interest (e.g., an MHC-binding peptide derived from an antigen of interest, or an epitope of an antigen of interest) can be loaded onto an MHC molecule (e.g., an MHC class I or II) by refolding the MHC molecule in presence of the peptide. Such a peptide can be derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The peptide may also be derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

Additionally or alternatively, a synthetically produced peptide (e.g., a synthetically produced MHC-binding peptide, or a synthetically produced epitope) can be loaded onto an MHC molecule (e.g., an MHC class I or II) by refolding the MHC molecule in presence of the peptide. Such a synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

In other instances, a polynucleotide-peptide conjugate (e.g., a cDNA-peptide conjugate), in which the peptide of the polynucleotide-peptide conjugate is derived from an antigen of interest (e.g., an MHC-binding peptide derived from an antigen of interest, or an epitope of an antigen of interest), can be loaded onto an MHC molecule (e.g., an MHC class I or II) by refolding the MHC molecule in presence of the polynucleotide-peptide conjugate. The peptide (e.g., MHC-binding peptide or epitope) of such a polynucleotide-peptide conjugate may be derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The peptide (e.g., MHC-binding peptide or epitope) of such polynucleotide-peptide conjugates may also be derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

Additionally or alternatively, a polynucleotide-peptide conjugate (e.g., a cDNA-peptide conjugate), in which the peptide of the polynucleotide-peptide conjugate is a synthetically produced peptide (e.g., a synthetically produced MHC-binding peptide, or a synthetically produced epitope), can be loaded onto an MHC molecule (e.g., an MHC class I or II) by refolding the MHC molecule in presence of the polynucleotide-peptide conjugate. The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

Alternatively, a peptide of interest can be loaded onto an MHC molecule (e.g., an MHC class I or II molecule) through exchange of a conditional MHC ligand.

Exchanging a Conditional MHC Ligand for a Peptide of Interest

A peptide of interest can be loaded onto an MHC molecule (e.g., an MHC class I or II) through exchange (e.g., UV-mediated exchange, chemical-mediated exchange, temperature-mediated exchange, or chaperone-mediated exchange) of a conditional MHC ligand (e.g., a conditionally cleavable MHC ligand) for the peptide of interest. Conditional MHC ligands (e.g., conditionally cleavable MHC ligands) form stable complexes with MHC molecules and can be cleaved in presence of various trigger or stimuli (e.g., UV irradiation, chemicals, temperature, or chaperone) that do not affect the MHC molecule (e.g., heavy or light chain of MHC class I or II molecule). Cleavage of conditional MHC ligands (e.g., conditionally cleavable MHC ligands) from the MHC molecules may generate peptide-free, empty MHC molecules that are stable and peptide-receptive. Cleavage of a conditional MHC ligand (e.g., a conditionally cleavable MHC ligand) in presence of another MHC ligand, such as a peptide of interest (e.g., a peptide of interest described herein or a polynucleotide peptide conjugate containing a peptide of interest described herein), may result in exchange of the cleaved conditional ligand for the peptide of choice. For example, a conditionally cleavable MHC ligand may be cleaved in presence of a peptide of interest (e.g., an MHC-binding peptide derived from an antigen of interest, or an epitope of an antigen of interest) or a polynucleotide-peptide conjugate (e.g., a cDNA-peptide conjugate) containing a peptide of interest to form a pMHC molecule (e.g., a pMHC monomer or a pMHC oligomer) featured herein.

For example, a peptide derived from an antigen of interest (e.g., an MHC-binding peptide derived from an antigen of interest, or an epitope of an antigen of interest) can be loaded onto an MHC molecule (e.g., an MHC class I or II) through exchange of a conditional MHC ligand for the antigen-derived peptide. Such a peptide can be derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The peptide may also be derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

Additionally or alternatively, a synthetically produced peptide (e.g., a synthetically produced MHC-binding peptide, or a synthetically produced epitope) can be loaded onto an MHC molecule (e.g., an MHC class I or II) by exchange of a conditional MHC ligand for the synthetically produced peptide. Such a synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

In other instances, a polynucleotide-peptide conjugate (e.g., a cDNA-peptide conjugate), in which the peptide of the polynucleotide-peptide conjugate is derived from an antigen of interest (e.g., an MHC-binding peptide derived from an antigen of interest, or an epitope of an antigen of interest), can be loaded onto an MHC molecule (e.g., an MHC class I or II) by exchange of a conditional MHC ligand for the polynucleotide-peptide conjugate. The peptide (e.g., MHC-binding peptide or epitope) of such a polynucleotide-peptide conjugate may be derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The peptide (e.g., MHC-binding peptide or epitope) of such polynucleotide-peptide conjugates may also be derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

Additionally or alternatively, a polynucleotide-peptide conjugate (e.g., a cDNA-peptide conjugate), in which the peptide of the polynucleotide-peptide conjugate is a synthetically produced peptide (e.g., a synthetically produced MHC-binding peptide, or a synthetically produced epitope), can be loaded onto an MHC molecule (e.g., an MHC class I or II) by exchange of a conditional MHC ligand for the polynucleotide-peptide conjugate. The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

A conditional MHC ligand (e.g., a conditionally cleavable MHC ligand) may be cleaved by different stimuli or trigger, and exchanged for a peptide of interest.

UV-Mediated Exchange of a Conditional Ligand for a Peptide of Interest

A conditional MHC ligand (e.g., a conditionally cleavable MHC ligand) can be cleaved from an MHC molecule (e.g., an MHC class I or II) by UV irradiation and replaced with a peptide of interest (e.g., a peptide of interest described herein or a polynucleotide peptide conjugate containing a peptide of interest described herein). A conditional MHC ligand, such as a UV-labile MHC ligand, can be cleaved in the MHC-bound state by exposure to UV light, as described by Rodenko et al. (*Nat Protoc* 1:1120-1132, 2006; included herein by reference in its entirety). As the cleaved peptide fragments no longer meet the strict length requirement for high affinity MHC (e.g., MHC class I or II) binding, these fragments may dissociate from the MHC molecules, resulting in disintegration of the MHC-conditional ligand complex and formation of empty peptide-receptive MHC molecules. The resulting peptide-free MHC complex may be stable under the conditions in which cleavage of the conditional MHC ligands (e.g., UV-labile MHC ligands) is performed, such as at neutral pH (e.g., at pH 7.0) and at temperature between 4-20° C. (e.g., at 4° C., 5° C., 6° C., 7° C., 8° C., 9° C., 10° C., 11° C., 12° C., 13° C., 14° C., 15° C., 16° C., 17° C., 18° C., 19° C., or 20° C.). When such a reaction (e.g., cleavage of a UV-labile MHC ligand by UV irradiation) is carried out in presence of a peptide of interest, the peptide of interest may be loaded onto the resulting empty, peptide-receptive MHC molecule, thus generating a pMHC molecule containing the peptide of interest. For example, cleavage of conditional MHC ligands (e.g., UV-labile MHC ligands) by UV irradiation in presence of another MHC (e.g., MHC class I or II) ligand, such as a peptide of interest described herein, may result in net exchange of the cleaved conditional ligand for the peptide of interest, loading of the peptide of interest onto the MHC molecule, and formation of a pMHC molecule of interest (e.g., a pMHC molecule containing a peptide of interest).

UV-labile MHC ligands for use in UV-mediated MHC exchange can be produced by replacing one of the TCR-exposed amino acids in a known or predicted MHC ligand by a non-natural amino acid that contains a (2-nitro)phenyl side chain. For example, UV-labile MHC ligands containing UV-sensitive building block 3-amino-3-(2-nitro)phenyl-propionic acid can be used in UV-mediated MHC exchange of the conditional MHC ligand for a peptide of interest. Introduction of the β-amino acid may, however, alter the peptide structure of the UV-labile MHC ligand in the peptide binding groove, and depending on the site at which the UV-sensitive amino acid is introduced, the affinity of the peptide for the MHC groove can be affected. Alternatively, UV-labile MHC ligands containing Fmoc-protected α-amino acid with a UV-sensitive (2-nitro)phenyl side chain can be used in UV-mediated MHC exchange of the conditional MHC ligand for a peptide of interest. An advantage of the use of this α-amino acid residue as a UV-sensitive building block is that the resulting peptides are expected to have an unaltered main chain conformation and are therefore expected to fit optimally in the MHC binding groove.

Chemical Trigger-Mediated Exchange of a Conditional Ligand for a Peptide of Interest A conditional MHC ligand (e.g., a conditionally cleavable MHC ligand) can be cleaved from an MHC molecule (e.g., an MHC class I or II) by a chemical trigger and replaced with a peptide of interest (e.g., a peptide of interest described herein or a polynucleotide peptide conjugate containing a peptide of interest described herein). A conditional MHC ligand, such as a chemical-labile MHC ligand (e.g., an MHC ligand sensitive to oxidizing or reducing conditions), can be cleaved in the MHC-bound state by exposure to a chemical trigger (e.g., enzymes, nucleophilic or electrophilic reagents, and reducing or oxidizing reagents), as described by Amore et al. (*ChemBioChem* 14:123-131, 2013; included herein by reference in its entirety. Cleavage of a conditional MHC ligand (e.g., a chemical-labile MHC ligand) by a chemical trigger may lead to disintegration of the MHC-conditional ligand complex and formation of an empty, peptide-receptive MHC molecule. When such a reaction (e.g., cleavage of a chemical-labile MHC ligand in presence of a chemical trigger) is carried out in presence of a peptide of interest, the peptide of interest may be loaded onto the resulting empty, peptide-receptive MHC molecule, thus generating a pMHC molecule containing the peptide of interest. For example, cleavage of conditional MHC ligands (e.g., chemical-labile MHC ligands, such as MHC ligands sensitive to oxidizing or reducing conditions) by a chemical trigger in presence of another MHC (e.g., MHC class I or II) ligand, such as a peptide of interest described herein, may result in net exchange of the cleaved conditional ligand for the peptide of interest, loading of the peptide of interest onto the empty, peptide-receptive MHC molecule, and formation of a pMHC molecule of interest (e.g., a pMHC molecule containing a peptide of interest).

Chemical trigger-mediated exchange of a conditional MHC ligand for a peptide of interest may circumvent one or more problems associated with UV-mediated MHC exchange (e.g., uncontrolled increase in temperature and concomitant evaporation of medium or buffer that can be caused by the heat generated by the UV irradiation, incomplete cleavage due to limited penetration of UV light into the sample medium, and/or uneven UV exposure of wells in microtiter plates in high-throughput screening applications, leading to distorted assay results). Contrary to UV irradiation as a tool for MHC exchange, chemical triggers may be readily available, can be added and quenched in a controlled fashion and under sterile conditions, and do not require special laboratory equipment (e.g., UV lamp).

Conditional MHC ligands that can be cleaved under mild oxidative conditions may have an advantage over conditional MHC ligands sensitive to reductive conditions, as they allow preservation of disulfide bonds and hence protein structure. For example, a conditional MHC ligand containing a vicinal diol moiety can be used as an oxidation-sensitive MHC ligand for chemical trigger-mediated MHC exchange of the conditional ligand for a peptide of interest. A conditional MHC ligand containing a vicinal diol moiety may be cleaved by a mild oxidant (e.g., sodium periodate) to yield two aldehyde fragments. Periodate-mediated diol cleavage is a mild and biocompatible reaction, but has one major drawback: complete cleavage of a diol linkage requires periodate concentrations in the millimolar range and incubation times of the order of hours. This invariably leads to co-oxidation of cysteine and methionine residues, which may affect protein function and protein-ligand and/or protein-protein interactions. Alternatively, to circumvent the co-oxidation problem, a conditional MHC ligand containing a vicinal amino alcohol (e.g., a conditional MHC ligand with 1,2-amino-alcohol-containing β-amino acids) can be used as an oxidation-sensitive MHC ligand for chemical trigger-mediated MHC exchange of the conditional ligand for a peptide of interest.

Temperature-Mediated Exchange of a Conditional Ligand for a Peptide of Interest

A peptide with low affinity may continuously bind and dissociate from an MHC molecule until a peptide with high affinity and/or low dissociation rate is bound to the MHC molecule for presentation. Thus, binding of a peptide to an MHC molecule may be strongly dependent on temperature. Low-affinity peptides that stably associated with MHC molecules at low temperature may be released at slightly elevated temperatures and replaced with higher-affinity peptides.

Accordingly, a conditional MHC ligand (e.g., a conditionally cleavable MHC ligand) can be cleaved from an MHC molecule (e.g., an MHC class I or II) and replaced with a peptide of interest (e.g., a peptide of interest described herein or a polynucleotide peptide conjugate containing a peptide of interest described herein) upon temperature variation (e.g., increase in temperature). A conditional MHC ligand, such as a temperature-labile MHC ligand, can be cleaved in the MHC-bound state by variation (e.g., increase) of temperature, as described by Luimstra et al. (*J Exp Med* 215:1493-1504, 2018; included herein by reference in its entirety). Cleavage of a conditional MHC ligand (e.g., a temperature-labile MHC ligand) by variation (e.g., increase) of temperature may lead to disintegration of the MHC-conditional ligand complex and formation of an empty, peptide-receptive MHC molecule. When such a reaction (e.g., cleavage of a temperature-labile MHC ligand in presence of elevated temperature) is carried out in presence of a peptide of interest, the peptide of interest may be loaded onto the resulting empty, peptide-receptive MHC molecule, thus generating a pMHC molecule containing the peptide of interest. In particular, cleavage of conditional MHC ligands (e.g., temperature-labile MHC ligands) by exposure to elevated temperature in presence of another MHC (e.g., MHC class I or II) ligand, such as a peptide of interest described herein, may result in net exchange of the cleaved conditional ligand for the peptide of interest, loading of the peptide of interest onto the empty, peptide-receptive MHC molecule, and formation of a pMHC molecule of interest (e.g., a pMHC molecule containing a peptide of interest). For example, a conditional MHC ligand (e.g., a temperature-labile MHC ligand) that is stably bound to a MHC molecule (e.g., MHC class I or II) at low temperature (e.g., between −20° C. to 15° C. (e.g., at −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., or 15° C., such as at 4° C.) can be cleaved from the MHC molecule when exposed to elevated temperature (e.g., between 20° C. to 50° C. (e.g., at 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., or 50° C., such as 37° C.), and when the cleavage occurs in presence of another MHC (e.g., MHC class I or II) ligand, such as a peptide of interest described herein, there may be net exchange of the cleaved conditional ligand for the peptide of interest, loading of the peptide of interest onto the empty, peptide-receptive MHC molecule, and formation of a pMHC molecule of interest (e.g., a pMHC molecule containing a peptide of interest).

Polynucleotide-Peptide Conjugates

For use in the methods, compositions and systems described herein, a peptide of interest (e.g., an MHC-binding peptide derived from an antigen of interest, or an epitope of an antigen of interest) can be conjugated to a polynucleotide to form a polynucleotide-peptide conjugate. A polynucleotide-peptide conjugate for use in the featured methods, compositions, and systems may include a peptide of interest conjugated to a reporter polynucleotide, such as a peptide conjugated to its encoding cDNA. In other instances, the polynucleotide comprises a sequence that identifies the peptide, such as a known sequence (i.e., a reporter sequence, also referred to as a barcode sequence) associated with the peptide. Conjugating a peptide to a reporter polynucleotide may enable readout of results (e.g., identification of the peptide) by nucleic acid sequencing of the polynucleotide.

A polynucleotide-peptide conjugate featured herein may include a peptide derived from an antigen of interest (e.g., an MHC-binding peptide derived from an antigen of interest, or an epitope of an antigen of interest) conjugated to a polynucleotide (e.g., a polynucleotide encoding the peptide). For example, a polynucleotide-peptide conjugate can include a peptide (e.g., an MHC-binding peptide or an epitope) conjugated to a polynucleotide (e.g., a polynucleotide encoding the peptide), in which the peptide is derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The featured polynucleotide-peptide conjugate can also include a peptide (e.g., an MHC-binding peptide or an epitope) conjugated to a polynucleotide (e.g., a polynucleotide encoding the peptide), in which the peptide is derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease.

A polynucleotide-peptide conjugate featured herein can also include a synthetically produced peptide (e.g., a synthetically produced MHC-binding peptide, or a synthetically produced epitope) conjugated to a polynucleotide (e.g., a polynucleotide encoding the peptide). The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

A polynucleotide-peptide conjugate may include an oligonucleotide or a polynucleotide, used herein interchangeably, which may be a part of a larger nucleotide construct comprising additional sequences, such as adapter sequences, primer sequences, and other functional sequences configured to, e.g., facilitate sequencing (such as an Illumina R1, R2, P5, or P7 sequence). The polynucleotide of a polynucleotide-peptide conjugate can be an oligonucleotide, a modified oligonucleotide and oligonucleoside, alone or as part of a larger construct. The polynucleotide portion can be linearly or circularly configured or comprise one or more hairpin segments. Modifications of oligonucleotides of the featured polynucleotide-peptide conjugates can include, but are not limited to, modifications of the 3'OH or 5'OH group, modifications of the nucleotide base, modifications of the sugar component, and modifications of the phosphate group.

The polynucleotide of the featured polynucleotide-peptide conjugate may include ribonucleotides (containing ribose as the only or principal sugar component), deoxyribonucleotides (containing deoxyribose as the principal sugar component), or modified sugars or sugar analogs. Thus, in addition to ribose and deoxyribose, the sugar moiety may be pentose, deoxypentose, hexose, deoxyhexose, glucose, arabinose, xylose, lyxose, and/or a sugar analog (e.g., a cyclopentyl group). The sugar may be in a pyranosyl form or in a furanosyl form. The preparation of these sugars or sugar analogs and the respective nucleosides wherein such sugars or analogs are attached to a heterocyclic base (nucleic acid base), per se, is known in the art.

Phosphorous derivative (or modified phosphate group) which may be attached to the sugar or sugar analog moiety in the modified oligonucleotide of the featured polynucleotide-peptide conjugate may be a monophosphate, diphosphate, triphosphate, alkylphosphate, alkanephosphate, phosphorothioate, phosphorodithioate or the like. In a particular example, the polynucleotide of the disclosed polynucleotide-peptide conjugate (e.g., a reporter polynucleotide, such as a barcode sequence) is chemically synthesized to incorporate phosphorothioate internucleoside linkages between at least two (e.g., at least 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, or more) nucleotides of the polynucleotide sequence. The nuclease-resistant internucleoside linkages (e.g., a phosphorothioate internucleoside linkage) may be located throughout the reporter polynucleotide. Such linkages are resistant to nuclease-mediated degradation, such as DNaseII-mediated degradation. In order to confer resistance to degradation by DNaseII, which is an endonuclease, phosphorothioate linkages can be introduced between non-terminal nucleotides (i.e., nucleotides that are not at the 5' or 3' end) of the polynucleotide sequence. The introduction of these modified linkages may increase the stability of the polynucleotide (e.g., by making the polynucleotide a poor substrate for an endonuclease(s)) and/or reduce degradation of the polynucleotide (e.g., a reporter polynucleotide) upon internalization by a target cell.

The heterocyclic bases, or nucleic acid bases which are incorporated in the oligonucleotide base of the featured polynucleotide-peptide conjugate may be naturally occurring principal purine and pyrimidine bases (namely uracil or thymine, cytosine, adenine and guanine, as mentioned above), as well as naturally occurring and synthetic modifications of said principal bases. Those skilled in the art will recognize that any suitable synthetic non-natural nucleosides containing various heterocyclic bases and various sugar moieties (and sugar analogs) can be utilized in the polynucleotides disclosed herein.

The polynucleotide can be a DNA, a complementary DNA (cDNA), a RNA, a messenger RNA (mRNA), a ribosomal RNA (rRNA), a transfer RNA (tRNA), a peptide nucleic acid (PNA), a DNA-like molecule, or an RNA-like molecule. The polynucleotide may be a single-stranded DNA (ssDNA), a double-stranded DNA (dsDNA), a partially dsDNA, a single-stranded RNA (ssRNA) a double-stranded RNA (dsRNA), or a partially dsRNA. Without being bound by any theory, a primer that is complimentary to and specifically binds to the polynucleotide of the featured polynucleotide-peptide conjugate may also be any natural or modified polynucleotide or derivative as described in any embodiments disclosed herein or any combinations thereof.

cDNA-Peptide Conjugate

In specific embodiments, the polynucleotide of the featured polynucleotide-peptide conjugate may be a cDNA. A peptide of interest (e.g., an MHC-binding peptide derived from an antigen of interest, or an epitope of an antigen of interest) can be conjugated to a cDNA (e.g., a CDNA encoding the peptide) to form a cDNA-peptide conjugate.

A cDNA-peptide conjugate featured herein may include a peptide derived from an antigen of interest (e.g., an MHC-binding peptide derived from an antigen of interest, or an epitope of an antigen of interest) conjugated to a cDNA (e.g., a cDNA encoding the peptide). For example, a cDNA-peptide conjugate can include a peptide (e.g., an MHC-binding peptide or an epitope) conjugated to a cDNA (e.g., a cDNA encoding the peptide), in which the peptide is derived from a tumor antigen, a self-antigen (e.g., a self-antigen listed in Table 1), an antigen from an infective agent (e.g., bacteria, virus, parasite or fungus), or an antigen from a therapeutic agent (e.g., a vaccine or a drug). The featured cDNA-peptide conjugate can also include a peptide (e.g., an MHC-binding peptide or an epitope) conjugated to a cDNA (e.g., a cDNA encoding the peptide), in which the peptide is derived from an antigen that is associated with a disease, such as a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or auto-immune disease.

A cDNA-peptide conjugate featured herein can also include a synthetically produced peptide (e.g., a synthetically produced MHC-binding peptide, or a synthetically produced epitope) conjugated to a cDNA (e.g., a cDNA encoding the peptide). The synthetically produced peptide (e.g., synthetically produced MHC-binding peptide or synthetically produced epitope) may be from a peptide library (e.g., an MHC-binding peptide library or an epitope library), including, but not limited to, a peptide library produced by PCR (including by introducing random mutations into various positions of a template peptide). Example of such a peptide library (e.g., an MHC-binding peptide library or an epitope library) includes, without limitation, a peptide library derived from a tumor antigen, a peptide library derived from an infective agent (e.g., bacteria, virus, parasite or fungus), a peptide library derived from a self-antigen (e.g., a self-antigen listed in Table 1), a peptide library derived from a therapeutic agent (e.g., a vaccine or a drug), or a peptide library derived from an antigen that is associated with a disease (e.g., a tumor antigen associated with cancer, an antigen from an infective agent (e.g., a bacterium, a virus, a parasite, or a fungus) associated with an infectious disease (e.g., a bacterial infection, a viral infection, a parasitic infection, or a fungal infection), or a self-antigen (e.g., a self-antigen listed in Table 1) associated with an inflammatory or autoimmune disease).

A peptide of interest (e.g., an MHC-binding peptide derived from an antigen of interest or an epitope of an antigen of interest) may be conjugated to a cDNA (e.g., a cDNA encoding the peptide) to form a cDNA-peptide conjugate according to the methods of Kozlov et al. (*PlosOne* 7:e37441, 2012) and US 2016/0025726, which are incorporated herein by reference in their entirety for all purposes. A cDNA-peptide conjugate for use in the methods, compositions and systems described herein can be produced from DNA templates by either CoA-mediated formation or puromycin-mediated formation. Each method can be implemented at high plexity, for example, by using high-complexity microarrays as a source of the DNA template.

CoA-Mediated Formation of cDNA-Peptide Conjugate cDNA-peptide conjugates can be formed from DNA templates that include the following elements (from 5' to 3'): (i) a T7 promoter, (ii) a 5' UTR sequence containing ribosomal binding site (RBS), (iii) a sequence encoding variable peptide (flanked by spacer residues), (iv) a sequence encoding S6 tag, and (v) a stop codon. In a single incubation mixture, these DNA templates can be transcribed to form mRNAs, the mRNAs translated into peptides, and the mRNAs and peptides covalently attached to each other. The peptide can be attached to the mRNA through a polyfunctional adapter molecule that includes a DNA hairpin (with an overhang region complementary to the conserved 3' end of the transcribed mRNAs). The DNA hairpin can be covalently attached, by means of a polyethylene glycol (PEG) linker moiety, to a coenzyme A (CoA) molecule. Attachment of the mRNA to the adapter can be mediated by T4 DNA ligase, and attachment of the peptide to the adapter can occur by SFP synthase-mediated attachment of the CoA molecule to the S6 tag. The mRNA-peptide conjugates thus formed can then be converted to cDNA-peptide conjugates using reverse transcriptase, followed by treatment with RNAse to degrade the mRNA. The cDNA-peptide conjugates thus prepared can then be isolated from the reaction mixture by capture onto beads bearing DNA baits complementary to a conserved DNA sequence present in all conjugates. As an optional further purification step, SFP synthase along with an excess of biotinylated S6 peptide, can be added to the bead-captured species. In this reaction, species containing unreacted CoA molecules are biotinylated and then depleted by means of streptavidin beads.

Puromycin-Mediated Formation of cDNA-Peptide Conjugate

Puromycin-mediated formation of cDNA-peptide conjugate does not require that the reactions be conducted in one isolated compartment per sequence. As described in Kozlov et al., (PLoS One 7:e37441, 2012), cDNA-peptide conjugates can be formed from DNA templates that include the following elements (from 5' to 3'): (i) a T7 promoter, (ii) a 5' UTR sequence containing ribosomal binding site, (iii) a sequence encoding variable peptide (flanked by spacer residues), (iv) a stop codon, and (v) a 3' UTR region. To form conjugates, the DNA templates can be transcribed to form mRNA. The mRNA can then be purified and attached to a polyfunctional adapter molecule containing a DNA molecule (with a region complementary to the conserved 3' end of the transcribed mRNAs) that is covalently attached, by means of a linker moiety, to a puromycin molecule. The resulting adapter-mRNA conjugates can then be purified and translated to form conjugates. During in vitro translation, a stalled ribosome allows the puromycin residue to enter the ribosome A-site and attach to the C-terminus of the peptide, creating an mRNA-peptide conjugate. The mRNA-peptide conjugates formed in this way can then be converted to cDNA-peptide conjugates by addition of reverse transcriptase, followed by treatment with RNAse to degrade the mRNA. The cDNA-peptide thus prepared can then be isolated from the reaction mixture by capture onto beads bearing DNA baits that are complementary to a conserved DNA sequence present in all conjugates.

Polynucleotide-peptide conjugates formed by the methods described herein can be loaded to major histocompatibility complex (MHC) molecules to generate peptide.

Polynucleotide pMHC Complexes

Figure 16A:
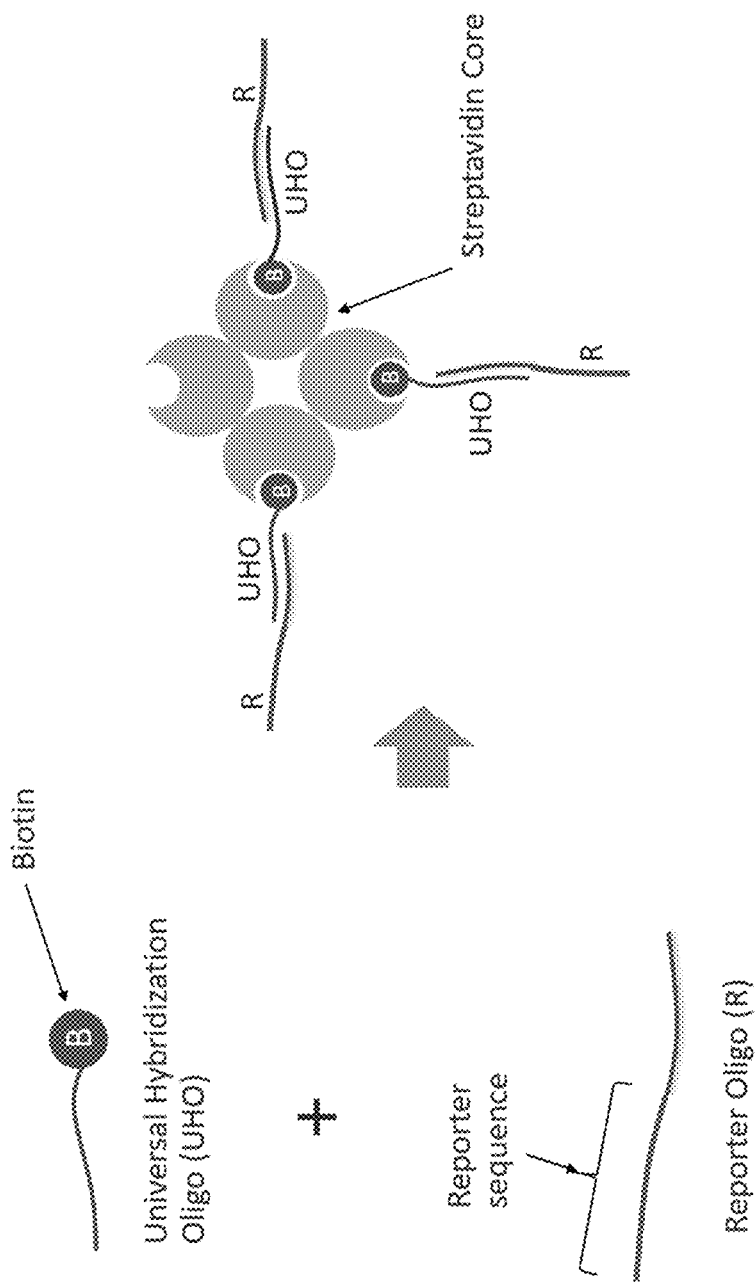
FIGS. 16A-16C are schematic illustrations of exemplary methods for the generation of barcoded pMHC monomers.
Figure 16B:
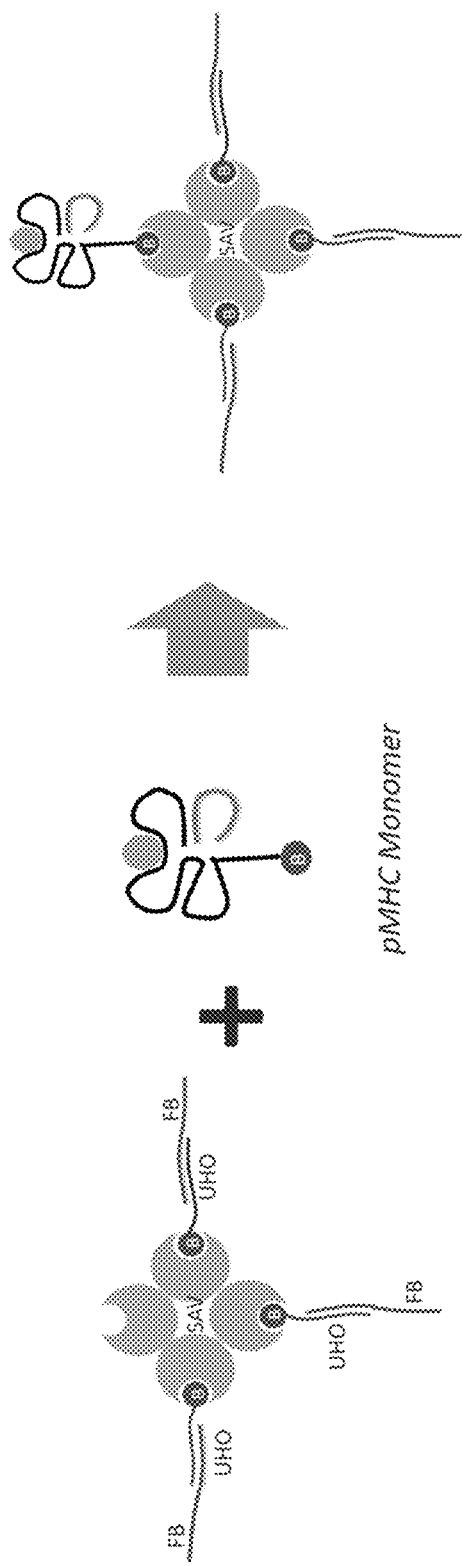
Figure 16C:
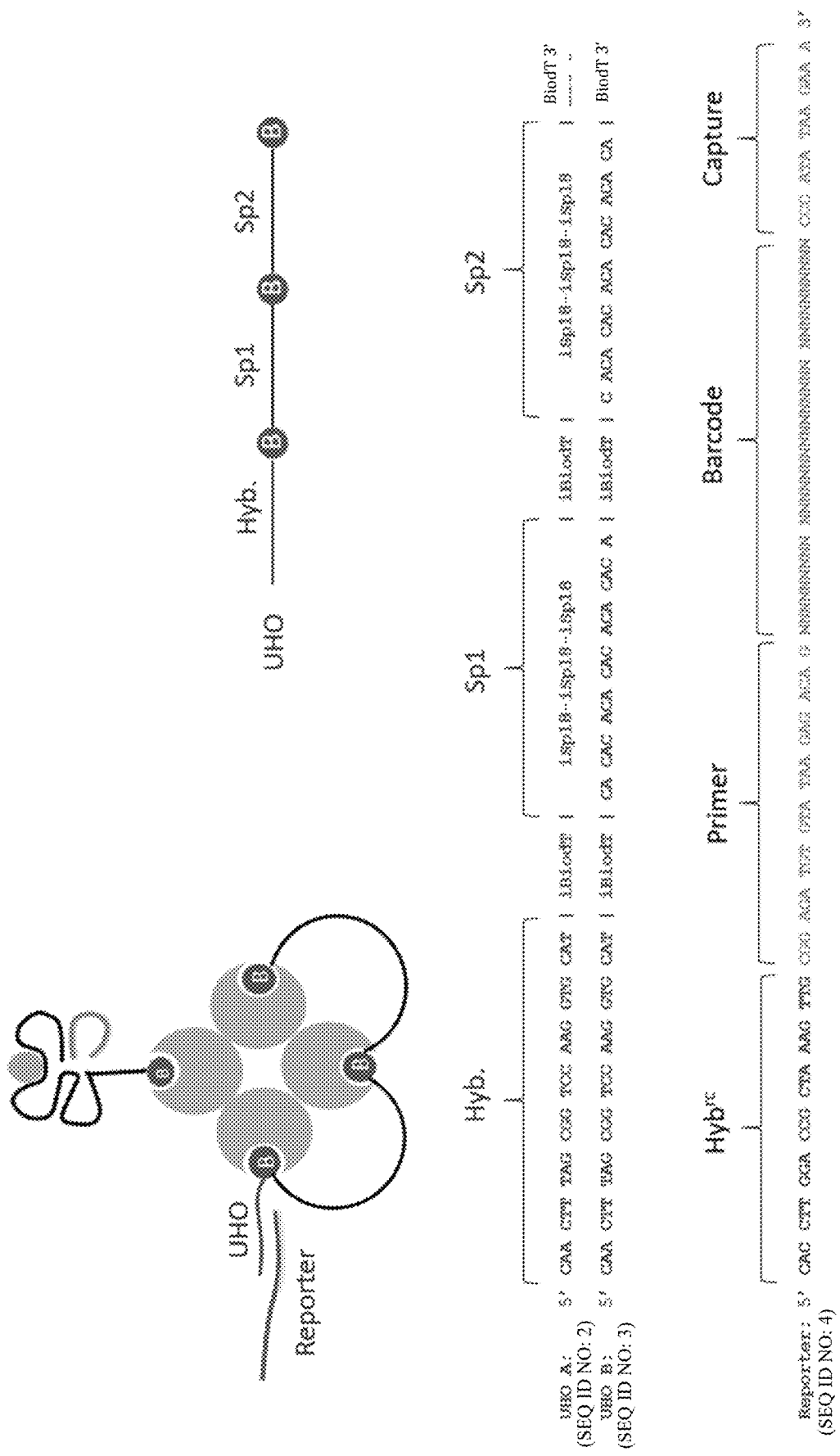

For use in the methods, compositions and systems described herein, a pMHC of interest (e.g., an MHC-binding peptide derived from an antigen of interest, or an epitope of an antigen of interest) can be conjugated or attached to a carrier protein or scaffold to generate a pMHC complex (see, e.g., FIGS. 16A-C). In some instances, the reporter polynucleotide is conjugated to the peptide, MHC molecule, or scaffold. In some embodiments, the reporter polynucleotide is covalently coupled to the peptide, MHC molecule, or scaffold. In other instances, the reporter polynucleotide is non-covalently coupled to the peptide, MHC molecule, or scaffold (such as though a biotin-streptavidin interaction). In some instances, a first nucleic acid molecule is coupled to the MHC complex or the carrier and the reporter oligonucleotide is hybridized to the first nucleic acid molecule to couple the reporter to the pMHC complex (see, e.g., FIG. 16A).

For example, as shown in FIG. 16A, a universal hybridization oligonucleotide (UHO) comprising a first affinity group (e.g., biotin) is coupled to a scaffold, such as a streptavidin tetramer. The reporter oligonucleotide comprises a sequence complementary to the UHO and a reporter sequence. The reporter oligonucleotide is hybridized to the UHO to generate a streptavidin tetramer with a single unoccupied site for pMHC monomer binding (e.g., using a biotinylated pMHC molecule; see, e.g., FIG. 16B).

In other instances, as shown in FIG. 16C, the UHO comprises a hybridization sequence ("Hyb"), a first internal biotin moiety (such as an internal biotin-modified thymidine residue "iBiodT"), a first internal spacer ("Sp1"), a second internal biotin moiety, a second internal spacer ("Sp2"), and a third biotin moiety. The spacer may be a chemical spacer and/or a nucleotide spacer. In some instances, the chemical spacer comprises, e.g., Spacer C3 (3 carbon spacer, "SpC3"), Spacer C6 (6 carbon spacer, "SpC6"), Spacer C12 (12 carbon spacer, "SpC12"), Spacer 9 (9 atom triethylene glycol, "Sp9"), or Spacer 18 (18-atom hexaethylene glycol spacer, "Sp18"). For example, as shown in FIG. 16C, UHO A comprises, from 5' to 3', (1) a hybridization sequence configured to hybridize with its reverse complement ("Hyb$^{rc}$") on a reporter oligonucleotide ("Reporter"); (2) a first biotin moiety (iBiodT), (3) a first spacer region (Sp1) with three internal Sp18 spacers, (4) a second biotin moiety (iBiodT), (5) a second spacer region (Sp2) with three internal Sp18 spacers, and (6) a third biotin moiety (iBiodT), Alternatively, as shown in FIG. 16C, UHO B comprises, from 5' to 3', (1) a hybridization sequence configured to hybridize with its reverse complement ("Hyb$^{rc}$") on a reporter oligonucleotide ("Reporter"); (2) a first biotin moiety (iBiodT), (3) a first polynucleotide spacer region (Sp1), (4) a second biotin moiety (iBiodT), (5) a second polynucleotide spacer region (Sp2), and (6) a third biotin moiety (BiodT), In some instances, a UHO may comprise both chemical (e.g., Sp18) and polynucleotide-based spacers. As shown in FIG. 16C, a reporter oligonucleotide may comprise, in some instances, from 5' to 3', (1) a sequence ("Hyb$^{rc}$") configured to hybridize with a sequence ("Hyb") on a UHO; (2) a primer sequence; (3) a barcode region (e.g., comprising a barcode sequence as described elsewhere herein and, optionally, one or more UMI sequences); and (4) a capture sequence (e.g., configured to hybridize to a sequence on a nucleic acid barcode molecule, such as those described elsewhere herein). Although FIGS. 16A-16C describe a reporter oligonucleotide hybridized to a UHO, a reporter oligonucleotide may be directly bound to the carrier protein or scaffold (i.e., without the use of a UHO). The designation "i", when used in combination with a component described herein designates that component as an "internal" component (e.g., "iSp18"), meaning the component is not a terminal component (e.g., the component resides between two other components).

T Cell Receptor (TCR)

Methods described herein may be used to detect binding of peptides to T cells (e.g., pMHC interaction with TCR(s) from T cell(s)). Antigenic peptides bound to MHC molecules are presented to T cells. Recognition and engagement of such peptide-MHC complex (pMHC) by the TCR, a molecule found on the surface of T cells, results in T cell activation and response. The TCR is a heterodimer composed of two different protein chains. In most T cells (about 95%), these two protein chains are alpha ($\alpha$) and beta ($\beta$) chains. However, in a small percentage of T cells (about 5%), these two protein chains are gamma and delta ($\gamma/\delta$) chains. The ratio of TCRs comprised of $\alpha/\beta$ chains versus $\gamma/\delta$ chains may change during a diseased state (e.g., in cancer (e.g., in a tumor), infectious disease, inflammatory disease or autoimmune disease). Engagement of the TCR with pMHC activates a T cell through a series of biochemical events mediated by associated enzymes, co-receptors, specialized adaptor molecules, and activated or released transcription factors.

Each of the two chains of a TCR contains multiple copies of gene segments—a variable 'V' gene segment, a diversity 'D' gene segment, and a joining 'J' gene segment. The TCR alpha chain is generated by recombination of V and J segments, while the beta chain is generated by recombination of V, D, and J segments. Similarly, generation of the TCR gamma chain involves recombination of V and J gene segments, while generation of the TCR delta chain occurs by recombination of V, D, and J gene segments. The intersection of these specific regions (V and J for the alpha or gamma chain, or V, D and J for the beta or delta chain) corresponds to the CDR3 region that is important for antigen-MHC recognition. Complementarity determining regions (e.g., CDR1, CDR2, and CDR3), or hypervariable regions, are sequences in the variable domains of antigen receptors (e.g., T cell receptor and immunoglobulin) that can complement an antigen. Most of the diversity of CDRs is found in CDR3, with the diversity being generated by somatic recombination events during the development of T lymphocytes. CDR3, which is encoded by the junctional region between the V and J or D and J genes, is highly variable, and plays an essential role in the interaction of the TCR with the peptide-MHC complex (pMHC), as it is the region of the TCR in direct contact with the peptide antigen. For this reason, CDR3 is often used as the region of interest to determine T cell clonotypes, a unique nucleotide sequence that arises during the gene arrangement process, as it is highly unlikely that two T cells will express the same CDR3 nucleotide sequence, unless they are derived from the same clonally expanded T cell. Because an active TCR consists of paired chains within single T cells, determination of the active paired chains may require the sequencing of single T cells.

Disclosed herein are methods of binding a peptide to a T cell (e.g., detecting binding of a peptide-MHC conjugate (pMHC) complex), including: (i) providing a pMHC complex including a MHC monomer and a peptide, in which the pMHC includes a reporter polynucleotide attached thereto, in which the reporter polynucleotide includes a reporter sequence that identifies the peptide of the pMHC; (ii) presenting the pMHC monomers to T cells to generate a pMHC bound to a T cell, in which the T cell receptor (TCR) of the T cell binds the pMHC monomer to form a pMHC-TCR complex, and in which the pMHC-TCR complex is stabilized by: (a) using a chemical fixative; (b) reducing diffusion of the pMHC monomer form the TCR; and/or (c) retaining and/or inducing internalization of the pMHC-TCR complex into the T cells; (iii) optionally enriching for the T cell; (iv) partitioning the T cell and a plurality of nucleic acid barcode molecules including a cell barcode sequence into a partition; (v) generating a barcoded nucleic acid molecule that includes (i) the reporter sequence or a reverse complement thereof and (ii) the cell barcode sequence or a reverse complement thereof; and (vi) before or after partitioning, lysing the pMHC-T cell multiplets to release the pMHC-TCR complex.

T Cells

The methods described herein can be used for detecting binding of T cells and pMHC monomers, which contain a peptide(s) of interest bound to the MHC molecule. The disclosed methods may be used for detecting the binding of polynucleotide-conjugated pMHC monomers to T cell(s) from a homogenous mix of T cell(s) or a heterogeneous mix of T cell(s). Detecting binding of pMHC monomers to T cells by the methods described herein can be accomplished regardless of whether the T cell population represents a homogeneous mix of T cells or a heterogenous mix of T cells (e.g., a 50/50 mix of T cell types, a 90/10 mix of T cell types, or virtually any ratio of T cell types (e.g., 99/1, 98/2, 97/3, 94/6, 92/8, 90/10, 85/15, 83/17, 80/20, 77/23, 75/25, 73/27, 71/29, 69/31, 67/33, 65/35, 63/37, 61/39, 59/41, 57/43, 55/45, 53/47, 51/49, 49/51, 47/53, 45/55, 43/57, 41/59, 39/61, 37/63, 35/65, 33/67, 31/69, 29/71, 27/73, 25/75, 23/77, 21/79, 19/81, 17/83, 15/85, 13/87, 11/89, 9/91, 7/93, 5/95, 3/97, or 1/99), as well as a complete heterogeneous mix of different T cell types, or any mixture between these. Differing T cell types may include T cells from different tissue types of a subject or the same tissue type from different subjects. For example, differing T cell types may include T cells from different tissues from a subject, such as T cells from healthy tissue and T cells from diseased tissue (e.g., cancer tissue, infected tissue (e.g., tissue infected with a bacterium, a virus, a parasite, a fungus), inflamed tissue, autoimmune disease-targeted tissue), or T cells from a tissue before and/or after treatment with a therapeutic agent (e.g., a vaccine or a drug). Differing T cell types may also include T cells from different subjects, such as T cells from a healthy subject, T cells from a subject with a disease (e.g., cancer, infectious disease (e.g., a bacterial infection, a viral infection, a parasitic infection, or a fungal infection), inflammatory disease, autoimmune disease), or T cells from a subject who is treated with a therapeutic agent (e.g., a drug and/or a vaccine).

The methods disclosed herein can be used for detecting binding of pMHC monomers to T cells from a healthy subject, T cells from a subject with a disease (e.g., cancer, infectious disease (e.g., a bacterial infection, a viral infection, a parasitic infection, or a fungal infection), inflammatory disease, autoimmune disease), T cells from a subject who is treated with a therapeutic agent (e.g., a drug and/or a vaccine), or T cells from a cell culture (e.g., a T cell culture generated from a subject (e.g., any of the subjects described above), a T cell line, or a T cell repository).

Improving pMHC-TCR Binding

Disclosed herein, in some embodiments, are compositions, systems, and methods for detection of binding of a peptide to a T cell comprising: (a) providing a peptide-MHC conjugate (pMHC) complex comprising a MHC monomer and a peptide, wherein the MHC is an MHC monomer, and wherein the pMHC comprises a reporter polynucleotide attached thereto, wherein the reporter polynucleotide comprises a reporter sequence that identifies the peptide of the pMHC; (b) presenting the pMHC monomers to T cells to generate a pMHC bound to a T cell, wherein a T cell receptor (TCR) of the T cell binds a pMHC monomer to form a pMHC-TCR complex, and wherein the pMHC-TCR complex is stabilized by: (i) using a chemical fixative; (ii) reducing diffusion of the pMHC monomer from the TCR (e.g., thorough physiochemical modifications to the pMHC or reaction buffer); and/or (iii) retaining and/or inducing internalization of the pMHC-TCR complex into T cells; (c) partitioning the T cell and a plurality of nucleic acid barcode molecules comprising a cell barcode sequence into a partition; and (d) generating a barcoded nucleic acid molecule comprising (i) the reporter sequence or a reverse complement thereof and (ii) the cell barcode sequence or a reverse complement thereof.

Crosslinkers

Methods described herein may be used to form a pMHC-TCR conjugate through crosslinking (e.g., through chemical fixation). The terms "crosslinker" and "crosslinking agent" are used interchangeably herein. The crosslinker may be a homobifunctional crosslinker or a heterobifunctional crosslinker. Homobifunctional crosslinkers have two identical reactive groups. Heterobifunctional crosslinkers have two different reactive groups.

Chemical crosslinking agents are routinely used to crosslink peptides and any suitable crosslinking agent can be utilized with the compositions, systems and methods disclosed herein. Non limiting examples of amine-specific crosslinkers are N-hydroxy succinimide (NHS), bis(sulfosuccinimidyl) suberate ($BS^3$), ethylene glycol bis(succinimidyl succinate) (EGS), ethylene glycol bis(sulfosuccinimidyl succinate) (sulfo-EGS), PEGylated bis(sulfosyccinimidyl) suberate ($BS(PEG)^9$), $BS(PEG)^5$, bis-$dPEG^5$-PFP (CAS No.: 1334177-78-4), disuccinimidyl tartarate, dimethyl adipimate·2HCl, dimethyl pimelimidate·2HCl, and dimethyl suberimidate·2HCl. Other crosslinkers are formaldehyde and glutaraldehyde.

Reduction of Monomer Diffusion

Simple dissociation constants (Kd) for TCR-pMHC interactions may not necessarily be the only important determinant of binding kinetics. For example, rapid on-rate may permit rapid rebinding in the context of antigen-presenting cells interacting with T cells (Govern et al., Fast on-Rates Allow Short Dwell Time Ligands to Activate T Cells. Proc Natl Acad Sci USA. 2010 May 11; 107(19):8724-9). As such, the compositions, systems, and methods described herein may further comprise one or more physiochemical alterations to the pMHC monomers or to the composition of binding buffers to reduce diffusion rates and/or improve sensitivity of pMHC monomer TCR interactions.

In some instances, the compositions, systems, and methods described herein comprise use of one or more crowding agents configured to reduce diffusion rates of the pMHC-TCR interaction and improve the sensitivity of detection of pMHC-TCR binding event (e.g., through detection of polynucleotide conjugated pMHC complexes described elsewhere herein). In some instances, the crowding agent comprises a polymer crowding agent, such as a synthetic polymer or a biopolymer crowding agent. For example, the synthetic polymer may include FICOLL® (e.g., Ficoll-70), polyvinylpyrrolidone (PVP, e.g., PVP-40), etc.

In other instances, the crowding agent comprises a polysaccharide, such as dextran. In other instances, the crowding agent comprises glycerol. In some embodiments, the crowding agent comprises one or more proteins. For example, the protein may include globular proteins, such as lysozyme, ovalbumin, albumin (e.g., bovine serum albumin (BSA)), etc.

In some instances, the concentration of pMHC monomers, the solute concentration and/or pH of binding buffers, and the temperature of pMHC T cell incubation is selected to reduce diffusion rates of the pMHC-TCR interaction and improve the sensitivity of detection of pMHC-TCR binding event. In some embodiments, the pMHC T cell incubation buffer is a colloid (e.g., may comprise nanospheres (e.g., spheres between about 1 nm to about 100 nm), which may be differently-sized). In some instances, additional molecules are conjugated to the pMHC monomer complexes, thereby increasing the molecular weight of the pMHC monomer and altering the diffusivity of the pMHC-TCR interaction. For example, an additional protein or polypeptide may be conjugated to the pMHC monomers (e.g., chemically conjugated or generated as a fusion protein using recombinant DNA technology), thereby increasing the molecular weight of the complex.

Modulating Rate of pMHC-TCR Internalization

T cell activation is only triggered in response to interactions between the TCR and the pMHC ligand that reach a specific-half-life threshold. Thus, efficient T cell activation by pMHC requires an optimal dwell time of TCR-pMHC interaction. For detection (e.g., FACS staining) of TCRs with, e.g., fluorescent MHC multimers (such as MHC tetramers), TCR internalization may reduce tetramer fluorescence and it can be advantageous to ameliorate this through use of a protein kinase inhibitor, such as dasatinib. See, e.g., Lissina, A. et al. 2009. Protein Kinase Inhibitors Substantially Improve the Physical Detection of T-Cells with Peptide-MHC Tetramers. *Journal of Immunological Methods* 340 (1): 11-24. However, in the compositions, methods, and systems disclosed herein, in some instances, it may be desirable to retain and/or induce pMHC-TCR complex internalization, thereby effectively inhibiting pMHC dissociation. Accordingly, in some embodiments, a protein kinase inhibitor (e.g., dasatanib) is not utilized during pMHC T cell incubation, thereby retaining pMHC-TCR internalization. Furthermore, it may be desirable to inhibit lysosomal degradation of any internalized pMHC complexes. Therefore, in some instances, the compositions, systems, and methods described herein comprise use of an agent that inhibits lysosomal degradation, such as an agent that inhibits the degradation of the polynucleotide reporter molecule of the pMHC monomer. Exemplary agents include nuclease inhibitors, such as a DNase II inhibitor. In some embodiments, inhibition of DNAse II is performed through the conjugation of a DNAse II inhibitor to the pMHC monomer as described, for example, in Sperinde et al. (*J. Gene Med.* 3: 101-108, 2000). In some instances, chloroquine is included in the pMHC T cell incubation buffer to increase lysosomal pH and inhibit DNAse II, for example as described in Zenke et al. (*PNAS* 87: 3655-3659, 1990).

Partitioning of pMHC-T Cell Multiplets

The compositions, systems, and methods described herein may be used for compartmentalized analysis of nucleic acid molecules(s), in particular, nucleic acid molecules with nucleic acid sequence(s) that identify the antigenic peptides of the pMHC. Antigenic peptides bound to major histocompatibility complex (MHC) molecules are presented to T cell. Methods and systems described herein can be used to partition pMHC-T cell multiplets or to deposit pMHC-T cell multiplets into discrete compartments or partitions (referred to interchangeably herein as partitions), where each partition maintains separation of its own contents from the contents of other partitions. In some examples, a partition is a droplet or well. Partitioning of pMHC-T cell multiplets by one or more methods described herein allows characterization of each pMHC-T cell multiplet individually.

Characterization of a pMHC-T cell multiplet (e.g., a polynucleotide conjugated pMHC complex bound to a TCR on a T cell) may include characterization of the peptide antigen (e.g., sequencing of the polynucleotide bound to the pMHC complex that identifies the peptide bound to the pMHC) that is presented to the T cell as a component of the pMHC. Identification of peptide antigens (e.g., peptide from a tumor antigen, an infective agent (e.g., bacteria, virus, parasite or fungus), a self-antigen (e.g., a self-antigen listed in Table 1), or a therapeutic agent (e.g., a vaccine or a drug)) may be useful in manipulation (e.g., activation or inhibition) of the immune system against such antigens (e.g., by using the sequencing information for generation of peptide vaccines). For example, peptides from a tumor antigen may be identified by one or more methods described herein for generation of tumor vaccines, which can be useful in activation of the immune system against the tumor antigen; or peptides from an infective agent (e.g., bacteria, virus, parasite, or fungus) may be identified by one or more methods described herein for generation of vaccines, which can be useful in activation of the immune system against that infective agent.

Identification of peptide antigens (e.g., peptide from a tumor antigen, or an infective agent (e.g., bacteria, virus, parasite or fungus)) may also be useful in diagnosis of a disease (e.g., cancer or infectious disease). For example, peptides from a sample (e.g., a tumor biopsy, blood, saliva, serum, or semen) from a subject (e.g., a human) may be identified by one or more methods described herein, and may be compared to sequences of tumors (e.g., tumors from a known cancer) or an infective agent so as to diagnose the presence of that tumor or infective agent in that subject.

Additionally, or alternatively, characterization of pMHC-T cell multiplets formed by one or more methods described herein may include characterization (e.g., sequencing) of the TCRs that recognize pMHC presented to the T cells. Uses and applications of TCR characterization (e.g., sequencing) is described further herein.

Figure 2:
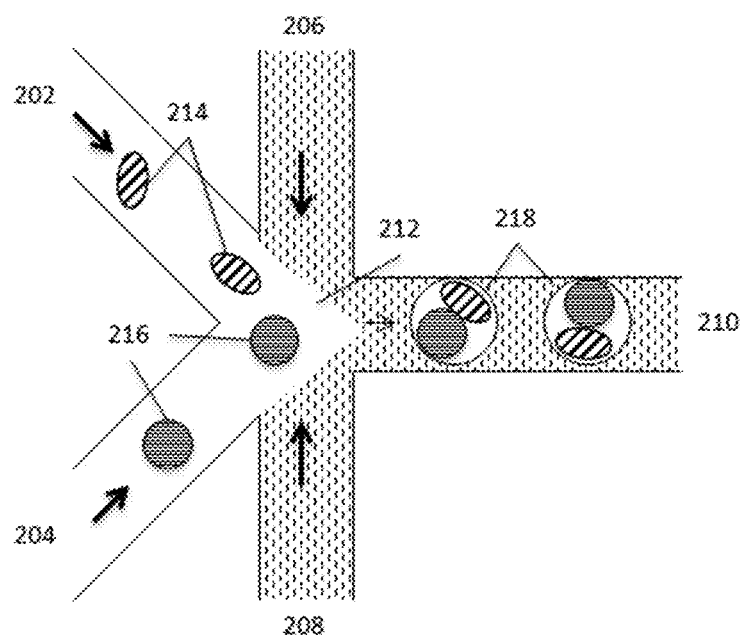
FIG. 2 is a schematic illustrating a microfluidic channel structure for co-partitioning cells and particles (e.g., beads) containing additional reagents.

Methods and systems described herein can be used to partition pMHC-T cell multiplets into droplets. Each such partition (e.g., a droplet in an emulsion or a well in a microwell/nanowell array) may contain a pMHC-T cell multiplet or derivative (e.g., a cell lysate) thereof and a partition-specific barcode molecule ((e.g., attached to a bead as described elsewhere herein). In some instances, a partition contains a single pMHC-T cell multiplet and a single particle (e.g., a bead comprising a partition-specific barcode molecule), as shown in FIG. 2. In other instances, a partition (such as a droplet) may contain a single pMHC-T cell multiplet and multiple (e.g., more than 1, such as 2, 3, 4, 5, 6, 7, 8, 9, 10, or more) particles (e.g., beads). Alternatively, a partition may contain multiple (e.g., more than 1, such as 2, 3, 4, 5, 6, 7, 8, 9, 10, or more) pMHC-T cell multiplets and a single particle (e.g., bead). In yet other examples, a partition may contain multiple (e.g., more than 1, such as 2, 3, 4, 5, 6, 7, 8, 9, 10, or more) pMHC-T cell multiplets and multiple (e.g., more than 1, such as 2, 3, 4, 5, 6, 7, 8, 9, 10, or more) particles (e.g., beads).

Barcode

For detecting binding of a pMHC to a TCR by one or more methods described herein, unique identifiers, e.g., barcodes or barcode sequences, may be previously, subsequently or concurrently delivered to the partitions (e.g., droplets) that hold the compartmentalized or partitioned T cell(s) (e.g., T cell(s) in pMHC-T cell multiplets) or cellular derivatives thereof (e.g., lysates, such as lysates containing nucleic acid molecules from a partitioned T cell(s) (e.g., nucleic acid molecules of T cells containing nucleic acid sequence of the TCR)), in order to allow for the later attribution of the characteristics of the individual T cells (e.g., TCR sequence of the T cell) to the particular compartment (e.g., droplet). Barcodes may be delivered, for example, as a nucleic acid molecule (e.g., a nucleic acid barcode molecule) to a partition (e.g., a droplet) via any suitable mechanism, such as by using particles (e.g., beads, such as gel beads). In some examples, cellular derivatives, such as T cells or constituents of T cells in matrix (e.g., gel or polymeric matrix), are compartmentalized or partitioned in the compartment with the barcode or barcode sequence.

A barcode sequence may be a delivered to a partition (e.g., droplet) as a nucleic acid molecule (e.g., a nucleic acid barcode molecule). In some cases, a barcode sequence may be a delivered to a partition (e.g., droplet) as a nucleic acid barcode molecule (e.g., a nucleic acid barcode molecule in a particle, a nucleic acid barcode molecule contained in a particle or a nucleic acid barcode molecule associated or attached to a particle). The nucleic acid barcode molecule may have a barcode sequence and a nucleic acid primer sequence (e.g., a nucleic acid primer sequence complementary to the nucleic acid sequence of the TCR or a poly-T sequence complementary to a poly-A sequence in a mRNA molecule). In some instances, the nucleic acid barcode molecule may have a barcode sequence and a template switching oligonucleotide (TSO) sequence configured to facilitate a template switching reaction during, e.g., cDNA synthesis.

The nucleic acid barcode molecule may have a single barcode sequence and a single TSO sequence and/or nucleic acid primer sequence (e.g., a poly-T sequence, a gene-specific primer sequence, such as a sequence complementary to a nucleic acid sequence of the TCR). In some instances, the nucleic acid barcode molecule may have a single barcode sequence and multiple (e.g., more than 1, such as 2, 3, 4, 5, 6, 7, 8, 9, 10, or more) nucleic acid primer sequences. In some instances, the nucleic acid barcode molecule may have multiple (e.g., more than 1, such as 2, 3, 4, 5, 6, 7, 8, 9, 10, or more) barcode sequences or barcode sequence segments and a single nucleic acid primer sequence. In some instances, the nucleic acid barcode molecule may have multiple (e.g., more than 1, such as 2, 3, 4, 5, 6, 7, 8, 9, 10, or more) barcode sequences or barcode sequence segments and multiple (e.g., more than 1, such as 2, 3, 4, 5, 6, 7, 8, 9, 10, or more) nucleic acid primer sequences.

Compartmentalization of a particle (e.g., a particle with a nucleic acid barcode molecule comprising a primer sequence) and a pMHC-T cell multiplet or derivative thereof (e.g., a lysate thereof, such as a lysate of a pMHC-T cell multiplet containing nucleic acid molecule(s) of the T cell (e.g., nucleic acid molecule(s) of the T cell with a nucleic acid sequence encoding the TCR)) in a partition (e.g., droplet) may allow hybridization of the nucleic acid molecule of the T cell (e.g., a nucleic acid molecule of the T cell encoding a TCR) with the nucleic acid barcode molecule (e.g., nucleic acid barcode molecule containing a barcode sequence and a nucleic acid primer sequence (e.g., a nucleic acid primer sequence complimentary to the nucleic acid sequence of the TCR)) under conditions sufficient to generate a barcoded nucleic acid molecule. The barcoded nucleic acid molecule may contain, from a 5' end to a 3' end, a sequence corresponding to the nucleic acid sequence of the TCR and a complement of the barcode sequence. The nucleic acid sequence of the TCR may be obtained by sequencing the barcoded nucleic acid molecule or a derivative thereof (e.g., an amplified product thereof).

In other instances, compartmentalization of a particle (e.g., a particle with a plurality of nucleic acid barcode molecules comprising a cell barcode sequence and a TSO sequence) and a pMHC-T cell multiplet or derivative thereof in a partition (e.g., droplet) may allow for a template switching reaction of the nucleic acid molecule of the T cell (e.g., a nucleic acid molecule of the T cell encoding a TCR) with the nucleic acid barcode molecule under conditions sufficient to generate a barcoded nucleic acid molecule. The barcoded nucleic acid molecule may contain, from a 5' end to a 3' end, a sequence corresponding to the nucleic acid sequence of the TCR (e.g., a cDNA sequence, which may be the complement of the mRNA sequence) and a complement of the barcode sequence. The nucleic acid sequence of the TCR may be obtained by sequencing the barcoded nucleic acid molecule or a derivative thereof (e.g., an amplified product thereof). Furthermore, the identity of the peptide bound to the TCR of the T cell may be determined may barcoding and sequencing the polynucleotide conjugated to the pMHC molecule. For example, in some instances, the polynucleotide conjugated to the pMHC molecule comprises a reporter sequence that identifies the peptide and a sequence complementary to the nucleic acid barcode molecule (e.g., the TSO sequence or the primer sequence). As such, an additional barcoded nucleic acid molecule can be generated comprising the reporter sequence and the cell barcode sequence. After sequencing the additional barcoded nucleic acid molecule or a derivative thereof, the reporter sequence can be utilized to identify the peptide bound to the T cell and the cell barcode sequence can be used to link the peptide with the TCR sequence of the T cell.

Particles

In some embodiments, nucleic acid barcode molecules are delivered to a partition (e.g., a droplet) via a particle. In some cases, nucleic acid barcode molecules are initially associated with the particle and then released from the particle upon application of a stimulus, which allows the nucleic acid barcode molecules to dissociate or to be released from the particle. In specific examples, nucleic acid barcode molecules are initially associated with the particle (e.g., bead) and then released from the particle upon application of a biological stimulus, a chemical stimulus, a thermal stimulus, an electrical stimulus, a magnetic stimulus, and/or a photo stimulus.

In some cases, a nucleic acid barcode molecule contains a barcode sequence and a functional sequence, such as a nucleic acid primer sequence or a TSO sequence.

A particle, in some embodiments, is a bead. A particle, e.g., a bead, may be porous, non-porous, hollow (e.g., a microcapsule), solid, semi-solid, semi-fluidic, fluidic, and/or a combination thereof. In some instances, a particle, e.g., a bead, may be dissolvable, disruptable, and/or degradable. In some cases, a particle, e.g., a bead, may not be degradable. In some cases, the particle, e.g., a bead, may be a gel bead. A gel bead may be a hydrogel bead. A gel bead may be formed from molecular precursors, such as a polymeric or monomeric species. A semi-solid particle, e.g., a bead, may be a liposomal bead. Solid particles, e.g., beads, may comprise metals including iron oxide, gold, and silver. In some cases, the particle, e.g., the bead, may be a silica bead. In some cases, the particle, e.g., a bead, can be rigid. In other cases, the particle, e.g., a bead, may be flexible and/or compressible.

In some cases, the particle (e.g., bead) may contain molecular precursors (e.g., monomers or polymers), which may form a polymer network via polymerization of the precursors. In some cases, a precursor may be an already polymerized species capable of undergoing further polymerization via, for example, a chemical cross-linkage. In some cases, a precursor has one or more of an acrylamide or a methacrylamide monomer, oligomer, or polymer. In some cases, the particle (e.g., bead) has prepolymers, which are oligomers capable of further polymerization. For example, polyurethane particles (e.g., polyurethane bead) may be prepared using prepolymers. In some cases, the particle (e.g., bead) may contain individual polymers that may be further polymerized together. In some cases, particles (e.g., beads) may be generated via polymerization of different precursors, such that they comprise mixed polymers, co-polymers, and/or block co-polymers.

A particle (e.g., bead) may be formed from natural and/or synthetic materials. For example, a polymer can be a natural polymer or a synthetic polymer. In some cases, a particle (e.g., bead) is formed from both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly(ethylene oxide), poly (ethylene terephthalate), polyethylene, polyisobutylene, poly(methyl methacrylate), poly(oxymethylene), polyformaldehyde, polypropylene, polystyrene, poly(tetrafluoroethylene), poly(vinyl acetate), poly(vinyl alcohol), poly(vinyl chloride), poly(vinylidene dichloride), poly(vinylidene difluoride), poly(vinyl fluoride) and combinations (e.g., co-polymers) thereof. Particle, e.g., beads, may also be formed from materials other than polymers, including lipids, micelles, ceramics, glass-ceramics, material composites, metals, other inorganic materials, and others.

In some cases, a chemical cross-linker may be a precursor used to cross-link monomers during polymerization of the monomers and/or may be used to attach nucleic acid molecules (e.g., nucleic acid barcode molecules) to the particle (e.g., bead). In some cases, polymers may be further polymerized with a cross-linker species or other type of monomer to generate a further polymeric network. Non-limiting examples of chemical cross-linkers (also referred to as a "crosslinker" or a "crosslinker agent" herein) include cystamine, gluteraldehyde, dimethyl suberimidate, N-Hydroxysuccinimide crosslinker BS3, formaldehyde, carbodiimide (EDC), SMCC, Sulfo-SMCC, vinylsilane, N,N'diallyltartardiamide (DATD), N,N'-Bis(acryloyl)cystamine (BAC), or homologs thereof. In some cases, the crosslinker used in the present disclosure contains cystamine.

Crosslinking may be permanent or reversible, depending upon the particular crosslinker used. Reversible crosslinking may allow for the polymer to linearize or dissociate under appropriate conditions. In some cases, reversible crosslinking may also allow for reversible attachment of a material bound to the surface of a particle, e.g., a bead. In some cases, a cross-linker may form disulfide linkages. In some cases, the chemical cross-linker forming disulfide linkages may be cystamine or a modified cystamine.

In some examples, disulfide linkages can be formed between molecular precursor units (e.g., monomers, oligomers, or linear polymers) or precursors incorporated into a particle (e.g., a bead) and nucleic acid molecules. Cystamine (including modified cystamines), for example, is an organic agent comprising a disulfide bond that may be used as a crosslinker agent between individual monomeric or polymeric precursors of a particle, e.g., a bead. Polyacrylamide may be polymerized in the presence of cystamine or a species comprising cystamine (e.g., a modified cystamine) to generate polyacrylamide gel particles (e.g., polyacrylamide gel beads) with disulfide linkages (e.g., chemically degradable beads with chemically-reducible cross-linkers). The disulfide linkages may permit the particle (e.g., bead) to be degraded (or dissolved) upon exposure of the particle (e.g., bead) to a reducing agent.

In some embodiments, chitosan, a linear polysaccharide polymer, may be crosslinked with glutaraldehyde via hydrophilic chains to form a particle (e.g., bead). Crosslinking of chitosan polymers may be achieved by chemical reactions that are initiated by heat, pressure, change in pH, and/or radiation.

In some instances, the particle (e.g., bead) may comprise covalent or ionic bonds between polymeric precursors (e.g., monomers, oligomers, linear polymers), oligonucleotides, primers, and other entities. In some cases, the covalent bonds have carbon-carbon bonds or thioether bonds.

In some cases, a particle (e.g., bead) may contain an acrydite moiety, which in certain aspects may be used to attach one or more nucleic acid molecule (e.g., barcode sequence, nucleic acid barcode molecule, primer, or other nucleic acid molecule) to the particle (e.g., bead). In some cases, an acrydite moiety can refer to an acrydite analogue generated from the reaction of acrydite with one or more species, such as, the reaction of acrydite with other monomers and cross-linkers during a polymerization reaction. Acrydite moieties may be modified to form chemical bonds with a species to be attached, such as an oligonucleotide or a nucleic acid molecule (e.g., barcode sequence, nucleic acid barcode molecule, primer, or other nucleic acid molecule). Acrydite moieties may be modified with thiol groups capable of forming a disulfide bond or may be modified with groups already comprising a disulfide bond. The thiol or disulfide (via disulfide exchange) may be used as an anchor point for a species to be attached or another part of the acrydite moiety may be used for attachment. In some cases, attachment is reversible, such that when the disulfide bond is broken (e.g., in the presence of a reducing agent), the attached species is released from the particle (e.g., bead). In other cases, an acrydite moiety comprises a reactive hydroxyl group that may be used for attachment.

Functionalization of particles (e.g., beads) for attachment of oligonucleotides or nucleic acid molecules may be achieved through a wide range of different approaches, including activation of chemical groups within a polymer, incorporation of active or activatable functional groups in the polymer structure, or attachment at the pre-polymer or monomer stage in particle (e.g., bead) production.

For example, precursors (e.g., monomers, cross-linkers) that are polymerized to form a particle (e.g., bead) may comprise acrydite moieties, such that when a particle (e.g., bead) is generated, the particle (e.g., bead) also comprises acrydite moieties. The acrydite moieties can be attached to an oligonucleotide or a nucleic acid molecule comprising one or more functional sequences, such as a TSO sequence or a primer sequence (e.g., a poly T sequence or a nucleic acid primer sequence complementary to a nucleic acid sequence of the TCR and/or for amplifying the nucleic acid sequence of the TCR, or a nucleic acid primer sequence complementary to the nucleic acid sequence of the nucleic acid barcode molecule and/or for amplifying the nucleic acid sequence of the nucleic acid barcode molecule, etc) that is desired to be incorporated into the particle (e.g., bead). In some cases, the nucleic acid molecule has a P5 sequence (or a portion thereof) for attachment to a sequencing flow cell for Illumina sequencing. In some cases, the nucleic acid molecule has a P7 sequence (or a portion thereof) for attachment to a sequencing flow cell for Illumina sequencing. In some cases, the nucleic acid molecule has a barcode sequence. In some cases, the nucleic acid molecule further contains a unique molecular identifier (UMI). In some cases, the nucleic acid molecule has an R1 primer sequence (or a portion thereof) for Illumina sequencing. In some cases, the nucleic acid molecule has an R2 primer sequence (or a portion thereof) for Illumina sequencing.

In some cases, precursors comprising a functional group that is reactive or capable of being activated such that it becomes reactive can be polymerized with other precursors to generate gel particles (e.g., gel beads) containing the activated or activatable functional group. The functional group may then be used to attach additional species (e.g., disulfide linkers, primers, or other oligonucleotides) to the gel particles (e.g., gel beads). For example, some precursors with a carboxylic acid (COOH) group can co-polymerize with other precursors to form a gel particle (e.g., gel bead) that also contains a COOH functional group.

In some cases, acrylic acid (a species comprising free COOH groups), acrylamide, and bis(acryloyl)cystamine can be co-polymerized together to generate a gel particle (e.g., gel bead) with free COOH groups. The COOH groups of the gel particle (e.g., gel bead) can be activated (e.g., via 1-Ethyl-3-(3-dimethylaminopropyl)carbodiimide (EDC) and N-Hydroxysuccinimide (NHS) or 4-(4,6-Dimethoxy-1,3,5-triazin-2-yl)-4-methylmorpholinium chloride (DMTMM)) such that they are reactive (e.g., reactive to amine functional groups where EDC/NHS or DMTMM are used for activation). The activated COOH groups can then react with an appropriate species (e.g., a species comprising an amine functional group where the carboxylic acid groups are activated to be reactive with an amine functional group) comprising a moiety to be linked to the particle (e.g., bead).

A particle (e.g., a bead, such as a gel bead) containing disulfide linkages in their polymeric network may be functionalized with additional species via reduction of some of the disulfide linkages to free thiols. The disulfide linkages may be reduced via, for example, the action of a reducing agent (e.g., DTT or TCEP) to generate free thiol groups, without dissolution of the particle. Free thiols of the particle (e.g., bead) can then react with free thiols of a species or a species containing another disulfide bond (e.g., via thiol-disulfide exchange such that the species can be linked to the particle (e.g., via a generated disulfide bond). In some cases, free thiols of the particles (e.g., beads) may react with any other suitable group. For example, free thiols of the particles (e.g., beads) may react with species containing an acrydite moiety. The free thiol groups of the particles (e.g., beads) can react with the acrydite via Michael addition chemistry, such that the species comprising the acrydite is linked to the particle. In some cases, uncontrolled reactions can be prevented by inclusion of a thiol capping agent such as N-ethylmalieamide or iodoacetate.

Activation of disulfide linkages within a particle (e.g., bead) can be controlled such that only a small number of disulfide linkages are activated. Control may be exerted, for example, by controlling the concentration of a reducing agent used to generate free thiol groups and/or concentration of reagents used to form disulfide bonds in particle (e.g., bead) polymerization. In some cases, a low concentration (e.g., molecules of reducing agent: particle ratios of less than about 10,000; 100,000; 1,000,000; 10,000,000; 100,000,000; 1,000,000,000; 10,000,000,000; or 100,000,000,000) of reducing agent may be used for reduction. Controlling the number of disulfide linkages that are reduced to free thiols may be useful in ensuring particle (e.g., bead) structural integrity during functionalization. In some cases, optically-active agents, such as fluorescent dyes may be coupled to particles (e.g., beads) via free thiol groups of the particles (e.g., beads) and used to quantify the number of free thiols present in a particle and/or track a particle.

In some cases, addition of moieties to a particle (e.g., a bead, such as gel bead) after particle formation may be advantageous. For example, addition of an oligonucleotide or nucleic acid molecule (e.g., nucleic acid barcode molecule) after particle (e.g., bead, such as gel bead) formation may avoid loss of the species during chain transfer termination that can occur during polymerization. Moreover, smaller precursors (e.g., monomers or cross linkers that do not comprise side chain groups and linked moieties) may be used for polymerization and can be minimally hindered from growing chain ends due to viscous effects. In some cases, functionalization after particle (e.g., bead, such as gel bead) synthesis can minimize exposure of species (e.g., oligonucleotides or nucleic acid molecules) to be loaded with potentially damaging agents (e.g., free radicals) and/or chemical environments. In some cases, the generated gel may possess an upper critical solution temperature (UCST) that can permit temperature driven swelling and collapse of a particle (e.g., bead, such as gel bead). Such functionality may aid in oligonucleotide or nucleic acid molecule (e.g., a primer) infiltration into the particle (e.g., bead) during subsequent functionalization of the particle with the oligonucleotide or nucleic acid molecule. Post-production functionalization may also be useful in controlling loading ratios of species in particles (e.g., beads), such that, for example, the variability in loading ratio is minimized. Species loading may also be performed in a batch process such that a plurality of particles (e.g., beads) can be functionalized with the species in a single batch.

In some cases, an acrydite moiety linked to precursor, another species linked to a precursor, or a precursor itself comprises a labile bond, such as chemically, thermally, or photo-sensitive bonds e.g., disulfide bonds, UV sensitive bonds, or the like. Once acrydite moieties or other moieties with a labile bond are incorporated into a particle (e.g., bead), the particle may also comprise the labile bond. The labile bond may be, for example, useful in reversibly linking (e.g., covalently linking) species (e.g., barcodes or primers) to a particle (e.g., bead). In some cases, a thermally labile bond may include a nucleic acid hybridization based attachment, e.g., where an oligonucleotide is hybridized to a complementary sequence that is attached to the particle (e.g., bead), such that thermal melting of the hybrid releases the oligonucleotide, e.g., a barcode containing sequence, from the particle (e.g., bead or microcapsule).

The addition of multiple types of labile bonds to a particle (e.g., a bead, such as gel bead) may result in the generation of a particle capable of responding to varied stimuli. Each type of labile bond may be sensitive to an associated stimulus (e.g., chemical stimulus, light, or temperature) such that release of species attached to a particle (e.g., bead) via each labile bond may be controlled by the application of the appropriate stimulus. Such functionality may be useful in controlled release of species from a particle (e.g., bead, such as gel bead). In some cases, another species comprising a labile bond may be linked to a particle (e.g., bead, such as gel bead) after particle formation via, for example, an activated functional group of the particle (e.g., bead, such as gel bead) as described above. As will be appreciated, barcodes (or barcode sequence from a nucleic acid barcode molecule) that are releasably, cleavably or reversibly attached to the particles (e.g., beads) described herein include barcodes (or barcode sequence) that are released or releasable through cleavage of a linkage between the barcode sequence (or the nucleic acid barcode molecule containing the barcode sequence) and the particle (e.g., bead), or that are released through degradation of the underlying particle itself, allowing the barcode sequence (or the nucleic acid barcode molecule containing the barcode sequence) to be accessed or accessible by other reagents, or both.

A barcode (or barcode sequence from a nucleic acid barcode molecule) that is releasable as described herein may sometimes be referred to as being activatable, in that the barcode can be made available for reaction once released. Thus, for example, an activatable barcode may be activated by releasing the barcode from a particle (or other suitable type of partition described herein). Other activatable configurations are also envisioned in the context of the described methods and systems.

In addition to thermally cleavable bonds, disulfide bonds and UV sensitive bonds, other non-limiting examples of labile bonds that may be coupled to a precursor or particle (e.g., bead) include an ester linkage (e.g., cleavable with an acid, a base, or hydroxylamine), a vicinal diol linkage (e.g., cleavable via sodium periodate), a Diels-Alder linkage (e.g., cleavable via heat), a sulfone linkage (e.g., cleavable via a base), a silyl ether linkage (e.g., cleavable via an acid), a glycosidic linkage (e.g., cleavable via an amylase), a peptide linkage (e.g., cleavable via a protease), or a phosphodiester linkage (e.g., cleavable via a nuclease (e.g., DNAase)).

Species that do not participate in polymerization may also be encapsulated in particles (e.g., beads) during particle generation (e.g., during polymerization of precursors). Such species may be entered into polymerization reaction mixtures such that generated particles (e.g., beads) comprise the species upon particle formation. In some cases, such species may be added to the particles (e.g., beads, such as gel beads) after formation. Such species may include, for example, oligonucleotides, reagents for a nucleic acid amplification reaction (e.g., primers, polymerases, dNTPs, co-factors (e.g., ionic co-factors)) including those described herein, reagents for enzymatic reactions (e.g., enzymes, co-factors, substrates), or reagents for nucleic acid modification reactions such as polymerization, ligation, or digestion. Trapping of such species may be controlled by the polymer network density generated during polymerization of precursors, control of ionic charge within the particle (e.g., bead, such as gel bead) (e.g., via ionic species linked to polymerized species), or by the release of other species. Encapsulated species may be released from a particle (e.g., a bead) upon particle degradation and/or by application of a stimulus capable of releasing the species from the particle (e.g., bead).

Particles (e.g., beads) may be of uniform size or heterogeneous size. In some cases, the diameter of a particle (e.g., bead) may be about 1 µm, 5 µm, 10 µm, 20 µm, 30 µm, 40 µm, 50 µm, 60 µm, 70 µm, 80 µm, 90 µm, 100 µm, 250 µm, 500 µm, or 1 mm. In some cases, a particle (e.g., bead) may have a diameter of at least about 1 µm, 5 µm, 10 µm, 20 µm, 30 µm, 40 µm, 50 µm, 60 µm, 70 µm, 80 µm, 90 µm, 100 µm, 250 µm, 500 µm, 1 mm, or more. In some cases, a particle (e.g., bead) may have a diameter of less than about 1 µm, 5 µm, 10 µm, 20 µm, 30 µm, 40 µm, 50 µm, 60 µm, 70 µm, 80 µm, 90 µm, 100 µm, 250 µm, 500 µm, or 1 mm. In some cases, a particle (e.g., bead) may have a diameter in the range of about 40-75 µm, 30-75 µm, 20-75 µm, 40-85 µm, 40-95 µm, 20-100 µm, 10-100 µm, 1-100 µm, 20-250 µm, or 20-500 µm.

In certain aspects, particles (e.g., beads) are provided as a population or plurality of particles having a relatively monodisperse size distribution. Where it may be desirable to provide relatively consistent amounts of reagents within partitions, maintaining relatively consistent particle (e.g., bead) characteristics, such as size, can contribute to the overall consistency. In particular, the particles (e.g., beads) described herein may have size distributions that have a coefficient of variation in their cross-sectional dimensions of less than 50%, less than 40%, less than 30%, less than 20%, and in some cases less than 15%, less than 10%, or even less than 5%.

Particles (e.g., beads) may be of any suitable shape. Examples of particle (e.g., bead) shapes include, but are not limited to, spherical, non-spherical, oval, oblong, amorphous, circular, cylindrical, and variations thereof.

In addition to, or as an alternative to the cleavable linkages between the particle (e.g., bead) and the associated molecules, e.g., nucleic acid barcode molecule, described above, the particle may be degradable, disruptable, or dissolvable spontaneously or upon exposure to one or more stimuli (e.g., temperature changes, pH changes, exposure to particular chemical species or phase, exposure to light, or a reducing agent). In some cases, a particle (e.g., bead) may be dissolvable, such that material components of the particles are solubilized when exposed to a particular chemical species or an environmental change, such as a change temperature or a change in pH. In some cases, a particle (e.g., bead, such as gel bead) is degraded or dissolved at elevated temperature and/or in basic conditions. In some cases, a particle (e.g., bead) may be thermally degradable such that when the particle is exposed to an appropriate change in temperature (e.g., heat), the particle degrades. Degradation or dissolution of a particle (e.g., bead) bound to a species (e.g., a nucleic acid molecule, such as nucleic acid barcode molecule) may result in release of the species from the particle.

A degradable particle (e.g., bead) may contain one or more species with a labile bond such that, when the particle/species is exposed to the appropriate stimuli, the bond is broken and the particle degrades. The labile bond may be a chemical bond (e.g., covalent bond, ionic bond) or may be another type of physical interaction (e.g., van der Waals interactions or dipole-dipole interactions). In some cases, a crosslinker used to generate a particle (e.g., bead) may comprise a labile bond. Upon exposure to the appropriate conditions, the labile bond can be broken and the particle (e.g., bead) degraded. For example, upon exposure of a particle (e.g., a polyacrylamide gel bead) comprising cystamine crosslinkers to a reducing agent, the disulfide bonds of the cystamine can be broken and the particle degraded.

A degradable particle (e.g., bead) may be useful in more quickly releasing an attached species (e.g., a nucleic acid molecule, a nucleic acid barcode molecule, a barcode sequence, or a primer) from the particle when the appropriate stimulus is applied to the particle as compared to a particle that does not degrade. For example, for a species bound to an inner surface of a porous particle (e.g., bead) or in the case of an encapsulated species, the species may have greater mobility and accessibility to other species in solution upon degradation of the particle. In some cases, a species may also be attached to a degradable particle (e.g., bead) via a degradable linker (e.g., disulfide linker). The degradable linker may respond to the same stimuli as the degradable particle (e.g., bead) or the two degradable species may respond to different stimuli. For example, a barcode sequence may be attached, via a disulfide bond, to a polyacrylamide particle (e.g., bead) containing cystamine. Upon exposure of the barcode-attached particle to a reducing agent, the particle degrades and the barcode sequence is released upon breakage of both the disulfide linkage between the barcode sequence and the particle and the disulfide linkages of the cystamine in the particle.

A degradable particle (e.g., bead) may be introduced into a partition, such as a droplet of an emulsion or a well, such that the particle degrades within the partition and any associated species (e.g., nucleic acid molecule, such as nucleic acid barcode molecule) are released within the droplet when the appropriate stimulus is applied. The free species (e.g., nucleic acid molecule, such as nucleic acid barcode molecule) may interact with other reagents contained in the partition (e.g., droplet). For example, a polyacrylamide particle (e.g., bead) containing cystamine and linked, via a disulfide bond, to a barcode sequence (e.g., barcode sequence in a nucleic acid barcode molecule), may be combined with a reducing agent within a droplet of a water-in-oil emulsion. Within the droplet, the reducing agent breaks the various disulfide bonds resulting in particle (e.g., bead) degradation and release of the barcode sequence into the aqueous, inner environment of the droplet. In another example, heating of a droplet comprising a particle-bound barcode sequence in basic solution may also result in particle degradation and release of the attached barcode sequence into the aqueous, inner environment of the droplet.

As will be appreciated from the above disclosure, while referred to as degradation of a particle (e.g., bead), in many instances as noted above, that degradation may refer to the disassociation of a bound or entrained species from a particle, both with and without structurally degrading the physical particle (e.g., bead) itself. For example, entrained species may be released from particles (e.g., beads) through osmotic pressure differences due to, for example, changing chemical environments. By way of example, alteration of particle (e.g., bead) pore sizes due to osmotic pressure differences can generally occur without structural degradation of the particle itself. In some cases, an increase in pore size due to osmotic swelling of a particle (e.g., bead) can permit the release of entrained species within the particle. In other cases, osmotic shrinking of a particle may cause a particle to better retain an entrained species due to pore size contraction.

Where degradable particle (e.g., bead) are provided, it may be desirable to avoid exposing such particles (e.g., beads) to the stimulus or stimuli that cause such degradation prior to the desired time, in order to avoid premature particle degradation and issues that arise from such degradation, including for example poor flow characteristics and aggregation. By way of example, where particles (e.g., beads) comprise reducible cross-linking groups, such as disulfide groups, it will be desirable to avoid contacting such particles with reducing agents, e.g., DTT or other disulfide cleaving reagents. In such cases, treatment to the particle (e.g., bead) described herein will, in some cases be provided free of reducing agents, such as DTT. Because reducing agents are often provided in commercial enzyme preparations, it may be desirable to provide reducing agent free (or DTT free) enzyme preparations in treating the particles (e.g., beads) described herein. Examples of such enzymes include, e.g., polymerase enzyme preparations, reverse transcriptase enzyme preparations, ligase enzyme preparations, as well as many other enzyme preparations that may be used to treat the particles (e.g., beads) described herein. The terms "reducing agent free" or "DTT free" preparations can refer to a preparation having less than $\frac{1}{10}$th, less than $\frac{1}{50}$th, and even less than $\frac{1}{100}$th of the lower ranges for such materials used in degrading the particles (e.g., beads). For example, for DTT, the reducing agent free preparation will typically have less than 0.01 mM, 0.005 mM, 0.001 mM DTT, 0.0005 mM DTT, or even less than 0.0001 mM DTT. In many cases, the amount of DTT will be undetectable.

In some cases, a stimulus may be used to trigger degradation of the particle (e.g., bead), which may result in the release of contents from the particle. Generally, a stimulus may cause degradation of the particle (e.g., bead) structure, such as degradation of the covalent bonds or other types of physical interaction. These stimuli may be useful in inducing a particle (e.g., bead) to degrade and/or to release its contents. Examples of stimuli that may be used include chemical stimuli, thermal stimuli, optical stimuli (e.g., light) and any combination thereof, as described more fully below.

Numerous chemical triggers may be used to trigger the degradation of particles (e.g., beads). Examples of these chemical changes may include, but are not limited to, pH-mediated changes to the integrity of a component within the particle (e.g., bead), degradation of a component of a particle via cleavage of cross-linked bonds, and depolymerization of a component of a particle.

In some embodiments, a particle (e.g., bead) may be formed from materials that contain degradable chemical crosslinkers, such as BAC or cystamine. Degradation of such degradable crosslinkers may be accomplished through a number of mechanisms. In some examples, a particle (e.g., bead) may be contacted with a chemical degrading agent that may induce oxidation, reduction or other chemical changes. For example, a chemical degrading agent may be a reducing agent, such as dithiothreitol (DTT). Additional examples of reducing agents may include R-mercaptoethanol, (2S)-2-amino-1,4-dimercaptobutane (dithiobutylamine or DTBA), tris(2-carboxyethyl) phosphine (TCEP), or combinations thereof. A reducing agent may degrade the disulfide bonds formed between gel precursors forming the particle (e.g., bead), and thus, degrade the particle. In other cases, a change in pH of a solution, such as an increase in pH, may trigger degradation of a particle (e.g., bead). In other cases, exposure to an aqueous solution, such as water, may trigger hydrolytic degradation, and thus degradation of the particle (e.g., bead).

Particles (e.g., beads) may also be induced to release their contents upon the application of a thermal stimulus. A change in temperature can cause a variety of changes to a particle (e.g., bead). For example, heat can cause a solid particle (e.g., bead) to liquefy. A change in heat may cause melting of a particle (e.g., bead) such that a portion of the particle degrades. In other cases, heat may increase the internal pressure of the particle (e.g., bead) components such that the particle ruptures or explodes. Heat may also act upon heat-sensitive polymers used as materials to construct particles (e.g., beads).

The methods, compositions, devices, and kits of this disclosure may be used with any suitable agent to degrade particles (e.g., beads). In some embodiments, changes in temperature or pH may be used to degrade thermo-sensitive or pH-sensitive bonds within particles (e.g., beads). In some embodiments, chemical degrading agents may be used to degrade chemical bonds within particles (e.g., beads) by oxidation, reduction or other chemical changes. For example, a chemical degrading agent may be a reducing agent, such as DTT, wherein DTT may degrade the disulfide bonds formed between a crosslinker and gel precursors, thus degrading the particle (e.g., bead). In some embodiments, a reducing agent may be added to degrade the particle (e.g., bead), which may or may not cause the particle to release its contents. Examples of reducing agents may include dithiothreitol (DTT), β-mercaptoethanol, (2S)-2-amino-1,4-dimercaptobutane (dithiobutylamine or DTBA), tris(2-carboxyethyl) phosphine (TCEP), or combinations thereof. The reducing agent may be present at a concentration of about 0.1 mM, 0.5 mM, 1 mM, 5 mM, or 10 mM. The reducing agent may be present at a concentration of at least about 0.1 mM, 0.5 mM, 1 mM, 5 mM, 10 mM, or greater. The reducing agent may be present at concentration of at most about 0.1 mM, 0.5 mM, 1 mM, 5 mM, or 10 mM.

Any suitable number of nucleic acid molecules (e.g., a primer or a nucleic acid barcode molecules) can be associated with a particle (e.g., bead) such that, upon release from the particle, the nucleic acid molecules (e.g., a primer or a nucleic acid barcode molecule) are present in the partition at a pre-defined concentration. Such pre-defined concentration may be selected to facilitate certain reactions for generating a sequencing library, e.g., amplification, within the partition (e.g., droplet). In some cases, the pre-defined concentration of the primer is limited by the process of producing nucleic acid molecule bearing particles (e.g., beads).

Partitions

In some aspects, the partitions refer to containers or vessels (such as wells, microwells, tubes, vials, through ports in nanoarray substrates, e.g., BioTrove nanoarrays, or other containers). In some aspects, the compartments or partitions encompass partitions that are flowable within fluid streams. These partitions may include, e.g., micro-vesicles that have an outer barrier surrounding an inner fluid center or core, or, in some cases, they may have a porous matrix that is capable of entraining and/or retaining materials within its matrix. In some aspects, partitions encompass droplets of aqueous fluid within a non-aqueous continuous phase, e.g., an oil phase. A variety of different vessels are described in, for example, U.S. Patent Application Publication No. 2014/0155295, the full disclosure of which is incorporated herein by reference in its entirety for all purposes. Emulsion systems for creating stable droplets in non-aqueous or oil continuous phases are described in detail in, e.g., U.S. Patent Application Publication No. 2010/0105112, the full disclosure of which is incorporated herein by reference in its entirety for all purposes.

In the case of droplets in an emulsion, allocating individual T cells or individual pMHC-T cell multiplets to discrete partitions may generally be accomplished by introducing a flowing stream of T cells or pMHC-T cell multiplets in an aqueous fluid into a flowing stream or reservoir of a non-aqueous fluid, such that droplets are generated (see generally, e.g., FIGS. 1-7). By providing the aqueous cell-containing stream at a certain concentration of cells (e.g., T cells or pMHC-T cell multiplets), the occupancy of the resulting partitions (e.g., number of cells per partition) can be controlled. Where single cell (e.g., a T cell) or pMHC-T cell multiplet partitions are desired, the relative flow rates of the fluids can be selected such that, on average, the partitions contain less than one cell (e.g., a single T cell or a single pMHC-T cell multiplet) per partition, in order to ensure that those partitions that are occupied, are primarily singly occupied. In some embodiments, the relative flow rates of the fluids can be selected such that a majority of partitions are occupied, e.g., allowing for only a small percentage of unoccupied partitions. In some aspects, the flows and channel architectures are controlled as to ensure a desired number of singly occupied partitions, less than a certain level of unoccupied partitions and less than a certain level of multiply occupied partitions.

The systems and methods described herein can be operated such that a majority of occupied partitions (e.g., droplets) include no more than one cell (e.g., a single T cell) or a single pMHC-T cell multiplet per occupied partition. In some instances, the partitioning process is conducted such that fewer than 25% of the occupied partitions (e.g., droplets) contain more than one cell (e.g., a T cell) or one pMHC-T cell multiplet, and in many cases, fewer than 20% of the occupied partitions (e.g., droplets) have more than one cell (e.g., a T cell) or one pMHC-T cell multiplet. In some cases, fewer than 10% or even fewer than 5% of the occupied partitions (e.g., droplets) include more than one cell (e.g., a T cell) or one pMHC-T cell multiplet) per partition (e.g., droplets).

In instances described herein where a partition (e.g., a droplet) contains only a single T cell or a single pMHC, a single pMHC or a single T cell, respectively, can later be added to the partition to form a pMHC-T cell multiplet.

In some instances, it is desirable to avoid the creation of excessive numbers of empty partitions (e.g., droplets). For example, from a cost perspective and/or efficiency perspective, it may be desirable to minimize the number of empty partitions (e.g., droplets). While this may be accomplished by providing sufficient numbers of cells (e.g., T cells or pMHC-T cell multiplets) into the partitioning zone, the Poissonian distribution may expectedly increase the number of partitions (e.g., droplets) that may include multiple cells (e.g., T cells or pMHC-T cell multiplets). As such, in accordance with aspects described herein, the flow of one or more of the cells (e.g., T cells or pMHC-T cell multiplets), or other fluids directed into the partitioning zone are conducted such that, in many cases, no more than 50% of the generated partitions (e.g., droplets), no more than 25% of the generated partitions (e.g., droplets), or no more than 10% of the generated partitions (e.g., droplets) are unoccupied. Further, in some aspects, these flows are controlled so as to present non-Poissonian distribution of single occupied partitions (e.g., droplets) while providing lower levels of unoccupied partitions. Restated, in some aspects, the above noted ranges of unoccupied partitions (e.g., droplets) can be achieved while still providing any of the single occupancy rates described above. For example, in many cases, the use of the systems and methods described herein creates resulting partitions (e.g., droplets) that have multiple occupancy rates of less than 25%, less than 20%, less than 15%, less than 10%, and in many cases, less than 5%, while having unoccupied partitions (e.g., droplets) of less than 50%, less than 40%, less than 30%, less than 20%, less than 10%, and in some cases, less than 5%.

As will be appreciated, the above-described occupancy rates are also applicable to partitions (e.g., droplets) that include both cells (e.g., T cells or pMHC-T cell multiplets) and additional reagents, including, but not limited to, particles (e.g., beads or microcapsules) carrying nucleic acid barcode molecules. In some aspects, a substantial percentage of the overall occupied partitions (e.g., droplets) can include both a cell (e.g., a T cell) or a pMHC-T cell multiplet and a particle (e.g., bead) containing a nucleic acid barcode molecule.

Although described in terms of providing substantially singly occupied partitions (e.g., droplets), above, in certain cases, it is desirable to provide multiply occupied partitions (e.g., droplets), e.g., containing two, three, four or more cells (e.g., T cells or pMHC-T cell multiplets) and/or particles (e.g., beads) containing nucleic acid barcode molecule within a single partition (e.g., droplet). Accordingly, as noted above, the flow characteristics of the cell (e.g., a T cell) or a pMHC-T cell multiplet and/or particle (e.g., bead) containing fluids and partitioning fluids may be controlled to provide for such multiply occupied partitions (e.g., droplets). In particular, the flow parameters may be controlled to provide a desired occupancy rate at greater than 50% of the partitions (e.g., droplets), greater than 75%, and in some cases greater than 80%, 90%, 95%, or higher.

In some cases, additional particles (e.g., beads) are used to deliver additional reagents to a partition (e.g., droplet). For example, it may be advantageous to introduce different particles (e.g., beads) into a common channel or droplet generation junction, from different particle sources, i.e., containing different associated reagents, through different channel inlets into such common channel or droplet generation junction. In such cases, the flow and frequency of the different particles (e.g., beads) into the channel or junction may be controlled to provide for the desired ratio of particles from each source, while ensuring the desired pairing or combination of such particles into a partition (e.g., droplet) with the desired number of cells.

The partitions (e.g., droplets) described herein may comprise small volumes, e.g., less than 10 µL, less than 5 µL, less than 1 µL, less than 900 picoliters (µL), less than 800 µL, less than 700 µL, less than 600 µL, less than 500 µL, less than 400 µL, less than 300 µL, less than 200 µL, less than 100 µL, less than 50 µL, less than 20 µL, less than 10 µL, less than 1 µL, less than 500 nanoliters (nL), or even less than 100 nL, 50 nL, or even less.

For example, in the case of droplet based partitions, the droplets may have overall volumes that are less than 1000 µL, less than 900 µL, less than 800 µL, less than 700 µL, less than 600 µL, less than 500 µL, less than 400 µL, less than 300 µL, less than 200 µL, less than 100 µL, less than 50 µL, less than 20 µL, less than 10 µL, or even less than 1 µL. Where co-partitioned with particles (e.g., beads), it will be appreciated that the sample fluid volume, e.g., including co-partitioned cells (e.g., T cells or pMHC-T cell multiplets), within the partitions (e.g., droplets) may be less than 90% of the above described volumes, less than 80%, less than 70%, less than 60%, less than 50%, less than 40%, less than 30%, less than 20%, or even less than 10% the above described volumes.

As is described elsewhere herein, partitioning species may generate a population or plurality of partitions (e.g., droplets). In such cases, any suitable number of partitions (e.g., droplets) can be generated to generate the plurality of partitions. For example, in a method described herein, a plurality of partitions (e.g., droplets) may be generated that comprises at least about 1,000 partitions, at least about 5,000 partitions, at least about 10,000 partitions, at least about 50,000 partitions, at least about 100,000 partitions, at least about 500,000 partitions, at least about 1,000,000 partitions, at least about 5,000,000 partitions at least about 10,000,000 partitions, at least about 50,000,000 partitions, at least about 100,000,000 partitions, at least about 500,000,000 partitions or at least about 1,000,000,000 partitions. Moreover, the plurality of partitions (e.g., droplets) may comprise both unoccupied partitions (e.g., empty partitions) and occupied partitions.

Microfluidic channel networks can be utilized to generate partitions (e.g., droplets) as described herein. Alternative mechanisms may also be employed in the partitioning of individual cells (e.g., T cells) or pMHC-T cell multiplets, including porous membranes through which aqueous mixtures of cells are extruded into non-aqueous fluids.

An example of a simplified microfluidic channel structure for partitioning individual cells (e.g., T cells) or pMHC-T cell multiplets is illustrated in FIGS. 1-7. As described elsewhere herein, in some cases, the majority of occupied partitions (e.g., droplets) include no more than one cell (e.g., a T cell) or one pMHC-T cell multiplet per occupied partition and, in some cases, some of the generated partitions are unoccupied. In some cases, though, some of the occupied partitions (e.g., droplets) may include more than one cell (e.g., a T cell or pMHC) or pMHC-T cell multiplet. In some cases, the partitioning process may be controlled such that fewer than 25% of the occupied partitions (e.g., droplets) contain more than one cell (e.g., a T cell or pMHC) or pMHC-T cell multiplet, and in many cases, fewer than 20% of the occupied partitions have more than one cell, while in some cases, fewer than 10% or even fewer than 5% of the occupied partitions include more than one cell or pMHC-T cell multiplet per partition. As shown in FIG. 1, the channel structure can include channel segments 102, 104, 106 and 108 communicating at a channel junction 110. In operation, a first aqueous fluid 112 that includes suspended cells 114, may be transported along channel segment 102 into junction 110, while a second fluid 116 that is immiscible with the aqueous fluid 112 is delivered to the junction 110 from channel segments 104 and 106 to create discrete droplets 118 of the aqueous fluid including individual cells 114, flowing into channel segment 108.

In some aspects, this second fluid 116 comprises an oil, such as a fluorinated oil, that includes a fluorosurfactant for stabilizing the resulting droplets, e.g., inhibiting subsequent coalescence of the resulting droplets. Examples of particularly useful partitioning fluids and fluorosurfactants are described for example, in U.S. Patent Application Publication No. 2010/0105112, the full disclosure of which is hereby incorporated herein by reference in its entirety for all purposes.

In other aspects, in addition to or as an alternative to droplet-based partitioning, cells (e.g., T cells or pMHC-T cell multiplets) may be encapsulated within a microcapsule that comprises an outer shell or layer or porous matrix in which is entrained one or more individual cells or small groups of cells, and may include other reagents. Encapsulation of cells (e.g., T cells or pMHC-T cell multiplets) may be carried out by a variety of processes. Such processes combine an aqueous fluid containing the cells (e.g., T cells or pMHC-T cell multiplets) to be analyzed with a polymeric precursor material that may be capable of being formed into a gel or other solid or semi-solid matrix upon application of a particular stimulus to the polymer precursor. Such stimuli include, e.g., thermal stimuli (either heating or cooling), photo-stimuli (e.g., through photo-curing), chemical stimuli (e.g., through crosslinking, polymerization initiation of the precursor (e.g., through added initiators), or the like.

Preparation of microcapsules comprising cells (e.g., T cells or pMHC-T cell multiplets) may be carried out by a variety of methods. For example, air knife droplet or aerosol generators may be used to dispense droplets of precursor fluids into gelling solutions in order to form microcapsules that include individual cells (e.g., T cells or pMHC-T cell multiplets) or small groups of cells. Likewise, membrane-based encapsulation systems may be used to generate microcapsules comprising encapsulated cells (e.g., T cells or pMHC-T cell multiplets) as described herein. In some aspects, microfluidic systems similar to that shown in FIG. 1 may be readily used in encapsulating cells (e.g., T cells or pMHC-T cell multiplets) as described herein. In particular, and with reference to FIG. 1, the aqueous fluid comprising the cells (e.g., T cells or pMHC-T cell multiplets) and the polymer precursor material is flowed into channel junction 110, where it is partitioned into droplets 118 comprising the individual cells 114, through the flow of non-aqueous fluid 116. In the case of encapsulation methods, non-aqueous fluid 116 may also include an initiator to cause polymerization and/or crosslinking of the polymer precursor to form the microcapsule that includes the entrained cells. Examples of polymer precursor/initiator pairs include those described in U.S. Patent Application Publication No. 2014/0378345, the full disclosure of which are hereby incorporated herein by reference in their entireties for all purposes.

For example, in the case where the polymer precursor material comprises a linear polymer material, e.g., a linear polyacrylamide, PEG, or other linear polymeric material, the activation agent may comprise a cross-linking agent, or a chemical that activates a cross-linking agent within the formed droplets. Likewise, for polymer precursors that comprise polymerizable monomers, the activation agent may comprise a polymerization initiator. For example, in certain cases, where the polymer precursor comprises a mixture of acrylamide monomer with a N,N'-bis-(acryloyl) cystamine (BAC) comonomer, an agent such as tetraethylmethylenediamine (TEMED) may be provided within the second fluid streams in channel segments 104 and 106, which initiates the copolymerization of the acrylamide and BAC into a cross-linked polymer network or, hydrogel.

Upon contact of the second fluid stream 116 with the first fluid stream 112 at junction 110 in the formation of droplets, the TEMED may diffuse from the second fluid 116 into the aqueous first fluid 112 comprising the linear polyacrylamide, which will activate the crosslinking of the polyacrylamide within the droplets, resulting in the formation of the gel, e.g., hydrogel, microcapsules 118, as solid or semi-solid beads or particles entraining the cells 114. Although described in terms of polyacrylamide encapsulation, other 'activatable' encapsulation compositions may also be employed in the context of the methods and compositions described herein. For example, formation of alginate droplets followed by exposure to divalent metal ions, e.g., Ca2+, can be used as an encapsulation process using the described processes. Likewise, agarose droplets may also be transformed into capsules through temperature-based gelling, e.g., upon cooling, or the like. In some cases, encapsulated cells (e.g., T cells or pMHC-T cell multiplets) can be selectively releasable from the microcapsule, e.g., through passage of time, or upon application of a particular stimulus, that degrades the microcapsule sufficiently to allow the cell or multiplet, or its contents (e.g., nucleic acid molecule, such as nucleic acid molecule of the T cell (e.g., nucleic acid molecule of the T cell that encodes a TCR)) to be released from the microcapsule, e.g., into a partition, such as a droplet. For example, in the case of the polyacrylamide polymer described above, degradation of the microcapsule may be accomplished through the introduction of an appropriate reducing agent, such as DTT or the like, to cleave disulfide bonds that cross link the polymer matrix (see, e.g., U.S. Patent Application Publication No. 2014/0378345, the full disclosures of which are hereby incorporated herein by reference in their entirety for all purposes).

Encapsulated cells (e.g., cells encapsulated in a cross-linked or polymer matrix) or cell populations provide certain potential advantages of being storable, and more portable than droplet based partitioned cells. Furthermore, in some cases, it may be desirable to allow cells (e.g., T cells or pMHC-T cell multiplets) to be analyzed to incubate for a select period of time, in order to characterize changes in such cells over time, either in the presence or absence of different stimuli. In such cases, encapsulation of individual cells (e.g., T cells) or individual pMHC-T cell multiplets may allow for longer incubation than partitioning in emulsion droplets, although in some cases, droplet partitioned cells may also be incubated for different periods of time, e.g., at least 10 seconds, at least 30 seconds, at least 1 minute, at least 5 minutes, at least 10 minutes, at least 30 minutes, at least 1 hour, at least 2 hours, at least 5 hours, or at least 10 hours or more. The encapsulation of cells (e.g., T cells or pMHC-T cell multiplets) may constitute the partitioning of the cells into which other reagents are co-partitioned. Alternatively, encapsulated cells (e.g., T cells or pMHC-T cell multiplets) may be readily deposited into other partitions, e.g., droplets, as described above.

Reagents can be co-partitioned with the cells described above (e.g., T cells or pMHC-T cell multiplets), including, for example, DNase and RNase inactivating agents or inhibitors, such as proteinase K, chelating agents, such as EDTA, and other reagents employed in removing or otherwise reducing negative activity or impact of different cell lysate components on subsequent processing of nucleic acids. In addition, in the case of encapsulated cells (e.g., T cells or pMHC-T cell multiplets in a polymer matrix), the cells may be exposed to an appropriate stimulus to release the cells or their contents (e.g., nucleic acid molecule, such as nucleic acid molecule of the T cell (e.g., nucleic acid molecule of the T cell containing nucleic acid sequence of TCR)). For example, in some cases, a chemical stimulus may be co-partitioned along with an encapsulated cell (e.g., a T cell) or pMHC-T cell multiplet to allow for the degradation of the microcapsule and/or release of the cell or its contents into the larger partition. In some cases, this stimulus may be the same as the stimulus described elsewhere herein for release of nucleic acid molecules (e.g., nucleic acid barcode molecules) from their respective microcapsule (e.g., bead). In alternative aspects, this may be a different and non-overlapping stimulus, in order to allow an encapsulated cell (e.g., a T cell) or pMHC-T cell multiplet to be released into a partition at a different time from the release of nucleic acid molecules into the same partition. For a description of methods, compositions, and systems for encapsulating cells (also referred to as a "cell bead"), see, e.g., U.S. Pat. No. 10,428,326 and U.S. Pat. Pub. 20190100632, which are each incorporated by reference in their entirety.

Additional reagents may also be co-partitioned with the cells (e.g., T cells or pMHC-T cell multiplets). In accordance with certain aspects, cells (e.g., T cells, nuclei, cell beads, or pMHC-T cell multiplets) may be partitioned along with lysis reagents in order to release the contents of the cells within the partition. In such cases, the lysis agents can be contacted with the cell suspension concurrently with, or immediately prior to, the introduction of the biological particles into the partitioning junction/droplet generation zone (e.g., junction 210 in FIG. 2), such as through an additional channel or channels upstream of the channel junction. In accordance with other aspects, additionally or alternatively, cells may be partitioned along with other reagents, as will be described further below.

Figure 3:
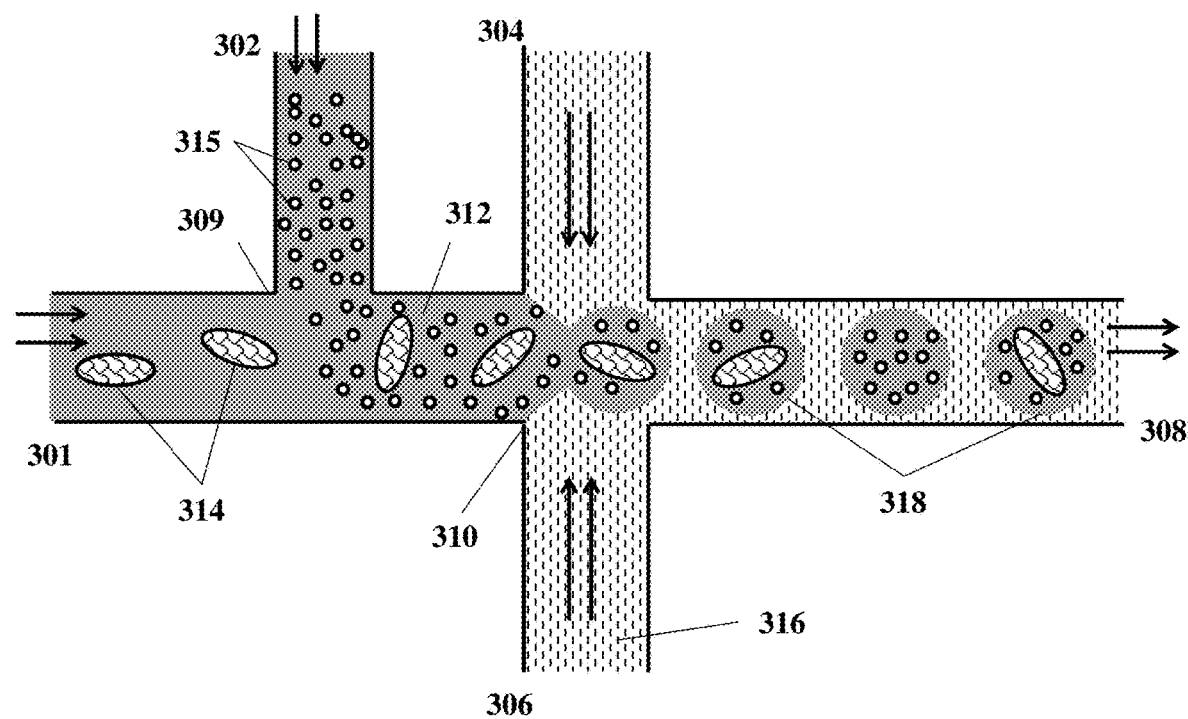
FIG. 3 shows an example of a microfluidic channel structure for co-partitioning cells and reagents.

FIG. 3 shows an example of a microfluidic channel structure 300 for co-partitioning cells and reagents. The channel structure 300 can include channel segments 301, 302, 304, 306 and 308. Channel segments 301 and 302 communicate at a first channel junction 309. Channel segments 302, 304, 306, and 308 communicate at a second channel junction 310.

In an example operation, the channel segment 301 may transport an aqueous fluid 312 that includes a plurality of cells 314 along the channel segment 301 into the second junction 310. As an alternative or in addition to, channel segment 301 may transport beads (e.g., gel beads). The beads may comprise barcode molecules.

For example, the channel segment 301 may be connected to a reservoir comprising an aqueous suspension of cells 314. In some instances, the cells are, e.g., T cells or pMHC-T cell multiplets as described herein. Upstream of, and immediately prior to reaching, the second junction 310, the channel segment 301 may meet the channel segment 302 at the first junction 309. The channel segment 302 may transport a plurality of reagents 315 (e.g., lysis agents) suspended in the aqueous fluid 312 along the channel segment 302 into the first junction 309. For example, the channel segment 302 may be connected to a reservoir comprising the reagents 315. After the first junction 309, the aqueous fluid 312 in the channel segment 301 can carry both the cells 314 and the reagents 315 towards the second junction 310. In some instances, the aqueous fluid 312 in the channel segment 301 can include one or more reagents, which can be the same or different reagents as the reagents 315. A second fluid 316 that is immiscible with the aqueous fluid 312 (e.g., oil) can be delivered to the second junction 310 from each of channel segments 304 and 306. Upon meeting of the aqueous fluid 312 from the channel segment 301 and the second fluid 316 from each of channel segments 304 and 306 at the second channel junction 310, the aqueous fluid 312 can be partitioned as discrete droplets 318 in the second fluid 316 and flow away from the second junction 310 along channel segment 308. The channel segment 308 may deliver the discrete droplets 318 to an outlet reservoir fluidly coupled to the channel segment 308, where they may be harvested.

The second fluid 316 can comprise an oil, such as a fluorinated oil, that includes a fluorosurfactant for stabilizing the resulting droplets, for example, inhibiting subsequent coalescence of the resulting droplets 318.

A discrete droplet generated may include an individual cell 314 and/or one or more reagents 315. In some instances, a discrete droplet generated may include a barcode carrying bead (not shown), such as via other microfluidics structures described elsewhere herein. In some instances, a discrete droplet may be unoccupied (e.g., no reagents, no cells).

Beneficially, when lysis reagents and cells are co-partitioned, the lysis reagents can facilitate the release of the contents of the cells within the partition. The contents released in a partition may remain discrete from the contents of other partitions.

As will be appreciated, the channel segments described herein may be coupled to any of a variety of different fluid sources or receiving components, including reservoirs, tubing, manifolds, or fluidic components of other systems. As will be appreciated, the microfluidic channel structure 300 may have other geometries (see, e.g., FIGS. 4-7). For example, a microfluidic channel structure can have more than two channel junctions. For example, a microfluidic channel structure can have 2, 3, 4, 5 channel segments or more each carrying the same or different types of beads, reagents, and/or cells that meet at a channel junction. Fluid flow in each channel segment may be controlled to control the partitioning of the different elements into droplets. Fluid may be directed flow along one or more channels or reservoirs via one or more fluid flow units. A fluid flow unit can comprise compressors (e.g., providing positive pressure), pumps (e.g., providing negative pressure), actuators, and the like to control flow of the fluid. Fluid may also or otherwise be controlled via applied pressure differentials, centrifugal force, electrokinetic pumping, vacuum, capillary or gravity flow, or the like.

Examples of lysis agents include bioactive reagents, such as lysis enzymes that are used for lysis of different cell types, e.g., gram positive or negative bacteria, plants, yeast, mammalian, etc., such as lysozymes, achromopeptidase, lysostaphin, labiase, kitalase, lyticase, and a variety of other commercially available lysis enzymes. Other lysis agents may additionally or alternatively be co-partitioned with the cells to cause the release of the cell's contents into the partitions. For example, in some cases, surfactant-based lysis solutions may be used to lyse cells, although these may be less desirable for emulsion-based systems where the surfactants can interfere with stable emulsions. In some cases, lysis solutions may include non-ionic surfactants such as, for example, TRITON™ X-100 and TWEEN® 20. In some cases, lysis solutions may include ionic surfactants such as, for example, sarcosyl and sodium dodecyl sulfate (SDS). Electroporation, thermal, acoustic or mechanical cellular disruption may also be used in certain cases, e.g., non-emulsion based partitioning such as encapsulation of cells that may be in addition to or in place of droplet partitioning, where any pore size of the encapsulate is sufficiently small to retain nucleic acid fragments of a given size, following cellular disruption.

Additional reagents may also be co-partitioned with the cells, such as endonucleases to fragment a cell's DNA, DNA polymerase enzymes and dNTPs used to amplify the cell's nucleic acid fragments and to attach the barcode molecular tags to the amplified fragments. Other enzymes may be co-partitioned, including without limitation, polymerase, transposase, ligase, proteinase K, DNAse, etc. Additional reagents may also include reverse transcriptase enzymes, including enzymes with terminal transferase activity, primers and oligonucleotides, and switch oligonucleotides (also referred to herein as "switch oligos" or "template switching oligonucleotides") which can be used for template switching. In some cases, template switching can be used to increase the length of a cDNA. In some cases, template switching can be used to append a predefined nucleic acid sequence to the cDNA. In an example of template switching, cDNA can be generated from reverse transcription of a template, e.g., cellular mRNA, where a reverse transcriptase with terminal transferase activity can add additional nucleotides, e.g., polyC, to the cDNA in a template independent manner. Switch oligos can include sequences complementary to the additional nucleotides, e.g., polyG. The additional nucleotides (e.g., polyC) on the cDNA can hybridize to the additional nucleotides (e.g., polyG) on the switch oligo, whereby the switch oligo can be used by the reverse transcriptase as template to further extend the cDNA. Template switching oligonucleotides may comprise a hybridization region and a template region. The hybridization region can comprise any sequence capable of hybridizing to the target. In some cases, as previously described, the hybridization region comprises a series of G bases to complement the overhanging C bases at the 3' end of a cDNA molecule. The series of G bases may comprise 1 G base, 2 G bases, 3 G bases, 4 G bases, 5 G bases or more than 5 G bases. The template sequence can comprise any sequence to be incorporated into the cDNA. In some cases, the template region comprises at least 1 (e.g., at least 2, 3, 4, 5 or more) tag sequences and/or functional sequences. Switch oligos may comprise deoxyribonucleic acids; ribonucleic acids; modified nucleic acids including 2-Aminopurine, 2,6-Diaminopurine (2-Amino-dA), inverted dT, 5-Methyl dC, 2'-deoxyInosine, SUPER T® (5-hydroxybutynl-2'-deoxyuridine), SUPER G® (8-aza-7-deazaguanosine), locked nucleic acids (LNAs), unlocked nucleic acids (UNAs, e.g., UNA-A, UNA-U, UNA-C, UNA-G), Iso-dG, Iso-dC, 2' Fluoro bases (e.g., Fluoro C, Fluoro U, Fluoro A, and Fluoro G), or any combination.

In some cases, the length of a switch oligo may be at least about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides or longer.

In some cases, the length of a switch oligo may be at most about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249 or 250 nucleotides.

Once the contents of the cells are released into their respective partitions, the macromolecular components (e.g., macromolecular constituents of cells, such as RNA, DNA, or proteins) contained therein may be further processed within the partitions. In accordance with the methods and systems described herein, the macromolecular component contents of individual cells can be provided with unique identifiers such that, upon characterization of those macromolecular components they may be attributed as having been derived from the same cell or particles. The ability to attribute characteristics to individual cells or groups of cells is provided by the assignment of unique identifiers specifically to an individual cell or groups of cells. Unique identifiers, e.g., in the form of nucleic acid barcodes can be assigned or associated with individual cells or populations of cells, in order to tag or label the cell's macromolecular components (and as a result, its characteristics) with the unique identifiers. These unique identifiers can then be used to attribute the cell's components and characteristics to an individual cell or group of cells.

In some aspects, this is performed by co-partitioning the individual cell or groups of cells with the unique identifiers, such as described herein. In some aspects, the unique identifiers are provided in the form of nucleic acid molecules (e.g., oligonucleotides) that comprise nucleic acid barcode sequences that may be attached to or otherwise associated with the nucleic acid contents of individual cell, or to other components of the cell, and particularly to fragments of those nucleic acids. The nucleic acid molecules are partitioned such that as between nucleic acid molecules in a given partition, the nucleic acid barcode sequences contained therein are the same, but as between different partitions, the nucleic acid molecule can, and do have differing barcode sequences, or at least represent a large number of different barcode sequences across all of the partitions in a given analysis. In some aspects, only one nucleic acid barcode sequence can be associated with a given partition, although in some cases, two or more different barcode sequences may be present.

The nucleic acid barcode sequences can include from about 6 to about 20 or more nucleotides within the sequence of the nucleic acid molecules (e.g., oligonucleotides). The nucleic acid barcode sequences can include from about 6 to about 20, 30, 40, 50, 60, 70, 80, 90, 100 or more nucleotides. In some cases, the length of a barcode sequence may be about 6, 7, 8, 9, 10, 11, 12, 13, 14, 15, 16, 17, 18, 19, 20 nucleotides or longer. In some cases, the length of a barcode sequence may be at least about 6, 7, 8, 9, 10, 11, 12, 13, 14, 15, 16, 17, 18, 19, 20 nucleotides or longer. In some cases, the length of a barcode sequence may be at most about 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be about 4, 5, 6, 7, 8, 9, 10, 11, 12, 13, 14, 15, 16 nucleotides or longer. In some cases, the barcode subsequence may be at least about 4, 5, 6, 7, 8, 9, 10, 11, 12, 13, 14, 15, 16 nucleotides or longer. In some cases, the barcode subsequence may be at most about 4, 5, 6, 7, 8, 9, 10, 11, 12, 13, 14, 15, 16 nucleotides or shorter.

The co-partitioned nucleic acid molecules can also comprise other functional sequences useful in the processing of the nucleic acids from the co-partitioned cells. These sequences include, e.g., targeted or random/universal amplification primer sequences for amplifying the genomic DNA from the individual cells within the partitions while attaching the associated barcode sequences, sequencing primers or primer recognition sites, hybridization or probing sequences, e.g., for identification of presence of the sequences or for pulling down barcoded nucleic acids, or any of a number of other potential functional sequences. Other mechanisms of co-partitioning oligonucleotides may also be employed, including, e.g., coalescence of two or more droplets, where one droplet contains oligonucleotides, or microdispensing of oligonucleotides into partitions, e.g., droplets within microfluidic systems.

In an example, microcapsules, such as beads, are provided that each include large numbers of the above described barcoded nucleic acid molecules (e.g., barcoded oligonucleotides) releasably attached to the beads, where all of the nucleic acid molecules attached to a particular bead will include the same nucleic acid barcode sequence, but where a large number of diverse barcode sequences are represented across the population of beads used. In some embodiments, hydrogel beads, e.g., comprising polyacrylamide polymer matrices, are used as a solid support and delivery vehicle for the nucleic acid molecules into the partitions, as they are capable of carrying large numbers of nucleic acid molecules, and may be configured to release those nucleic acid molecules upon exposure to a particular stimulus, as described elsewhere herein. In some cases, the population of beads provides a diverse barcode sequence library that includes at least about 1,000 different barcode sequences, at least about 5,000 different barcode sequences, at least about 10,000 different barcode sequences, at least about 50,000 different barcode sequences, at least about 100,000 different barcode sequences, at least about 1,000,000 different barcode sequences, at least about 5,000,000 different barcode sequences, or at least about 10,000,000 different barcode sequences, or more. Additionally, each bead can be provided with large numbers of nucleic acid (e.g., oligonucleotide) molecules attached. In particular, the number of molecules of nucleic acid molecules including the barcode sequence on an individual bead can be at least about 1,000 nucleic acid molecules, at least about 5,000 nucleic acid molecules, at least about 10,000 nucleic acid molecules, at least about 50,000 nucleic acid molecules, at least about 100,000 nucleic acid molecules, at least about 500,000 nucleic acids, at least about 1,000,000 nucleic acid molecules, at least about 5,000,000 nucleic acid molecules, at least about 10,000,000 nucleic acid molecules, at least about 50,000,000 nucleic acid molecules, at least about 100,000,000 nucleic acid molecules, at least about 250,000,000 nucleic acid molecules and in some cases at least about 1 billion nucleic acid molecules, or more. Nucleic acid molecules of a given bead can include identical (or common) barcode sequences, different barcode sequences, or a combination of both. Nucleic acid molecules of a given bead can include multiple sets of nucleic acid molecules. Nucleic acid molecules of a given set can include identical barcode sequences. The identical barcode sequences can be different from barcode sequences of nucleic acid molecules of another set.

Moreover, when the population of beads is partitioned, the resulting population of partitions can also include a diverse barcode library that includes at least about 1,000 different barcode sequences, at least about 5,000 different barcode sequences, at least about 10,000 different barcode sequences, at least at least about 50,000 different barcode sequences, at least about 100,000 different barcode sequences, at least about 1,000,000 different barcode sequences, at least about 5,000,000 different barcode sequences, or at least about 10,000,000 different barcode sequences. Additionally, each partition of the population can include at least about 1,000 nucleic acid molecules, at least about 5,000 nucleic acid molecules, at least about 10,000 nucleic acid molecules, at least about 50,000 nucleic acid molecules, at least about 100,000 nucleic acid molecules, at least about 500,000 nucleic acids, at least about 1,000,000 nucleic acid molecules, at least about 5,000,000 nucleic acid molecules, at least about 10,000,000 nucleic acid molecules, at least about 50,000,000 nucleic acid molecules, at least about 100,000,000 nucleic acid molecules, at least about 250,000,000 nucleic acid molecules and in some cases at least about 1 billion nucleic acid molecules.

In some cases, it may be desirable to incorporate multiple different barcodes within a given partition, either attached to a single or multiple beads within the partition. For example, in some cases, a mixed, but known set of barcode sequences may provide greater assurance of identification in the subsequent processing, e.g., by providing a stronger address or attribution of the barcodes to a given partition, as a duplicate or independent confirmation of the output from a given partition.

The nucleic acid molecules (e.g., oligonucleotides) are releasable from the beads upon the application of a particular stimulus to the beads. In some cases, the stimulus may be a photo-stimulus, e.g., through cleavage of a photo-labile linkage that releases the nucleic acid molecules. In other cases, a thermal stimulus may be used, where elevation of the temperature of the beads environment will result in cleavage of a linkage or other release of the nucleic acid molecules form the beads. In still other cases, a chemical stimulus can be used that cleaves a linkage of the nucleic acid molecules to the beads, or otherwise results in release of the nucleic acid molecules from the beads. In one case, such compositions include the polyacrylamide matrices described above for encapsulation of cells, and may be degraded for release of the attached nucleic acid molecules through exposure to a reducing agent, such as DTT.

In some aspects, provided are systems and methods for controlled partitioning. Droplet size may be controlled by adjusting certain geometric features in channel architecture (e.g., microfluidics channel architecture). For example, an expansion angle, width, and/or length of a channel may be adjusted to control droplet size.

Figure 4:
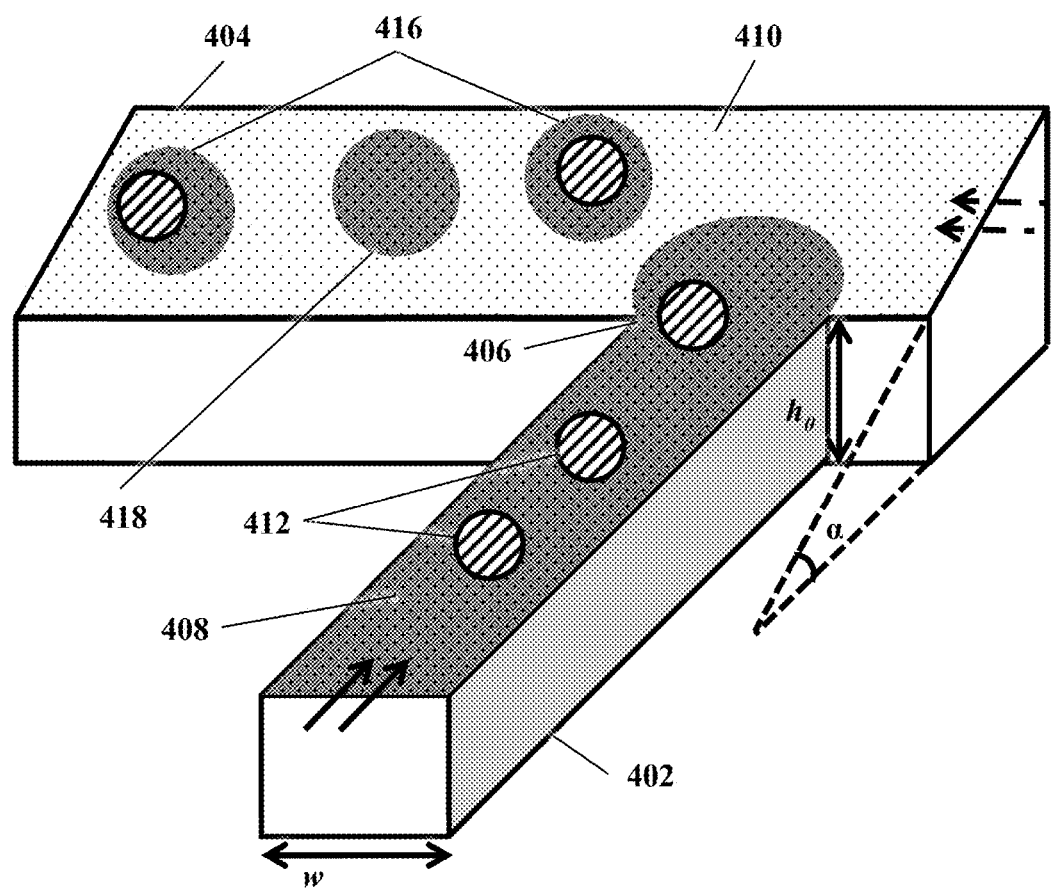
FIG. 4 is a schematic illustrating an example of a microfluidic channel structure for the controlled partitioning of beads into discrete droplets.

FIG. 4 shows an example of a microfluidic channel structure for the controlled partitioning of beads into discrete droplets. A channel structure 400 can include a channel segment 402 communicating at a channel junction 406 (or intersection) with a reservoir 404. The reservoir 404 can be a chamber. Any reference to "reservoir," as used herein, can also refer to a "chamber." In operation, an aqueous fluid 408 that includes suspended beads 412 may be transported along the channel segment 402 into the junction 406 to meet a second fluid 410 that is immiscible with the aqueous fluid 408 in the reservoir 404 to create droplets 416, 418 of the aqueous fluid 408 flowing into the reservoir 404. At the junction 406 where the aqueous fluid 408 and the second fluid 410 meet, droplets can form based on factors such as the hydrodynamic forces at the junction 406, flow rates of the two fluids 408, 410, fluid properties, and certain geometric parameters (e.g., w, h0, α, etc.) of the channel structure 400. A plurality of droplets can be collected in the reservoir 404 by continuously injecting the aqueous fluid 408 from the channel segment 402 through the junction 406.

A discrete droplet generated may include a bead (e.g., as in occupied droplets 416). Alternatively, a discrete droplet generated may include more than one bead. Alternatively, a discrete droplet generated may not include any beads (e.g., as in unoccupied droplet 418). In some instances, a discrete droplet generated may contain one or more cells, as described elsewhere herein. In some instances, a discrete droplet generated may comprise one or more reagents, as described elsewhere herein.

In some instances, the aqueous fluid 408 can have a substantially uniform concentration or frequency of beads 412. The beads 412 can be introduced into the channel segment 402 from a separate channel (not shown in FIG. 4). The frequency of beads 412 in the channel segment 402 may be controlled by controlling the frequency in which the beads 412 are introduced into the channel segment 402 and/or the relative flow rates of the fluids in the channel segment 402 and the separate channel. In some instances, the beads can be introduced into the channel segment 402 from a plurality of different channels, and the frequency controlled accordingly.

In some instances, the aqueous fluid 408 in the channel segment 402 can comprise cells (e.g., described with reference to FIGS. 1 and 2). In some instances, the aqueous fluid 408 can have a substantially uniform concentration or frequency of cells. As with the beads, the cells can be introduced into the channel segment 402 from a separate channel. The frequency or concentration of the cells in the aqueous fluid 408 in the channel segment 402 may be controlled by controlling the frequency in which the cells are introduced into the channel segment 402 and/or the relative flow rates of the fluids in the channel segment 402 and the separate channel. In some instances, the cells can be introduced into the channel segment 402 from a plurality of different channels, and the frequency controlled accordingly. In some instances, a first separate channel can introduce beads and a second separate channel can introduce cells into the channel segment 402. The first separate channel introducing the beads may be upstream or downstream of the second separate channel introducing the cells.

The second fluid 410 can comprise an oil, such as a fluorinated oil, that includes a fluorosurfactant for stabilizing the resulting droplets, for example, inhibiting subsequent coalescence of the resulting droplets.

In some instances, the second fluid 410 may not be subjected to and/or directed to any flow in or out of the reservoir 404. For example, the second fluid 410 may be substantially stationary in the reservoir 404. In some instances, the second fluid 410 may be subjected to flow within the reservoir 404, but not in or out of the reservoir 404, such as via application of pressure to the reservoir 404 and/or as affected by the incoming flow of the aqueous fluid 408 at the junction 406. Alternatively, the second fluid 410 may be subjected and/or directed to flow in or out of the reservoir 404. For example, the reservoir 404 can be a channel directing the second fluid 410 from upstream to downstream, transporting the generated droplets.

The channel structure 400 at or near the junction 406 may have certain geometric features that at least partly determine the sizes of the droplets formed by the channel structure 400. The channel segment 402 can have a height, $h_0$ and width, w, at or near the junction 406. By way of example, the channel segment 402 can comprise a rectangular cross-section that leads to a reservoir 404 having a wider cross-section (such as in width or diameter). Alternatively, the cross-section of the channel segment 402 can be other shapes, such as a circular shape, trapezoidal shape, polygonal shape, or any other shapes. The top and bottom walls of the reservoir 404 at or near the junction 406 can be inclined at an expansion angle, $\alpha$. The expansion angle, $\alpha$, allows the tongue (portion of the aqueous fluid 408 leaving channel segment 402 at junction 406 and entering the reservoir 404 before droplet formation) to increase in depth and facilitate decrease in curvature of the intermediately formed droplet. Droplet size may decrease with increasing expansion angle. The resulting droplet radius, $R_d$, may be predicted by the following equation for the aforementioned geometric parameters of $h_0$, w, and $\alpha$:

$$R_d \approx 0.44\left(1 + 2.2\sqrt{\tan\alpha}\,\frac{w}{h_0}\right)\frac{h_0}{\sqrt{\tan\alpha}}$$

By way of example, for a channel structure with w=21 µm, h=21 µm, and $\alpha=3°$, the predicted droplet size is 121 µm. In another example, for a channel structure with w=25 µm, h=25 µm, and $\alpha=5°$, the predicted droplet size is 123 µm. In another example, for a channel structure with w=28 µm, h=28 µm, and $\alpha=7°$, the predicted droplet size is 124 µm.

In some instances, the expansion angle, $\alpha$, may be between a range of from about 0.5° to about 4°, from about 0.1° to about 10°, or from about 0° to about 90°. For example, the expansion angle can be at least about 0.01°, 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, or higher. In some instances, the expansion angle can be at most about 89°, 88°, 87°, 86°, 85°, 84°, 830, 82°, 81°, 80°, 75°, 70°, 65°, 60°, 55°, 50°, 450, 40°, 35°, 30°, 250, 20°, 15°, 10°, 9° 8°, 7° 6°, 5°, 4°, 3°, 2°, 1°, 0.1°, 0.01°, or less. In some instances, the width, w, can be between a range of from about 100 micrometers (µm) to about 500 µm. In some instances, the width, w, can be between a range of from about 10 µm to about 200 µm. Alternatively, the width can be less than about 10 µm. Alternatively, the width can be greater than about 500 µm. In some instances, the flow rate of the aqueous fluid 408 entering the junction 406 can be between about 0.04 microliters (µL)/minute (min) and about 40 µL/min. In some instances, the flow rate of the aqueous fluid 408 entering the junction 406 can be between about 0.01 microliters (pL)/minute (min) and about 100 µL/min. Alternatively, the flow rate of the aqueous fluid 408 entering the junction 406 can be less than about 0.01 µL/min. Alternatively, the flow rate of the aqueous fluid 408 entering the junction 406 can be greater than about 40 µL/min, such as 45 µL/min, 50 µL/min, 55 µL/min, 60 µL/min, 65 µL/min, 70 µL/min, 75 µL/min, 80 µL/min, 85 µL/min, 90 µL/min, 95 µL/min, 100 µL/min, 110 µL/min, 120 µL/min, 130 µL/min, 140 µL/min, 150 µL/min, or greater. At lower flow rates, such as flow rates of about less than or equal to 10 microliters/minute, the droplet radius may not be dependent on the flow rate of the aqueous fluid 408 entering the junction 406.

In some instances, at least about 50% of the droplets generated can have uniform size. In some instances, at least about 55%, 60%, 65%, 70%, 75%, 80%, 85%, 90%, 95%, 96%, 97%, 98%, 99%, or greater of the droplets generated can have uniform size. Alternatively, less than about 50% of the droplets generated can have uniform size.

The throughput of droplet generation can be increased by increasing the points of generation, such as increasing the number of junctions (e.g., junction 406) between aqueous fluid 408 channel segments (e.g., channel segment 402) and the reservoir 404. Alternatively or in addition, the throughput of droplet generation can be increased by increasing the flow rate of the aqueous fluid 408 in the channel segment 402.

Figure 5:
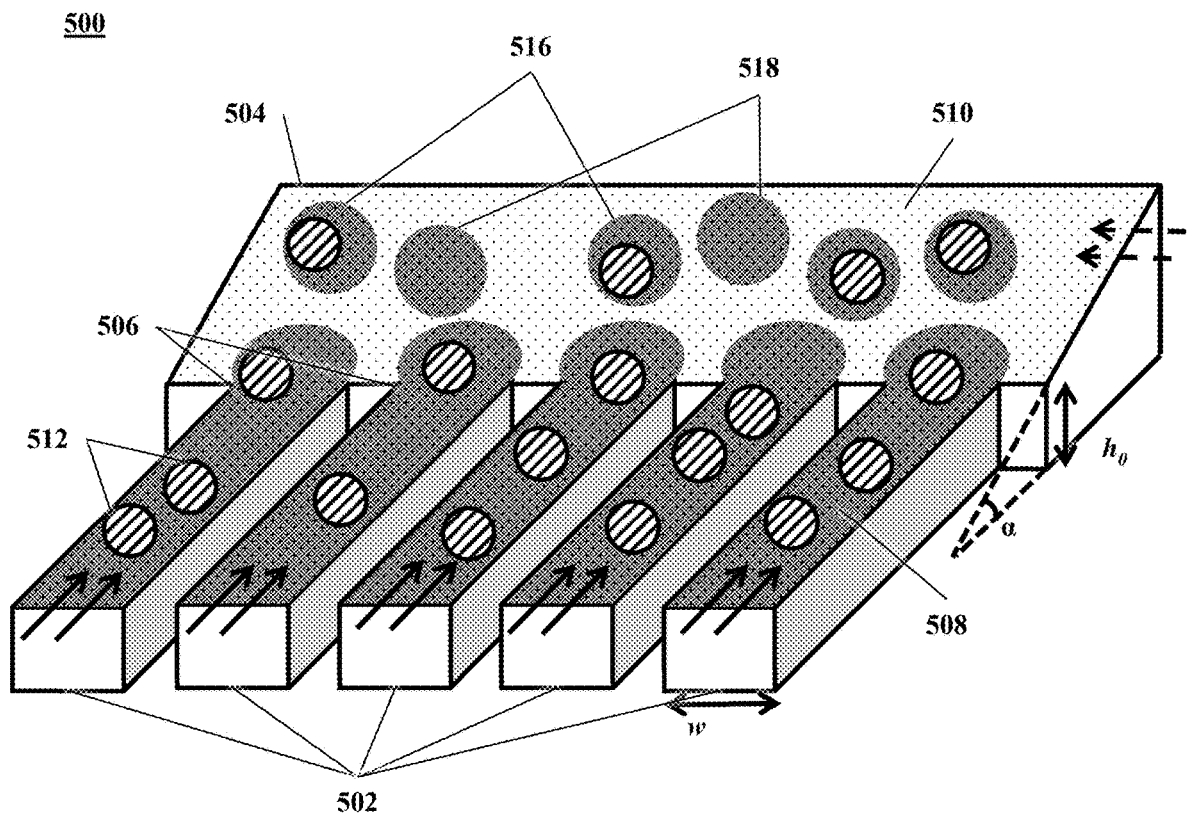
FIG. 5 is a schematic illustrating an example of a microfluidic channel structure for increased droplet generation throughput.

FIG. 5 shows an example of a microfluidic channel structure for increased droplet generation throughput. A microfluidic channel structure 500 can comprise a plurality of channel segments 502 and a reservoir 504. Each of the plurality of channel segments 502 may be in fluid communication with the reservoir 504. The channel structure 500 can comprise a plurality of channel junctions 506 between the plurality of channel segments 502 and the reservoir 504. Each channel junction can be a point of droplet generation. The channel segment 402 from the channel structure 400 in FIG. 4 and any description to the components thereof may correspond to a given channel segment of the plurality of channel segments 502 in channel structure 500 and any description to the corresponding components thereof. The reservoir 404 from the channel structure 400 and any description to the components thereof may correspond to the reservoir 504 from the channel structure 500 and any description to the corresponding components thereof.

Each channel segment of the plurality of channel segments 502 may comprise an aqueous fluid 508 that includes suspended beads 512. The reservoir 504 may comprise a second fluid 510 that is immiscible with the aqueous fluid 508. In some instances, the second fluid 510 may not be subjected to and/or directed to any flow in or out of the reservoir 504. For example, the second fluid 510 may be substantially stationary in the reservoir 504. In some instances, the second fluid 510 may be subjected to flow within the reservoir 504, but not in or out of the reservoir 504, such as via application of pressure to the reservoir 504 and/or as affected by the incoming flow of the aqueous fluid 508 at the junctions. Alternatively, the second fluid 510 may be subjected and/or directed to flow in or out of the reservoir 504. For example, the reservoir 504 can be a channel directing the second fluid 510 from upstream to downstream, transporting the generated droplets.

In operation, the aqueous fluid 508 that includes suspended beads 512 may be transported along the plurality of channel segments 502 into the plurality of junctions 506 to meet the second fluid 510 in the reservoir 504 to create droplets 516, 518. A droplet may form from each channel segment at each corresponding junction with the reservoir 504. At the junction where the aqueous fluid 508 and the second fluid 510 meet, droplets can form based on factors such as the hydrodynamic forces at the junction, flow rates of the two fluids 508, 510, fluid properties, and certain geometric parameters (e.g., w, h0, α, etc.) of the channel structure 500, as described elsewhere herein. A plurality of droplets can be collected in the reservoir 504 by continuously injecting the aqueous fluid 508 from the plurality of channel segments 502 through the plurality of junctions 506. Throughput may significantly increase with the parallel channel configuration of channel structure 500. For example, a channel structure having five inlet channel segments comprising the aqueous fluid 508 may generate droplets five times as frequently than a channel structure having one inlet channel segment, provided that the fluid flow rate in the channel segments are substantially the same. The fluid flow rate in the different inlet channel segments may or may not be substantially the same. A channel structure may have as many parallel channel segments as is practical and allowed for the size of the reservoir. For example, the channel structure may have at least about 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 5000 or more parallel or substantially parallel channel segments.

The geometric parameters, w, $h_0$, and α, may or may not be uniform for each of the channel segments in the plurality of channel segments 502. For example, each channel segment may have the same or different widths at or near its respective channel junction with the reservoir 504. For example, each channel segment may have the same or different height at or near its respective channel junction with the reservoir 504. In another example, the reservoir 504 may have the same or different expansion angle at the different channel junctions with the plurality of channel segments 502. When the geometric parameters are uniform, beneficially, droplet size may also be controlled to be uniform even with the increased throughput. In some instances, when it is desirable to have a different distribution of droplet sizes, the geometric parameters for the plurality of channel segments 502 may be varied accordingly.

In some instances, at least about 50% of the droplets generated can have uniform size. In some instances, at least about 55%, 60%, 65%, 70%, 75%, 80%, 85%, 90%, 95%, 96%, 97%, 98%, 99%, or greater of the droplets generated can have uniform size. Alternatively, less than about 50% of the droplets generated can have uniform size.

Figure 6:
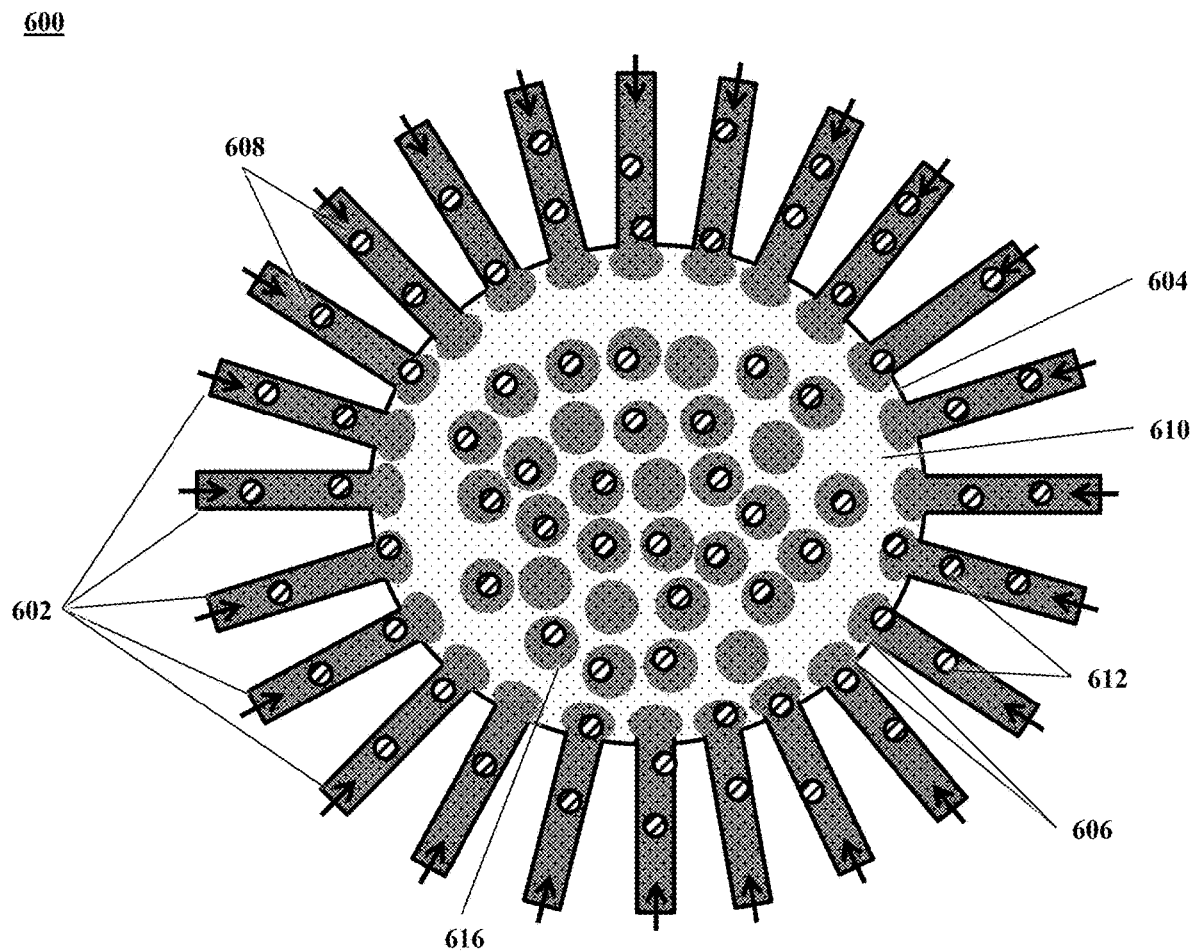
FIG. 6 is a schematic illustrating another example of a microfluidic channel structure for increased droplet generation throughput.

FIG. 6 shows another example of a microfluidic channel structure for increased droplet generation throughput. A microfluidic channel structure 600 can comprise a plurality of channel segments 602 arranged generally circularly around the perimeter of a reservoir 604. Each of the plurality of channel segments 602 may be in fluid communication with the reservoir 604. The channel structure 600 can comprise a plurality of channel junctions 606 between the plurality of channel segments 602 and the reservoir 604. Each channel junction can be a point of droplet generation. The channel segment 402 from the channel structure 400 in FIG. 4 and any description to the components thereof may correspond to a given channel segment of the plurality of channel segments 602 in channel structure 600 and any description to the corresponding components thereof. The reservoir 404 from the channel structure 400 and any description to the components thereof may correspond to the reservoir 604 from the channel structure 600 and any description to the corresponding components thereof.

Each channel segment of the plurality of channel segments 602 may comprise an aqueous fluid 608 that includes suspended beads 612. The reservoir 604 may comprise a second fluid 610 that is immiscible with the aqueous fluid 608. In some instances, the second fluid 610 may not be subjected to and/or directed to any flow in or out of the reservoir 604. For example, the second fluid 610 may be substantially stationary in the reservoir 604. In some instances, the second fluid 610 may be subjected to flow within the reservoir 604, but not in or out of the reservoir 604, such as via application of pressure to the reservoir 604 and/or as affected by the incoming flow of the aqueous fluid 608 at the junctions. Alternatively, the second fluid 610 may be subjected and/or directed to flow in or out of the reservoir 604. For example, the reservoir 604 can be a channel directing the second fluid 610 from upstream to downstream, transporting the generated droplets.

In operation, the aqueous fluid 608 that includes suspended beads 612 may be transported along the plurality of channel segments 602 into the plurality of junctions 606 to meet the second fluid 610 in the reservoir 604 to create a plurality of droplets 616. A droplet may form from each channel segment at each corresponding junction with the reservoir 604. At the junction where the aqueous fluid 608 and the second fluid 610 meet, droplets can form based on factors such as the hydrodynamic forces at the junction, flow rates of the two fluids 608, 610, fluid properties, and certain geometric parameters (e.g., widths and heights of the channel segments 602, expansion angle of the reservoir 604, etc.) of the channel structure 600, as described elsewhere herein. A plurality of droplets can be collected in the reservoir 604 by continuously injecting the aqueous fluid 608 from the plurality of channel segments 602 through the plurality of junctions 606. Throughput may significantly increase with the substantially parallel channel configuration of the channel structure 600. A channel structure may have as many substantially parallel channel segments as is practical and allowed for by the size of the reservoir. For example, the channel structure may have at least about 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 5000 or more parallel or substantially parallel channel segments. The plurality of channel segments may be substantially evenly spaced apart, for example, around an edge or perimeter of the reservoir. Alternatively, the spacing of the plurality of channel segments may be uneven.

The reservoir 604 may have an expansion angle, a (not shown in FIG. 6) at or near each channel junction. Each channel segment of the plurality of channel segments 602 may have a width, w, and a height, $h_0$, at or near the channel junction. The geometric parameters, w, $h_0$, and α, may or may not be uniform for each of the channel segments in the plurality of channel segments 602. For example, each channel segment may have the same or different widths at or near its respective channel junction with the reservoir 604. For example, each channel segment may have the same or different height at or near its respective channel junction with the reservoir 604.

The reservoir 604 may have the same or different expansion angle at the different channel junctions with the plurality of channel segments 602. For example, a circular reservoir (as shown in FIG. 6) may have a conical, dome-like, or hemispherical ceiling (e.g., top wall) to provide the same or substantially same expansion angle for each channel segments 602 at or near the plurality of channel junctions 606. When the geometric parameters are uniform, beneficially, resulting droplet size may be controlled to be uniform even with the increased throughput. In some instances, when it is desirable to have a different distribution of droplet sizes, the geometric parameters for the plurality of channel segments 602 may be varied accordingly.

In some instances, at least about 50% of the droplets generated can have uniform size. In some instances, at least about 55%, 60%, 65%, 70%, 75%, 80%, 85%, 90%, 95%, 96%, 97%, 98%, 99%, or greater of the droplets generated can have uniform size. Alternatively, less than about 50% of the droplets generated can have uniform size. The beads and/or biological particle injected into the droplets may or may not have uniform size.

Figure 7A:
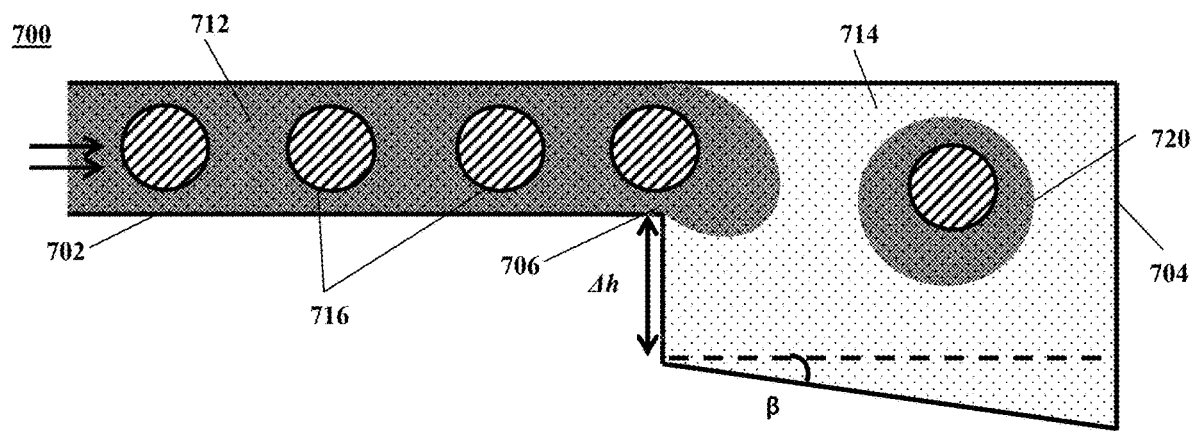
FIG. 7A is a schematic illustrating a cross-section view of another example of a microfluidic channel structure with a geometric feature for controlled partitioning.
Figure 7B:
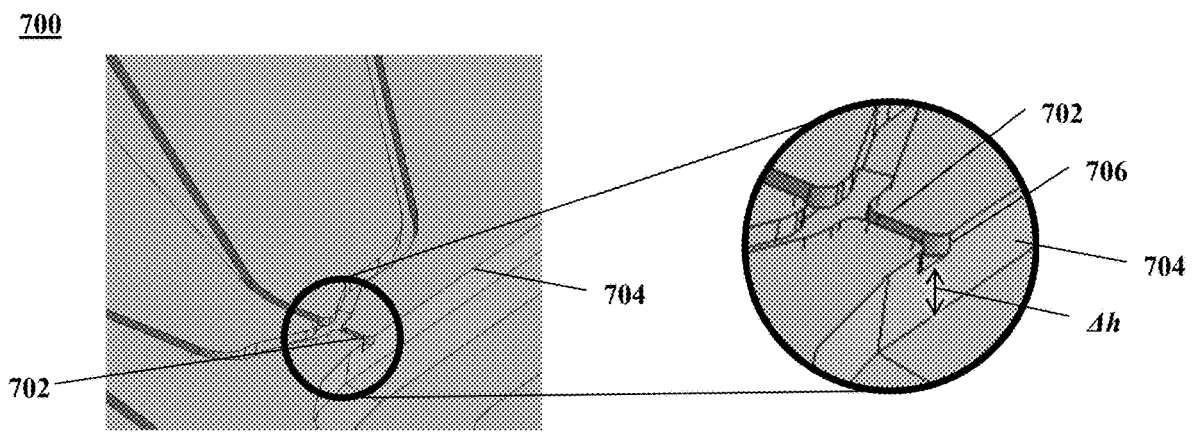
FIG. 7B is a schematic illustrating a perspective view of the channel structure of FIG. 7A is a schematic illustrating an example nucleic acid barcode molecule for use in analysis of ribonucleic (RNA) using the methods described herein.

FIG. 7A shows a cross-section view of another example of a microfluidic channel structure with a geometric feature for controlled partitioning. A channel structure 700 can include a channel segment 702 communicating at a channel junction 706 (or intersection) with a reservoir 704. In some instances, the channel structure 700 and one or more of its components can correspond to the channel structure 100 and one or more of its components. FIG. 7B shows a perspective view of the channel structure 700 of FIG. 7A.

An aqueous fluid 712 comprising a plurality of particles 716 may be transported along the channel segment 702 into the junction 706 to meet a second fluid 714 (e.g., oil, etc.) that is immiscible with the aqueous fluid 712 in the reservoir 704 to create droplets 720 of the aqueous fluid 712 flowing into the reservoir 704. At the junction 706 where the aqueous fluid 712 and the second fluid 714 meet, droplets can form based on factors such as the hydrodynamic forces at the junction 706, relative flow rates of the two fluids 712, 714, fluid properties, and certain geometric parameters (e.g., Δh, etc.) of the channel structure 700. A plurality of droplets can be collected in the reservoir 704 by continuously injecting the aqueous fluid 712 from the channel segment 702 at the junction 706.

A discrete droplet generated may comprise one or more particles of the plurality of particles 716. As described elsewhere herein, a particle may be any particle, such as a bead, cell bead, gel bead, biological particle, macromolecular constituents of biological particle, or other particles. Alternatively, a discrete droplet generated may not include any particles.

In some instances, the aqueous fluid 712 can have a substantially uniform concentration or frequency of particles 716. As described elsewhere herein (e.g., with reference to FIG. 4), the particles 716 (e.g., beads) can be introduced into the channel segment 702 from a separate channel (not shown in FIG. 7). The frequency of particles 716 in the channel segment 702 may be controlled by controlling the frequency in which the particles 716 are introduced into the channel segment 702 and/or the relative flow rates of the fluids in the channel segment 702 and the separate channel. In some instances, the particles 716 can be introduced into the channel segment 702 from a plurality of different channels, and the frequency controlled accordingly. In some instances, different particles may be introduced via separate channels. For example, a first separate channel can introduce beads and a second separate channel can introduce biological particles into the channel segment 702. The first separate channel introducing the beads may be upstream or downstream of the second separate channel introducing the biological particles.

In some instances, the second fluid 714 may not be subjected to and/or directed to any flow in or out of the reservoir 704. For example, the second fluid 714 may be substantially stationary in the reservoir 704. In some instances, the second fluid 714 may be subjected to flow within the reservoir 704, but not in or out of the reservoir 704, such as via application of pressure to the reservoir 704 and/or as affected by the incoming flow of the aqueous fluid 712 at the junction 706. Alternatively, the second fluid 714 may be subjected and/or directed to flow in or out of the reservoir 704. For example, the reservoir 704 can be a channel directing the second fluid 714 from upstream to downstream, transporting the generated droplets.

The channel structure 700 at or near the junction 706 may have certain geometric features that at least partly determine the sizes and/or shapes of the droplets formed by the channel structure 700. The channel segment 702 can have a first cross-section height, $h_1$, and the reservoir 704 can have a second cross-section height, $h_2$. The first cross-section height, $h_1$, and the second cross-section height, $h_2$, may be different, such that at the junction 706, there is a height difference of Δh. The second cross-section height, $h_2$, may be greater than the first cross-section height, $h_1$. In some instances, the reservoir may thereafter gradually increase in cross-section height, for example, the more distant it is from the junction 706. In some instances, the cross-section height of the reservoir may increase in accordance with expansion angle, β, at or near the junction 706. The height difference, Δh, and/or expansion angle, β, can allow the tongue (portion of the aqueous fluid 712 leaving channel segment 702 at junction 706 and entering the reservoir 704 before droplet formation) to increase in depth and facilitate decrease in curvature of the intermediately formed droplet. For example, droplet size may decrease with increasing height difference and/or increasing expansion angle.

The height difference, $\Delta h$, can be at least about 1 µm. Alternatively, the height difference can be at least about 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 200, 300, 400, 500 µm or more. Alternatively, the height difference can be at most about 500, 400, 300, 200, 100, 90, 80, 70, 60, 50, 45, 40, 35, 30, 25, 20, 19, 18, 17, 16, 15, 14, 13, 12, 11, 10, 9, 8, 7, 6, 5, 4, 3, 2, 1 µm or less. In some instances, the expansion angle, #, may be between a range of from about 0.5° to about 4°, from about 0.1° to about 10°, or from about 0° to about 90°. For example, the expansion angle can be at least about 0.01°, 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 25°, 30°, 35°, 40°, 45°, 50°, 55°, 60°, 650°, 70°, 75°, 80°, 85°, or higher. In some instances, the expansion angle can be at most about 89°, 88°, 87°, 86°, 85°, 84°, 83°, 82°, 81°, 80°, 75°, 70°, 65°, 60°, 55°, 50°, 45°, 40°, 35°, 30°, 25°, 200, 15°, 10°, 9°, 8°, 7°, 6°, 5°, 4°, 3°, 2°, 1°, 0.1°, 0.01°, or less.

In some instances, the flow rate of the aqueous fluid 712 entering the junction 706 can be between about 0.04 microliters (µL)/minute (min) and about 40 µL/min. In some instances, the flow rate of the aqueous fluid 712 entering the junction 706 can be between about 0.01 microliters (µL)/minute (min) and about 100 µL/min. Alternatively, the flow rate of the aqueous fluid 712 entering the junction 706 can be less than about 0.01 µL/min. Alternatively, the flow rate of the aqueous fluid 712 entering the junction 706 can be greater than about 40 µL/min, such as 45 µL/min, 50 µL/min, 55 µL/min, 60 µL/min, 65 µL/min, 70 µL/min, 75 µL/min, 80 µL/min, 85 µL/min, 90 µL/min, 95 µL/min, 100 µL/min, 110 µL/min, 120 µL/min, 130 µL/min, 140 µL/min, 150 µL/min, or greater. At lower flow rates, such as flow rates of about less than or equal to 10 microliters/minute, the droplet radius may not be dependent on the flow rate of the aqueous fluid 712 entering the junction 706. The second fluid 714 may be stationary, or substantially stationary, in the reservoir 704. Alternatively, the second fluid 714 may be flowing, such as at the above flow rates described for the aqueous fluid 712.

In some instances, at least about 50% of the droplets generated can have uniform size. In some instances, at least about 55%, 60%, 65%, 70%, 75%, 80%, 85%, 90%, 95%, 96%, 97%, 98%, 99%, or greater of the droplets generated can have uniform size. Alternatively, less than about 50% of the droplets generated can have uniform size.

While FIGS. 7A and 7B illustrate the height difference, $\Delta h$, being abrupt at the junction 706 (e.g., a step increase), the height difference may increase gradually (e.g., from about 0 µm to a maximum height difference). Alternatively, the height difference may decrease gradually (e.g., taper) from a maximum height difference. A gradual increase or decrease in height difference, as used herein, may refer to a continuous incremental increase or decrease in height difference, wherein an angle between any one differential segment of a height profile and an immediately adjacent differential segment of the height profile is greater than 90°. For example, at the junction 706, a bottom wall of the channel and a bottom wall of the reservoir can meet at an angle greater than 90°. Alternatively or in addition, a top wall (e.g., ceiling) of the channel and a top wall (e.g., ceiling) of the reservoir can meet an angle greater than 90°. A gradual increase or decrease may be linear or non-linear (e.g., exponential, sinusoidal, etc.). Alternatively or in addition, the height difference may variably increase and/or decrease linearly or non-linearly. While FIGS. 7A and 7B illustrate the expanding reservoir cross-section height as linear (e.g., constant expansion angle, P), the cross-section height may expand non-linearly. For example, the reservoir may be defined at least partially by a dome-like (e.g., hemispherical) shape having variable expansion angles. The cross-section height may expand in any shape.

The channel networks, e.g., as described above or elsewhere herein, can be fluidly coupled to appropriate fluidic components. For example, the inlet channel segments are fluidly coupled to appropriate sources of the materials they are to deliver to a channel junction. These sources may include any of a variety of different fluidic components, from simple reservoirs defined in or connected to a body structure of a microfluidic device, to fluid conduits that deliver fluids from off-device sources, manifolds, fluid flow units (e.g., actuators, pumps, compressors) or the like. Likewise, the outlet channel segment (e.g., channel segment 208, reservoir 604, etc.) may be fluidly coupled to a receiving vessel or conduit for the partitioned cells for subsequent processing. Again, this may be a reservoir defined in the body of a microfluidic device, or it may be a fluidic conduit for delivering the partitioned cells to a subsequent process operation, instrument or component.

The methods and systems described herein may be used to greatly increase the efficiency of single cell applications and/or other applications receiving droplet-based input. For example, following the sorting of occupied cells and/or appropriately-sized cells, subsequent operations that can be performed can include generation of amplification products, purification (e.g., via solid phase reversible immobilization (SPRI)), further processing (e.g., shearing, ligation of functional sequences, and subsequent amplification (e.g., via PCR)). These operations may occur in bulk (e.g., outside the partition). In the case where a partition is a droplet in an emulsion, the emulsion can be broken and the contents of the droplet pooled for additional operations. Additional reagents that may be co-partitioned along with the barcode bearing bead may include oligonucleotides to block ribosomal RNA (rRNA) and nucleases to digest genomic DNA from cells. Alternatively, rRNA removal agents may be applied during additional processing operations. The configuration of the constructs generated by such a method can help minimize (or avoid) sequencing of the poly-T sequence during sequencing and/or sequence the 5' end of a polynucleotide sequence. The amplification products, for example, first amplification products and/or second amplification products, may be subject to sequencing for sequence analysis. In some cases, amplification may be performed using the Partial Hairpin Amplification for Sequencing (PHASE) method.

A variety of applications require the evaluation of the presence and quantification of different biological particle or organism types within a population of biological particles, including, for example, microbiome analysis and characterization, environmental testing, food safety testing, epidemiological analysis, e.g., in tracing contamination or the like.

Barcoding and Sequencing of Polynucleotide-Peptide Conjugates or TCR

Once the contents of the cells (e.g., T cells or pMHC-T cell multiplets) are released into their respective partitions (e.g., droplets), the nucleic acids (e.g., nucleic acid molecule(s) of the polynucleotide of the polynucleotide-peptide conjugate) contained therein may be further processed within the partitions. In accordance with the methods and systems described herein, the nucleic acid contents of individual cells (e.g., T cells) or pMHC-T cell multiplets can be provided with unique identifiers such that, upon characterization of those nucleic acids they may be attributed as having been derived from the same cell or cells. The ability to attribute characteristics to individual cells (e.g., T cells or pMHC-T cell multiplets) or groups of cells is provided by the assignment of unique identifiers specifically to an individual cell or groups of cells. Unique identifiers, e.g., in the form of nucleic acid barcode molecules can be assigned or associated with individual cells (e.g., T cells) or pMHC-T cell multiplets or populations of cells, in order to tag or label the cell's components (and as a result, its characteristics) with the unique identifiers. These unique identifiers can then be used to attribute the cell's components and characteristics to an individual cell (e.g., an individual T cell or the T cell of a pMHC-T cell multiplet) or group of cells. In some instances, attribution is carried out by co-partitioning the individual cells (e.g., T cells or pMHC-T cell multiplets) or groups of cells with the unique identifiers. In some instances, the unique identifiers are provided in the form of nucleic acid molecules (e.g., nucleic acid barcode molecules) that contain barcode sequences that may be attached to, or otherwise associated with, the nucleic acid contents of individual cells, or to other components of the cells, and particularly to fragments of those nucleic acids. The nucleic acid barcode molecules are partitioned such that as between nucleic acid barcode molecules in a given partition (e.g., droplet), the barcode sequences contained therein are the same, but as between different partitions (e.g., droplets), the nucleic acid barcode molecules can, and do have differing barcode sequences, or at least represent a large number of different barcode sequences across all of the partitions (e.g., droplets) in a given analysis. In some instances, only one barcode sequence can be associated with a given partition (e.g., droplet), although in some cases, two or more different barcode sequences may be present. Labelling of nucleic acid molecules with barcode sequences and use of such in sequencing nucleic acid molecules from individual cells (e.g., T cells) are described in detail in, e.g., U.S. Patent Application Publication No. 2018/0105808, the full disclosure of which is incorporated herein by reference in its entirety for all purposes.

The barcode sequences can include from 6 to about 20 or more nucleotides within the sequence of the nucleic acid barcode molecule. In some cases, the length of a barcode sequence may be 6, 7, 8, 9, 10, 11, 12, 13, 14, 15, 16, 17, 18, 19, 20 nucleotides or longer. In some cases, the length of a barcode sequence may be at least 6, 7, 8, 9, 10, 11, 12, 13, 14, 15, 16, 17, 18, 19, 20 nucleotides or longer. In some cases, the length of a barcode sequence may be at most 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be 4, 5, 6, 7, 8, 9, 10, 11, 12, 13, 14, 15, 16 nucleotides or longer. In some cases, the barcode subsequence may be at least 4, 5, 6, 7, 8, 9, 10, 11, 12, 13, 14, 15, 16 nucleotides or longer. In some cases, the barcode subsequence may be at most 4, 5, 6, 7, 8, 9, 10, 11, 12, 13, 14, 15, 16 nucleotides or shorter.

The co-partitioned nucleic acid barcode molecule can also contain other functional sequences useful in the processing of the nucleic acids from the co-partitioned cells (e.g., T cells, such as T cells from pMHC-T cell multiplets). These sequences include, e.g., targeted or random/universal amplification primer sequences for amplifying nucleic acids (e.g., mRNA, genomic DNA) from the individual cells (e.g., T cells, such as T cells from pMHC-T cell multiplets) within the partitions while attaching the associated barcode sequences, sequencing primers or primer recognition sites, hybridization or probing sequences, e.g., for identification of presence of the sequences or for pulling down barcoded nucleic acids, or any of a number of other potential functional sequences. Other mechanisms of co-partitioning nucleic acid molecules may also be employed, including, e.g., coalescence of two or more droplets, where one droplet contains nucleic acid molecules, or microdispensing of nucleic acid molecules (e.g., attached to a bead) into partitions, e.g., droplets within microfluidic systems.

Briefly, in one example, particles, such as beads, are provided that each include large numbers of the above described nucleic acid barcode molecule releasably attached to the particles, where all of the nucleic acid barcode molecules attached to a particular particle will include the same barcode sequence, but where a large number of diverse barcode sequences are represented across the population of particle (e.g., beads) used. In some embodiments, hydrogel beads, e.g., comprising polyacrylamide polymer matrices, are used as a solid support and delivery vehicle for the nucleic acid barcode molecules into the partitions (e.g., droplets), as they are capable of carrying large numbers of nucleic acid barcode molecules, and may be configured to release those nucleic acid barcode molecules upon exposure to a particular stimulus, as described elsewhere herein. In some cases, the population of particles (e.g., beads) will provide a diverse barcode sequence library that includes at least 1,000 different barcode sequences, at least 5,000 different barcode sequences, at least 10,000 different barcode sequences, at least at least 50,000 different barcode sequences, at least 100,000 different barcode sequences, at least 1,000,000 different barcode sequences, at least 5,000,000 different barcode sequences, or at least 10,000,000 different barcode sequences. Additionally, each particle (e.g., bead) can be provided with large numbers of nucleic acid barcode molecules attached. In particular, the number of nucleic acid barcode molecules including the barcode sequence on an individual particle (e.g., bead) can be at least 1,000 nucleic acid barcode molecules, at least 5,000 nucleic acid barcode molecules, at least 10,000 nucleic acid barcode molecules, at least 50,000 nucleic acid barcode molecules, at least 100,000 nucleic acid barcode molecules, at least 500,000 nucleic acid barcode molecules, at least 1,000,000 nucleic acid barcode molecules, at least 5,000,000 nucleic acid barcode molecules, at least 10,000,000 nucleic acid barcode molecules, at least 50,000,000 nucleic acid barcode molecules, at least 100,000,000 nucleic acid barcode molecules, and in some cases at least 1 billion nucleic acid barcode molecules.

Moreover, when the population of particles (e.g., beads) is partitioned, the resulting population of partitions (e.g., droplets) can also include a diverse barcode library that includes at least 1,000 different barcode sequences, at least 5,000 different barcode sequences, at least 10,000 different barcode sequences, at least at least 50,000 different barcode sequences, at least 100,000 different barcode sequences, at least 1,000,000 different barcode sequences, at least 5,000,000 different barcode sequences, or at least 10,000,000 different barcode sequences. Additionally, each partition (e.g., droplet) of the population can include at least 1,000 nucleic acid barcode molecules, at least 5,000 nucleic acid barcode molecules, at least 10,000 nucleic acid barcode molecules, at least 50,000 nucleic acid barcode molecules, at least 100,000 nucleic acid barcode molecules, at least 500,000 nucleic acid barcode molecules, at least 1,000,000 nucleic acid barcode molecules, at least 5,000,000 nucleic acid barcode molecules, at least 10,000,000 nucleic acid barcode molecules, at least 50,000,000 nucleic acid barcode molecules, at least 100,000,000 nucleic acid barcode molecules, and in some cases at least 1 billion nucleic acid barcode molecules.

In some cases, it may be desirable to incorporate multiple different barcodes or barcode sequences within a given partition (e.g., droplet), either attached to a single or multiple particle (e.g., beads) within the partition. For example, in some cases, a mixed, but known barcode sequences set may provide greater assurance of identification in the subsequent processing, e.g., by providing a stronger address or attribution of the barcodes to a given partition (e.g., droplet), as a duplicate or independent confirmation of the output from a given partition.

The nucleic acid molecules (e.g., nucleic acid barcode molecules) are releasable from the particles (e.g., beads) upon the application of a particular stimulus to the particles. In some cases, the stimulus may be a photo-stimulus, e.g., through cleavage of a photo-labile linkage that releases the nucleic acid barcode molecules. In other cases, a thermal stimulus may be used, where elevation of the temperature of the particle (e.g., bead) environment will result in cleavage of a linkage or other release of the nucleic acid barcode molecules form the particles (e.g., beads). In still other cases, a chemical stimulus is used that cleaves a linkage of the nucleic acid barcode molecules to the particles (e.g., beads), or otherwise results in release of the nucleic acid barcode molecules from the particles. In one case, such compositions include the polyacrylamide matrices described above for encapsulation of cells, and may be degraded for release of the attached nucleic acid barcode molecules through exposure to a reducing agent, such as DTT.

In accordance with the methods and systems described herein, the particles (e.g., beads) including the attached nucleic acid barcode molecules are co-partitioned with the individual cells (e.g., T cells or pMHC-T cell multiplets) such that a single particle and a single cell or multiplet are contained within an individual partition (e.g., droplet). As noted above, while single occupancy (e.g., partitions (e.g., droplets) with single cell (e.g., a T cell) or single pMHC-T cell multiplet and single particle (e.g., bead)) is the most desired state, it will be appreciated that multiply occupied partitions (either in terms of cells, particles or both), or unoccupied partitions (either in terms of cells, particles or both) will often be present. An example of microfluidic channel structures for co-partitioning cells and particles (e.g., beads) comprising nucleic acid barcode molecules is schematically illustrated in FIGS. 1-7. As described elsewhere herein, in some instances, a substantial percentage of the overall occupied partitions (e.g., droplets) will include both a particle (e.g., a bead) and a cell (e.g., a T cell) or a pMHC-T cell multiplet and, in some cases, some of the partitions that are generated will be unoccupied. In some cases, some of the partitions (e.g., droplets) may have particles (e.g., beads) and cells (e.g., T cells or pMHC-T cell multiplets) that are not partitioned 1:1. In some cases, it may be desirable to provide multiply occupied partitions (e.g., droplets), e.g., containing two, three, four or more cells (e.g., T cells or pMHC-T cell multiplets) and/or particles (e.g., beads) within a single partition.

As shown in FIG. 2, channel segments 202, 204, 206, 208 and 210 are provided in fluid communication at channel junction 212. An aqueous stream comprising the individual cells or pMHC-T cell multiplets 214, is flowed through channel segment 202 toward channel junction 212. As described above, these cells may be suspended within an aqueous fluid, or may have been pre-encapsulated, prior to the partitioning process.

Concurrently, an aqueous stream comprising the barcode sequence carrying beads 216, is flowed through channel segment 204 toward channel junction 212. A non-aqueous partitioning fluid 216 is introduced into channel junction 212 from each of side channels 206 and 208, and the combined streams are flowed into outlet channel 210. Within channel junction 212, the two combined aqueous streams from channel segments 202 and 204 are combined, and partitioned into droplets 218, that include co-partitioned cells or pMHC-T cell multiplets 214 and beads 216. As noted previously, by controlling the flow characteristics of each of the fluids combining at channel junction 212, as well as controlling the geometry of the channel junction, partitioning can be optimized to achieve a desired occupancy level of beads, cells or both, within the partitions 218 that are generated.

In some cases, lysis agents, e.g., cell lysis enzymes, may be introduced into the partition (e.g., droplets) with the particle (e.g., bead) stream, e.g., flowing through channel segment 204, such that lysis of the cell (e.g., T cell or pMHC-T cell multiplet) only commences at or after the time of partitioning. Additional reagents may also be added to the partition in this configuration, such as reverse transcriptase, primer molecules, and dNTPs used to barcode the cell's nucleic acid molecules. As noted above, in many cases, a chemical stimulus, such as DTT, may be used to release the barcode sequences from their respective particles (e.g., beads) into the partition (e.g., droplet). In such cases, it may be particularly desirable to provide the chemical stimulus along with the cell-containing stream in channel segment 202, such that release of the barcodes only occurs after the two streams have been combined, e.g., within the partitions 218. Where the cells (e.g., T cells or pMHC-T cell multiplets) are encapsulated, however, introduction of a common chemical stimulus, e.g., that both releases the oligonucleotides from their particles (e.g., beads), and releases cells from their microcapsules may generally be provided from a separate additional side channel (not shown) upstream of or connected to channel junction 212.

A number of other reagents may be co-partitioned along with the cells (e.g., T cells or pMHC-T cell multiplets), particles (e.g., beads), lysis agents and chemical stimuli, including, for example, protective reagents, like proteinase K, chelators, nucleic acid extension, replication, transcription or amplification reagents such as polymerases, reverse transcriptases, transposases which can be used for transposon based methods (e.g., NEXTERA™), nucleoside triphosphates or NTP analogues, primer sequences and additional cofactors such as divalent metal ions used in such reactions, ligation reaction reagents, such as ligase enzymes and ligation sequences, dyes, labels, or other tagging reagents.

The channel networks, e.g., as described herein, can be fluidly coupled to appropriate fluidic components. For example, the inlet channel segments, e.g., channel segments 202, 204, 206 and 208 are fluidly coupled to appropriate sources of the materials they are to deliver to channel junction 212. For example, channel segment 202 will be fluidly coupled to a source of an aqueous suspension of cells (e.g., T cells or pMHC-T cell multiplets) 214 to be analyzed, while channel segment 204 may be fluidly coupled to a source of an aqueous suspension of particles (e.g., beads)

216. Channel segments 206 and 208 may then be fluidly connected to one or more sources of the non-aqueous fluid. These sources may include any of a variety of different fluidic components, from simple reservoirs defined in or connected to a body structure of a microfluidic device, to fluid conduits that deliver fluids from off-device sources, manifolds, or the like. Likewise, the outlet channel segment 210 may be fluidly coupled to a receiving vessel or conduit for the partitioned cells (e.g., T cells or pMHC-T cell multiplets). Again, this may be a reservoir defined in the body of a microfluidic device, or it may be a fluidic conduit for delivering the partitioned cells (e.g., T cells or pMHC-T cell multiplets) to a subsequent process operation, instrument or component. In operation, once lysed, the nucleic acid contents of the individual cells (e.g., T cells or pMHC-T cell multiplets) are then available for further processing within the partitions (e.g., droplets), including, e.g., fragmentation, reverse transcription, amplification and barcoding, as well as attachment of other functional sequences. As noted above, fragmentation may be accomplished through the co-partitioning of shearing enzymes, such as endonucleases and transposases, in order to fragment the nucleic acids (e.g., nucleic acid molecule of the T cell, such as nucleic acid molecule of the T cell containing nucleic acid sequence of TCR) into smaller fragments. These endonucleases may include restriction endonucleases, including type II and type IIs restriction endonucleases as well as other nucleic acid cleaving enzymes, such as nicking endonucleases, and the like. In some cases, fragmentation may not be desired, and full-length nucleic acids may be retained within the partitions. In some instances, e.g., in the case of encapsulated cells (e.g., T cells or pMHC-T cell multiplets) or cell contents, fragmentation may be carried out prior to partitioning, e.g., through enzymatic methods, e.g., those described herein, or through mechanical methods, e.g., mechanical, acoustic or other shearing.

Once co-partitioned, and the cells (e.g., T cells or pMHC-T cell multiplets) are lysed to release their nucleic acids, the nucleic acid barcode molecule disposed upon the particle (e.g., bead) may be used to barcode those nucleic acids and, e.g., the nucleic acid molecule of the polynucleotide-peptide conjugate. Briefly, in one aspect, the nucleic acid barcode molecules present on the particles (e.g., beads) that are co-partitioned with the cells (e.g., T cells or pMHC-T cell multiplets), are released from the particles into the partition (e.g., droplet) with the cell's nucleic acids. The nucleic acid barcode molecule can include, along with the barcode sequence, a primer sequence or a TSO sequence at its 5' end. This primer sequence may be a random nucleic acid sequence intended to randomly prime numerous different regions on the nucleic acids of the cells (e.g., T cells, such as T cells from pMHC-T cell multiplets), or it may be a specific primer sequence (e.g., poly T sequence or gene specific primer) targeted to prime a specific targeted region. In some instances, the primer or TSO sequence is complementary to a nucleic acid sequence of a polynucleotide-peptide conjugate.

Once released, the primer or TSO portion of the nucleic acid barcode molecule can anneal to a complementary region of the polynucleotide-peptide conjugate. Extension reaction reagents, e.g., DNA polymerase, nucleoside triphosphates, co-factors (e.g., Mg2+ or Mn2+), that are also co-partitioned with the T cells (e.g., T cells in pMHC-T cell multiplets) and particles (e.g., beads), then extend the primer or TSO sequence using the polynucleotides of the polynucleotide-peptide conjugate as a template, to produce a complementary fragment to the strand of the polynucleotides of the polynucleotide-peptide conjugate to which the primer annealed; the complementary fragment may also include the nucleic acid barcode molecule and its associated barcode sequence. The complementary fragment may be a barcoded nucleic acid molecule that contains, from a 5' end to a 3' end, a sequence corresponding to the nucleic acid sequence of polynucleotide-peptide conjugate and a complement of the barcode sequence.

As described herein, the T cell's nucleic acids may include any desired nucleic acids within the cell including, for example, the cell's DNA, e.g., genomic DNA (including epigenetic states, such as methylation or open chromatin status), RNA, e.g., messenger RNA, and the like. For example, in some cases, the methods and systems described herein are used in characterizing expressed mRNA, including, e.g., the presence and quantification of such mRNA, and may include RNA sequencing processes as the characterization process. Alternatively, or additionally, the reagents partitioned along with the T cells may include reagents for the conversion of mRNA into cDNA, e.g., reverse transcriptase enzymes and reagents, to facilitate sequencing processes where DNA sequencing is employed. Moreover, one or more analytes of a cell (e.g., cell surface components, such as a protein) can be analyzed using polynucleotide conjugated labelling agents similar to as described for the pMHC complexes described herein. Briefly, a library of potential labelling agents may be provided associated with a first set of nucleic acid reporter molecules, e.g., where a different reporter oligonucleotide sequence is associated with a specific labelling agent, and therefore capable of binding to a specific cell analyte (such as a cell surface feature or intracellular analyte such as a protein). Labelling agents may include, but are not limited to, an antibody, or an epitope binding fragment thereof, a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold. In some aspects, different members of the library may be characterized by the presence of a different oligonucleotide sequence label, e.g., an antibody to a first type of cell surface protein or receptor may have associated with it a first known reporter oligonucleotide sequence, while an antibody to a second cell surface protein or receptor may have a different known reporter oligonucleotide sequence associated with it. Prior to co-partitioning, the cells may be incubated with the library of labelling agents, that may represent antibodies to a broad panel of different cell surface features, e.g., receptors, proteins, etc., and which include their associated reporter oligonucleotides. Unbound labelling agents may be washed from the cells, and the cells may then be co-partitioned along with the barcode oligonucleotides described above. As a result, the partitions may include the cell or cells, as well as the bound labelling agents and their known, associated reporter oligonucleotides. Labelling agent reporter oligonucleotides can then be barcoded, optionally further processed, and sequenced as described generally herein. For a description of polynucleotide conjugated labelling agent compositions, methods, and systems, see, e.g., U.S. Pat. Nos. 9,951,386 and 10,480,029, the disclosures of which are incorporated by reference herein in their entirety for all purposes.

Single cell (e.g., T cell) processing and analysis methods and systems described herein can be utilized for a wide variety of applications, including analysis of specific individual T cells, analysis of different T cell types within populations of differing T cell types, analysis and characterization of large populations of T cells for environmental, human health, epidemiological, forensic, or any of a wide variety of different applications.

A particularly valuable application of the single cell (e.g., T cells) analysis processes described herein is in the sequencing and characterization of a diseased cell. A diseased T cell or a T cell activated to express a particular TCR in a subject (e.g., a human, such as a human patient) due to the presence of a disease can have altered metabolic properties, gene expression (e.g., TCR sequence or TCR profile), and/or morphologic features. Examples of diseases include inflammatory diseases, autoimmune diseases, metabolic disorders, nervous system disorders, infectious diseases, and cancers.

Where pMHC binding to T cells (e.g., pMHC binding to a TCR on a T cell) is to be analyzed for diagnosis, prognosis, and/or treatment of a disease (e.g., an inflammatory disease, autoimmune disease, metabolic disorder, nervous system disorder, infectious disease, and cancer), polynucleotide-peptide conjugates may be designed for the specific disease. Furthermore, in instances of TCR profiling (e.g., TCR sequencing) primer sequences useful in any of the various operations for attaching barcode sequences and/or amplification reactions may comprise gene specific sequences which target genes or regions of genes associated with or suspected of being associated with the disease. For example, this can include genes or regions of genes where the presence of mutations (e.g., insertions, deletions, polymorphisms, copy number variations, and gene fusions) associated with a disease condition are suspected to be present in a T cell population.

As with analysis of T cells (e.g., the TCR sequence or the TCR profile) for diagnosis, prognosis, and/or treatment of a disease, the analysis and diagnosis of fetal health or abnormality through the analysis of fetal T cells is a difficult task using conventional techniques. In particular, in the absence of relatively invasive procedures, such as amniocentesis obtaining fetal T cell samples can employ harvesting those T cells from the maternal circulation. As will be appreciated, such circulating fetal T cells make up an extremely small fraction of the overall cellular population of that circulation. As a result, complex analyses are performed in order to characterize what of the obtained data is likely derived from fetal T cells as opposed to maternal T cells. By employing the single T cell characterization methods and systems described herein, however, one can attribute genetic make up to individual T cells, and categorize those T cells (e.g., with regard to the expression of TCR(s)) as maternal or fetal based upon their respective genetic make-up. Further, the genetic sequence of fetal T cells may be used to identify any of a number of genetic disorders, including, e.g., aneuploidy such as Down syndrome, Edwards syndrome, and Patau syndrome.

Methods and compositions disclosed herein can be also be utilized for sequence analysis of the TCR repertoire, which can provide a significant improvement in understanding the status and function of the immune system.

Where T cells are to be analyzed, primer sequences useful in any of the various operations for attaching barcode sequences and/or amplification reactions may include gene specific sequences which target genes or regions of genes of T cells, for example TCRs. Such gene sequences include, but are not limited to, sequences of various T cell receptor alpha variable genes (TRAV genes), T cell receptor alpha joining genes (TRAJ genes), T cell receptor alpha constant genes (TRAC genes), T cell receptor beta variable genes (TRBV genes), T cell receptor beta diversity genes (TRBD genes), T cell receptor beta joining genes (TRBJ genes), T cell receptor beta constant genes (TRBC genes), T cell receptor gamma variable genes (TRGV genes), T cell receptor gamma joining genes (TRGJ genes), T cell receptor gamma constant genes (TRGC genes), T cell receptor delta variable genes (TRDV genes), T cell receptor delta diversity genes (TRDD genes), T cell receptor delta joining genes (TRDJ genes), and T cell receptor delta constant genes (TRDC genes).

The ability to characterize individual T cells from larger diverse populations of T cells is also of significant value in both environmental testing as well as in forensic analysis, where samples may, by their nature, be made up of diverse populations of T cells and other material that "contaminate" the sample, relative to the T cells for which the sample is being tested, e.g., environmental indicator organisms, toxic organisms, and the like for, e.g., environmental and food safety testing, victim and/or perpetrator cells in forensic analysis for sexual assault, and other violent crimes, and the like.

Additionally, the methods and compositions disclosed herein, allow the determination of not only the immune repertoire and different clonotypes, but the functional characteristics (e.g., the transcriptome) of the T cells associated with a clonotype or plurality of clonotypes that bind to the same or similar antigen (e.g., pMHC). These functional characteristics can comprise transcription of cytokine, chemokine, or cell-surface associated molecules, such as, costimulatory molecules, checkpoint inhibitors, cell surface maturation markers, or cell-adhesion molecules. Such analysis allows a T cell or T cell population expressing a particular TCR or immunoglobulin to be associated with certain functional characteristics. For example, for any given antigen there will be multiple clonotypes of TCR, or immunoglobulin that specifically bind to that antigen. Multiple clonotypes that bind to the same antigen are known as the idiotype.

The single cell (e.g., T cell) analysis methods described herein are also useful in the analysis of gene expression, as noted above, both in terms of identification of RNA transcripts and their quantitation. In particular, using the single cell level analysis methods described herein, one can isolate and analyze the RNA transcripts present in individual T cells, populations of T cells, or subsets of populations of T cells. In particular, in some cases, the barcode oligonucleotides may be configured to prime, replicate and consequently yield barcoded fragments of RNA from individual T cells. For example, in some cases, the nucleic acid barcode molecules may include mRNA specific priming sequences, e.g., poly-T primer segments that allow priming and replication of mRNA in a reverse transcription reaction or other targeted priming sequences (e.g., sequence of TCR). Alternatively, or additionally, random RNA priming may be carried out using random N-mer primer segments of the nucleic acid barcode molecules. In still other cases, the nucleic acid barcode molecules may include a template switching oligonucleotide (TSO) sequence to facilitate a template switching reaction onto the nucleic acid barcode molecule during, e.g., cDNA synthesis. Labelling of nucleic acid molecules with barcode sequences and use of such in sequencing nucleic acid molecules (e.g., immune receptor transcripts) from individual cells (e.g., T cells) are described in detail in, e.g., U.S. Patent Application Publication No. 2018/0105808, the full disclosures of which are incorporated herein by reference in their entirety for all purposes.

As noted elsewhere herein, the structure of the nucleic acid barcode molecules may include a number of sequence elements in addition to the barcode sequence. One example of a nucleic acid barcode molecule for use in RNA analysis as described above is shown in FIG. 8. As shown, the overall nucleic acid barcode molecule 802 is optionally coupled to a particle (e.g., bead) 804 by a releasable linkage 806, such as a disulfide linker. The nucleic acid barcode molecule may include functional sequences that are used in subsequent processing, such as functional sequence 808, which may include one or more of a sequencer specific flow cell attachment sequence, e.g., a P5 sequence (or partial sequence thereof) for Illumina sequencing systems, as well as sequencing primer sequences, e.g., a R1 primer (or partial sequence thereof) for Illumina sequencing systems. A barcode sequence 810 is included within the structure for use in barcoding the sample RNA. An mRNA specific priming sequence 812, such as poly-T sequence, a targeted priming sequence, or a random sequence is also included in the nucleic acid barcode molecule structure. An anchoring sequence segment 814 may optionally be included to ensure that, e.g., the poly-T sequence hybridizes at the sequence end of the mRNA. This anchoring sequence can include a random short sequence of nucleotides, e.g., 1-mer, 2-mer, 3-mer or longer sequence, which will ensure that the poly-T segment is more likely to hybridize at the sequence end of the poly-A tail of the mRNA. An additional sequence segment 816 may be provided within the nucleic acid barcode molecule sequence. In some cases, this additional sequence provides a unique molecular identifier (UMI) sequence segment, e.g., as a random sequence (e.g., such as a random N-mer sequence) that varies across individual nucleic acid barcode molecules coupled to a single particle (e.g., bead), whereas barcode sequence 810 can be constant among nucleic acid barcode molecules tethered to an individual particle (e.g., bead). This unique sequence serves to provide a unique identifier of the starting mRNA molecule that was captured, in order to allow quantitation of the number of original expressed RNA. As will be appreciated, although shown as a single nucleic acid barcode molecule tethered to the surface of a particle (e.g., bead), individual particle can include tens to hundreds of thousands or even millions of individual nucleic acid barcode molecules, where, as noted, the barcode sequence can be constant or relatively constant for a given particle (e.g., bead), but where the variable or unique sequence segment will vary across an individual particle. This unique molecular identifier (UMI) sequence segment may include from 5 to about 8 or more nucleotides within the sequence of the nucleic acid barcode molecules. In some cases, the unique molecular identifier (UMI) sequence segment can be 2, 3, 4, 5, 6, 7, 8, 9, 10, 11, 12, 13, 14, 15, 16, 17, 18, 19 or 20 nucleotides in length or longer. In some cases, the unique molecular identifier (UMI) sequence segment can be at least 2, 3, 4, 5, 6, 7, 8, 9, 10, 11, 12, 13, 14, 15, 16, 17, 18, 19 or 20 nucleotides in length or longer. In some cases, the unique molecular identifier (UMI) sequence segment can be at most 2, 3, 4, 5, 6, 7, 8, 9, 10, 11, 12, 13, 14, 15, 16, 17, 18, 19 or 20 nucleotides in length or shorter. Labelling of nucleic acid molecules with barcode sequences and use of such in sequencing nucleic acid molecules (e.g., immune receptor transcripts) from individual cells (e.g., T cells) are described in detail in, e.g., U.S. Pat. No. 9,951,386 and U.S. Patent Application Publication No. 2018/0105808, the full disclosures of which are incorporated herein by reference in their entirety for all purposes.

Figure 8:
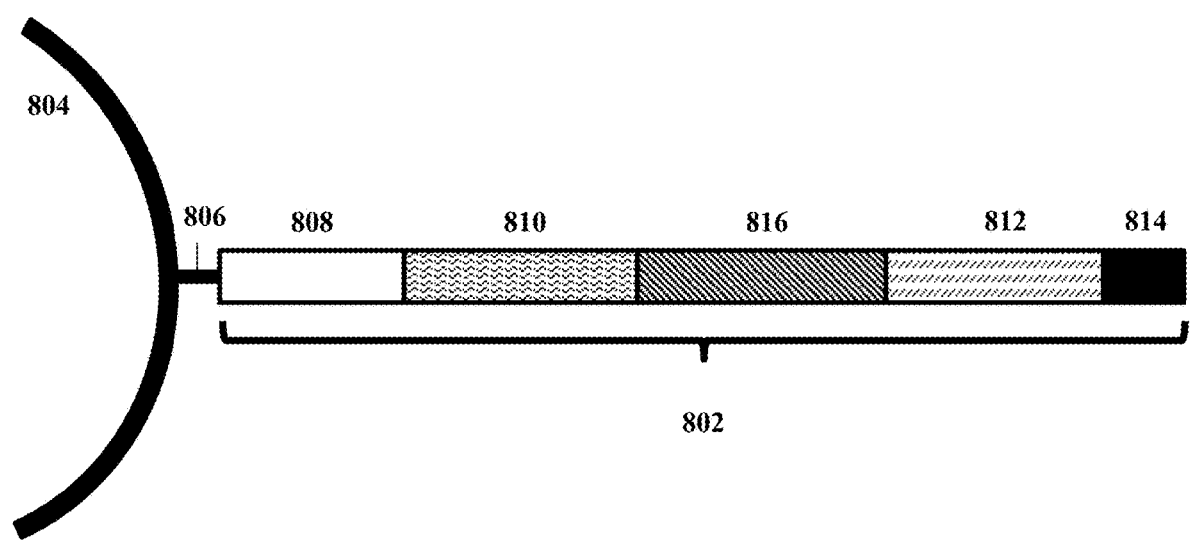
FIG. 8 is a schematic illustrating an example nucleic acid barcode molecule for use in the methods and systems described herein.

In operation, and with reference to FIG. 8, a T cell (either as an individual cell (e.g., after contact with pMHC monomers) or as part of a pMHC-T cell multiplet) is co-partitioned along with a barcode bearing particle (e.g., barcode bearing bead) and lysed. In some instances, the nucleic acid barcode molecules are released from the particle. The poly-T portion of the released nucleic acid barcode molecule then hybridizes to the poly-A tail of the mRNA. The poly-T segment then primes the reverse transcription of the mRNA to produce a cDNA transcript of the mRNA, but which includes each of the sequence segments 808-816 of the nucleic acid barcode molecule. Again, because the nucleic acid barcode molecule 802 includes an anchoring sequence 814, it will more likely hybridize to and prime reverse transcription at the sequence end of the poly-A tail of the mRNA. Within any given partition, all of the cDNA transcripts of the individual mRNA molecules will include a common barcode sequence segment 810. However, by including the unique random N-mer sequence, the transcripts made from different mRNA molecules within a given partition will vary at this unique sequence. This provides a quantitation feature that can be identifiable even following any subsequent amplification of the contents of a given partition, e.g., the number of unique segments associated with a common barcode can be indicative of the quantity of mRNA originating from a single partition (e.g., droplet), and thus, a single T cell. As noted above, the transcripts are then amplified, cleaned up and sequenced to identify the sequence of the cDNA transcript of the mRNA, as well as to sequence the barcode segment (or barcode sequence) and the unique sequence segment.

As noted elsewhere herein, while a poly-T primer sequence is described, other targeted or random priming sequences may also be used in priming the reverse transcription reaction. In some cases, the primer sequence can be a gene specific primer sequence which targets specific genes for reverse transcription. In some examples, such target genes comprise the nucleic acid sequence of TCRs. Likewise, although described as releasing the nucleic acid barcode molecules into the partition (e.g., droplets) along with the contents of the lysed T cells, it will be appreciated that in some cases, the particle (e.g., gel bead) bound nucleic acid barcode molecule may be used to hybridize and capture the mRNA on the solid phase of the particle, in order to facilitate the separation of the RNA from other cellular contents.

Figure 9:
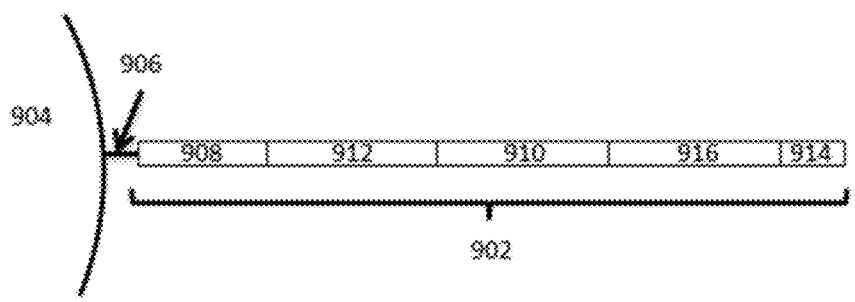
FIG. 9 is a schematic illustrating an exemplary nucleic acid barcode molecule structure for use in analysis of RNA and example operations for performing RNA analysis.
Figure 9:
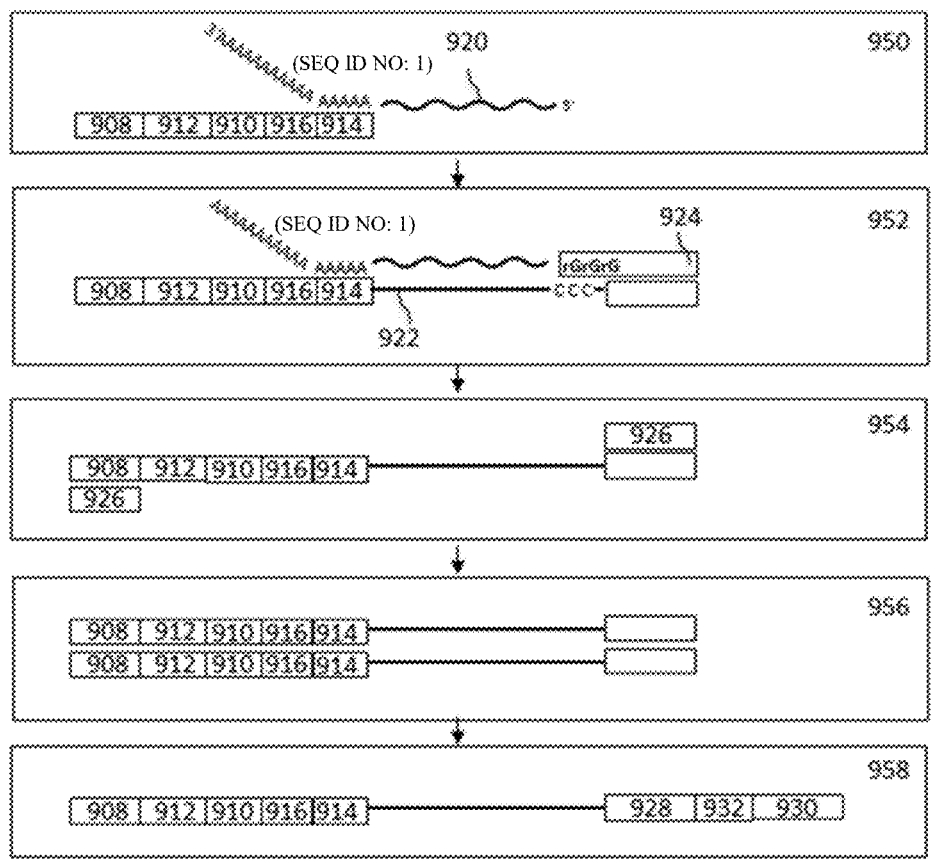

An additional example of a nucleic acid barcode molecule for use in RNA analysis, including messenger RNA (mRNA, including mRNA obtained from a T cell, such as mRNA containing the nucleic acid sequence encoding a TCR) analysis, is shown in FIG. 9. As shown, the overall nucleic acid barcode molecule 902 can be coupled to a particle (e.g., bead) 904, optionally by a releasable linkage 906, such as a disulfide linker. The nucleic acid barcode molecule may include functional sequences that are used in subsequent processing, such as functional sequence 908, which may include a sequencer specific flow cell attachment sequence, e.g., a P5 sequence for Illumina sequencing systems, as well as functional sequence 910, which may include sequencing primer sequences, e.g., a R1 primer binding site for Illumina sequencing systems. A barcode sequence 912 is included within the structure for use in barcoding the sample RNA. An RNA specific (e.g., mRNA specific) priming sequence (e.g., complementary to the nucleic acid sequence of TCR), such as poly-T sequence 914 is also included in the nucleic acid barcode molecule structure. An anchoring sequence segment (not shown) may be included to ensure that the poly-T sequence hybridizes at the sequence end of the mRNA. An additional sequence segment 916 may be provided within the nucleic acid barcode molecule sequence. This additional sequence can provide a unique molecular identifier (UMI) sequence segment, e.g., as a random N-mer sequence that varies across individual nucleic acid barcode molecules coupled to a single particle (e.g., bead), whereas barcode sequence 912 can be constant among nucleic acid barcode molecules tethered to an individual particle. As described elsewhere herein, this unique sequence can serve to provide a unique identifier of the starting mRNA molecule that was captured, in order to allow quantitation of the number of original expressed RNA, e.g., mRNA counting. As will be appreciated, although shown as a single nucleic acid barcode molecule tethered to the surface of a particle (e.g., bead), individual particles can include tens to hundreds of thousands or even millions of individual nucleic acid barcode molecules, where, as noted, the barcode segment or barcode sequence can be constant or relatively constant for a given particle, but where the variable or unique sequence segment will vary across an individual particle.

In an example method of cellular RNA (e.g., mRNA) analysis and in reference to FIG. 9, a T cell (either as a single cell (e.g., after contact with pMHC monomers) or as a pMHC-T cell multiplet) is co-partitioned along with a barcode bearing particle (e.g., barcode bearing bead), switch oligo 924, and other reagents such as reverse transcriptase, a reducing agent and dNTPs into a partition (e.g., a droplet in an emulsion). In operation 950, the T cell is lysed while the nucleic acid barcode molecules 902 are released from the particle (e.g., via the action of the reducing agent) and the poly-T segment 914 of the released nucleic acid barcode molecule then hybridizes to the poly-A tail of mRNA 920 that is released from the T cell. Next, in operation 952 the poly-T segment 914 is extended in a reverse transcription reaction using the mRNA as a template to produce a cDNA transcript 922 complementary to the mRNA and also includes each of the sequence segments 908, 912, 910, 916 and 914 of the nucleic acid barcode molecule. Terminal transferase activity of the reverse transcriptase can add additional bases to the cDNA transcript (e.g., polyC). The switch oligo 924 may then hybridize with the additional bases added to the cDNA transcript and facilitate template switching. A sequence complementary to the switch oligo sequence can then be incorporated into the cDNA transcript 922 via extension of the cDNA transcript 922 using the switch oligo 924 as a template. Within any given partition, all of the cDNA transcripts of the individual mRNA molecules will include a common barcode sequence segment 912. However, by including the unique random N-mer sequence 916, the transcripts made from different mRNA molecules within a given partition (e.g., droplet) will vary at this unique sequence. As described elsewhere herein, this provides a quantitation feature that can be identifiable even following any subsequent amplification of the contents of a given partition, e.g., the number of unique segments associated with a common barcode sequence can be indicative of the quantity of mRNA originating from a single partition (e.g., droplet), and thus, a single T cell. Following operation 952, the cDNA transcript 922 is then amplified with primers 926 (e.g., PCR primers) in operation 954. Next, the amplified product is then purified (e.g., via solid phase reversible immobilization (SPRI)) in operation 956. At operation 958, the amplified product is then sheared, ligated to additional functional sequences, and further amplified (e.g., via PCR). The functional sequences may include a sequencer specific flow cell attachment sequence 930, e.g., a P7 sequence for Illumina sequencing systems, as well as functional sequence 928, which may include a sequencing primer binding site, e.g., for a R2 primer for Illumina sequencing systems, as well as functional sequence 932, which may include a sample index, e.g., an i7 sample index sequence for Illumina sequencing systems. In some cases, operations 950 and 952 can occur in the partition (e.g., droplet), while operations 954, 956 and 958 can occur in bulk solution (e.g., in a pooled mixture outside of the partition). In the case where a partition is a droplet in an emulsion, the emulsion can be broken and the contents of the droplet pooled in order to complete operations 954, 956 and 958. In some cases, operation 954 may be completed in the partition. In some cases, nucleic acid barcode molecules may be digested with exonucleases after the emulsion is broken. Exonuclease activity can be inhibited by ethylenediaminetetraacetic acid (EDTA) following primer digestion. Although described in terms of specific sequence references used for certain sequencing systems, e.g., Illumina systems, it will be understood that the reference to these sequences is for illustration purposes only, and the methods described herein may be configured for use with other sequencing systems incorporating specific priming, attachment, index, and other operational sequences used in those systems, e.g., systems available from Ion Torrent, Oxford Nanopore, Genia, Pacific Biosciences, Complete Genomics, and the like.

In an alternative example of a nucleic acid barcode molecule for use in RNA (e.g., cellular RNA) analysis as shown in FIG. 9, functional sequence 908 may be a P7 sequence and functional sequence 910 may be a R2 primer binding site. Moreover, the functional sequence 930 may be a P5 sequence, functional sequence 928 may be a R1 primer binding site, and functional sequence 932 may be an i5 sample index sequence for Illumina sequencing systems. The configuration of the constructs generated by such nucleic acid barcode molecules can help minimize (or avoid) sequencing of the poly-T sequence during sequencing.

The approach of FIG. 9 may be employed for use with various target regions. In some examples, such target regions are TCRs and/or immunoglobulin regions. In such examples, nucleic acid barcode molecules coupled to particle (e.g., beads) may include primers with sequences that are targeted for such target regions (e.g., the nucleic acid sequence of TCRs). For example, poly T primer regions can instead be gene specific (e.g., specific to the nucleic acid sequence of a TCR) primer sequences.

Figure 10:
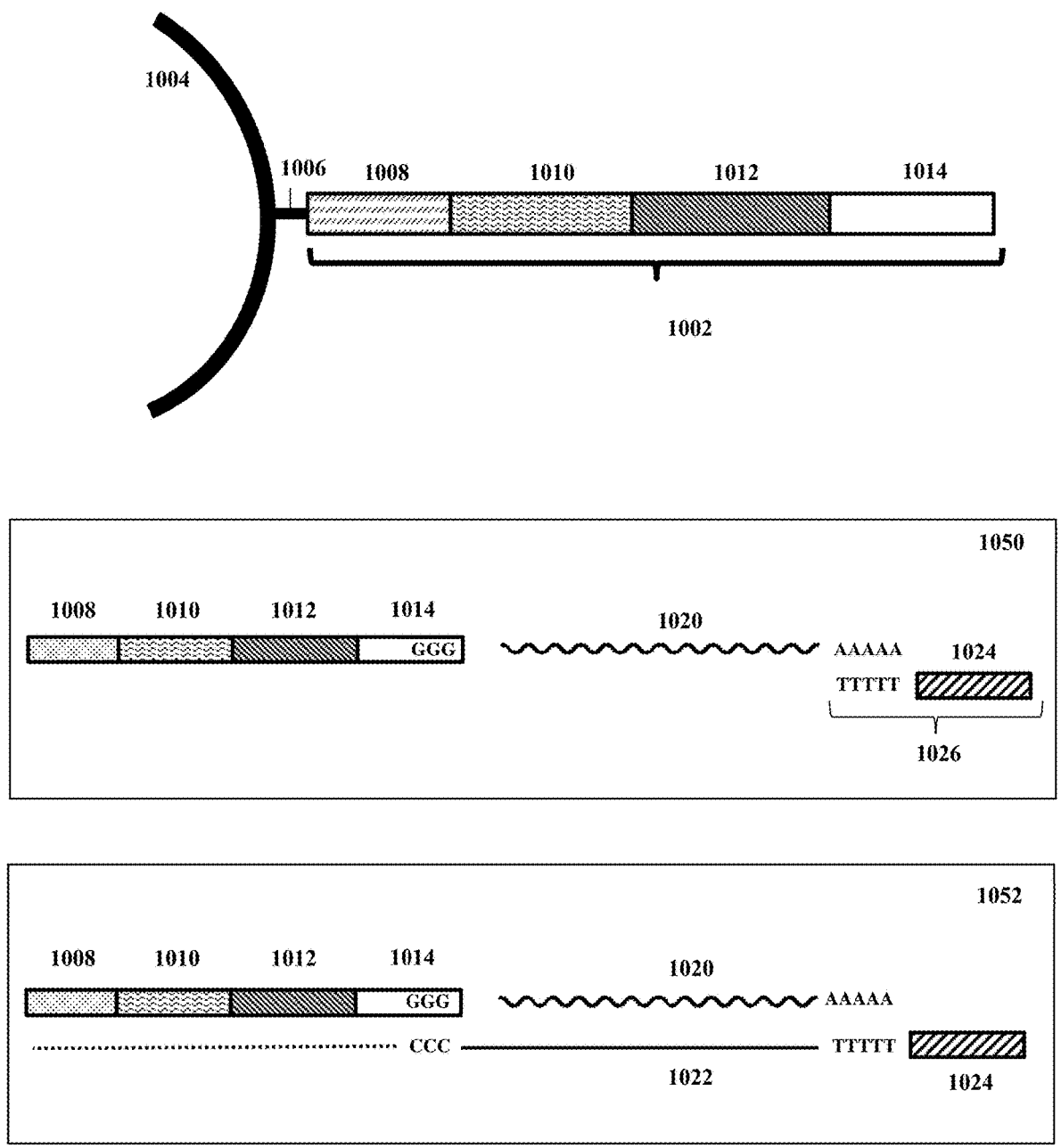
FIG. 10 is a schematic illustrating an exemplary nucleic acid barcode molecule and methods for use in generated barcoded nucleic acid products.

An additional example of a nucleic acid barcode molecule for use in RNA analysis, including messenger RNA (mRNA, including mRNA obtained from a T cell) analysis is shown in FIG. 10. As shown, the overall nucleic acid barcode molecule 1002 is coupled to a particle (e.g., bead) 1004, optionally by a releasable linkage 1006, such as a disulfide linker. The nucleic acid barcode molecule may include functional sequences that are used in subsequent processing, such as functional sequence 1008, which may include a sequencer specific flow cell attachment sequence, e.g., a P5 sequence and/or a sequencing primer sequence, e.g., a R1 primer binding site, or partial sequences thereof. In some cases, sequence 1008 comprises a P7 sequence and/or a R2 primer binding site, or partial sequences thereof. A barcode sequence 1010 is included within the structure for use in barcoding the sample RNA. An additional sequence segment 1012 may be provided within the nucleic acid barcode molecule sequence. In some cases, this additional sequence can provide a unique molecular identifier (UMI) sequence segment, as described elsewhere herein. An additional sequence 1014 may be included to facilitate template switching, e.g., poly-G, which is some instances are ribonucleotide bases (poly ribo-G). As will be appreciated, although shown as a single nucleic acid barcode molecule tethered to the surface of a particle (e.g., bead), individual particles can include tens to hundreds of thousands or even millions of individual nucleic acid barcode molecules, where, as noted, the barcode segment or barcode sequence can be constant or relatively constant for a given particle, but where the variable or unique sequence segment will vary across an individual particle.

In an example method of cellular mRNA analysis and in reference to FIG. 10, a T cell (e.g., as an individual T cell (e.g., after contact with pMHC monomers) or as a pMHC-T cell multiplet) is co-partitioned along with a microcapsule (e.g., bead bearing a nucleic acid barcode molecule), poly T sequence, and other reagents such as a DNA polymerase, a reverse transcriptase, oligonucleotide primers, dNTPs, and reducing agent into a partition (e.g., a droplet in an emulsion). The partition can serve as a reaction volume. As described elsewhere herein, the partition serving as the reaction volume can comprise a container or vessel such as a well, a microwell, vial, a tube, through ports in nanoarray substrates, or micro-vesicles having an outer barrier surrounding an inner fluid center or core, emulsion, or a droplet. In some embodiments, the partition encompasses a droplet of aqueous fluid within a non-aqueous continuous phase, e.g., an oil phase. Within the partition, the T cell can be lysed and, in some embodiments, the nucleic acid barcode molecules can be released from the particle (e.g., via the action of a reducing agent or other stimulus). T cell lysis and release of the nucleic acid barcode molecule from the microcapsule may occur simultaneously in the partition (e.g., a droplet in an emulsion) or the reaction volume. In some embodiments, T cell lysis precedes release of the nucleic acid barcode molecules from the microcapsule. In some embodiments, release of the nucleic acid barcode molecules from the microcapsule precedes T cell lysis.

Subsequent to T cell lysis and optional release of nucleic acid barcode molecules from the particle (e.g., gel bead), nucleic acid molecule 1026 comprising a poly T sequence hybridizes to the poly A tail of mRNA 1020 released from the T cell as illustrated in operation 1050. In some instances, nucleic acid 1026 optionally comprises additional sequence 1024, such as an adapter sequence, a primer or primer binding sequence, etc. Next, in operation 1052, the poly T sequence is then extended in a reverse transcription reaction using the mRNA as a template to produce a cDNA transcript 1022 complementary to the mRNA. Terminal transferase activity of the reverse transcriptase can add additional bases to the cDNA transcript (e.g., poly C) in a template independent manner. The additional bases added to the cDNA transcript, e.g., poly C, can then hybridize with, e.g., a poly G sequence of 1014 of the nucleic acid barcode molecule 1002. This can facilitate template switching and a sequence complementary to the nucleic acid barcode molecule can be incorporated into the cDNA transcript. In various embodiments, the nucleic acid barcode molecule does not hybridize to the template polynucleotide.

Labelling of nucleic acid molecules with barcode sequences and use of such in sequencing nucleic acid molecules (e.g., immune receptor transcripts) from individual cells (e.g., T cells) are described in detail in, e.g., U.S. Pat. No. 9,951,386 and U.S. Patent Application Publication No. 2018/0105808, the full disclosures of which are incorporated herein by reference in their entirety for all purposes.

In some embodiments, polynucleotide conjugated pMHC molecules are also barcoded using the nucleic acid barcode molecule 1002 described in FIG. 10. As described elsewhere herein, MHCs, including full or partial MHC-peptides, may be used as labelling agents that are coupled to oligonucleotides that comprise a barcode sequence that identifies the peptide and/or MHC molecule coupled to a TCR, e.g., a pMHC-T cell multiplet as described herein.

Figure 11A:
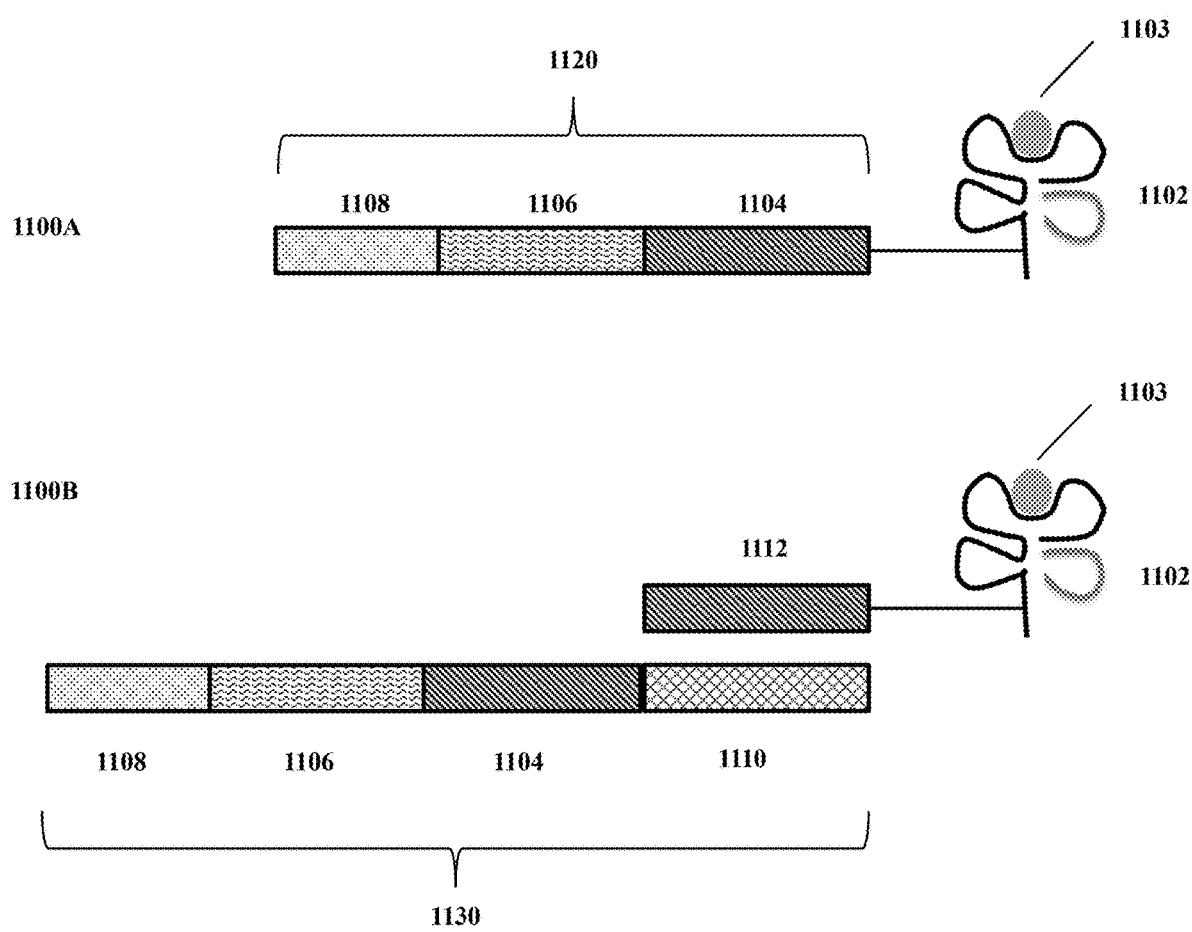
FIG. 11A is a schematic illustrating an exemplary pMHC molecule for use in the methods and systems described herein.

For example, as shown in FIG. 11A, a reporter polynucleotide 1120 can be conjugated to a pMHC monomer 1102 to produce a labelled pMHC molecule for use in the methods and systems described herein. As shown in panel 1100A, the reporter oligonucleotide 1120 can comprise: (1) a hybridization sequence 1108 configured to hybridize with other oligonucleotides (e.g., the nucleic acid barcode molecules described herein); (2) a reporter sequence 1106 (also referred to as barcode sequence) that identifies the peptide 1103 and/or MHC molecule (such as the MCH allele) of a pMHC monomer 1102; and (3) a functional sequence 1104, such as a primer binding or additional hybridization sequence. In some instances, the reporter polynucleotide is not directly conjugated to the pMHC molecule 1102, but is hybridized to an additional nucleic acid molecule directly conjugated to the pMHC monomer 1102. For example, as shown in panel 1100B, the reporter oligonucleotide 1130 can comprise: (1) a hybridization sequence 1108 configured to hybridize with other oligonucleotides (e.g., the nucleic acid barcode molecules described herein); (2) a reporter sequence 1106 that identifies the peptide 1103 and/or MHC molecule (such as the MCH allele) of a pMHC monomer 1102; (3) a functional sequence 1104, such as a primer binding or additional hybridization sequence; and (4) a sequence complementary to a sequence 1112 conjugated to a pMHC monomer 1102. In other instances, the pMHC monomer is present in a complex as described elsewhere herein, e.g., in FIGS. 16A-C.

Figure 11B:
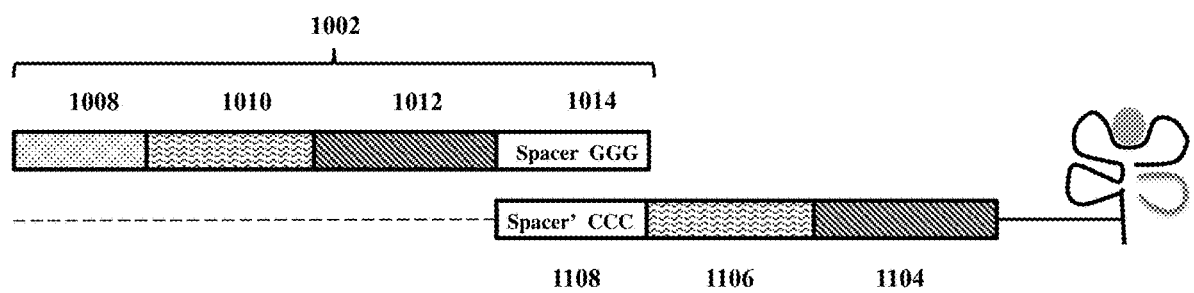
FIG. 11B is a schematic illustrating the generation of barcoded nucleic acid products using the pMHC molecules of FIG. 11A.

As shown in FIG. 11B, in some embodiments, hybridization sequence 1108 comprises a sequence complementary to sequence 1014 (see FIG. 10), which in some embodiments comprises a Spacer sequence and a poly G sequence (e.g., a ribo poly-G). Thus, in some instances, hybridization sequence 1108 comprises a reverse complement of the Spacer (Spacer) and a poly C sequence. In some embodiments, barcode molecule 1002 may at first be associated with a bead and optionally released from the bead using a stimulus as described elsewhere herein. In any case, though, oligonucleotide 1002 can hybridize with the reporter polynucleotide (e.g., 1120 or 1130). The hybridized oligonucleotides 1002 and 1120 or 1130 can then be extended in primer extension reactions such that constructs comprising sequences that correspond to each of the two barcode sequences 1010 and 1106 are generated. In some cases, one or both of these corresponding sequences may be a complement of the original sequence in oligonucleotide 1002 or 1120. One or both of the resulting constructs can be optionally further processed (e.g., to add any additional sequences and/or for clean-up) and subjected to sequencing. As described elsewhere herein, the sequence in such a construct derived from barcode sequence 1010 may be used to identify a partition or a cell within a partition and the sequence derived from barcode sequence 1106 may be used to identify the peptide bound to a particular TCR on the surface of the cell. Furthermore, barcode sequence 1010 and the sequence (e.g., 1022 or a portion thereof) corresponding to an immune receptor of a cell (e.g., a TCR) may be used to identify the immune receptor and associate the TCR with the peptide bound to, e.g., the T cell.

The nucleic acid barcode molecule can be present in the reaction volume at any suitable concentration. In some embodiments, the nucleic acid barcode molecule is present in the reaction volume at a concentration of about 0.2 µM, 0.3 µM, 0.4 µM, 0.5 µM, 1 µM, 5 µM, 10 µM, 15 µM, 20 µM, 25 µM, 30 µM, 35 µM, 40 µM, 50 µM, 100 µM, 150 µM, 200 µM, 250 µM, 300 µM, 400 µM, or 500 µM. In some embodiments, the nucleic acid barcode molecule is present in the reaction volume at a concentration of at least about 0.2 µM, 0.3 µM, 0.4 µM, 0.5 µM, 1 µM, 5 µM, 10 µM, 15 µM, 20 µM, 25 µM, 30 µM, 35 µM, 40 µM, 50 µM, 100 µM, 150 µM, 200 µM, 250 µM, 300 µM, 400 µM, 500 µM or greater. In some embodiments, the nucleic acid barcode molecule is present in the reaction volume at a concentration of at most about 0.2 µM, 0.3 µM, 0.4 µM, 0.5 µM, 1 µM, 5 µM, 10 µM, 15 µM, 20 µM, 25 µM, 30 µM, 35 µM, 40 µM, 50 µM, 100 µM, 150 µM, 200 µM, 250 µM, 300 µM, 400 µM, or 500 µM.

After operation 1052 (FIG. 10), the barcoded molecules (e.g., barcoded pMHC reporter polynucleotides and/or immune receptor sequences) can be further processed (e.g., the barcoded molecules may be amplified, have portions removed, or additional sequences added) and characterized as described elsewhere herein. In some embodiments, the barcoded molecules are sequenced directly. In some embodiments, the barcoded molecules are further processed (e.g., portions removed, additional sequences added) and then sequenced.

Figure 12:
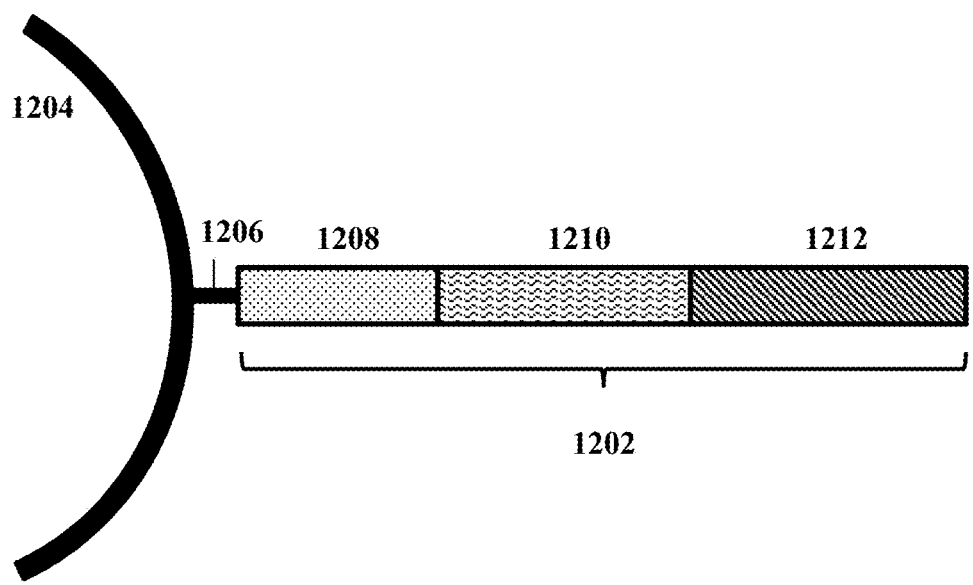
FIG. 12 is a schematic illustrating an exemplary nucleic acid barcode molecule structure for use in analysis of cellular analytes.

An additional example of a nucleic acid barcode molecule for use in RNA analysis, including cellular RNA analysis is shown in FIG. 12. As shown, the overall nucleic acid barcode molecule 1202 is coupled to a particle (e.g., bead) 1204, optionally by a releasable linkage 1206, such as a disulfide linker. The nucleic acid barcode molecule may include functional sequences that are used in subsequent processing, such as functional sequence 1208, which may include a sequencer specific flow cell attachment sequence, e.g., a P5 sequence, and/or a sequencing primer sequence, e.g., a R1 primer binding site, or partial sequences thereof. In some cases, sequence 1208 is a P7 sequence and/or a R2 primer binding site, or partial sequences thereof. A barcode sequence 1210 is included within the structure for use in barcoding the sample RNA. An additional sequence segment 1212 may be provided within the nucleic acid barcode molecule sequence. In some cases, this additional sequence can provide a unique molecular identifier (UMI) sequence segment, as described elsewhere herein. As will be appreciated, although shown as a single nucleic acid barcode molecule tethered to the surface of a particle, individual particles can include tens to hundreds of thousands or even millions of individual nucleic acid barcode molecules, where, as noted, the barcode segment or barcode sequence can be constant or relatively constant for a given particle, but where the variable or unique sequence segment will vary across an individual particle. In an example method of cellular RNA analysis using this barcode sequence, a T cell (e.g., as an individual T cell (e.g., after contact with pMHC monomers) or as a pMHC-T cell multiplet) is co-partitioned along with a barcode bearing particle (e.g., a barcode bearing bead) and other reagents such as RNA ligase and, optionally, a reducing agent into a partition (e.g., a droplet in an emulsion). The T cell is lysed while, optionally, the nucleic acid barcode molecules are released (e.g., via the action of the reducing agent) from the particle. The nucleic acid barcode molecules can then be ligated to the 5' end of mRNA transcripts while in the partitions (e.g., droplets) by RNA ligase to form barcoded nucleic acid molecules. Subsequent operations may include purification (e.g., via solid phase reversible immobilization (SPRI)) and further processing (shearing, ligation of functional sequences, subsequent amplification (e.g., via PCR), and sequencing) (e.g., of these barcoded nucleic acid molecules), and these operations may occur in bulk (e.g., outside the partition). In the case where a partition is a droplet in an emulsion, the emulsion can be broken and the contents of the droplet pooled for the additional operations.

Additional reagents that may be co-partitioned along with the barcode bearing particle may include nucleic acid molecules to block ribosomal RNA (rRNA) and nucleases to digest genomic DNA and cDNA from T cells. Alternatively, rRNA removal agents may be applied during additional processing operations. The configuration of the constructs generated by such a method can help minimize (or avoid) sequencing of the poly-T sequence during sequencing.

In some embodiments, the barcode (e.g., barcode sequence) can be appended to the 3' end of the template polynucleotide sequence (e.g., mRNA). Such configuration may be desired, for example, if the sequence at the 3' end of the template polynucleotide is desired to be analyzed.

In some embodiments, the barcode (e.g., barcode sequence) can be appended to the 5' end of a template polynucleotide sequence (e.g., mRNA). Such configuration may be desired, for example, if the sequence at the 5' end of the template polynucleotide is desired to be analyzed.

In some embodiments, a barcode (e.g., barcode sequence) can be appended to the 3' end of a first subset of the template polynucleotides, and a barcode can be appended to the 5' end of a second subset of the template polynucleotides. In some embodiments, the first subset of template polynucleotides and the second subset of template polynucleotides are appended to barcodes in the same partition (e.g., droplet). In some cases, the barcodes appended to the 3' ends of template polynucleotides are different from the barcodes appended to the 5' ends of template polynucleotides. For example, the barcodes appended to the 3' ends may have a different barcode sequence compared to the barcodes appended to the 5' end. In some cases, the barcodes appended to the 3' ends of template polynucleotides have the same barcode sequence as the barcodes appended to the 5' ends of template polynucleotides. In some cases, particle (e.g., beads) are used to deliver the nucleic acid barcode molecules to partitions (e.g., droplets). The different barcodes can be attached to the same or different particle.

A barcode sequence can be appended to the 5' end of a template polynucleotide sequence by any suitable method. In some cases, the template polynucleotide is a messenger RNA, mRNA, molecule. The barcode sequence can be appended to the 5' end of a template polynucleotide sequence by use of a primer containing the barcode sequence in a primer extension reaction. For example, the barcode may be present in a primer used for a primer extension reaction in which the template polynucleotide or a derivative thereof, for example an amplification product, is used as the template for primer extension. In some cases, the barcode may be present on a template switching oligonucleotide participating in a primer extension reaction. As an alternative, the barcode sequence can be appended to the 5' end of a template polynucleotide by ligating nucleic acid barcode molecule containing the barcode sequence directly to the template polynucleotide.

In another aspect, the present disclosure provides a method of appending a barcode sequence to the 5' end of a template polynucleotide sequence by a primer extension reaction using a primer comprising a barcode sequence and the template polynucleotide or a derivative thereof as the template for primer extension. The primer extension reaction may occur in a partition. In some embodiments, a T cell, or a nucleic acid derivative thereof (e.g., a nucleic acid molecule of a T cell encoding a TCR), is co-partitioned with a primer capable of primer extension and a template switching oligo containing a barcode sequence. The primer capable of primer extension may hybridize to the nucleic acid of the T cell or to a nucleic acid derivative (e.g., a nucleic acid molecule or nucleic acid derivative of a T cell encoding the TCR). In some cases, the template switching oligo containing the barcode sequence is releasably attached to a particle (e.g., a bead, such as a gel bead). In some embodiments, a T cell, or a nucleic acid derivative thereof, is co-partitioned with a primer having a sequence towards a 3' end that hybridizes to the template polynucleotide, a template switching oligonucleotide having a first predefined sequence towards a 5' end, and a particle (e.g., a microcapsule, such as a bead), having nucleic acid barcode molecules releasably coupled thereto. In some embodiments, the nucleic acid barcode molecules coupled to the particle include barcode sequences that are identical (e.g., all nucleic acid barcode molecules sharing the same barcode sequence). In some aspects, the nucleic acid barcode molecules coupled to the particles additionally include unique molecular identifier (UMI) sequence segments (e.g., all oligonucleotides having different unique molecular identifier sequences).

In another aspect, a barcode sequence is appended to the 5' end of a template polynucleotide sequence by ligating nucleic acid molecule containing a barcode sequence (e.g., a nucleic acid barcode molecule) directly to the 5' end of the template polynucleotide. Ligating a nucleic acid molecule containing a barcode sequence to a template polynucleotide can be implemented by various methods. In some embodiments herein, ligating nucleic acid molecule containing a barcode sequence to a template polynucleotide involves an enzyme, such as a ligase (e.g., an RNA ligase or a DNA ligase). Non-limiting examples of enzymes that can be used for ligation in embodiments herein include ATP-dependent double-stranded polynucleotide ligases, NAD+ dependent DNA or RNA ligases, and single-strand polynucleotide ligases. Non-limiting examples of ligases which can be used in embodiments herein include CIRCLIGASE™ I and CIRCLIGASE™ II (Epicentre; Madison, WI), *Escherichia coli* DNA ligase, *Thermus filiformis* DNA ligase, Tth DNA ligase, *Thermus scotoductus* DNA ligase (I and II), T3 DNA ligase, T4 DNA ligase, T4 RNA ligase, T7 DNA ligase, Taq ligase, AMPLIGASE™ (EpicentreTechnologies Corp.), VanC-type ligase, 9° N DNA Ligase, Tsp DNA ligase, DNA ligase I, DNA ligase III, DNA ligase IV, Sso7-T3 DNA ligase, Sso7-T4 DNA ligase, Sso7-T7 DNA ligase, Sso7-Taq DNA ligase, Sso7-*E. coli* DNA ligase, Sso7-Ampligase DNA ligase, and thermostable ligases. Ligase enzymes may be wild-type, mutant isoforms, and genetically engineered variants.

In some embodiments where a nucleic acid barcode molecule is ligated to a template polynucleotide containing mRNA, the mRNA molecule can be treated to yield a 5' monophosphate group prior to ligating. Any suitable reaction may be employed to yield a 5' monophosphate group. For example, the mRNA molecule can be treated with an enzyme such as a pyrophosphohydrolase. An example of a pyrophosphohydrolase that can be used in embodiments herein is RNA 5' phyrophosphohydrolase (RppH). In some cases, all of the phosphate groups at the 5' end of the molecule are removed and a single phosphate groups is added back to the 5' end. In some cases, two phosphate groups are removed from a triphosphate group to yield a monophosphate. In some cases, a single enzyme both removes the phosphate groups present on the mRNA molecule and adds the monophosphate group. In some cases, a first enzyme removes the phosphate groups present on the mRNA molecule and a second enzyme adds the monophosphate group. In some cases, the phosphate groups are removed from the 5' end of the mRNA molecule and the 5' end is adenylated. An enzyme which can be used for 5' adenylation in embodiments herein includes Mth RNA ligase.

In some cases, the nucleic acid molecule containing the barcode sequence (e.g., a nucleic acid barcode molecule) is ligated to the template polynucleotide within a partition (e.g., droplet or well). A partition, in some cases, includes a polynucleotide sample containing the template polynucleotide, a nucleic acid molecule having the barcode sequence, a ligase enzyme, and any other suitable reagents for ligation.

The ligase can implement the attachment of the nucleic acid molecule containing the barcode sequence to the template polynucleotide within the partition. In some cases, the template polynucleotide is an mRNA molecule and the nucleic acid molecule ligated to it is a DNA molecule. In some cases, the nucleic acid molecule containing the barcode sequence is ligated to the template polynucleotide outside of a partition.

Following the generation of barcoded nucleic acid molecules (e.g., barcoded template polynucleotides) or derivatives (e.g., amplification products) thereof, subsequent operations may be performed, including purification (e.g., via solid phase reversible immobilization (SPRI)) or further processing (e.g., shearing, addition of functional sequences, and subsequent amplification (e.g., via PCR)). Functional sequences, such as flow cell sequences, may be added by ligation. These operations may occur in bulk (e.g., outside the partition). In the case where a partition is a droplet in an emulsion, the emulsion can be broken and the contents of the droplet pooled for additional operations. Additional reagents that may be co-partitioned along with the barcode bearing particle may include oligonucleotides or nucleic acid molecules to block ribosomal RNA (rRNA) and nucleases to digest genomic DNA from T cells. Alternatively, rRNA removal agents may be applied during additional processing operations. The configuration of the constructs generated by such a method can help minimize (or avoid) sequencing of the poly-T sequence during sequencing and/or sequence the 5' end of a polynucleotide sequence. The amplification products, for example, first amplification products and/or second amplification products, may be subject to sequencing for sequence analysis.

Although operations with various barcode designs have been discussed individually, individual particle (e.g., beads) can include nucleic acid barcode molecules of various designs for simultaneous use, and in particular, to identify and characterize the TCRs expressed by T cells.

In addition to characterizing individual T cells or T cell sub-populations from larger populations, the processes and systems described herein may also be used to characterize individual T cells as a way to provide an overall profile of a cellular, or other organismal population. A variety of applications require the evaluation of the presence and quantification of different T cell or TCRs within a population of T cells, including, for example, microbiome analysis and characterization, environmental testing, food safety testing, epidemiological analysis, e.g., in tracing contamination or the like. In particular, the analysis processes described above may be used to individually characterize, sequence and/or identify large numbers of individual T cells within a population. This characterization may then be used to assemble an overall profile of the originating population, which can provide important prognostic and diagnostic information.

For example, shifts in human microbiomes, including, e.g., gut, buccal, or epidermal microbiomes, have been identified as being both diagnostic and prognostic of different conditions or general states of health. Using the single T cell analysis methods and systems described herein, one can again, characterize, sequence and identify individual T cells in an overall population, and identify shifts within that population that may be indicative of diagnostically relevant factors. Using the targeted amplification and sequencing processes described above can provide identification of individual T cells within a population of cells. One may further quantify the numbers of different T cells within a population to identify current states or shifts in states over time. See, e.g., Morgan et al, PLoS Comput. Biol., Ch. 12, December 2012, 8(12):e1002808, and Ram et al., Syst. Biol. Reprod. Med., June 2011, 57(3):162-170, each of which is incorporated herein by reference in its entirety for all purposes. Likewise, identification and diagnosis of infection or potential infection may also benefit from the single T cell analyses described herein, e.g., to identify microbial species present in large mixes of T cells and/or nucleic acids from T cells (e.g., nucleic acids encoding the TCR(s)) from diagnostically relevant environments, e.g., cerebrospinal fluid, blood, fecal or intestinal samples, or the like.

As described in the foregoing sections, analyses outlined herein may also be particularly useful in the characterization of potential drug resistance of different infective agents or cancer, through the analysis of distribution and profiling of TCRs, and different resistance markers/mutations across T cell populations in a given sample. Additionally, characterization of shifts in TCR profiles and these markers/mutations across populations of T cells over time can provide valuable insight into the progression, alteration, prevention, prognosis and treatment of a variety of diseases characterized by such drug resistance issues.

Similarly, analysis of different environmental samples to profile the microbial organisms, viruses, or other biological contaminants that are present within such samples, can provide important information about disease epidemiology, and potentially aid in forecasting disease outbreaks, epidemics, and pandemics.

As described above, the methods, systems and compositions described herein may also be used for analysis and characterization of other aspects of individual T cells or populations of T cells. In one example process, a sample is provided that contains T cells that are to be analyzed and characterized as to their TCR sequence. Also provided is a library of antibodies, antibody fragments, or other molecules having a binding affinity to the TCRs (or other cell features) for which the T cell is to be characterized (also referred to herein as TCR binding groups, or labelling agents). For a description of polynucleotide conjugated labelling agent compositions, methods, and systems, see, e.g., U.S. Pat. Nos. 9,951,386 and 10,480,029, the disclosure of each of which is incorporated by reference herein in its entirety for all purposes. For ease of discussion, these affinity groups are referred to herein as binding groups. The binding groups can include a reporter molecule that is indicative of the TCR to which the binding group binds. In particular, a binding group type that is specific to one type of TCR will include a first reporter molecule, while a binding group type that is specific to a different TCR will have a different reporter molecule associated with it. In some aspects, these reporter molecules will include nucleic acid molecule sequences. Oligonucleotide or nucleic acid molecule-based reporter molecules provide advantages of being able to generate significant diversity in terms of sequence, while also being readily attachable to most biomolecules, e.g., antibodies, as well as being readily detected, e.g., using sequencing or array technologies. In the example process, the binding groups include nucleic acid molecules attached to them. Thus, a first binding group type, e.g., antibodies to a TCR, will have associated with it a reporter nucleic acid molecule that has a first nucleotide sequence. Different binding group types, e.g., antibodies having binding affinity for other TCRs, will have associated therewith reporter nucleic acid molecules that contain different nucleotide sequences, e.g., having a partially or completely different nucleotide sequence. In some cases, for each type of cell surface feature (e.g., TCR) binding group, e.g., antibody or antibody fragment, the reporter nucleic acid molecule sequence may be known and readily identifiable as being associated with the known cell surface feature (e.g., TCR) binding group. These nucleic acid molecules may be directly coupled to the binding group, or they may be attached to a bead, molecular lattice, e.g., a linear, globular, cross-slinked, or other polymer, or other framework that is attached or otherwise associated with the binding group, which allows attachment of multiple reporter nucleic acid molecules to a single binding group.

In the case of multiple reporter molecules coupled to a single binding group, such reporter molecules can include the same sequence, or a particular binding group will include a known set of reporter nucleic acid barcode sequences. As between different binding groups, e.g., specific for different cell surface features (e.g., TCRs), the reporter molecules can be different and attributable to the particular binding group.

Attachment of the reporter groups to the binding groups may be achieved through any of a variety of direct or indirect, covalent or non-covalent associations or attachments. For example, in the case of nucleic acid molecule reporter groups associated with antibody based binding groups, such nucleic acid molecules may be covalently attached to a portion of an antibody or antibody fragment using chemical conjugation techniques (e.g., LIGHTNING-LINK® antibody labeling kits available from Innova Biosciences), as well as other non-covalent attachment mechanisms, e.g., using biotinylated antibodies and nucleic acid molecules (or beads that include one or more biotinylated linker, coupled to nucleic acid molecules) with an avidin or streptavidin linker. Antibody and nucleic acid molecule biotinylation techniques are available (See, e.g., Fang, et al., Nucleic Acids Res. 31(2):708-715, 2003; DNA 3' End Biotinylation Kit, available from Thermo Scientific, the full disclosures of which are incorporated herein by reference in their entirety for all purposes). Likewise, protein and peptide biotinylation techniques have been developed and are readily available (See, e.g., U.S. Pat. No. 6,265,552, the full disclosure of which is incorporated herein by reference in its entirety for all purposes).

The reporter nucleic acid molecules may be provided having any of a range of different lengths, depending upon the diversity of reporter molecules desired or a given analysis, the sequence detection scheme employed, and the like. In some cases, these reporter sequences can be greater than about 5 nucleotides in length, greater than about 10 nucleotides in length, greater than about 20, 30, 40, 50, 60, 70, 80, 90, 100, 120, 150 or even 200 nucleotides in length. In some cases, these reporter nucleotides may be less than about 250 nucleotides in length, less than about 200, 180, 150, 120 100, 90, 80, 70, 60, 50, 40, or even 30 nucleotides in length. In many cases, the reporter oligonucleotides may be selected to provide barcoded products that are already sized, and otherwise configured to be analyzed on a sequencing system. For example, these sequences may be provided at a length that ideally creates sequenceable products of a desired length for particular sequencing systems. Likewise, these reporter nucleic acid molecules may include additional sequence elements, in addition to the reporter sequence, such as sequencer attachment sequences, sequencing primer sequences, amplification primer sequences, or the complements to any of these.

In operation, a T cell-containing sample is incubated with the binding molecules and their associated reporter nucleic acid molecules, for any of the cell surface features (e.g., TCR) desired to be analyzed. Following incubation, the T cells are washed to remove unbound binding groups. Following washing, the T cells are partitioned into separate partitions, e.g., droplets, along with the barcode carrying particles (e.g., barcode carrying beads) described above, where each partition includes a limited number of T cells, e.g., in some cases, a single T cell (e.g., after contact with pMHC monomers) or as a pMHC-T cell multiplet. Upon releasing the barcodes from the particles, they will prime the amplification and barcoding of the reporter nucleic acid molecules. As noted above, the barcoded replicates of the reporter molecules may additionally include functional sequences, such as primer sequences (e.g., primer sequence complimentary to the nucleic acid sequence), attachment sequences or the like.

The barcoded reporter nucleic acid molecules are then subjected to sequence analysis to identify which reporter nucleic acid molecules bound to the polynucleotide-peptide conjugates and the T cells within the partitions (e.g., droplets). Further, by also sequencing the associated barcode sequence, one can identify that a given T cell surface feature (e.g., TCR) likely came from the same T cell as other, different T cell surface features (e.g., TCR), whose reporter sequences include the same barcode sequence, i.e., they were derived from the same partition.

Based upon the reporter molecules that emanate from an individual partition based upon the presence of the barcode sequence, one may then create a cell surface (e.g., TCR) profile of individual T cells from a population of T cells. Profiles of individual T cells or populations of T cells may be compared to profiles from other T cells, e.g., 'normal' or healthy T cells, or T cells from healthy or disease-free subjects (e.g., human) to identify variations in TCRs, which may provide diagnostically relevant information. In particular, these profiles may be particularly useful in the diagnosis of a variety of disorders that are characterized by variations in TCRs, such as cancer and other disorders.

The present disclosure also provides methods for reducing nonspecific priming in a single-cell 5' gene expression assay. In generating an assay that allows measurement of 1) a cell barcode sequence (barcode), 2) a unique molecular identifier sequence (UMI) and 3) the 5' sequence of an mRNA transcript simultaneously, one strategy is to place these sequences on a sequence that attaches to the 5' end of an mRNA transcript—in the present disclosure, this may be accomplished by placing the barcode and UMI on a template switching oligonucleotide (TSO). This oligonucleotide may be attached to the first strand cDNA via a template switching reaction where the reverse transcription (RT) enzyme 1) reverse transcribes a messenger RNA (mRNA) sequence into first-strand complementary DNA (cDNA) from a primer targeting the 3' end of the mRNA, 2) adds non-templated cytidines to the 5' end of the first-strand cDNA, 3) switches template to the TSO, which may contain 3' guanidines or guanidine-derivatives that hybridize to the added cytidines. The result is a first-strand cDNA molecule that is complementary to the TSO sequence: cell-barcode, UMI, guanidines, and the 5' end of the mRNA.

In some cases, the TSO may co-exist in solution with the RT enzyme and the total RNA contents of a T cell. If the TSO is a single stranded DNA (ssDNA) molecule, it can participate as an RT primer rather than as a template-switching substrate. Given, for example, that the over 90% of the total RNA contents of a T cell include noncoding ribosomal RNA (rRNA), this may produce barcoded off products that do not contribute to the 5' gene expression or V(D)J sequencing assay but do consume sequencing reads, increasing the cost required to achieve the same sequencing depth. In addition, if the UMI is implemented as a randomer, the presence of this randomer at the 3' end of the TSO greatly increases its ability to serve as a primer on rRNA template.

In some cases, a TSO that is less likely to serve as an RT primer via the introduction of a particular spacer sequence between the UMI and terminal riboGs may be used. Another approach is to design and include a set of auxiliary blocking oligonucleotides or nucleic acid molecules that may hybridize to rRNA and prevent binding of the TSO.

The spacer sequence can be optimized by selecting a sequence that minimizes the predicted melting temperature of the (spacer-GGG):rRNA duplex against all human ribosomal RNA molecules.

The blocker sequences can be optimized by selecting sequences that maximize the predicted melting temperature of the (blocker):rRNA duplex against all human ribosomal RNA molecules.

Provided herein are TSO that are less likely to serve as an RT primer via the introduction of a particular spacer sequence between the UMI and terminal riboGs. Additionally, described herein are auxiliary blocking oligonucleotides or nucleic acid molecules that hybridize to rRNA and prevent binding of the TSO. For a description of exemplary spacer sequences, blocker sequences, and full construct barcode molecule sequences for use with the compositions, methods and systems described herein, see, e.g., U.S. Pat. Pub. 2018/0105808, which is hereby incorporated by reference in its entirety for all purposes.

In some examples, a cell barcode may be a 16 base sequence that is a random choice from about 737,000 sequences. The length of the barcode (16) can be altered. The diversity of potential barcode sequences (737k) can be alterable. The defined nature of the barcode can be altered, for example, it may also be completely random (16 Ns) or semi-random (16 bases that come from a biased distribution of nucleotides).

The canonical UMI sequence may be a 10 nucleotide randomer. The length of the UMI can be altered. The random nature of the UMI can be altered, for example, it may be semi-random (bases that come from a biased distribution of nucleotides). In a certain case, the distribution of UMI nucleotide(s) may be biased; for example, UMI sequences that do not contain Gs or Cs may be less likely to serve as primers.

The spacer may be alterable within given or predetermined parameters.

The selected template switching region can include 3 consecutive riboGs or more. The selected template switching region can include 4, 5, 6, 7, 8, 9, 10, 11, 12, 13, 14, 15, 16, 17, 18, 19, 20 consecutive riboGs, or more. Alternative nucleotide may be used, such as deoxyribo Gs, LNA G's, and potentially any combination thereof.

The present disclosure also provides methods of enriching cDNA sequences. Enrichment may be useful for TCR gene analysis since these genes may possess similar yet polymorphic variable region sequences. These sequences can be responsible for antigen binding and peptide-MHC interactions. For example, due to gene recombination events in individual developing T cells, a single human or mouse will naturally express many thousands of different TCR genes.

This T cell repertoire can exceed 100,000 or more different TCR rearrangements occurring during T cell development, yielding a total T cell population that is highly polymorphic with respect to its TCR gene sequences especially for the variable region. As previously noted, each distinct sequence may correspond to a clonotype. In certain embodiments, enrichment increases accuracy and sensitivity of methods for sequencing TCR genes at a single T cell level. In certain embodiments, enrichment increases the number of sequencing reads that map to a TCR. In some embodiments, enrichment leads to greater than or equal to 25%, 30%, 35%, 40%, 45%, 50%, 55%, 60%, 65%, 70%, 75%, 80%, 85%, 90%, 95% or more of total sequencing reads mapping to a TCR. In some embodiments, enrichment leads to greater than or equal to 25%, 30%, 35%, 40%, 45%, 50%, 55%, 60%, 65%, 70%, 75%, 80%, 85%, 90%, 95% or more of total sequencing reads mapping to a variable region of a TCR.

In order to aide in sequencing, detection, and analysis of sequences of interest, an enrichment step can be employed. Enrichment may be useful for the sequencing and analysis of genes (e.g., TCR genes) that may be related yet highly polymorphic. In some embodiments, an enriched gene includes a TCR sequence. In some embodiments, an enriched gene includes a mitochondrial gene or a cytochrome family gene. In some embodiments, enrichment is employed after an initial round of reverse transcription (e.g., cDNA production). In some embodiments, enrichment is employed after an initial round of reverse transcription and cDNA amplification for at least 5, 10, 15, 20, 25, 30, 40 or more cycles. In some embodiments, enrichment is employed after a cDNA amplification. In some embodiments, the amplified cDNA can be subjected to a clean-up step before the enrichment step using a column, gel extraction, or beads in order to remove unincorporated primers, unincorporated nucleotides, very short or very long nucleic acid fragments and enzymes. In some embodiments, enrichment is followed by a clean-up step before sequencing library preparation.

Enrichment of gene or cDNA sequences can be facilitated by a primer that anneals within a known sequence of the target gene. In some embodiments, for enrichment of a TCR gene, a primer that anneals to a constant region of the gene or cDNA can be paired with a sequencing primer that anneals to a TSO functional sequence. In some embodiments, the enriched cDNA falls into a length range that approximately corresponds to variable region of that gene. In some embodiments, greater than about 50%, 60%, 70%, 80%, 85%, 90%, 95% or more cDNA or cDNA fragments fall within a range of about 300 base pairs to about 900 base pairs, of about 400 base pairs to about 800 base pairs, of about 500 base pairs to about 700 base pairs, or of about 500 base pairs to about 600 base pairs.

Figure 14:
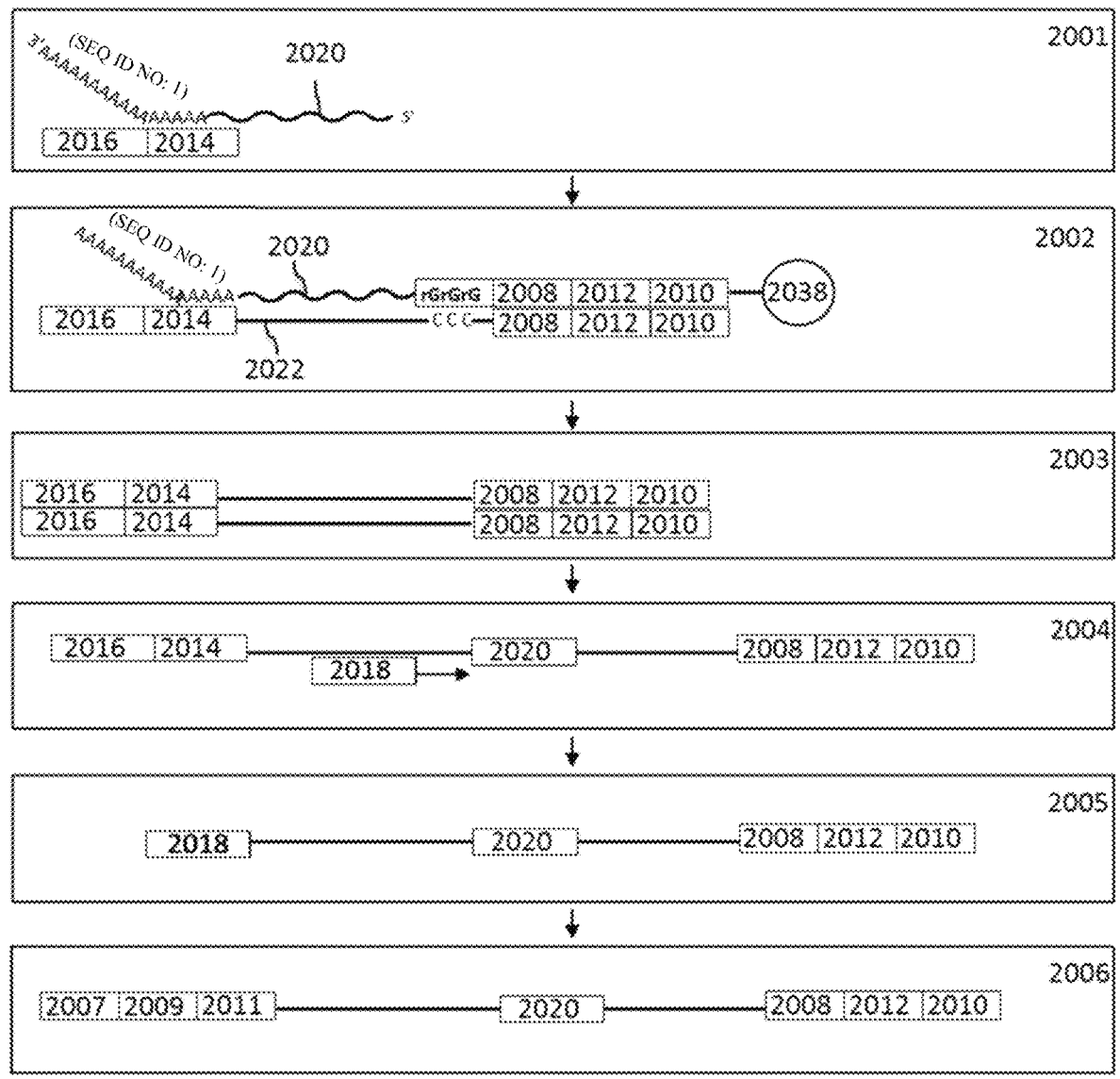
FIG. 14 is a schematic illustrating a method for enriching V(D)J sequences from TCRs.

FIG. 14 shows an example enrichment scheme. In operation 2001, an oligonucleotide or a nucleic acid molecule with a poly-T sequence 2014, and in some cases an additional sequence 2016 that binds to, for example, a sequencing or PCR primer, anneals to a target RNA 2020. In operation 2002, the oligonucleotide or nucleic acid molecule is extended yielding an anti-sense strand 2022, which is appended by multiple cytidines on the 3' end. A template switching oligonucleotide attached to a particle (e.g., gel bead) 2038 is provided and a riboG of the TSO pairs with the cytidines of the sense strand and is extended to create a sense and an antisense strand. In some cases, the template switching oligonucleotide is released from the particle during extension. In some cases, the template switching oligonucleotide is released from the particle prior to extension. In some cases, the template switching oligonucleotide is released from the particle after extension. In addition to the riboG sequence, the TSO includes a barcode 2012 and one or two additional functional sequences 2008 and 2012. The additional functional sequences can include a UMI, a P5, P7, R1 and/or R2 sequence, for example. Operations 2001 and 2002 may be performed in a partition (e.g., droplet or well). Subsequent to operation 2002, the nucleic acid product from operations 2001 and 2002 may be removed from the partition and in some cases pooled with other products from other partitions for subsequent processing.

Next, additional functional sequences can be added that allow for amplification or sample identification. This may occur in a partition or in bulk. This reaction yields amplified cDNA molecules as in 2003 which are mixed templates containing a barcode and sequencing primers. In some cases, not all of these cDNA molecules will contain a target variable region sequence. In one enrichment scheme, shown in operation 2004, a primer 2018 that anneals to a sequence 3' of a TCR variable region 2020 specifically amplifies the variable region containing cDNAs, yielding products as shown in operation 2005. Such enrichment may be performed for various approaches described herein, such as, e.g., the approaches described above in the context of FIGS. 9 and 10.

In certain aspects, primer 2018 anneals in a constant region of a TCR (e.g., TCR-alpha or TCR-beta) gene. After amplification the products are sheared, adaptors ligated and amplified a second time to add additional functional sequences 2007 and 2011 and a sample index 2009 as shown in operation 2006. The additional functional sequences can functionally complement the first pair 2008 and 2010 and comprise for example a P5 or R1 sequence. In some embodiments, the initial poly-T primer, containing sequences 2016 and 2014 can be attached to a particle (e.g., gel bead) as opposed to the TSO. In some embodiments, the poly-T containing primer includes functional sequences and barcode sequences 2008, 2010, 2012, and the TSO includes sequence 2016. Operations 2003-2006 may be performed in bulk.

In some embodiments, clonotype information derived from next-generation sequencing data of cDNA prepped from cellular RNA is combined with other targeted or non-targeted cDNA enrichment to illuminate functional and ontological aspects of T cells that express a given TCR. In some embodiments, clonotype information is combined with analysis of expression of an immunologically relevant cDNA. In some embodiments, the cDNA encodes a cell lineage marker, a cell surface functional marker, immunoglobulin isotype, a cytokine and/or chemokine, an intracellular signaling polypeptide, a cell metabolism polypeptide, a cell-cycle polypeptide, an apoptosis polypeptide, a transcriptional activator/inhibitor, a miRNA or lncRNA.

Also disclosed herein are methods and systems for reference-free clonotype identification. Such methods may be implemented by way of software executing algorithms. Tools for assembling TCR sequences may use known sequences of V and C regions to "anchor" assemblies. This may make such tools only applicable to organisms with well characterized references (human and mouse). However, most mammalian TCRs have similar amino acid motifs and similar structure. In the absence of a reference, a method can scan assembled transcripts for regions that are diverse or semi-diverse, find the junction region which should be highly diverse, then scan for known amino acid motifs. In some cases, it may not be critical that the complementary CDRs, such as the CDR1, CDR2, or CDR3, region be accurately delimited, only that a diverse sequence is found that can uniquely identify the clonotype. One advantage of this method is that the software may not require a set of reference sequences and can operate fully de novo, thus this method can enable immune research in eukaryotes with poorly characterized genomes/transcriptomes.

The methods described herein allow simultaneously obtaining single-cell gene expression information with single-cell immune receptor sequences (e.g., TCRs) as well as analyzing peptide TCR interactions-all from the same single cell. This can be achieved using the methods described herein, such as by amplifying genes relevant to T cell function and state (either in a targeted or unbiased way) while simultaneously amplifying the TCR sequences for clonotyping. This can allow such applications as: (1) interrogating changes in T cell activation/response to an antigen, at the single clonotype or single cell level; or (2) classifying T cells into subtypes based on gene expression while simultaneously sequencing their TCRs. UMIs are typically ignored during TCR (or generally transcriptome) assembly.

Key analytical operations involved in clonotype sequencing according to the methods described herein include: (1) Assemble each UMI separately, then merge highly similar assembled sequences. High depth per molecule in TCR sequencing makes this feasible. This may result in a reduced chance of "chimeric" assemblies; (2) Assemble all UMIs from each cell together but use UMI information to choose paths in the assembly graph. This is analogous to using barcode and read-pair information to resolve "bubbles" in WGS assemblies; (3) Base quality estimation. UMI information and alignment of short reads may be used to assemble contigs to compute per-base quality scores. Base quality scoring may be important as a few base differences in a CDR sequence may differentiate one clonotype from another. This may be in contrast to other methods that rely on using long-read sequencing.

Thus, base quality estimates for assembled contigs can inform clonotype inference. Errors can make cells with the same (real) clonotype have mismatching assembled sequences. Further, combining base-quality estimates and clonotype abundances to correct clonotype assignments. For example, if 10 T cells have clonotype X and one T cell has a clonotype that differs from X in only a few bases and these bases have low quality, then this T cell may be assigned to clonotype X. In some embodiments, clonotypes that differ by a single amino acid or nucleic acid may be discriminated. In some embodiments, clonotypes that differ by less than 50, 40, 30, 20, 15, 10, 9, 8, 7, 6, 5, 4, 3, or 2 amino acids or nucleic acids may be discriminated. An example, non-limiting, base error calculation scheme is shown below in Example VII.

Also provided herein are the microfluidic devices used for partitioning the T cells as described above. Such microfluidic devices can comprise channel networks for carrying out the partitioning process, like those set forth in FIGS. 1-7. Briefly, these microfluidic devices can comprise channel networks, such as those described herein, for partitioning T cells into separate partitions, and co-partitioning such T cells with nucleic acid barcode molecule library members, e.g., disposed on particles (e.g., beads). These channel networks can be disposed within a solid body, e.g., a glass, semiconductor or polymer body structure in which the channels are defined, where those channels communicate at their termini with reservoirs for receiving the various input fluids, and for the ultimate deposition of the partitioned T cells, from the output of the channel networks. By way of example, and with reference to FIG. 2, a reservoir fluidly coupled to channel 202 may be provided with an aqueous suspension of T cells 214, while a reservoir coupled to channel 204 may be provided with an aqueous suspension of particles (e.g., beads) 216 carrying the nucleic acid barcode molecules. Channel segments 206 and 208 may be provided with a non-aqueous solution, e.g., an oil, into which the aqueous fluids are partitioned as droplets at the channel junction 212. Finally, an outlet reservoir may be fluidly coupled to channel 210 into which the partitioned T cells and particles can be delivered and from which they may be harvested. As will be appreciated, while described as reservoirs, the channel segments may be coupled to any of a variety of different fluid sources or receiving components, including tubing, manifolds, or fluidic components of other systems.

Also provided are systems that control flow of these fluids through the channel networks e.g., through applied pressure differentials, centrifugal force, electrokinetic pumping, capillary or gravity flow, or the like.

Detecting pMHC TCR Binding for TCR Repertoire Profiling

Genetically programmed variability of TCRs and immunoglobulins (Ig) underlies immune recognition of diverse antigens. The sum of all TCRs of a subject (e.g., human) is termed the TCR repertoire, TCR profile, or TCR repertoire profile. The TCR sequence of T cells (e.g., the TCR sequence obtained by one or more methods described herein) from a subject (e.g., a human) may be combined to obtain the TCR repertoire profile of the subject. The selection of TCRs (e.g., V(D)J recombination) can dramatically alter the TCR repertoire in a subject either transiently or permanently during a disease (e.g., a cancer, an infectious disease (e.g., a bacterial infection, a viral infection, a parasitic infection, or a fungal infection), an inflammatory disease, or an autoimmune disease) and/or following treatment with a therapeutic agent (e.g., a drug and/or a vaccine). A relationship between TCR selection (e.g., V(D)J recombination) and a healthy state (e.g., the absence of a disease state), a disease state (e.g., the presence of a disease, such as cancer, an infectious disease (e.g., a bacterial infection, a viral infection, a parasitic infection, or a fungal infection), an inflammatory disease, or an autoimmune disease) and/or responsiveness to treatment with a therapeutic agent (e.g., a drug and/or a vaccine) may be established by: (i) determining the TCR repertoire profile of a test subject (e.g., a test subject who is affected by a disease and/or is treated with a therapeutic agent); and (ii) comparing the profile of the test subject to the TCR repertoire profile of a reference subject (e.g., a healthy subject, a diseased subject, and/or a subject treated, or not treated, with the therapeutic agent). The TCR repertoire profile of a subject (e.g., a test subject or a reference subject) may be obtained by: (i) presentation of a peptide of interest (e.g., a peptide associated with a disease (e.g., a peptide from a tumor antigen, a peptide from an infective agent (e.g., a bacterium, a virus, a parasite, or a fungus), or a peptide from a self-antigen (e.g., a self-antigen listed in Table 1)), or a peptide from a therapeutic agent (e.g., a vaccine or a drug)) as a pMHC to a T cell; (ii) recognition (e.g., engagement) of the pMHC by a TCR(s) on a T cell(s) obtained from the subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) encoding the TCR(s) from the T cell(s) by the methods described herein; and (v) combining the nucleic acid sequence(s) encoding the TCR(s) from the individual T cell(s) of the subject to obtain the TCR repertoire profile of the subject.

In some instances, a pMHC-TCR complex may be formed by recognition and binding of pMHC molecules to TCRs on T cells. The pMHC-T cell multiplets (e.g., pMHC molecules bound to a TCR on the surface of a T cell) may then be prepared, e.g., by partitioning into partitions, such as droplets. In some instances, the pMHC-T cell multiplets may be lysed in the partitions to release cellular nucleic acids (e.g., immune receptor molecules) for subsequent analysis. The polynucleotide attached to the pMHC of the pMHC-TCR complex is capable of hybridizing with barcode molecules (e.g., nucleic acid barcode molecules) that are co-partitioned into the partition. Barcoded nucleic acid molecules may be formed through hybridization of the polynucleotide of the pMHC complex with the nucleic acid barcode molecule that contains a sequence complimentary to a sequence of the polynucleotide. The barcoded nucleic acid molecule can be processed (e.g., amplified, such as by PCR) and sequenced for detection of binding of the peptide to T cells (e.g., by detecting the presence of the reporter polynucleotide attached to the pMHC molecule). The method can further include obtaining the nucleic acid sequence(s) encoding the TCR, as described herein.

Also featured herein are methods for establishing a relationship between TCR selection (e.g., V(D)J recombination) and a healthy state, a disease state (e.g., the presence of a disease, such as cancer, infectious disease (e.g., a bacterial infection, a viral infection, a parasitic infection, or a fungal infection), an inflammatory disease, or an autoimmune disease), and/or responsiveness of a subject, or not, to treatment with a therapeutic agent (e.g., a drug and/or a vaccine). For example, a relationship between TCR selection (e.g., V(D)J recombination) and a healthy state or a disease state (e.g., the presence of a disease, such as cancer, an infectious disease (e.g., a bacterial infection, a viral infection, a parasitic infection, or a fungal infection), an inflammatory disease, or an autoimmune disease) may be established by: (i) determining the TCR repertoire profile of a test subject(s) who is/are affected with the disease (e.g., a patient(s) with the disease) by one or more methods described herein; and (ii) comparing the profile of the test subject to the TCR repertoire profile of a reference subject(s) (e.g., a healthy subject(s) and/or a diseased subject(s)). Establishing a relationship between TCR selection and the presence or absence of a disease state may be useful for diagnostic and/or therapeutic applications, such as diagnosis of the disease, disease prognosis (e.g., predicting chance of recovery from the disease), and/or determining the responsiveness of a subject to a treatment for the disease (e.g., by developing therapeutic agent(s)). Once a relationship has been established, the information can be used to assess the condition of a subject in which the presence of disease may be unknown by comparing the subject's TCR repertoire profile to that of a healthy or diseased reference subject or to the equivalent information contained with a TCR repertoire database, such as a database described herein.

Additionally, or alternatively, a relationship between TCR selection (e.g., V(D)J recombination) and treatment with a therapeutic agent (e.g., a drug and/or a vaccine) may be established by: (i) determining the TCR repertoire profile of a test subject(s) who is/are treated with the therapeutic agent by one or more methods described herein; and (ii) comparing the profile of the test subject to the TCR repertoire profile of a reference subject(s) (e.g., a subject(s) not exposed to the therapeutic agent, such as an untreated subject(s)). Establishing a relationship between TCR selection and treatment with a therapeutic agent may be useful for diagnostic and/or therapeutic application(s), such as for determining whether a test subject that has not yet been treated with the therapeutic agent will likely be responsive to the therapeutic agent, in order to establish a therapeutic strategy for treatment of the subject (e.g., treating a responsive subject with the therapeutic agent and/or finding alternative therapeutic agent(s) for treating a non-responsive subject).

In some embodiments, the methods, compositions, and systems disclosed herein can be used to analyze the sequences of different TCRs from T cells, for example different clonotypes. In some embodiments, the methods, compositions, and systems disclosed herein can be used to analyze the sequence of a TCR alpha chain, a TCR beta chain, a TCR delta chain, a TCR gamma chain, or any fragment thereof (e.g., variable regions including V(D)J or VJ regions, constant regions, transmembrane regions, fragments thereof, combinations thereof, and combinations of fragments thereof).

Building a TCR Sequence Database

The disclosed methods can be used to characterize nucleic acid molecules from T cells encoding TCRs (e.g., by sequencing nucleic acid molecules encoding the TCR), annotate the TCR sequences, profile the TCR repertoire, and/or establish a relationship between TCR selection and a healthy state, a disease state, and/or responsiveness to treatment with a therapeutic agent. Specifically, the disclosed methods can be used to characterize or sequence one or more, or all, TCRs from individual T cells, including, but not limited to, T cells from a subject, such as a healthy subject, a subject with a disease (e.g., a cancer, an infectious disease (e.g., a bacterial infection, a viral infection, a parasitic infection, or a fungal infection), an inflammatory disease, or an autoimmune disease), a subject treated with a therapeutic agent (e.g., a drug and/or a vaccine), and/or a subject not treated with a therapeutic agent (e.g., an untreated subject, or a subject not exposed to a therapeutic agent), or T cells from a cell culture (e.g., a T cell culture generated from a subject, a T cell line, or a T cell repository). The disclosed methods can also be used to annotate the TCR sequence and to attribute the TCR sequence and/or TCR selection (e.g., V(D)J recombination) to a healthy state, a disease state (e.g., the presence of a disease, such as a cancer, an infectious disease (e.g., a bacterial infection, a viral infection, a parasitic infection, or a fungal infection), an inflammatory disease, or an autoimmune disease), and/or to responsiveness to treatment with a therapeutic agent (e.g., a drug and/or a vaccine). The disclosed methods can also be used to obtain the TCR repertoire profile of a subject (e.g., a human), such as a healthy subject, a subject with a disease (e.g., a cancer, an infectious disease (e.g., a bacterial infection, a viral infection, a parasitic infection, or a fungal infection), an inflammatory disease, or an autoimmune disease), a subject treated with a therapeutic agent (e.g., a drug and/or a vaccine), and/or a subject not treated with a therapeutic agent (e.g., an untreated subject, or a subject not exposed to a therapeutic agent). The disclosed methods can also be used to establish the relationship between TCR selection (e.g., V(D)J recombination) and a healthy state, a disease state (e.g., the presence of a disease, such as cancer, an infectious disease (e.g., a bacterial infection, a viral infection, a parasitic infection, or a fungal infection), an inflammatory disease, or an autoimmune disease), and/or responsiveness to treatment with a therapeutic agent (e.g., a drug and/or a vaccine). Information obtained using the methods and systems disclosed herein may be pooled, combined, assembled, and/or aggregated to build a TCR sequence database.

A TCR sequence database may serve as a uniform platform that stores and contains: (i) TCR sequence(s) from individual T cells, including, but not limited to, T cells from a cell culture (e.g., a T cell culture generated from a subject, a T cell line, or a T cell repository), T cells from subject, such as a healthy subject, a subject with a disease (e.g., a cancer, an infectious disease (e.g., a bacterial infection, a viral infection, a parasitic infection, or a fungal infection), an inflammatory disease, or an autoimmune disease), a subject that can be treated with a therapeutic agent (e.g., a drug and/or a vaccine), and/or a subject that is not treatable with a therapeutic agent; (ii) TCR sequences and/or TCR selection (e.g., V(D)J recombination) information annotated to a healthy state, a disease state (e.g., a disease, such as cancer, an infectious disease (e.g., a bacterial infection, a viral infection, a parasitic infection, or a fungal infection), an inflammatory disease, or an autoimmune disease), and/or responsiveness to treatment with a therapeutic agent (e.g., a drug and/or a vaccine); (iii) TCR repertoire profile of a subject (e.g., a human), such as a healthy subject, a subject with a disease (e.g., a cancer, an infectious disease (e.g., a bacterial infection, a viral infection, a parasitic infection, or a fungal infection), an inflammatory disease, or an autoimmune disease), a subject treated with a therapeutic agent (e.g., a drug and/or a vaccine), and/or a subject not treated with a therapeutic agent (e.g., an untreated subject, or a subject not exposed to a therapeutic agent); and/or (iv) information on a relationship between TCR selection (e.g., V(D)J recombination) and a healthy state, a disease state (e.g., a disease, such as cancer, infectious disease (e.g., a bacterial infection, a viral infection, a parasitic infection, or a fungal infection), an inflammatory disease, or an autoimmune disease), and/or treatment with a therapeutic agent (e.g., a drug and/or a vaccine).

A TCR sequence database built by the methods and systems disclosed herein may be useful for diagnostic and/or therapeutic applications, such as: (i) diagnosis of a disease (e.g., cancer, an infectious disease (e.g., a bacterial infection, a viral infection, a parasitic infection, or a fungal infection), an inflammatory disease, or an autoimmune disease); (ii) prognosis of a disease (e.g., predicting chance of recovery from a disease, such as cancer, an infectious disease (e.g., a bacterial infection, a viral infection, a parasitic infection, or a fungal infection), an inflammatory disease, or an autoimmune disease); (iii) determining the antigenic target in the context of a disease, such as a tumor antigen for a cancer, an infective agent (e.g., a bacterium, a virus, a parasite, or a fungi) for an infectious disease, a self-antigen for an autoimmune and/or an inflammatory disease (e.g., a self-antigen listed in Table 1); (iv) determining responsiveness of a subject (e.g., a human) to a therapeutic agent (e.g., a drug and/or a vaccine); (v) selecting a therapeutic strategy (e.g., based on responsiveness of a subject to a therapeutic agent); (vi) developing an antigen-specific diagnostic marker(s) (e.g., for diagnosis of an infective agent, a tumor antigen, or a self-antigen); and/or (vii) developing a therapy, whether immunizing or tolerizing, such as developing a vaccine (e.g., against an infective agent or a tumor), developing cancer immunotherapy, developing an anti-inflammatory drug, or developing a personalized medicine.

Such a TCR sequence database may be built by methods known to those skilled in the art, such as the methods described by Shugay et al. (*Nucleic Acids Research*, 46:D419-D427 (2018)).

Applications of pMHC-T Cell Binding

The methods described herein can be used to detect binding between an antigenic peptide within a pMHC and a TCR. The methods described herein can be used to identify the antigenic target(s) of TCR(s) in the context of various disease (e.g., a tumor antigen for cancer, an infective agent (e.g., a bacterium, a virus, a parasite, or a fungus) for infectious disease, a self-antigen for autoimmune and/or inflammatory disease (e.g., a self-antigen listed in Table 1), and/or immune responses (e.g., following treatments with a therapeutic agent (e.g., a vaccine and/or a drug)). The present disclosure also features methods for the identification and discovery of T cell targets in numerous diseases, with implications for understanding the basic mechanism of the immune response and for developing an antigen-specific diagnostic marker and therapy, whether immunizing or tolerizing, such as for developing a vaccine, a cancer immunotherapy, or an anti-inflammatory drug. Moreover, once pMHC binding is detected (e.g., by using a reporter conjugated pMHC molecule) and TCR(s) are characterized, cloned TCR(s) can be used to formulate a personalized immunotherapy (e.g., a personalized cancer immunotherapy). Also, the methods described herein can be used for diagnostic applications (e.g., for diagnosis of a disease, such as a cancer of an infectious disease). Additionally, the methods described herein can be used for determining responsiveness of a subject (e.g., a human, such as a patient) to a therapeutic agent (e.g., a vaccine or a drug (e.g., a chemotherapeutic agent)).

Therapeutic Applications of Detecting pMHC TCR Binding

Detecting pMHC TCR binding by one or more methods described herein may be useful for monitoring the dynamics of TCR repertoire during a disease (e.g., a cancer, an infectious disease, an inflammatory disease, or an autoimmune disease), so as to understand the involvement and the role of the TCR(s) during the disease. Expression of the TCR(s) can then be manipulated (e.g., the TCR(s) may be expressed or depleted on T cell(s), or T cell(s) expressing the TCR(s) may be manipulated, such as expanded or depleted) for therapeutic purposes, such as for development of therapeutic approaches for treating a disease stated involving T cell activation. For example, using the methods described herein, TCR(s) that drive the progress of and/or increase the symptoms associated with a disease (e.g., a cancer, an infectious disease, an inflammatory disease, or an autoimmune disease) may be identified on T cell(s). The TCR(s) or T cells expressing such TCRs may be depleted as a therapeutic approach to treat the disease. Alternatively, TCR(s) that cure, inhibit the progress of, and/or reduce the symptoms associated with a disease (e.g., a cancer, an infectious disease, an inflammatory disease, or an autoimmune disease) may be identified on T cell(s). The TCR(s) or T cell(s) expressing such TCR(s) may be expanded in, or provided to, a subject as a therapeutic approach for treating the disease.

Detecting pMHC TCR binding by one or more methods described herein may also be useful for monitoring dynamics of TCR repertoire during an immune response (e.g., immune response to a therapeutic agent (e.g., a vaccine or a drug)), so as to understand the involvement and role of the TCR(s) during the immune response. Expression of the TCR(s) can then be manipulated (e.g., the TCR(s) may be expressed or depleted on T cell(s), or T cell(s) expressing the TCR(s) may be manipulated, such as expanded or depleted) for therapeutic purpose. For example, TCR(s) that drive immune response to a vaccine (e.g., induce memory cell generation following administration of the vaccine) may be expressed on T cell(s) or T cell(s) expressing such TCR(s) may be expanded as a therapeutic approach to increase the efficiency and/or efficacy of that vaccine; or TCR(s) that drive immune response to a drug (e.g., induce anti-tumor response following administration of a chemotherapeutic drug, induce inflammatory response following administration of a drug targeting an infective agent (e.g., a drug targeting a bacteria, virus, parasite or fungus), or induce tolerogenic, regulatory and/or anti-inflammatory response following administration of an anti-inflammatory drug) may be expressed on T cell(s) or T cell(s) expressing such TCR(s) may be expanded in, or provided to, a subject as a therapeutic approach to increase the efficiency and/or efficacy of that drug.

Moreover, TCR profiling by one or more methods described herein may also be useful for recognizing antigenic target(s) of TCR(s) in the context of a disease (e.g., a cancer, an infectious disease, an inflammatory disease, or an autoimmune disease) and/or an immune response (e.g., immune response to a therapeutic agent (e.g., a vaccine or a drug)). Following recognition of antigenic target(s), expression of TCR(s) may be manipulated (e.g., the TCR(s) may be expressed or depleted on T cell(s) or T cell(s) expressing the TCR(s) may be manipulated, such as expanded or depleted) for therapeutic purposes. For example, TCR(s) that recognize pMHC monomer(s) having an antigen(s) in the context of a cancer (e.g., a cancer antigen or a tumor antigen) may be expressed on T cell(s) or T cell(s) expressing such TCR(s) may be expanded in, or provided to, a subject as a therapeutic approach for treating the cancer.

TCR(s) that recognize pMHC monomer(s) having an antigen(s) in the context of an infectious disease (e.g., an infective agent, such as bacteria, virus, parasite, or fungus) may be expressed on T cell(s) or T cell(s) expressing such TCR(s) may be expanded in, or provided to, a subject as a therapeutic approach for treating the infectious disease.

TCR(s) that recognize pMHC monomer(s) having an antigen(s) in the context of an autoimmune disease and/or an inflammatory disease (e.g., a self-antigen, such as a self-antigen listed in Table 1) may be depleted on T cell(s) or T cell(s) expressing such TCR(s) may be depleted as a therapeutic approach to treat the autoimmune disease and/or the inflammatory disease.

TCRs that recognize pMHC monomer(s) having an antigen(s) (e.g., a peptide antigen) associated with a therapeutic agent (e.g., a vaccine or a drug) and/or that trigger an immune response to a therapeutic agent (e.g., a vaccine or a drug) may be expressed on T cell(s) or T cell(s) expressing such TCR(s) may be expanded in, or provided to, a subject as a therapeutic approach to increase the efficiency and/or efficacy of that therapeutic agent.

Diagnostic Applications of TCR Profiling

TCR profiling by one or more methods described herein may be useful for diagnosis of a disease (e.g., a cancer, an infectious disease, an inflammatory disease, or an autoimmune disease) in a subject (e.g., a test subject, such as a human). For diagnosis of a disease in a test subject, the TCR repertoire profile of the test subject may be compared to the TCR repertoire profile of one or more reference subjects (e.g., reference subjects diagnosed with the disease and/or reference subjects diagnosed to be healthy or free of the disease). For diagnosis of a disease in a test subject, the TCR repertoire profile of the test subject may be obtained by: (i) presentation of a peptide of interest (e.g., a peptide associated with the disease, such as a peptide from a tumor antigen, a peptide from an infective agent (e.g., bacteria, virus, parasite or fungus), or a peptide from a self-antigen (e.g., a self-antigen listed in Table 1)) as a pMHC monomer(s) to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate or the nucleic acids sequence(s) encoding the TCR(s) from the T cell(s) by the methods described herein; and (v) combining the nucleic acid sequence(s) of the polynucleotide-peptide conjugate or the nucleic acids sequences encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects diagnosed with the disease and/or reference subjects diagnosed to be healthy or free of the disease) is stored). In addition, the methods of diagnosis can include obtaining the TCR repertoire profile(s) of a test subject by sequencing the TCR(s) expressed in T cell(s) from the test subject (e.g., obtained from a blood sample of the test subject), e.g., using the methods described herein, and comparing the TCR repertoire profile(s) of a test subject to the TCR repertoire profile(s) of a reference subject (e.g., a healthy or diseased subject) or to a database.

For example, a test subject (e.g., a human) may be diagnosed as having a disease (e.g., a cancer, an infectious disease, an inflammatory disease, or an autoimmune disease) by: (i) obtaining the TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the disease, and/or comparing the TCR repertoire profile of the test subject to the TCR repertoire profile of one or more reference subjects diagnosed to be healthy or free of the disease; and (iii) diagnosing the test subject as having the disease if the TCR repertoire profile of the test subject is significantly similar to the TCR repertoire profile of the one or more reference subjects diagnosed with the disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), or if the TCR repertoire profile of the test subject is significantly dissimilar to the TCR repertoire profile of the one or more reference subjects diagnosed to be healthy or free of the disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)). Alternatively, a test subject (e.g., a human) may be identified as being free of a disease (e.g., a cancer, an infectious disease, an inflammatory disease, or an autoimmune disease) by: (i) obtaining the TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the disease, and/or comparing the TCR repertoire profile of the test subject to the TCR repertoire profile of one or more reference subjects diagnosed to be healthy or free of the disease; and (iii) diagnosing the test subject to be free of the disease if the TCR repertoire profile of the test subject is significantly similar to the TCR repertoire profile of the one or more reference subjects diagnosed to be healthy or free of the disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or if the TCR repertoire profile of the test subject is significantly dissimilar to the TCR repertoire profile of the one or more reference subjects diagnosed with the disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

A subject (e.g., a test subject) diagnosed by one or more methods described herein to have a disease may subsequently be treated using a therapeutic strategy described herein (e.g., a therapeutic strategy described in the foregoing sections). Alternatively, a subject diagnosed by one or more methods described herein to have a disease may subsequently be treated using a therapeutic strategy that is approved for treatment of that disease. For example, a subject diagnosed by one or more methods described herein to have a cancer may subsequently be treated with a chemotherapeutic drug that is approved for treatment of that cancer.

TCR Profiling for Disease Prognosis

TCR profiling by one or more methods described herein may be useful for predicting a chance of recovery of a subject (e.g., a test subject, such as a human) from a disease (e.g., a cancer, an infectious disease, an inflammatory disease, or an autoimmune disease). For predicting a chance of recovery of a test subject from a disease, the TCR repertoire profile of the test subject may be compared to the TCR repertoire profile of one or more reference subjects (e.g., reference subjects who have recovered from the disease and/or reference subjects who have not recovered from the disease) or to TCR repertoire profiles catalogued in a database, such as a database described herein. For predicting a chance of recovery of a test subject from a disease, the TCR repertoire profile of the test subject may also be obtained by: (i) presentation of a peptide of interest (e.g., a peptide associated with the disease, such as a peptide from a tumor antigen, a peptide from an infective agent (e.g., bacteria, virus, parasite or fungus), or a peptide from a self-antigen (e.g., a self-antigen listed in Table 1)) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing reporter sequence(s) (e.g., polynucleic acid barcode molecules); (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects who have recovered from the disease and/or reference subjects who have not recovered from the disease) is stored).

For example, a test subject (e.g., a human) may be predicted to have a good chance (e.g., 50% or more chance, such as 50%, 55%, 60%, 65%, 70%, 75%, 80%, 85%, 90%, 95%, 99%, or more chance) of recovery from a disease (e.g., a cancer, an infectious disease, an inflammatory disease, or an autoimmune disease) by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects who have recovered from the disease, and/or comparing the TCR repertoire profile of the test subject to the TCR repertoire profile of one or more reference subjects who have not recovered from the disease; and (iii) predicting the test subject to have a good chance of recovery from the disease if the TCR repertoire profile of the test subject is significantly similar to the TCR repertoire profile of the one or more reference subjects who have recovered from the disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have not recovered from the disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be predicted to have a poor chance (e.g., less than 50% chance, such as 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less chance) of recovery from a disease (e.g., a cancer, an infectious disease, an inflammatory disease, or an autoimmune disease) by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects who have recovered from the disease, and/or comparing the TCR repertoire profile of the test subject to the TCR repertoire profile of one or more reference subjects who have not recovered from the disease; and (iii) predicting the test subject to have a poor chance of recovery from the disease if the TCR repertoire profile of the test subject is significantly similar to the TCR repertoire profile of the one or more reference subjects who have not recovered from the disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have recovered from the disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Once a prediction of a chance of recovery from a disease is established using one or more of the methods described herein, a subject (e.g., a test subject, such as a human) may be treated using a therapeutic strategy described herein (e.g., a therapeutic strategy described in the foregoing sections). Alternatively, once a prediction of a chance of recovery from a disease is established using one or more of the methods described herein, a subject (e.g., a test subject, such as a human) may be treated using a therapeutic strategy that is approved for treatment of that disease. For example, a subject predicted by one or more methods described herein to have good chance (e.g., 50% or more chance, such as 50%, 55%, 60%, 65%, 70%, 75%, 80%, 85%, 90%, 95%, 99%, or more chance) of recovery from a disease (e.g., a cancer) may subsequently be treated with a therapy (e.g., a chemotherapeutic drug) that is approved for treatment of that disease.

Cancers

The methods described herein may be used for diagnosis of one or more cancers in a subject (e.g., a test subject, such as a human). For diagnosis of a cancer in a test subject, the TCR repertoire profile of the test subject may be compared to the TCR repertoire profile of one or more reference subjects (e.g., reference subjects diagnosed with the cancer and/or reference subjects diagnosed to be healthy or free of the cancer) or to TCR repertoire profile(s) catalogued in a database, such as a database as described herein. For diagnosis of a cancer in a test subject, the TCR repertoire profile of the test subject may also be obtained by: (i) presentation of a peptide of interest (e.g., a peptide associated with the cancer, such as a peptide from a tumor antigen) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects diagnosed with the cancer and/or reference subjects diagnosed to be healthy or free of the cancer) is stored).

For example, a test subject (e.g., a human) may be diagnosed to have a cancer by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the cancer, and/or comparing the TCR repertoire profile of the test subject to the TCR repertoire profile of one or more reference subjects diagnosed to be healthy or free of the cancer or to TCR repertoire profile(s) stored in a database; and (iii) diagnosing the test subject as having the cancer if the TCR repertoire profile of the test subject is significantly similar to the TCR repertoire profile of the one or more reference subjects diagnosed with the cancer (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), or the TCR repertoire profile of the test subject is significantly dissimilar to the TCR repertoire profile of the one or more reference subjects diagnosed to be healthy or free of the cancer (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be identified as being free of a cancer by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the cancer, and/or comparing the TCR repertoire profile of the test subject to the TCR repertoire profile of one or more reference subjects diagnosed to be healthy or free of the cancer; and (iii) diagnosing the test subject to be free of the cancer if the TCR repertoire profile of the test subject is significantly similar to the TCR repertoire profile of the one or more reference subjects diagnosed to be healthy or free of the cancer (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects diagnosed with the cancer (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

The methods described herein may also be used for predicting a chance of recovery of a subject (e.g., a test subject, such as a human) from one or more cancers. For predicting a chance of recovery of a test subject from a cancer, the TCR repertoire profile of the test subject may be compared to the TCR repertoire profile of one or more reference subjects (e.g., reference subjects who have recovered from the cancer and/or reference subjects who have not recovered from the cancer) or to TCR repertoire profile(s) catalogued in a database, such as a database as described herein. For predicting a chance of recovery of a test subject from a cancer, the TCR repertoire profile of the test subject may be obtained by: (i) presentation of a peptide of interest (e.g., a peptide associated with the cancer, such as a peptide from a tumor antigen) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects who have recovered from the cancer and/or reference subjects who have not recovered from the cancer) is stored).

For example, a test subject (e.g., a human) may be predicted to have a good chance (e.g., 50% or more chance, such as 50%, 55%, 60%, 65%, 70%, 75%, 80%, 85%, 90%, 95%, 99%, or more chance) of recovery from a cancer by: (i) obtaining a TCR repertoire profile of the test subject by one or more methods described herein; (ii) comparing the TCR repertoire profile of the test subject to the TCR repertoire profile of one or more reference subjects who have recovered from the cancer, and/or comparing the TCR repertoire profile of the test subject to the TCR repertoire profile of one or more reference subjects who have not recovered from the cancer; and (iii) predicting the test subject to have a good chance of recovery from the cancer if the TCR repertoire profile of the test subject is significantly similar to the TCR repertoire profile of the one or more reference subjects who have recovered from the cancer (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have not recovered from the cancer (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be predicted to have a poor chance (e.g., less than 50% chance, such as 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less chance) of recovery from a cancer by: (i) obtaining a TCR repertoire profile of the test subject by one or more methods described herein; (ii) comparing the TCR repertoire profile of the test subject to the TCR repertoire profile of one or more reference subjects who have recovered from the cancer, and/or comparing the TCR repertoire profile of the test subject to the TCR repertoire profile of one or more reference subjects who have not recovered from the cancer; and (iii) predicting the test subject to have a poor chance of recovery from the cancer if the TCR repertoire profile of the test subject is significantly similar to the TCR repertoire profile of the one or more reference subjects who have not recovered from the cancer (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have recovered from the cancer (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Non-limiting examples of cancers that can be diagnosed and/or prognosed by one or more methods described herein include cancers such as Acanthoma, Acinic cell carcinoma, Acoustic neuroma, Acral lentiginous melanoma, Acrospiroma, Acute eosinophilic leukemia, Acute lymphoblastic leukemia, Acute megakaryoblastic leukemia, Acute monocytic leukemia, Acute myeloblastic leukemia with maturation, Acute myeloid dendritic cell leukemia, Acute myeloid leukemia, Acute promyelocytic leukemia, Adamantinoma, Adenocarcinoma, Adenoid cystic carcinoma, Adenoma, Adenomatoid odontogenic tumor, Adrenocortical carcinoma, Adult T-cell leukemia, Aggressive NK-cell leukemia, AIDS-Related Cancers, AIDS-related lymphoma, Alveolar soft part sarcoma, Ameloblastic fibroma, Anal cancer, Anaplastic large cell lymphoma, Anaplastic thyroid cancer, Angioimmunoblastic T-cell lymphoma, Angiomyolipoma, Angiosarcoma, Appendix cancer, Astrocytoma, Atypical teratoid rhabdoid tumor, Basal cell carcinoma, Basal-like carcinoma, B-cell leukemia, B-cell lymphoma, Bellini duct carcinoma, Biliary tract cancer, Bladder cancer, Blastoma, Bone Cancer, Bone tumor, Brain Stem Glioma, Brain Tumor, Breast Cancer, Brenner tumor, Bronchial Tumor, Bronchioloalveolar carcinoma, Brown tumor, Burkitt's lymphoma, Cancer of Unknown Primary Site, Carcinoid Tumor, Carcinoma, Carcinoma in situ, Carcinoma of the penis, Carcinoma of Unknown Primary Site, Carcinosarcoma, Castleman's Disease, Central Nervous System Embryonal Tumor, Cerebellar Astrocytoma, Cerebral Astrocytoma, Cervical Cancer, Cholangiocarcinoma, Chondroma, Chondrosarcoma, Chordoma, Choriocarcinoma, Choroid plexus papilloma, Chronic Lymphocytic Leukemia, Chronic monocytic leukemia, Chronic myelogenous leukemia, Chronic Myeloproliferative Disorder, Chronic neutrophilic leukemia, Clear-cell tumor, Colon Cancer, Colorectal cancer, Craniopharyngioma, Cutaneous T-cell lymphoma, Degos disease, Dermatofibrosarcoma protuberans, Dermoid cyst, Desmoplastic small round cell tumor, Diffuse large B cell lymphoma, Dysembryoplastic neuroepithelial tumor, Embryonal carcinoma, Endodermal sinus tumor, Endometrial cancer, Endometrial Uterine Cancer, Endometrioid tumor, Enteropathy-associated T-cell lymphoma, Ependymoblastoma, Ependymoma, Epithelioid sarcoma, Erythroleukemia, Esophageal cancer, Esthesioneuroblastoma, Ewing Family of Tumor, Ewing Family Sarcoma, Ewing's sarcoma, Extracranial Germ Cell Tumor, Extragonadal Germ Cell Tumor, Extrahepatic Bile Duct Cancer, Extramammary Paget's disease, Fallopian tube cancer, Fetus in fetu, Fibroma, Fibrosarcoma, Follicular lymphoma, Follicular thyroid cancer, Gallbladder Cancer, Gallbladder cancer, Ganglioglioma, Ganglioneuroma, Gastric Cancer, Gastric lymphoma, Gastrointestinal cancer, Gastrointestinal Carcinoid Tumor, Gastrointestinal Stromal Tumor, Gastrointestinal stromal tumor, Germ cell tumor, Germinoma, Gestational choriocarcinoma, Gestational Trophoblastic Tumor, Giant cell tumor of bone, Glioblastoma multiforme, Glioma, Gliomatosis cerebri, *Glomus* tumor, Glucagonoma, Gonadoblastoma, Granulosa cell tumor, Hairy Cell Leukemia, Hairy cell leukemia, Head and Neck Cancer, Head and neck cancer, Heart cancer, Hemangioblastoma, Hemangiopericytoma, Hemangiosarcoma, Hematological malignancy, Hepatocellular carcinoma, Hepatosplenic T-cell lymphoma, Hereditary breast-ovarian cancer syndrome, Hodgkin Lymphoma, Hodgkin's lymphoma, Hypopharyngeal Cancer, Hypothalamic Glioma, Inflammatory breast cancer, Intraocular Melanoma, Islet cell carcinoma, Islet Cell Tumor, Juvenile myelomonocytic leukemia, Kaposi Sarcoma, Kaposi's sarcoma, Kidney Cancer, Klatskin tumor, Krukenberg tumor, Laryngeal Cancer, Laryngeal cancer, Lentigo maligna melanoma, Leukemia, Leukemia, Lip and Oral Cavity Cancer, Liposarcoma, Lung cancer, Luteoma, Lymphangioma, Lymphangiosarcoma, Lymphoepithelioma, Lymphoid leukemia, Lymphoma, Macroglobulinemia, Malignant Fibrous Histiocytoma, Malignant fibrous histiocytoma, Malignant Fibrous Histiocytoma of Bone, Malignant Glioma, Malignant Mesothelioma, Malignant peripheral nerve sheath tumor, Malignant rhabdoid tumor, Malignant triton tumor, MALT lymphoma, Mantle cell lymphoma, Mast cell leukemia, Mediastinal germ cell tumor, Mediastinal tumor, Medullary thyroid cancer, Medulloblastoma, Medulloblastoma, Medulloepithelioma, Melanoma, Melanoma, Meningioma, Merkel Cell Carcinoma, Mesothelioma, Mesothelioma, Metastatic Squamous Neck Cancer with Occult Primary, Metastatic urothelial carcinoma, Mixed Mullerian tumor, Monocytic leukemia, Mouth Cancer, Mucinous tumor, Multiple Endocrine Neoplasia Syndrome, Multiple Myeloma, Multiple myeloma, Mycosis Fungoides, Mycosis fungoides, Myelodysplastic Disease, Myelodysplastic Syndromes, Myeloid leukemia, Myeloid sarcoma, Myeloproliferative Disease, Myxoma, Nasal Cavity Cancer, Nasopharyngeal Cancer, Nasopharyngeal carcinoma, Neoplasm, Neurinoma, Neuroblastoma, Neuroblastoma, Neurofibroma, Neuroma, Nodular melanoma, Non-Hodgkin Lymphoma, Non-Hodgkin lymphoma, Nonmelanoma Skin Cancer, Non-Small Cell Lung Cancer, Ocular oncology, Oligoastrocytoma, Oligodendroglioma, Oncocytoma, Optic nerve sheath meningioma, Oral Cancer, Oral cancer, Oropharyngeal Cancer, Osteosarcoma, Osteosarcoma, Ovarian Cancer, Ovarian cancer, Ovarian Epithelial Cancer, Ovarian Germ Cell Tumor, Ovarian Low Malignant Potential Tumor, Paget's disease of the breast, Pancoast tumor, Pancreatic Cancer, Pancreatic cancer, Papillary thyroid cancer, Papillomatosis, Paraganglioma, Paranasal Sinus Cancer, Parathyroid Cancer, Penile Cancer, Perivascular epithelioid cell tumor, Pharyngeal Cancer, Pheochromocytoma, Pineal Parenchymal Tumor of Intermediate Differentiation, Pineoblastoma, Pituicytoma, Pituitary adenoma, Pituitary tumor, Plasma Cell Neoplasm, Pleuropulmonary blastoma, Polyembryoma, Precursor T-lymphoblastic lymphoma, Primary central nervous system lymphoma, Primary effusion lymphoma, Primary Hepatocellular Cancer, Primary Liver Cancer, Primary peritoneal cancer, Primitive neuroectodermal tumor, Prostate cancer, Pseudomyxoma peritonei, Rectal Cancer, Renal cell carcinoma, Respiratory Tract Carcinoma Involving the NUT Gene on Chromosome 15, Retinoblastoma, Rhabdomyoma, Rhabdomyosarcoma, Richter's transformation, Sacrococcygeal teratoma, Salivary Gland Cancer, Sarcoma, Schwannomatosis, Sebaceous gland carcinoma, Secondary neoplasm, Seminoma, Serous tumor, Sertoli-Leydig cell tumor, Sex cord-stromal tumor, Sezary Syndrome, Signet ring cell carcinoma, Skin Cancer, Small blue round cell tumor, Small cell carcinoma, Small Cell Lung Cancer, Small cell lymphoma, Small intestine cancer, Soft tissue sarcoma, Somatostatinoma, Soot wart, Spinal Cord Tumor, Spinal tumor, Splenic marginal zone lymphoma, Squamous cell carcinoma, Stomach cancer, Superficial spreading melanoma, Supratentorial Primitive Neuroectodermal Tumor, Surface epithelial-stromal tumor, Synovial sarcoma, T-cell acute lymphoblastic leukemia, T-cell large granular lymphocyte leukemia, T-cell leukemia, T-cell lymphoma, T-cell prolymphocytic leukemia, Teratoma, Terminal lymphatic cancer, Testicular cancer, Thecoma, Throat Cancer, Thymic Carcinoma, Thymoma, Thyroid cancer, Transitional Cell Cancer of Renal Pelvis and Ureter, Transitional cell carcinoma, Urachal cancer, Urethral cancer, Urogenital neoplasm, Uterine sarcoma, Uveal melanoma, Vaginal Cancer, Verner Morrison syndrome, Verrucous carcinoma, Visual Pathway Glioma, Vulvar Cancer, Waldenstrom's macroglobulinemia, Warthin's tumor, Wilms' tumor, and combinations thereof.

Inflammatory and Autoimmune Diseases

The methods described herein may be used for diagnosis of one or more inflammatory and/or autoimmune diseases in a subject (e.g., a test subject, such as a human). For diagnosis of an inflammatory and/or autoimmune disease in a test subject, the TCR repertoire profile of the test subject may be compared to the TCR repertoire profile of one or more reference subjects (e.g., reference subjects diagnosed with the inflammatory and/or autoimmune disease, and/or reference subjects diagnosed to be healthy or free of the inflammatory and/or autoimmune disease) or to TCR repertoire profile(s) catalogued in a database, such as a database as described herein. For diagnosis of an inflammatory and/or autoimmune disease in a test subject, the TCR repertoire profile of the test subject may also be obtained by: (i) presentation of a peptide of interest (e.g., a peptide associated with the inflammatory and/or autoimmune disease, such as a peptide from a self-antigen (e.g., a self-antigen listed in Table 1)) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects diagnosed with the inflammatory and/or autoimmune disease, and/or reference subjects diagnosed to be healthy or free of the inflammatory and/or autoimmune disease) is stored).

For example, a test subject (e.g., a human) may be diagnosed to have an inflammatory and/or an autoimmune disease by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the inflammatory and/or autoimmune disease, and/or comparing the TCR repertoire profile of the test subject to the TCR repertoire profile of one or more reference subjects diagnosed to be healthy or free of the inflammatory and/or autoimmune disease; and (iii) diagnosing the test subject as having the inflammatory and/or autoimmune disease if the TCR repertoire profile of the test subject is significantly similar to the TCR repertoire profile of the one or more reference subjects diagnosed with the inflammatory and/or autoimmune disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), or the TCR repertoire profile of the test subject is significantly dissimilar to the TCR repertoire profile of the one or more reference subjects diagnosed to be healthy or free of the inflammatory and/or autoimmune disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be identified as being free of an inflammatory and/or autoimmune disease by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects diagnosed with the inflammatory and/or autoimmune disease, and/or comparing the TCR repertoire profile of the test subject to the TCR repertoire profile of one or more reference subjects diagnosed to be healthy or free of the inflammatory and/or autoimmune disease; and (iii) diagnosing the test subject to be free of the inflammatory and/or autoimmune disease if the TCR repertoire profile of the test subject is significantly similar to the TCR repertoire profile of the one or more reference subjects diagnosed to be healthy or free of the inflammatory and/or autoimmune disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects diagnosed with the inflammatory and/or autoimmune disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

The methods described herein may also be used for predicting a chance of recovery of a subject (e.g., a test subject, such as a human) from one or more inflammatory and/or autoimmune diseases. For predicting a chance of recovery of a test subject from an inflammatory and/or autoimmune disease, the TCR repertoire profile of the test subject may be compared to the TCR repertoire profile of one or more reference subjects (e.g., reference subjects who have recovered from the inflammatory and/or autoimmune disease, and/or reference subjects who have not recovered from the inflammatory and/or autoimmune disease) or to TCR repertoire profile(s) catalogued in a database, such as a database as described herein. For predicting a chance of recovery of a test subject from an inflammatory and/or autoimmune disease, the TCR repertoire profile of the test subject may also be obtained by: (i) presentation of a peptide of interest (e.g., a peptide associated with the inflammatory and/or autoimmune disease, such as a peptide from a self-antigen (e.g., a self-antigen listed in Table 1)) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects who have recovered from the inflammatory and/or autoimmune disease, and/or reference subjects who have not recovered from the inflammatory and/or autoimmune disease) is stored).

For example, a test subject (e.g., a human) may be predicted to have a good chance (e.g., 50% or more chance, such as 50%, 55%, 60%, 65%, 70%, 75%, 80%, 85%, 90%, 95%, 99%, or more chance) of recovery from an inflammatory and/or autoimmune disease by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects who have recovered from the inflammatory and/or autoimmune disease, and/or comparing the TCR repertoire profile of the test subject to the TCR repertoire profile of one or more reference subjects who have not recovered from the inflammatory and/or autoimmune disease; and (iii) predicting the test subject to have a good chance of recovery from the inflammatory and/or autoimmune disease if the TCR repertoire profile of the test subject is significantly similar to the TCR repertoire profile of the one or more reference subjects who have recovered from the inflammatory and/or autoimmune disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have not recovered from the inflammatory and/or autoimmune disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be predicted to have a poor chance (e.g., less than 50% chance, such as 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less chance) of recovery from an inflammatory and/or autoimmune disease by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects who have recovered from the inflammatory and/or autoimmune disease, and/or comparing the TCR repertoire profile of the test subject to the TCR repertoire profile of one or more reference subjects who have not recovered from the inflammatory and/or autoimmune disease; and (iii) predicting the test subject to have a poor chance of recovery from the inflammatory and/or autoimmune disease if the TCR repertoire profile of the test subject is significantly similar to the TCR repertoire profile of the one or more reference subjects who have not recovered from the inflammatory and/or autoimmune disease (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects who have recovered from the inflammatory and/or autoimmune disease (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Non-limiting examples of inflammatory and/or autoimmune diseases that can be diagnosed and/or prognosed by one or more methods described herein include endotoxemia, sepsis, obesity-related insulin resistance, diabetes, polycystic ovary syndrome, metabolic syndrome, hypertension, cerebrovascular accident, myocardial infarction, congestive heart failure, cholecystitis, gout, osteoarthritis, Pickwickian syndrome, sleep apnea, atherosclerosis, inflammatory bowel disease, rheumatoid arthritis, vasculitis, transplant rejection, asthma, ischaemic heart disease, appendicitis, peptic, gastric and duodenal ulcers, peritonitis, pancreatitis, ulcerative, pseudomembranous, acute and ischemic colitis, diverticulitis, epiglottitis, achalasia, cholangitis, hepatitis, Crohn's disease, enteritis, Whipple's disease, allergy, anaphylactic shock, immune complex disease, organ ischemia, reperfusion injury, organ necrosis, hay fever, septicemia, endotoxic shock, cachexia, hyperpyrexia, eosinophilic granuloma, granulomatosis, sarcoidosis, septic abortion, epididymitis, vaginitis, prostatitis, urethritis, bronchitis, emphysema, rhinitis, cystic fibrosis, pneumonitis, alveolitis, bronchiolitis, pharyngitis, pleurisy, sinusitis, a parastic infection, a bacterial infection, a viral infection, an autoimmune disease, influenza, respiratory syncytial virus infection, herpes infection, HIV infection, hepatitis B virus infection, hepatitis C virus infection, disseminated bacteremia, Dengue fever, candidiasis, malaria, filariasis, amebiasis, hydatid cysts, burns, dermatitis, dermatomyositis, sunburn, urticaria, warts, wheals, vasulitis, angiitis, endocarditis, arteritis, thrombophlebitis, pericarditis, myocarditis, myocardial ischemia, periarteritis nodosa, rheumatic fever, celiac disease, adult respiratory distress syndrome, meningitis, encephalitis, cerebral infarction, cerebral embolism, Guillame-Barre syndrome, neuritis, neuralgia, spinal cord injury, paralysis, uveitis, arthritides, arthralgias, osteomyelitis, fasciitis, Paget's disease, periodontal disease, synovitis, myasthenia gravis, thryoiditis, systemic lupus erythematosus, Goodpasture's syndrome, Behcets's syndrome, allograft rejection, graft-versus-host disease, ankylosing spondylitis, Berger's disease, Retier's syndrome, Hodgkins disease, and combinations thereof.

Use of TCR Profiling for Determining Responsiveness to a Therapeutic Agent

TCR profiling by one or more methods described herein may be useful for determining responsiveness of a subject (e.g., a test subject, such as a human) to a therapeutic agent (e.g., a vaccine or a drug (e.g., a chemotherapeutic drug, an anti-inflammatory drug, or a drug directed to an infective agent, and, in particular, a biologic (polypeptide) drug, such as an antibody)). For determining responsiveness of a test subject to a therapeutic agent, the TCR repertoire profile of the test subject may be compared to the TCR repertoire profile of one or more reference subjects (e.g., reference subjects that are responsive to the therapeutic agent and/or reference subjects that are non-responsive to the therapeutic agent) or to TCR repertoire profile(s) catalogued in a database, such as a database as described herein. For determining responsiveness of a test subject to a therapeutic agent, the TCR repertoire profile of the test subject may also be obtained by: (i) presentation of a peptide of interest (e.g., a peptide from the therapeutic agent) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects that are responsive to the therapeutic agent and/or reference subjects that are non-responsive to the therapeutic agent) is stored).

For example, a test subject (e.g., a human) may be determined to be responsive to a therapeutic agent (e.g., a vaccine or a drug) by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects that are responsive to the therapeutic agent, and/or comparing the TCR repertoire profile of the test subject to the TCR repertoire profile of one or more reference subjects that are non-responsive to the therapeutic agent; and (iii) determining the test subject to be responsive to the therapeutic agent if the TCR repertoire profile of the test subject is significantly similar to the TCR repertoire profile of the one or more reference subjects that are responsive to the therapeutic agent (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects that are non-responsive to the therapeutic agent (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s))).

Alternatively, a test subject (e.g., a human) may be determined to be non-responsive to a therapeutic agent by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects that are responsive to the therapeutic agent, and/or comparing the TCR repertoire profile of the test subject to the TCR repertoire profile of one or more reference subjects that are non-responsive to the therapeutic agent; and (iii) determining the test subject to be non-responsive to the therapeutic agent if the TCR repertoire profile of the test subject is significantly dissimilar to the TCR repertoire profile of the one or more reference subjects that are responsive to the therapeutic agent (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)), and/or the TCR repertoire profile of the test subject is significantly similar to the TCR repertoire profile of the one or more reference subjects that are non-responsive to the therapeutic agent (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s))).

A subject (e.g., a test subject) determined to be responsive to a therapeutic agent by one or more methods described herein may subsequently be treated with that therapeutic agent as a therapeutic approach for the disease for which the therapeutic agent is intended and/or approved. For example, a subject determined to be responsive to a chemotherapeutic agent by one or more methods described herein may subsequently be treated with that chemotherapeutic agent as a therapeutic approach for the cancer for which the chemotherapeutic agent is intended and/or approved.

Alternatively, a subject (e.g., a test subject) determined to be non-responsive to a therapeutic agent by one or more methods described herein may subsequently be treated with an alternative therapeutic approach that is approved for the intended disease. For example, a subject determined to be non-responsive to a chemotherapeutic agent by one or more methods described herein may subsequently be treated with other chemotherapeutic agents.

Chemotherapeutic Drugs

Responsiveness of a subject (e.g., a test subject, such as a human) to one or more chemotherapeutic drugs may be determined by the methods described herein. For determining responsiveness of a test subject to a chemotherapeutic drug, the TCR repertoire profile of the test subject may be compared to the TCR repertoire profile of one or more reference subjects (e.g., reference subjects that are responsive to the chemotherapeutic drug and/or reference subjects that are non-responsive to the chemotherapeutic drug) or to TCR repertoire profile(s) catalogued in a database, such as a database as described herein. For determining responsiveness of a test subject to a chemotherapeutic drug, the TCR repertoire profile of the test subject may also be obtained by: (i) presentation of a peptide of interest (e.g., a peptide from the chemotherapeutic drug) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects that are responsive to the chemotherapeutic drug and/or reference subjects that are non-responsive to the chemotherapeutic drug) is stored).

For example, a test subject (e.g., a human) may be determined to be responsive to a chemotherapeutic drug by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects that are responsive to the chemotherapeutic drug, and/or comparing the TCR repertoire profile of the test subject to the TCR repertoire profile of one or more reference subjects that are non-responsive to the chemotherapeutic drug; and (iii) determining the test subject to be responsive to the chemotherapeutic drug if the TCR repertoire profile of the test subject is significantly similar to the TCR repertoire profile of the one or more reference subjects that are responsive to the chemotherapeutic drug (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects that are non-responsive to the chemotherapeutic drug (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be determined to be non-responsive to a chemotherapeutic drug by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects that are responsive to the chemotherapeutic drug, and/or comparing the TCR repertoire profile of the test subject to the TCR repertoire profile of one or more reference subjects that are non-responsive to the chemotherapeutic drug; and (iii) determining the test subject to be non-responsive to the chemotherapeutic drug if the TCR repertoire profile of the test subject is significantly dissimilar to the TCR repertoire profile of the one or more reference subjects that are responsive to the chemotherapeutic drug (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)), and/or the TCR repertoire profile of the test subject is significantly similar to the TCR repertoire profile of the one or more reference subjects that are non-responsive to the chemotherapeutic drug (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)).

Non-limiting examples of such chemotherapeutic drugs include anthracyclines (e.g., doxorubicin), nucleoside analogs (e.g., 5-fluorouracil (5-FU)) and related inhibitors, platinum-based anti-neoplastic agents (e.g., cisplatin), taxanes (e.g., paclitaxel), vinca alkaloids (e.g., vincristine), glycopeptide antibiotics (e.g., bleomycin), polypeptide antibiotic (e.g., actinomycin D), alkylating agents, antimetabolites, folic acid analogs, epipodopyyllotoxins, L-asparaginase, topoisomerase inhibitors, interferons, anthracenedione substituted urea, methyl hydrazine derivatives, adrenocortical suppressant, adrenocorticosteroides, progestins, estrogens, antiestrogen, androgens, antiandrogen, and gonadotropin-releasing hormone analog. Also included is leucovorin (LV), irenotecan, oxaliplatin, capecitabine, and doxetaxel. Non-limiting examples of chemotherapeutic drugs further include alkylating agents such as thiotepa and cyclophosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammall and calicheamicin omegall; dynemicin, including dynemicin A; bisphosphonates, such as clodronate; an esperamicin; as well as neocarzinostatin chromophore and related chromoprotein enediyne antiobiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norieucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-FU; folic acid analogs such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elfomithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., paclitaxel; chloranbucil; gemcitabine; 6-thioguanine; mercaptopurine; methotrexate; platinum coordination complexes such as cisplatin, oxaliplatin and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluoromethylornithine (DMFO); retinoids such as retinoic acid; capecitabine; and pharmaceutically acceptable salts, acids or derivatives of any of the above.

Anti-Inflammatory Drugs

Responsiveness of a subject (e.g., a test subject, such as a human) to one or more anti-inflammatory drugs may be determined by the methods described herein. For determining responsiveness of a test subject to an anti-inflammatory drug, the TCR repertoire profile of the test subject may be compared to the TCR repertoire profile of one or more reference subjects (e.g., reference subjects that are responsive to the anti-inflammatory drug and/or reference subjects that are non-responsive to the anti-inflammatory drug) or to TCR repertoire profile(s) catalogued in a database, such as a database as described herein. For determining responsiveness of a test subject to an anti-inflammatory drug, the TCR repertoire profile of the test subject may also be obtained by: (i) presentation of a peptide of interest (e.g., a peptide from the anti-inflammatory drug) as a pMHC monomer to a T cell; (ii) recognition (e.g., engagement) of the pMHC monomer(s) by a TCR(s) on a T cell(s) obtained from the test subject to generate a pMHC-T cell multiplet(s); (iii) co-partitioning of the pMHC-T cell multiplet(s) into a droplet(s) with a particle(s) (e.g., a bead) containing nucleic acid barcode molecules; (iv) barcoding and analysis of the nucleic acid sequence(s) of the polynucleotide-peptide conjugate and/or the nucleic acid sequence(s) encoding the TCR(s) from the T cell(s) by the methods described herein; and (v) combining the nucleic acid sequence(s) of the polynucleotide-peptide conjugate and/or the nucleic acid sequence(s) encoding the TCR(s) from the individual T cell(s) of the test subject to obtain the TCR repertoire profile of the test subject. The TCR repertoire profile(s) of the one or more reference subjects may be obtained in the same manner (e.g., following the same methods) as the TCR repertoire profile of the test subject. Alternatively, the TCR repertoire profile(s) of the one or more reference subjects may be obtained from a database (e.g., a database in which the TCR repertoire profile(s) of the one or more reference subjects (e.g., reference subjects that are responsive to the anti-inflammatory drug and/or reference subjects that are non-responsive to the anti-inflammatory drug) is stored).

For example, a test subject (e.g., a human) may be determined to be responsive to an anti-inflammatory drug by: (i) obtaining a TCR repertoire profile of the test subject by one or more methods described herein (e.g., by TCR sequencing and/or detecting pMHC TCR binding (e.g., using a reporter conjugated pMHC molecule); (ii) comparing the TCR repertoire profile of the test subject to the TCR repertoire profile of one or more reference subjects that are responsive to the anti-inflammatory drug, and/or comparing the TCR repertoire profile of the test subject to the TCR repertoire profile of one or more reference subjects that are non-responsive to the anti-inflammatory drug; and (iii) determining the test subject to be responsive to the anti-inflammatory drug if the TCR repertoire profile of the test subject is significantly similar to the TCR repertoire profile of the one or more reference subjects that are responsive to the anti-inflammatory drug (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)), and/or the TCR repertoire profile of the test subject is significantly dissimilar to the TCR repertoire profile of the one or more reference subjects that are non-responsive to the anti-inflammatory drug (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)).

Alternatively, a test subject (e.g., a human) may be determined to be non-responsive to an anti-inflammatory drug by: (i) obtaining a TCR repertoire profile of the subject by one or more methods described herein (e.g., by TCR sequencing and/or detecting pMHC TCR binding (e.g., using a reporter conjugated pMHC molecule); (ii) comparing the TCR repertoire profile of the subject to the TCR repertoire profile of one or more reference subjects that are responsive to the anti-inflammatory drug, and/or comparing the TCR repertoire profile of the test subject to the TCR repertoire profile of one or more reference subjects that are non-responsive to the anti-inflammatory drug; and (iii) determining the test subject to be non-responsive to the anti-inflammatory drug if the TCR repertoire profile of the test subject is significantly dissimilar to the TCR repertoire profile of the one or more reference subjects that are responsive to the anti-inflammatory drug (e.g., if there is less than 50% (e.g., 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less) overlap between the TCR repertoire profiles of the test subject and the reference subject(s)), and/or the TCR repertoire profile of the test subject is significantly similar to the TCR repertoire profile of the one or more reference subjects that are non-responsive to the anti-inflammatory drug (e.g., if there is 50% or more (e.g., 50%, 55%, 60%, 65%, 70%, 75%, 80%, 85%, 90%, 95%, 99%, or more) overlap between the TCR repertoire profiles of the test subject and the reference subject(s)).

Non-limiting examples of such anti-inflammatory drugs include disease-modifying anti-rheumatic drug (DMARD), biologic response modifiers (a type of DMARD), corticosteroid, nonsteroidal anti-inflammatory medication (NSAID), prednisone, prednisolone, methylprednisolone, methotrexate, hydroxycholorquine, sulfasalazine, leflunomide, cyclophosphamide, azathioprine, tofacitinib, adalimumab, abatacept, anakinra, kineret, certolizumab, etanercept, golimumab, infliximab, rituximab tocilizumab, antiviral compound, nucleoside-analog reverse transcriptase inhibitor (NRTI), non-nucleoside reverse transcriptase inhibitor (NNRTI), antibacterial compound, antifungal compound, and antiparasitic compound.

Kits

Also provided herein are kits for analyzing individual T cells or small populations of T cells. The kits may include one, two, three, four, five or more, up to all of partitioning fluids, including both aqueous buffers and non-aqueous partitioning fluids or oils, nucleic acid barcode molecule libraries that are releasably associated with particles (e.g., beads), as described herein, microfluidic devices, reagents for disrupting cells amplifying nucleic acids, and providing additional functional sequences on fragments of cellular nucleic acids or replicates thereof, as well as instructions for using any of the foregoing in the methods described herein.

Computer Control Systems

Figure 13:
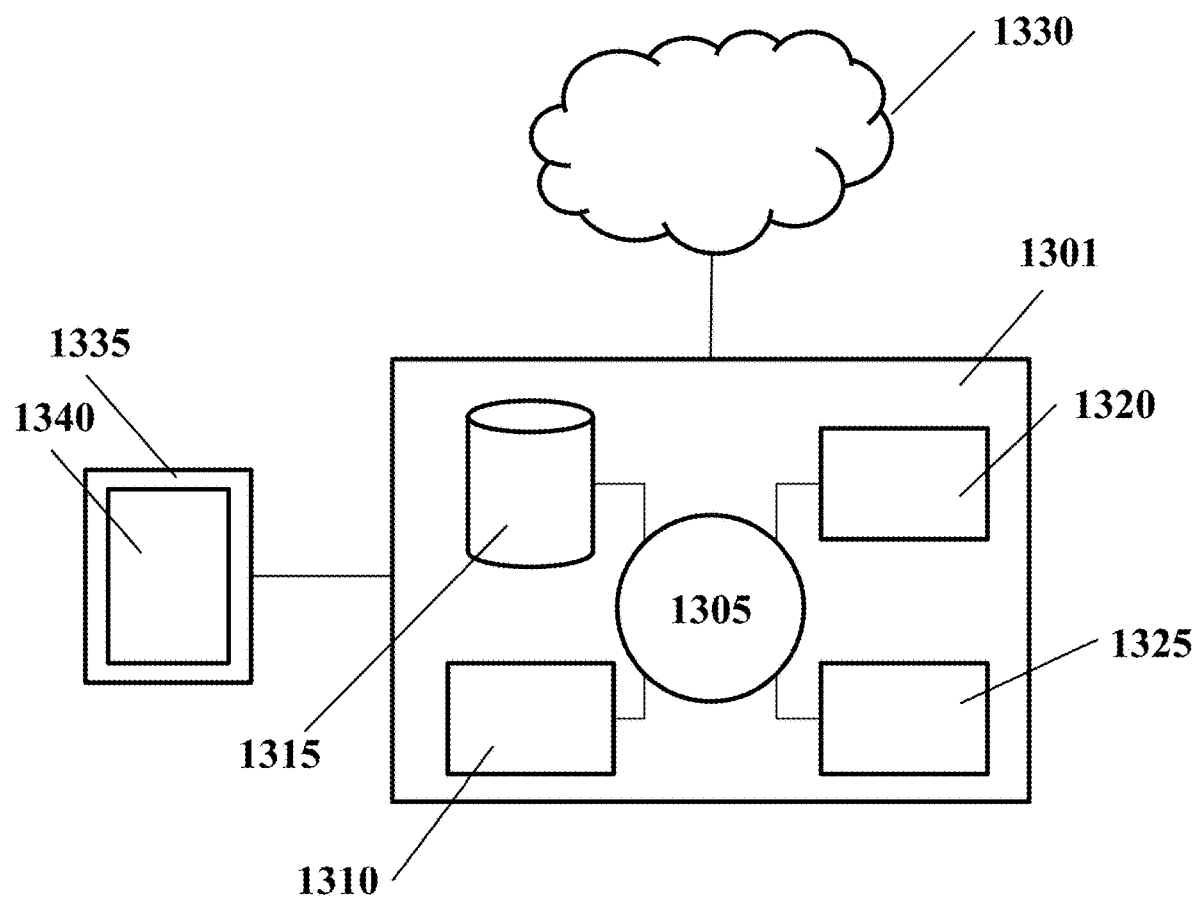
FIG. 13 is a diagram showing an example computer control system that is programmed or otherwise configured to implement methods provided herein.

The present disclosure provides computer control systems that are programmed to implement methods of the disclosure. FIG. 13 shows a computer system 1301 that is programmed or otherwise configured to implement methods of the disclosure including nucleic acid sequencing methods, interpretation of nucleic acid sequencing data and analysis of cellular nucleic acids, such as RNA (e.g., mRNA), and characterization of T cells from sequencing data. The computer system 1301 can be an electronic device of a user or a computer system that is remotely located with respect to the electronic device. The electronic device can be a mobile electronic device.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user. Non-limiting examples of remote computer systems include personal computers (e.g., portable PC), slate or tablet PC's (e.g., APPLE® iPad, SAMSUNG® Galaxy Tab), telephones, Smart phones (e.g., APPLE® iPhone, Android-enabled device, BLACKBERRY®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine-readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, results of nucleic acid sequencing, analysis of nucleic acid sequencing data, characterization of nucleic acid sequencing samples, or cell characterizations Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305. The algorithm can, for example, initiate nucleic acid sequencing, process nucleic acid sequencing data, interpret nucleic acid sequencing results, characterize nucleic acid samples, or characterize cells.

EXAMPLES

The following non-limiting examples are given for the purpose of illustrating various embodiments of present disclosure.

Example 1. Production of Peptide-cDNA Conjugate-MHC Complexes

Peptide-cDNA conjugates can be produced from DNA molecules by either CoA-mediated formation or puromycin-mediated formation. Each method can be implemented at high plexity, for example by using high-complexity microarrays as a source DNA template.

CoA-Mediated Formation

In this method, the reactions are conducted in one isolated compartment per sequence. Peptide-cDNA conjugates are formed from DNA templates comprising the following elements (from 5' to 3'): (i) a T7 promoter, (ii) a 5' UTR sequence containing a ribosomal binding site (RBS), (iii) a sequence encoding a variable peptide (flanked byt spacer residues), (iv) a sequence encoding an S6 tag, and (v) a stop codon. In a single incubation mixture, these DNA templates are transcribed to form mRNAs, the mRNAs are translated into peptides, and the mRNAs and the peptides are covalently attached to each other by methods described herein. Peptide-mRNA attachment occurs through a polyfunctional adapter molecule comprising a DNA hairpin (with an overhang region complementary to the conserved 3' end of the transcribed mRNAs) that is covalently attached, by means of a polyethylene glycol (PEG) linker moiety, to a coenzyme A (CoA) molecule. Attachment of the mRNA to the adapter is mediated by T4 DNA ligase, and the attachment of the peptide to the adapter occurs by SFP synthase-mediated attachment of the CoA molecule to the S6 tag. Peptide-mRNA conjugates are then converted to peptide-cDNA conjugates using reverse transcriptase, followed by treatment of the mixture with RNAse to degrade the mRNA. Prepared peptide-cDNA conjugates are then isolated from the reaction mixture by capture onto beads bearing DNA baits complementary to a conserved DNA sequence present in all of the conjugates. As an optional further purification step, SFP synthase along with an excess of biotinylated S6 peptide is added to the bead-captured mixture. In this reaction, the species containing unreacted COA molecules are biotinylated and then depleted by means of streptavidin beads.

Puromycin-Mediated Formation

This method does not require that the reactions be conducted in an isolated compartment per sequence. As previously described (Kozlov et al. (PLoS One, 7:e37441, 2012), peptide-cDNA conjugates are formed from DNA templates comprising the following elements (from 5' to 3'): (i) a T7 promoter, (ii) a 5' UTR sequence containing a ribosomal binding site, (iii) a sequence encoding a variable peptide (flanked by spacer residues), (iv) a stop codon, and (b) a 3' UTR region. To form conjugates, the DNA templates are transcribed to form mRNA. The mRNA is then purified and attached to a polyfunctional adapter molecule comprising a DNA molecule (with a region complementary to the conserved 3' end of the transcribed mRNAs) that is covalently attached, by means of a linker moiety, to a puromycin molecule. The resulting adapter-mRNA conjugates are purified and then translated to form peptide-mRNA conjugates. During in vitro translation, a stalled ribosome allows the puromycin residue to enter the ribosome A-site and attach to the C-terminus of the peptide, creating a polynucleotide-peptide conjugate (e.g., a peptide-mRNA).

Peptide-mRNA formed in this way are then converted to peptide-cDNA conjugates by the addition of reverse transcriptase, followed by treatment with RNAse to degrade the mRNA. Prepared peptide-cDNA conjugates are then isolated from the reaction mixture by capture onto beads bearing DNA baits that are complementary to a conserved DNA sequence present in all conjugates.

pMHC Production

The polynucleotide-peptide conjugates formed by methods described herein can be used to bind to MHC forming pMHC complexes. Examples of loading the polynucleotide-peptide conjugate into the MHC are described herein. For example, the polynucleotide-peptide conjugate can be loaded into an MHC molecule (e.g., an MHC class I or II) by refolding the MHC molecule in the presence of the peptide, as described by Garboczi et al. (*Proc Nat Acad Sci* 89:3429-3433, 1992), and further described herein. The polynucleotide-peptide conjugate can be loaded into an MHC molecule (e.g., an MHC class I or II) through exchange (e.g., US-mediated exchange, chemical-mediate exchange, temperature-mediated exchange, or chaperone-mediate exchange) or a conditional MHC ligand (e.g., a conditionally cleavable MHC ligand) for the peptide of interest. Methods of polynucleotide-peptide conjugate exchange are discussed herein.

Example 2. Sequencing of TCRs and pMHC Reporter Molecules

Figure 15:
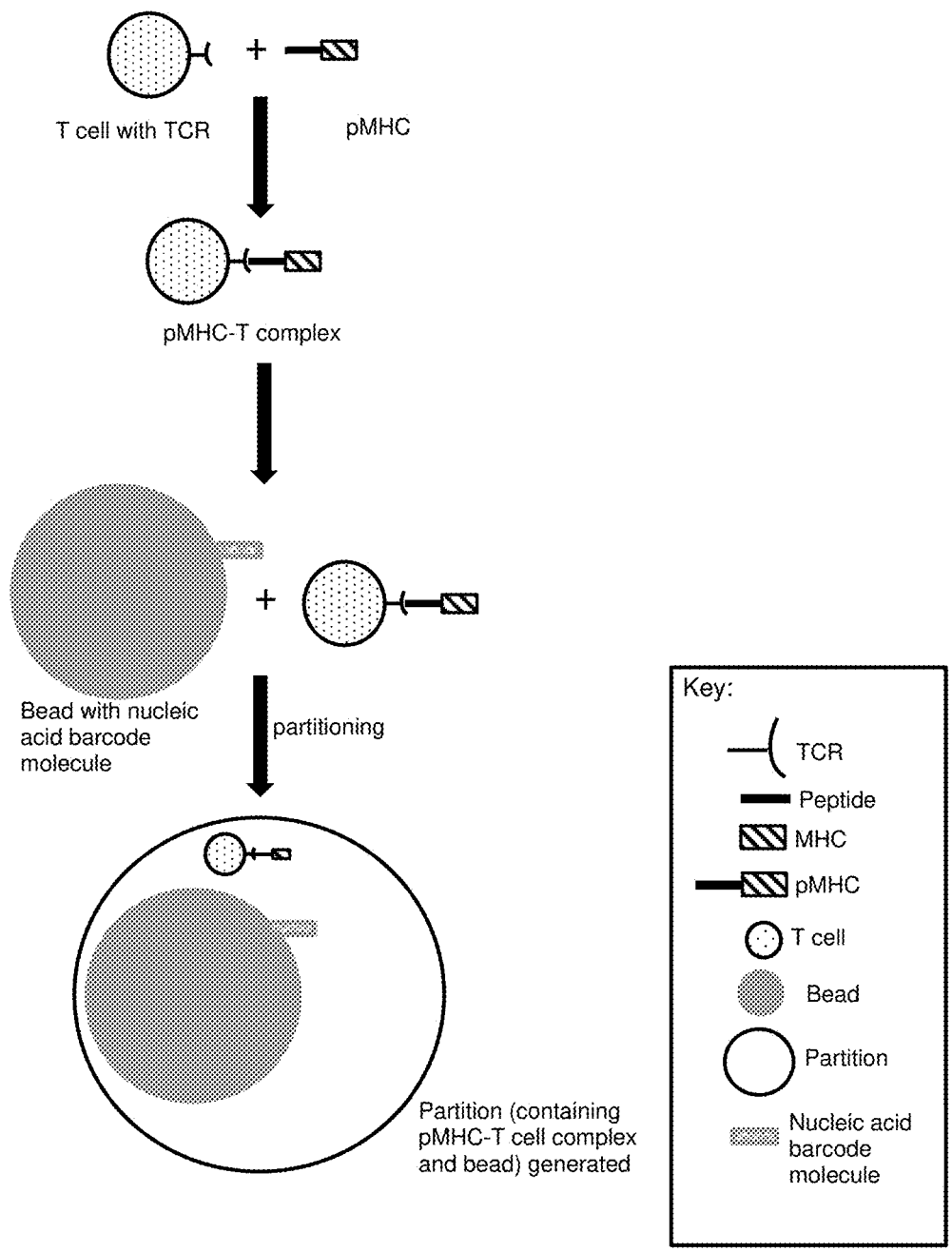
FIG. 15 is a schematic illustrating generation of a pMHC-T cell complex (multiplet) and partitioning of the pMHC-T cell complex and bead into a partition.

TCRs from individual T cells or individual pMHC-T cell multiplets can be sequenced according to the methods disclosed herein. Barcoded nucleic acid molecules, as described elsewhere herein, e.g., FIGS. 10-11, can be generated by co-partitioning pMHC-T-cell multiplets with gel beads containing nucleic acid barcode molecules having template switching oligonucleotides (see, e.g., FIG. 15). Prior to partitioning, T cells can be optionally enriched from the cell sample, for example by fluorescence activated cell sorting (FACS) or other sorting technique. Additional reagents for generating barcoded nucleic acid molecules, including, but not limited to, reverse transcriptase enzyme, poly(dT) primer, and dNTPs, can be delivered to droplets as part of a master mix. Within the droplets, T cells can be lysed, thus yielding template nucleic acid molecules (e.g., template mRNA) containing nucleic acid sequence from TCRs. The poly-T segment of the nucleic acid barcode molecule can hybridize to the poly-A tail of mRNA released from the T cell to form barcoded nucleic acid molecules. As illustrated schematically in FIG. 10, T cell derived template nucleic acid molecule containing mRNA (e.g., 1020), poly (dT) primer (e.g., 1026), and a barcoded template switching oligonucleotide (e.g., 1002) can be subjected to a template switching reaction during cDNA synthesis to yield a first barcoded reverse transcription product comprising the partition specific barcode and a sequence of a TCR receptor. The poly(dT) primer can hybridize to the polyA tail of the mRNA template nucleic acid molecule and act as a primer for reverse transcription by the reverse transcriptase enzyme that is co-partitioned with the T cell (e.g., 1050). The reverse transcriptase enzyme can have terminal transferase activity and add additional nucleotides, e.g., polyC, to the cDNA transcript in a template independent manner. The template switching oligonucleotide sequence (e.g., 1014) can hybridize to the cDNA transcript and facilitate template switching (e.g., 1052).

Unbiased cDNA containing a sequencing adapter, a cell (or partition-specific) barcode and a unique molecular identifier (UMI) can be generated within the droplets on the 5' end of the transcript, by reverse transcription. To enrich for transcripts with nucleic acid sequence of TCR, the barcoded product or cDNA transcript can be subjected to an amplification reaction to generate an amplification product. Polymerase chain reaction (PCR) can be performed with one primer for the 5' end of the transcript and one or more primers for the desired TCR/Ig constant region(s) (e.g., primers targeting TCR alpha (α) and/or beta (β) chain, and in some cases gamma and/or delta (γ/δ) chains). Optionally, the contents of multiple droplets can be combined, such that the amplification reaction is performed in bulk. For a description of exemplary primer sequences that can be used for enrichment of TCR transcripts, see U.S. Pat. Pub. 20180105808, which is hereby incorporated by reference in its entirety for all purposes.

Similarly, the peptide of the pMHC-T cell multiplet can be analyzed in conjunction with the corresponding TCR sequences by appending the partition-specific barcode to the reporter polynucleotide in the droplet, e.g., as described in FIG. 11. As illustrated schematically in FIG. 11, a reporter polynucleotide 1120 conjugated to a pMHC monomer 1102 is hybridized via sequence 1108 to the TSO sequence 1014 of nucleic acid barcode molecule 1002. The reporter oligonucleotide (e.g., 1020) and/or the nucleic acid barcode molecule 1002 is then extended to generate a barcoded product comprising the partition-specific barcode sequence 1010 and the reporter sequence 1106. The barcoded product can then be optionally processed and/or amplified to append sequence platform specific sequences to the barcoded product.

Barcoded products (or amplification products thereof) can then be subjected to one or more nucleic acid reactions (such as enzymatic fragmentation) and further processed to attach sequencing adaptors to generate a sequencing library. Additional sequences can include functional sequences, such as flow cell attachment sequences and sequencing primer binding sequences. The barcoded nucleic acid molecules can be sequenced to yield sequencing reads, and sequencing reads can be used to assemble full or partial TCR sequences. Additional analysis can include transcript counting for which an analysis pipeline may include, for example, (i) barcode processing, (ii) read filtering, (iii) cell-by-cell consensus assembly, (iv) V(D)J annotation, and (v) clonotype inference and clustering.

Example 3. Diagnosis of Cancer

TCR profiling and pMHC binding can be used for the diagnosis of a cancer in a test subject who is suspected of having the cancer. pMHCs can be generated as described in Example 1. Such pMHC can have peptide(s) derived from the tumor or cancer. The pMHC monomers can be incubated with T cells (e.g., T cells from blood, plasma, serum, urine, saliva, mucosal excretions, sputum, stool, tears, tumor biopsy, etc.) from the test subject to generate pMHC-T cell multiplets. The pMHC-T cell multiplets can be partitioned into droplets and the sequence of the TCR from the T cells can be obtained, as described in, e.g., Example 2.

Using pMHC Reporter Molecules

Recognition of peptides of pMHC complexes derived from an antigen or epitopes of an antigen (e.g., a cancer antigen) by TCRs is essential for activation of T cells and triggering of an immune response. pMHC-TCR binding detected by one or more methods described herein can be used for the diagnosis of a cancer in a subject (e.g., a test subject), such as a human (e.g., a human who is suspected to have the cancer). Detection of TCR binding on a T cell of the test subject by a pMHC reporter molecule of the present disclosure containing a peptide derived from a tumor or cancer antigen can be used to diagnose a test subject as having cancer. Alternatively, the test subject can be diagnosed as free of the cancer if binding is not detected between the pMHC reporter molecule and a TCR on a T cell of the test subject.

Using TCR Profiling

A TCR profile generated by one or more methods described herein can be used for the diagnosis of a cancer in a subject (e.g., a test subject), such as a human (e.g., a human who is suspected to have the cancer). TCR sequences from multiple T cells or multiple T cell samples from the test subject can be combined to obtain the TCR repertoire profile of the test subject. The TCR repertoire profile of the test subject can be compared to the TCR repertoire profile of one or more reference subjects who have been diagnosed with the cancer and/or to the TCR repertoire profile of one or more reference subjects who are healthy or free of the cancer. The test subject can be diagnosed as having the cancer if the TCR repertoire profile of the test subject is significantly similar to the TCR repertoire profile of the one or more reference subjects diagnosed as having the cancer, and/or the TCR repertoire profile of the test subject is significantly dissimilar to the TCR repertoire profile of the one or more reference subjects that are healthy or free of the cancer. Alternatively, the test subject can be diagnosed as free of the cancer if the TCR repertoire profile of the test subject is significantly similar to the TCR repertoire profile of the one or more reference subjects that are healthy or free of the cancer, and/or the TCR repertoire profile of the test subject is significantly dissimilar to the TCR repertoire profile of the one or more reference subjects diagnosed as having the cancer.

Optionally, following diagnosis of the cancer by the methods described herein, the test subject may be treated by therapeutic methods and strategies approved for treatment of that cancer.

Example 4. Diagnosis of an Infectious Disease

TCR profiling and pMHC binding can be used for the diagnosis of an infectious disease, such as bacterial infection, viral infection, parasitic infection, fungal infection, etc., in a test subject who is suspected of having that disease. pMHCs can be generated as described in Example 1. Such pMHC can be formed that have peptides derived from the infective agent which causes that infectious disease (e.g., from the causative bacteria, virus, parasite, fungus, etc.). The pMHCs can be incubated with T cells (e.g., T cells from blood, plasma, serum, urine, saliva, mucosal excretions, sputum, stool, tears, tumor biopsy, etc.) from the test subject to generate pMHC-T cell multiplets. The pMHC-T cell multiplets can be partitioned into droplets and the sequence of the TCR from the T cells can be obtained, as described in, e.g., Example 2.

Using pMHC Reporter Molecules

Recognition of peptides of pMHC complexes derived from an antigen or epitopes of an antigen (e.g., an infectious disease (e.g., bacterial infection, viral infection, parasitic infection, fungal infection, etc.)) by TCRs is essential for activation of T cells and triggering of an immune response. pMHC-TCR binding detected by one or more methods described herein can be used for the diagnosis of an infectious disease (e.g., a bacterial infection, viral infection, parasitic infection, fungal infection, etc.) in a subject (e.g., a test subject), such as a human (e.g., a human who is suspected to have that disease). Detection of TCR binding on a T cell of the test subject by a pMHC reporter molecule of the present disclosure containing a peptide derived from an infectious disease can be used to diagnose a test subject as having the infectious disease. Alternatively, the test subject can be diagnosed as free of the infectious disease if binding is not detected between the pMHC reporter molecule and a TCR on a T cell of the test subject.

Using TCR Profiling

A TCR profile generated by one or more methods described herein can be used for the diagnosis of an infectious disease (e.g., a bacterial infection, viral infection, parasitic infection, fungal infection, etc.) in a subject (e.g., a test subject), such as a human (e.g., a human who is suspected to have that disease). TCR sequences from multiple T cells or multiple T cell samples from the test subject can be combined to obtain the TCR repertoire profile of the test subject. The TCR repertoire profile of the test subject can be compared to the TCR repertoire profile of one or more reference subjects who have been diagnosed with the infectious disease and/or to the TCR repertoire profile of one or more reference subjects that are healthy or free of the infectious disease. The test subject can be diagnosed as having the infectious disease if the TCR repertoire profile of the test subject is significantly similar to the TCR repertoire profile of the one or more reference subjects diagnosed as having the infectious disease, and/or if the TCR repertoire profile of the test subject is significantly dissimilar to the TCR repertoire profile of the one or more reference subjects that are healthy or free of the infectious disease. Alternatively, the test subject can be diagnosed as free of the infectious disease if the TCR repertoire profile of the test subject is significantly similar to the TCR repertoire profile of the one or more reference subjects that are healthy or free of the infectious disease, and/or if the TCR repertoire profile of the test subject is significantly dissimilar to the TCR repertoire profile of the one or more reference subjects that are diagnosed as having the infectious disease.

Optionally, following diagnosis of the infectious disease by the methods described herein, the test subject may be treated by therapeutic methods and strategies approved for treatment of that infectious disease.

Example 5. Identifying Disease Prognosis

TCR profiling and pMHC binding can be used for predicting a chance of recovery from a disease (e.g., cancer, infectious disease (e.g., bacterial infection, viral infection, parasitic infection, fungal infection, etc.), inflammatory disease, autoimmune disease, etc.) in a test subject who is suspected of having the disease. pMHCs can be generated as described in Example 1. The pMHCs can be incubated with T cells (e.g., T cells from blood, plasma, serum, urine, saliva, mucosal excretions, sputum, stool, tears, tumor biopsy, etc.) from the test subject to generate pMHC-T cell multiplets. The pMHC-T cell multiplets can be partitioned into droplets and the sequence of the TCR from the T cells can be obtained, as described in, e.g., Example 2.

Using pMHC Reporter Molecules

Recognition of peptides of pMHC complexes derived from an antigen or epitopes of an antigen (e.g., a disease (e.g., cancer) or infective agent (e.g., from the causative bacteria, virus, parasite, fungus, etc.)) by TCRs is essential for activation of T cells and triggering of an immune response. Detection of TCR binding on a T cell of the test subject by a pMHC reporter molecule of the present disclosure containing a peptide derived from the disease or infective agent (e.g., from the causative bacteria, virus, parasite, fungus, etc.) can be used to identify the disease (e.g., cancer) or infective agent (e.g., bacteria, virus, parasite, fungus, etc.) thereby allowing one of skill in the art to assess the probability of recovery of the subject based on the particular identified disease (e.g., cancer) or infective agent (e.g., bacteria, virus, parasite, fungus, etc.). Alternatively, the test subject can be diagnosed as free of a disease (e.g., cancer) or infective agent (e.g., bacteria, virus, parasite, fungus, etc.) if binding is not detected between the pMHC reporter molecule and a TCR on a T cell of the test subject.

Using TCR Profiling

A TCR profile generated by one or more methods described herein can be used for predicting a chance of recovery from a disease in a subject (e.g., a test subject), such as a human (e.g., a human who is suspected to have the disease). TCR sequences from multiple T cells or multiple T cell samples from the test subject can be combined to obtain the TCR repertoire profile of the test subject. The TCR repertoire profile of the test subject can be compared to the TCR repertoire profile of one or more reference subjects that have recovered from the disease and/or to the TCR repertoire profile of one or more reference subjects that have not recovered from the disease. The test subject can be predicted to have a good chance (e.g., 50% or more chance, such as 50%, 55%, 60%, 65%, 70%, 75%, 80%, 85%, 90%, 95%, 99%, or more chance) of recovery from the disease if the TCR repertoire profile of the test subject is significantly similar to the TCR repertoire profile of the one or more reference subjects that have recovered from the disease, and/or if the TCR repertoire profile of the test subject is significantly dissimilar to the TCR repertoire profile of the one or more reference subjects that have not recovered from the disease. Alternatively, the test subject can be predicted to have a poor chance (e.g., less than 50% chance, such as 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less chance) of recovery from the disease if the TCR repertoire profile of the test subject is significantly similar to the TCR repertoire profile of the one or more reference subjects that have not recovered from the disease, and/or if the TCR repertoire profile of the test subject is significantly dissimilar to the TCR repertoire profile of the one or more reference subjects that have recovered from the disease.

Optionally, following prediction of a chance of recovery from the disease by the methods described herein, the test subject may be treated by therapeutic methods and strategies approved for treatment of that disease.

Example 6. Determining Responsiveness to a Drug

TCR profiling and pMHC binding can be used for determining responsiveness of a test subject to a drug (e.g., a biologic drug (e.g., a protein drug). pMHCs can be generated as described in Example 1. Such pMHCs can be formed that have peptides derived from the drug or from a protein target of the drug. The pMHCs can be incubated with T cells (e.g., T cells from blood, plasma, serum, urine, saliva, mucosal excretions, sputum, stool, tears, tumor biopsy, etc.) from the test subject to generate pMHC-T cell multiplets. The pMHC-T cell multiplets can be partitioned into droplets and the sequence of the TCR from the T cells can be obtained, as described in, e.g., Example 2.

Using pMHC Reporter Molecules

Detection of TCR binding on a T cell of the test subject by a pMHC reporter molecule containing a peptide derived from a target of the therapeutic drug (e.g., a chemotherapeutic drug, an anti-inflammatory drug, a drug directed to an infective agent, etc.) or from a biologic drug (e.g., a polypeptide drug) can be used to diagnose a test subject as being responsive to the therapeutic drug. Alternatively, the test subject can be diagnosed as not being responsive to the therapeutic drug if binding is not detected between the pMHC reporter molecule and a TCR on a T cell of the test subject.

Using TCR Profiling

A TCR profile generated by one or more methods described herein can be used for determining responsiveness to a drug (e.g., a chemotherapeutic drug, an anti-inflammatory drug, a drug directed to an infective agent, etc., and, in particular, a biologic (e.g., polypeptide) drug) in a subject (e.g., a test subject), such as a human (e.g., a human who needs to be treated with that drug, such as a cancer patient who needs to be treated with a chemotherapeutic drug). TCR sequences from multiple T cells or multiple T cell samples from the test subject can be combined to obtain the TCR repertoire profile of the test subject. The TCR repertoire profile of the test subject can be compared to the TCR repertoire profile of one or more reference subjects that are responsive to the drug and/or to the TCR repertoire profile of one or more reference subjects that are non-responsive to the drug. The test subject can be determined to be responsive to the drug if the TCR repertoire profile of the test subject is significantly similar to the TCR repertoire profile of the one or more reference subjects that are responsive to the drug, and/or if the TCR repertoire profile of the test subject is significantly dissimilar to the TCR repertoire profile of the one or more reference subjects that are non-responsive to the drug. Alternatively, the test subject can be determined to be non-responsive to the drug if the TCR repertoire profile of the test subject is significantly dissimilar to the TCR repertoire profile of the one or more reference subjects that are responsive to the drug, and/or if the TCR repertoire profile of the test subject is significantly similar to the TCR repertoire profile of the one or more reference subjects that are non-responsive to the drug.

Optionally, the test subject determined to be responsive to the drug by one or more methods described herein may subsequently be treated with that drug as a therapeutic approach for the disease for which the drug is intended and/or approved. For example, a test subject determined to be responsive to a chemotherapeutic drug by one or more methods described herein may subsequently be treated with that chemotherapeutic drug as a therapeutic approach for the cancer for which the chemotherapeutic drug is intended and/or approved.

Alternatively, the test subject determined to be non-responsive to the drug by one or more methods described herein may subsequently be treated with an alternative drug and/or therapeutic approach that is approved for the intended disease. For example, a test subject determined to be non-responsive to a chemotherapeutic drug by one or more methods described herein may subsequently be treated with other chemotherapeutic drugs.

Example 7. Stabilizing pMHC-TCR Binding

Chemical Fixation

Stabilizing the transient interaction between the peptide of the pMHC monomer and a TCR on the surface of a T cell may be desirable. One way to stabilize the pMHC-TCR interaction is through crosslinking (e.g., through chemical fixation). Chemical crosslinking is well known in the art and is the process of binding two or more protein molecules together to facilitate probing protein-protein interactions. The use of a chemical crosslinker, such as an amine-specific crosslinker (e.g., NHS, $BS^3$, EGS, sulfo-EGS, $BS(PEG)^9$, $BS(PEG)^5$, bis-$dPEG^5$-PFP, disuccinimidyl tartarate, dimethyl adipimate·2HCl, dimethyl primelimidate·2HCl, and dimethyl superimidate·2HCl), can lock the two proteins together through primary amines (e.g., through the N-terminus of each peptide and the side chain of lysine). During the incubation of the pMHC monomers with T cells of a subject, a chemical crosslinking reaction can be performed, locking the pMHC-TCR complex together for analysis. Any chemical-crosslinker capable of reacting with the pMHC monomer and the associated TCR can be used.

Modulating the Rate of pMHC-TCR Internalization

Upon binding and activation of TCR effector function, the pMHC-TCR complex is internalized within the T cell. The rate at which the pMHC-TCR complex is internalized can either be increased decreased, allowing the pMHC-TCR complex to spend more time on the T cell surface, or increased, internalizing the pMHC-TCR complex and effectively locking the complex together. Internalization is partly triggered by protein kinases, as shown Lissina et al. (*J. Immunol. Methods* 340:11-24, 2009). Incorporation of a protein kinase inhibitor, such as dasatinib, can inhibit internalization, allowing for longer incubation and pMHC-TCR complex formation. Increasing the rate of internalization can be achieved through the incorporation of protein kinase activators (e.g., anisomycin, byrostatin, 12-deoxyphorbol 13 phenylacetate 20-acetate (dPPA), oleic acid, PF-04937319 (CAS NO.: 1245603-92-2), PF-6808472 (Sigma), or prostratin) after the pMHC-TCR complex has been formed, initiating internalization. It will be important to inhibit lysosomal degradation of the pMHC-TCR complex after internalization. Mizuzhima et al. (*Cell,* 140(3): 313-326) demonstrated that chloroquine inhibits lysozyme activity by increasing the pH. Incorporation of chloroquine in the incubation buffer, or the addition of chloroquine to the incubation buffer after a protein kinase activator, can effectively inhibit lysosomal degradation.

OTHER EMBODIMENTS

While some embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

All publications and patent applications mentioned in this specification are herein incorporated by reference to the same extent as if each independent publication or patent application was specifically and individually indicated as being incorporated by reference in their entirety.

The invention claimed is:

1. A method for detection of binding of a peptide to a T cell comprising:
   (a) providing a peptide Major Histocompatibility Complex conjugate (pMHC) complex comprising a MHC monomer and a peptide, and wherein the MHC monomer comprises a reporter polynucleotide covalently attached thereto, wherein the reporter polynucleotide comprises a reporter sequence that identifies the peptide of the pMHC;
   (b) presenting the pMHC monomers to T cells to generate a pMHC bound to a T cell, wherein a T cell receptor (TCR) of the T cell binds a pMHC monomer to form a pMHC-TCR complex, wherein the pMHC-TCR complex is stabilized by:
      (i) using a chemical fixative;
      (ii) reducing diffusion of the pMHC monomer from the TCR; and/or
      (iii) retaining and/or increasing the rate of internalization of the pMHC-TCR complex into T cells;
   (c) partitioning the T cell and a plurality of nucleic acid barcode molecules comprising a cell barcode sequence into a partition; and
   (d) generating a barcoded nucleic acid molecule comprising (i) the reporter sequence or a reverse complement thereof and (ii) the cell barcode sequence or a reverse complement thereof.

2. The method of claim 1, wherein the T cell comprises a template nucleic acid molecule comprising a sequence corresponding to an immune receptor; and further comprising, subsequent to (c), generating an additional barcoded nucleic acid molecule comprising (i) a sequence of a V(D)J region of the immune receptor or a reverse complement thereof and (ii) the cell barcode sequence or a reverse complement thereof.

3. The method of claim 2, further comprising, lysing the T cell in the partition to release the template nucleic acid molecule.

4. The method of claim 3, wherein the template nucleic acid molecule is a messenger RNA (mRNA) molecule.

5. The method of claim 1, wherein the pMHC complex comprises a carrier, and wherein said pMHC monomer and said polynucleotide are attached to said carrier.

6. The method of claim 1, wherein the reporter polynucleotide comprises an adapter sequence, wherein at least some of said plurality of nucleic acid barcode molecules comprise a capture sequence complementary to said adapter sequence, and wherein (d) comprises hybridizing said adapter sequence to a first nucleic acid barcode molecule and performing one or more nucleic acid reactions to generate the barcoded nucleic acid molecule.

7. The method of claim 1, further comprising sequencing the barcoded nucleic acid molecule or a derivative thereof and/or the additional barcoded nucleic acid molecule or a derivative thereof to generate sequencing data corresponding to the barcoded nucleic acid molecule and the additional barcoded nucleic acid molecule.

8. The method of claim 1, wherein the chemical fixative in step (b) is not a thiol-based fixative.

9. The method of claim 1, wherein the chemical fixative is selected from the group consisting of ethylene glycol bis(succinimidyl succinate) (EGS), PEGylated bis(sulfosuccinimidyl)suberate (BS(PEG)9), BS(PEG)5, sulfo-EGS, bis-dPEG5-PFP, and bis(sulfosuccinimidyl)suberate (BS3).

10. The method of claim 1, wherein reducing diffusion of the pMHC monomer in step (c) comprises physiochemical alterations to the pMHC monomer and/or physiochemical alterations to the composition of the binding buffer.

11. The method of claim 1, wherein increasing the rate of internalization of the pMHC-TCR complex into T cells comprises stimulating protein kinase activity; and/or wherein retaining internalization of the pMHC-TCR complex comprises not using a protein kinase inhibitor.

12. The method of claim 1, wherein retaining and/or increasing the rate of internalization of the pMHC-TCR complex into T cells in step (b) further comprises inhibiting lysosomal degradation of the pMHC monomers in the T cells.

13. The method of claim 12, wherein inhibiting lysosomal degradation of the pMHC monomers comprises inhibiting DNAse II activity.

14. The method of claim 1, wherein the reporter polynucleotide comprises at least 1, 2, 3, 4, 5, 6, 7, 8, 9, or 10 nuclease-resistant internucleoside linkages.

15. The method of claim 1, wherein the plurality of nucleic acid barcode molecules are attached to a bead.

16. The method of claim 1, wherein the partition is a droplet in an emulsion or a well in a microwell array.

17. A system for detection of binding of a peptide to a T cell comprising:
(a) a peptide-MHC conjugate (pMHC) complex comprising an MHC monomer and a peptide, and wherein the MHC monomer comprises a reporter polynucleotide covalently attached thereto, wherein the reporter polynucleotide comprises a reporter sequence that identifies the peptide of the pMHC; and
(b) a pMHC-TCR stabilization agent comprising:
  (i) a chemical fixative;
  (ii) an agent configured to reduce diffusion of the pMHC monomer from a TCR; and/or
  (iii) an agent capable of retaining and/or increasing the rate of internalization of the pMHC-TCR complex into a T cell.

18. The system of claim 17, further comprising:
(c) a plurality of nucleic acid barcode molecules comprising a cell barcode sequence; and
(d) a device configured to partition a plurality of cells into a plurality of partitions.

19. The system of claim 18, wherein the device is a microwell array comprising a plurality of microwells.

20. The system of claim 18, wherein the device is a microfluidic device configured to generate a plurality of droplets in an emulsion.

\* \* \* \* \*

SEQUENCE LISTING

```
<160> NUMBER OF SEQ ID NOS: 4

<210> SEQ ID NO 1
<211> LENGTH: 16
<212> TYPE: DNA
<213> ORGANISM: Artificial sequence
<220> FEATURE:
<223> OTHER INFORMATION: Synthetic polynucleotide

<400> SEQUENCE: 1
aaaaaaaaaa aaaaaa                                                     16

<210> SEQ ID NO 2
<211> LENGTH: 27
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (25)..(25)
<223> OTHER INFORMATION: biotin-modified thymidine residue
<220> FEATURE:
<221> NAME/KEY: misc_feature
<222> LOCATION: (25)..(26)
<223> OTHER INFORMATION: three 18-atom hexaethylene glycol spacers
<220> FEATURE:
<221> NAME/KEY: misc_feature
<222> LOCATION: (26)..(26)
<223> OTHER INFORMATION: biotin-modified thymidine residue
<220> FEATURE:
<221> NAME/KEY: misc_feature
<222> LOCATION: (26)..(27)
<223> OTHER INFORMATION: three 18-atom hexaethylene glycol spacers
<220> FEATURE:
<221> NAME/KEY: misc_feature
<222> LOCATION: (27)..(27)
<223> OTHER INFORMATION: biotin-modified thymidine residue

<400> SEQUENCE: 2
caactttagc ggtccaaggt gcatttt                                         27

<210> SEQ ID NO 3
<211> LENGTH: 62
<212> TYPE: DNA
<213> ORGANISM: Artificial sequence
<220> FEATURE:
<223> OTHER INFORMATION: Synthetic polynucleotide
```

```
-continued

<220> FEATURE:
<221> NAME/KEY: misc_feature
<222> LOCATION: (25)..(25)
<223> OTHER INFORMATION: biotin-modified thymidine residue
<220> FEATURE:
<221> NAME/KEY: misc_feature
<222> LOCATION: (44)..(44)
<223> OTHER INFORMATION: biotin-modified thymidine residue
<220> FEATURE:
<221> NAME/KEY: misc_feature
<222> LOCATION: (62)..(62)
<223> OTHER INFORMATION: biotin-modified thymidine residue

<400> SEQUENCE: 3
caactttagc ggtccaaggt gcattcacac acacacacac acatcacaca cacacacaca      60
ca                                                                    62

<210> SEQ ID NO 4
<211> LENGTH: 90
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (44)..(77)
<223> OTHER INFORMATION: N is any nucleotide

<400> SEQUENCE: 4
caccttggac cgctaaagtt gcggagatgt gtataagaga cagnnnnnnn nnnnnnnnnn      60
nnnnnnnnnn nnnnnnnccc atataagaaa                                      90
```